United States Patent [19]

Paganini et al.

[11] 4,308,522

[45] Dec. 29, 1981

[54] IDENTITY VERIFICATION APPARATUS AND METHOD

[75] Inventors: Bruno J. Paganini, Centerville, Ohio; Jeram G. Advani, Miami, Fla.; Robert M. Whitely; William J. Hale, both of Dayton, Ohio

[73] Assignee: NCR Corporation, Dayton, Ohio

[21] Appl. No.: 21,851

[22] Filed: Mar. 19, 1979

[51] Int. Cl.³ .............................................. G06K 9/52
[52] U.S. Cl. ........................................ 340/146.3 SY
[58] Field of Search ................................... 375/27, 28; 340/146.3 SY, 146.3 R, 146.3 MA, 146.3 H, 146.3 SG

[56] References Cited

U.S. PATENT DOCUMENTS

| | | | |
|---|---|---|---|
| 3,145,367 | 8/1964 | Crane | 340/146.3 SY |
| 3,462,548 | 8/1969 | Rinder | 340/146.3 SY |
| 3,480,911 | 11/1969 | Danna | 340/146.3 SY |
| 3,579,186 | 5/1971 | Johnson et al. | 340/146.3 SY |
| 3,618,019 | 11/1971 | Nemirovsky et al. | 340/146.3 SY |
| 3,621,720 | 11/1971 | Clark | 340/146.3 SY |
| 3,818,443 | 6/1974 | Radcliffe, Jr. | 340/146.3 SY |
| 3,859,515 | 1/1975 | Radcliffe, Jr. | 340/146.3 SY |
| 3,906,444 | 9/1975 | Crane et al. | 340/146.3 SY |
| 3,950,733 | 4/1976 | Cooper et al. | 340/146.3 T |
| 3,956,734 | 5/1976 | Radcliffe, Jr. | 340/146.3 SY |
| 3,959,769 | 5/1976 | Sternberg et al. | 340/146.3 SY |
| 3,962,679 | 6/1976 | Engelbrecht | 340/146.3 SY |
| 3,983,535 | 9/1976 | Herbst et al. | 340/146.3 SY |
| 4,020,463 | 4/1977 | Himmel | 340/146.3 SY |
| 4,024,500 | 5/1977 | Herbst et al. | 340/146.3 SG |
| 4,028,674 | 6/1977 | Chuang | 340/146.3 SY |
| 4,035,769 | 7/1977 | Sternberg et al. | 340/146.3 SY |
| 4,040,011 | 8/1977 | Crane et al. | 340/146.3 SY |
| 4,040,012 | 8/1977 | Crane et al. | 340/146.3 SY |
| 4,055,756 | 10/1977 | Jolivet et al. | 364/725 |
| 4,086,567 | 4/1978 | Crane et al. | 340/146.3 SY |
| 4,128,829 | 12/1978 | Herbst et al. | 340/146.3 SY |
| 4,143,357 | 3/1979 | Baver et al. | 340/146.3 SY |

OTHER PUBLICATIONS

Andrews, "Multidimensional Rotations in Feature Selection", *IEEE Trans. on Computers*, Sep. 1971, pp. 1045–1051.

Nemcek et al., "Experimental Investigation of Automatic Signature Verification", *IEEE Trans. on Systems, Man, and Cybernetics*, vol. SMC-4, (1974), pp. 121–126.

Bremermann, "Pattern Recognition, Functionals, and Entropy", *IEEE Trans. on Bio-Med. Eng.*, vol. BME-15, No. 3, pp. 201–207, Jul. 1968.

Meltzer, "Speech Synthesis by Haar Functions with Comparison to a Terminal Analog Device", Ph. D. Dissertation, Ohio State University, pp. 16–30, 1972.

Meltzer et al., "Vowel and Speaker Identification in Natural and Synthetic Speech, *JASA*, vol. 51, p. 131, Jan. 1972.

Haar; A., "Zur Theorie der Orthogonalen Funktionen-systeme", *Math. Annalen.*, vol. 69, pp. 331–371, 1910.

Andrews; H. C., *Computer Techniques in Image Processing*, Academic Press, pp. 73–103, 1970.

Andrews; H. C. et al., "Kronecker Matrices, Computer Implementation, and Generalized Spectra", *JACM*, vol. 17, pp. 260–268, Apr. 1970.

Andrews et al., "A Generalized Technique for Spectral Analysis", *IEEE Trans. on Computers*, vol. C-19, No. 1, pp. 16–25, Jan. 1970.

*Primary Examiner*—Leo H. Boudreau
*Attorney, Agent, or Firm*—J. T. Cavender; Albert L. Sessler, Jr.

[57] ABSTRACT

A method and apparatus are provided for verifying the identity of a person by establishing and storing a standard vector for said person based upon predetermined characteristics derived from a number of handwriting samples, and then comparing said standard with a vector derived from a corresponding sample of handwriting provided by said person at the time the identity of said person is to be verified. Derivation of the vector is accomplished by digitizing an analog waveform representing forces generated by writing, compressing the digitized information, extracting Haar coefficients and directly observable features from the compressed digital information, and deriving a vector from said Haar coefficients and said directly observable features.

33 Claims, 31 Drawing Figures

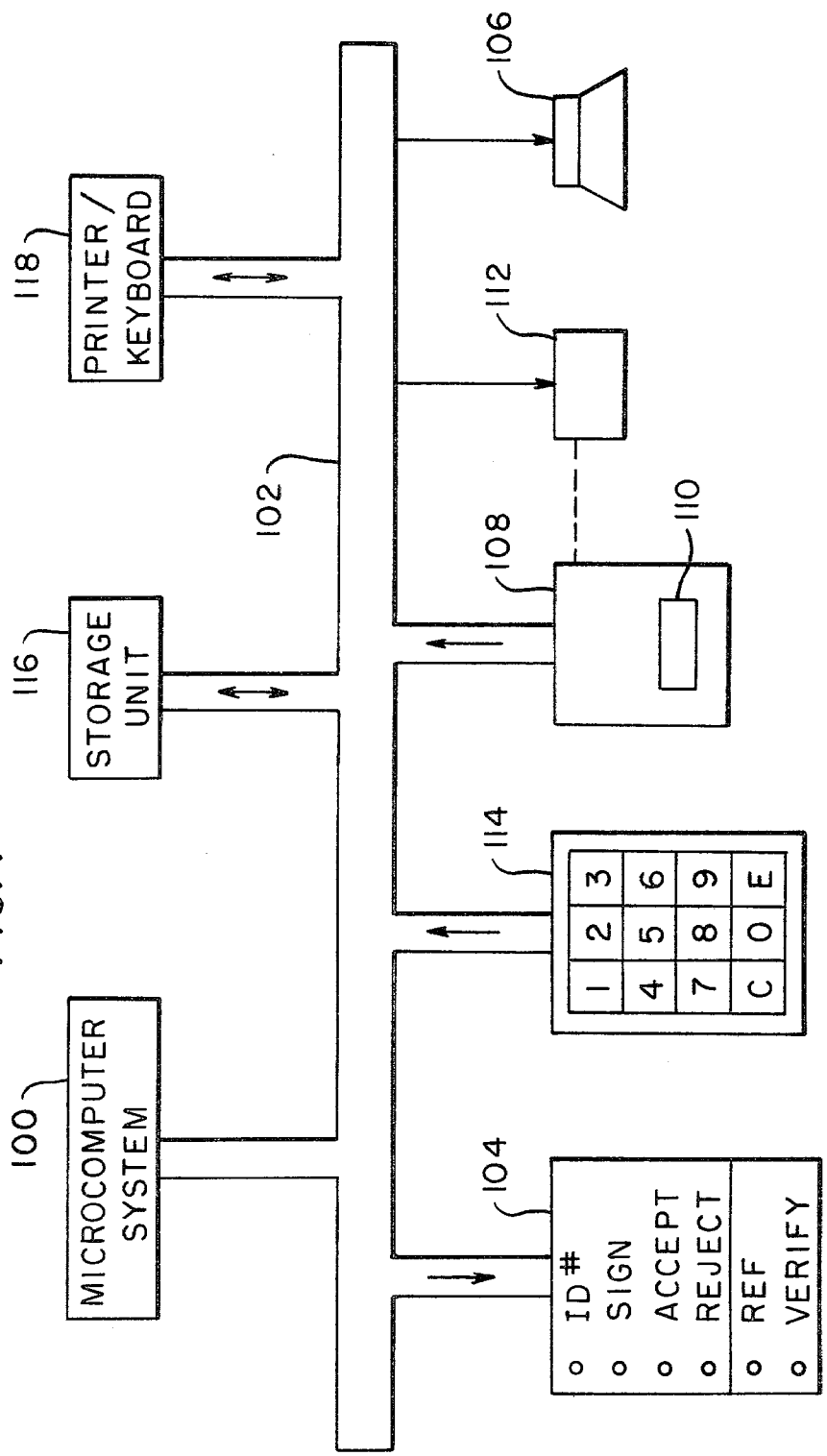

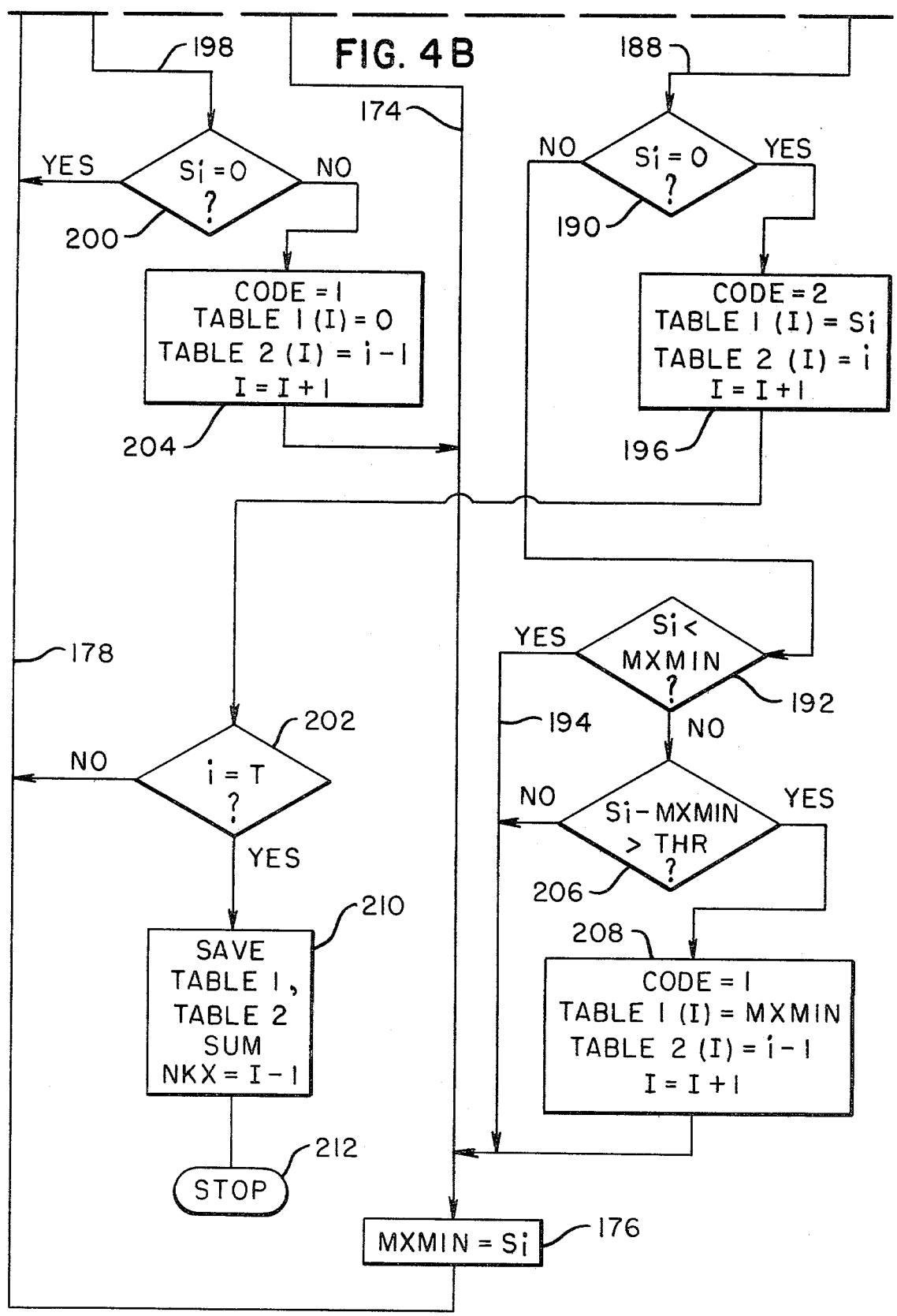

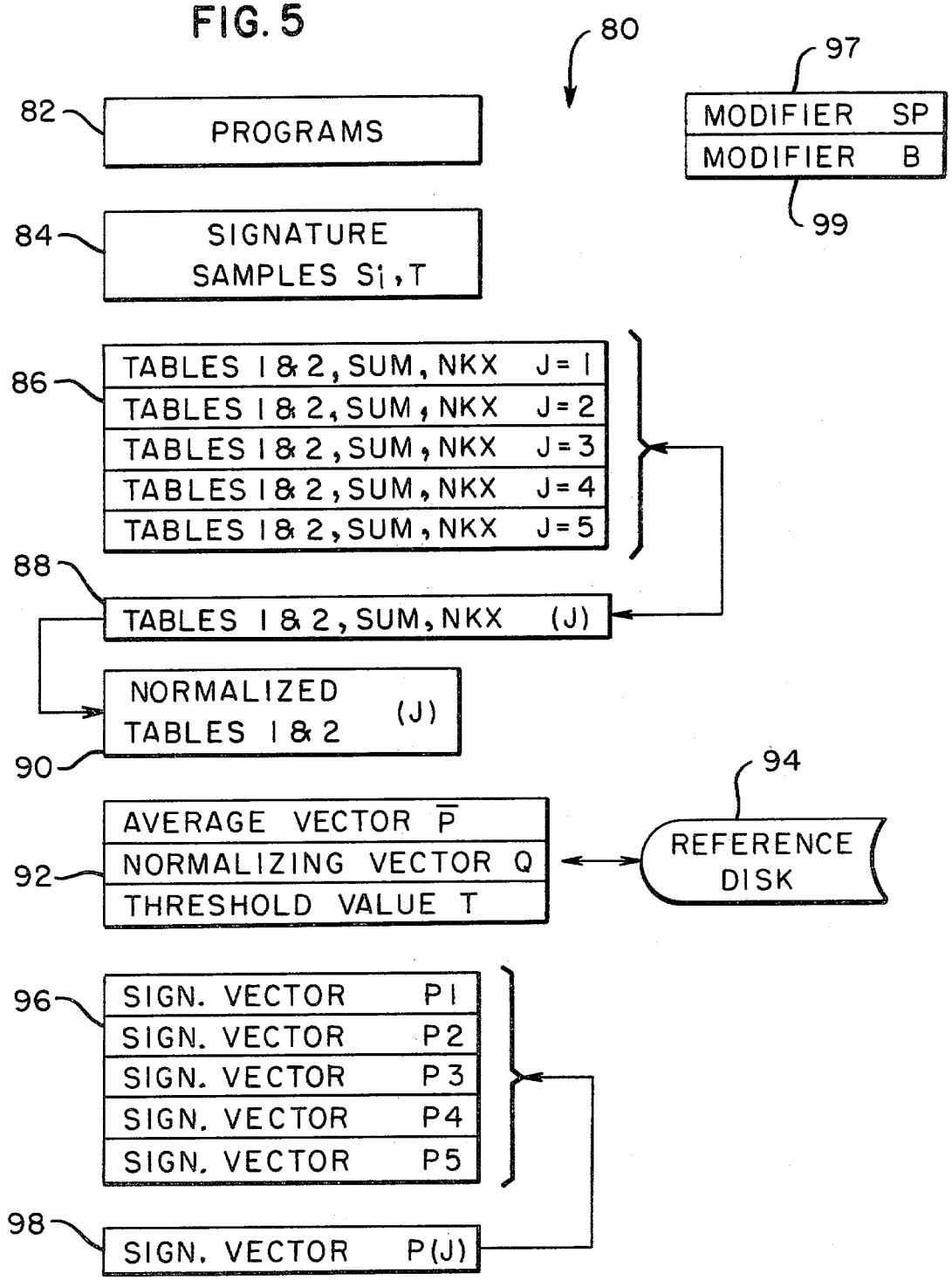

| I | 1 | 2 | 3 | 4 | 5 | 6 | 7 | 8 |
|---|---|---|---|---|---|---|---|---|
| TABLE 1 | 9 | 27 | 0 | 0 | 15 | 3 | 13 | 0 |
| TABLE 2 | 1 | 9 | 12 | 13 | 15 | 18 | 19 | 21 |

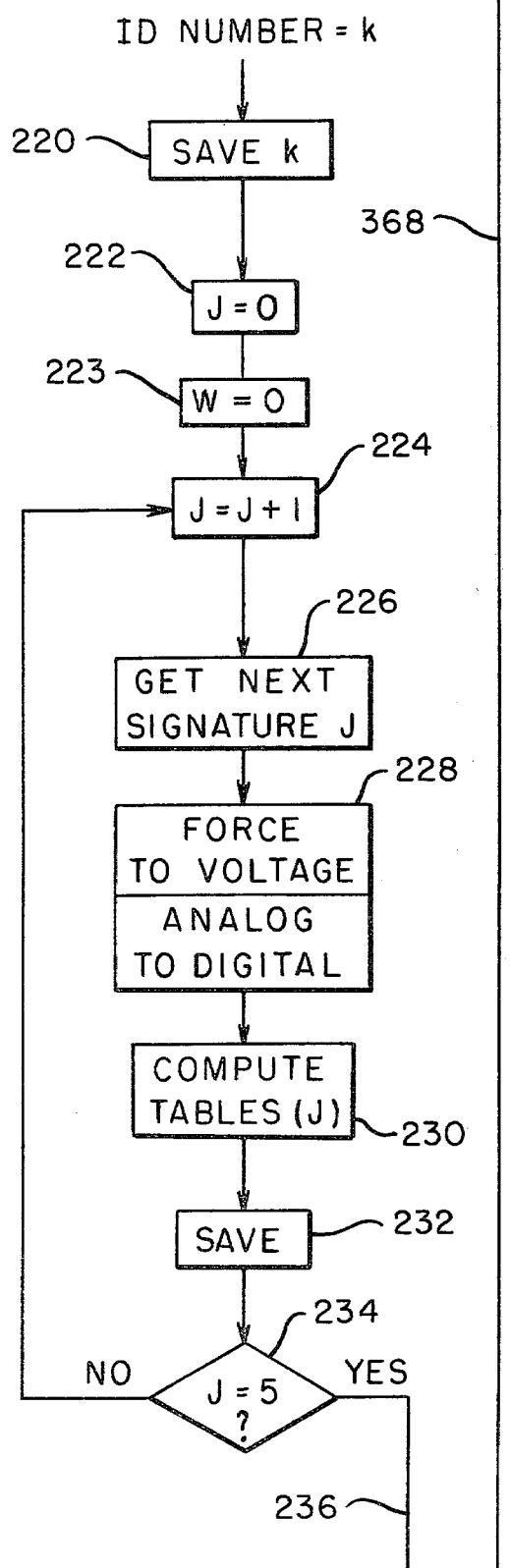
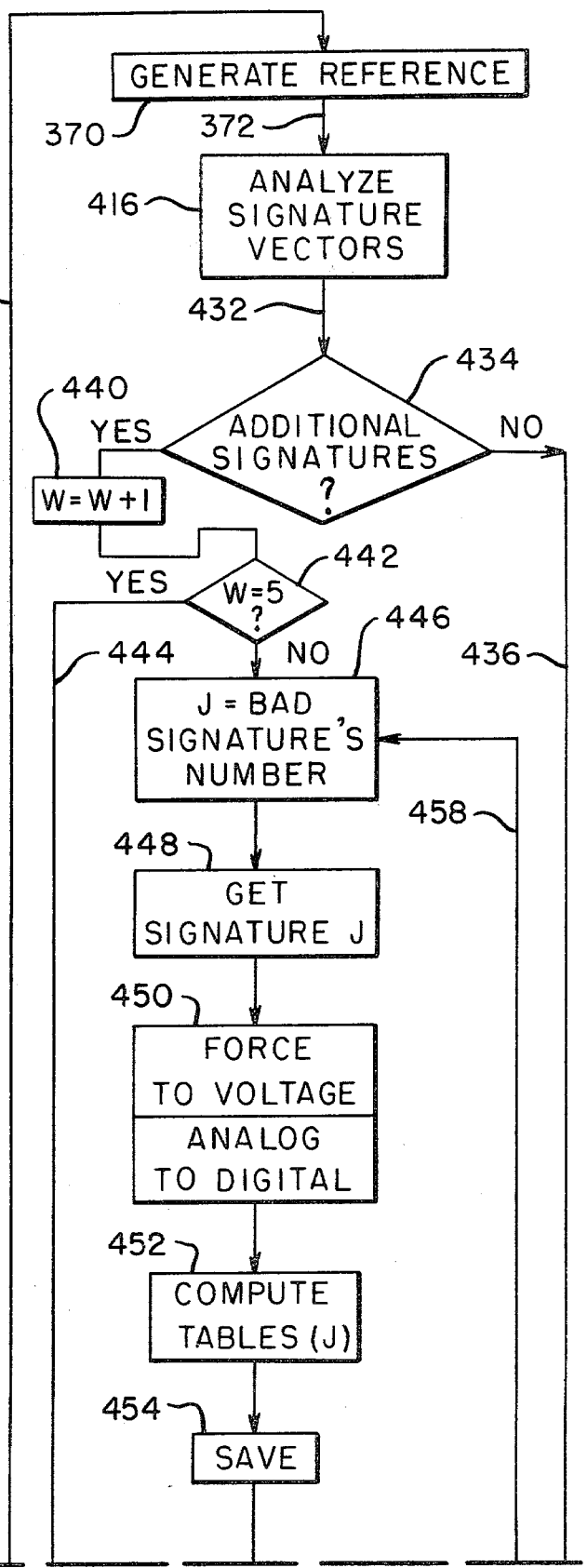
FIG. 7A

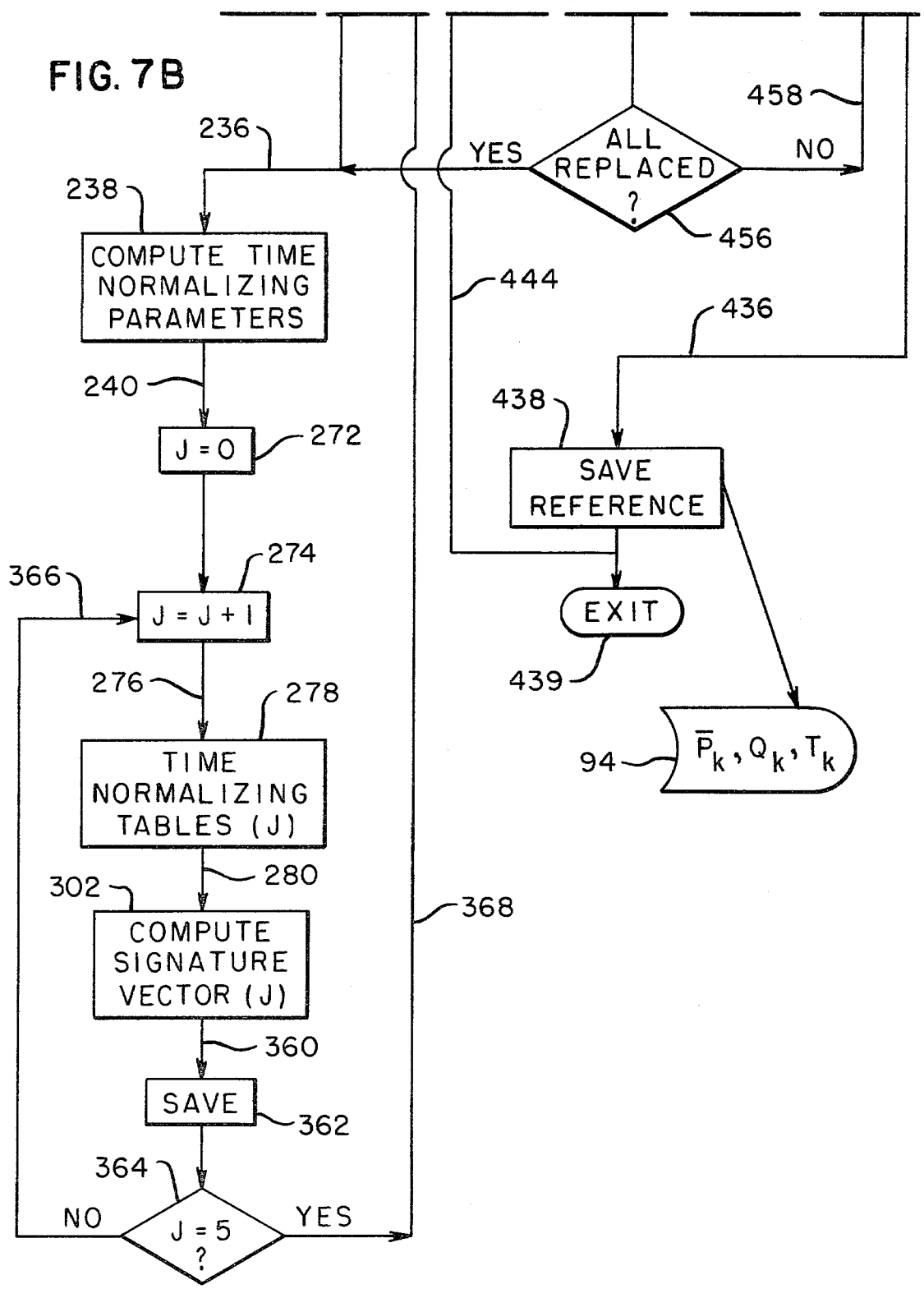

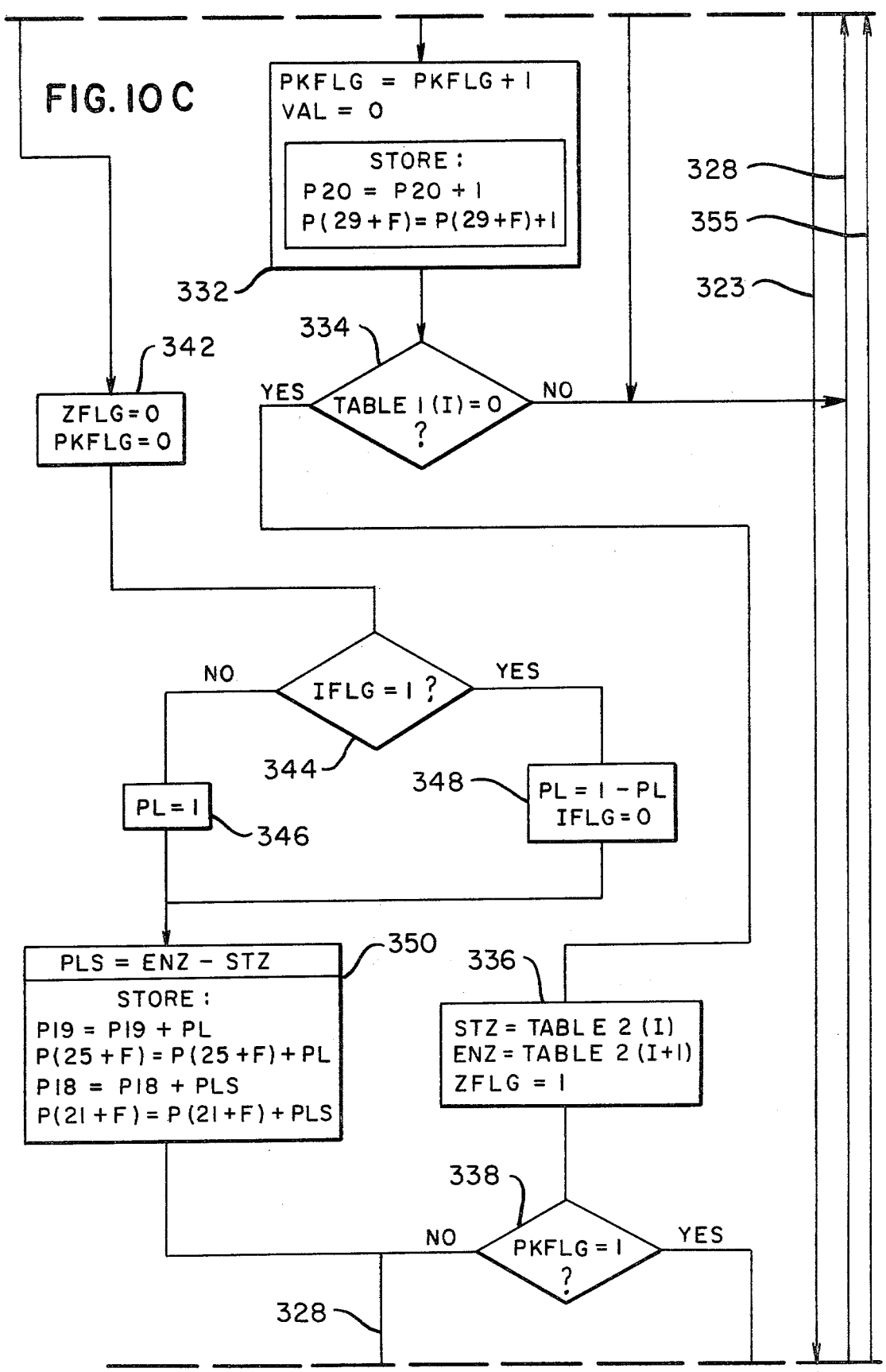

FIG. 14

368 — COMPUTE AVERAGE VECTOR $\overline{P}$ AND SAVE
$$\overline{P}_r = \frac{1}{5}\sum_{j=1}^{5} P_{j,r} \text{ FOR } r = 1, 2 \ldots 37$$

374, 376 — COMPUTE VARIANCE VECTOR V
$$V_r = \frac{1}{5}\sum_{j=1}^{5} (P_{j,r} - \overline{P}_r)^2 \text{ FOR } r = 1, 2 \ldots 37$$

378 — COMPUTE NORMALIZING VECTOR Q AND SAVE
$Q_r = B_r \times \overline{P}_r^2$ IF $\overline{P}_r \geq SP_r$ AND IF $B_r \times \overline{P}_r^2 > V_r$
$Q_r = B_r \times SP_r^2$ IF $SP_r > \overline{P}_r$ AND IF $B_r \times SP_r^2 > V_r$
$Q_r = V_r$ OTHERWISE

412 — COMPUTE ERRORS $E_j$
$$E_j = \sum_{r=1}^{37} \frac{(P_{j,r} - \overline{P}_r)^2}{Q_r}$$

414 — COMPUTE THRESHOLD VALUE T
$$T = KT \times \frac{1}{5}\sum_{j=1}^{5} E_j$$

372

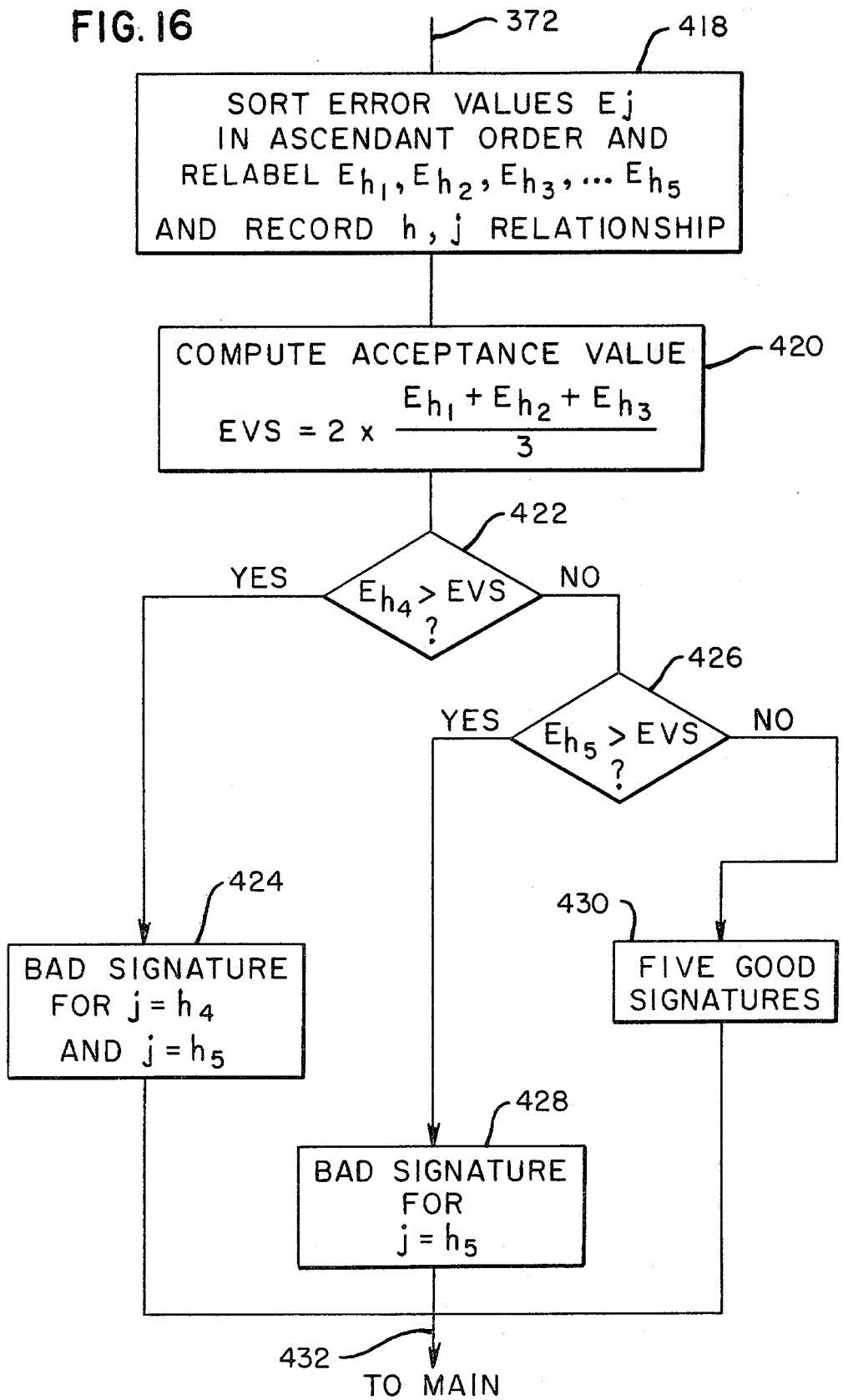

IDENTITY VERIFICATION APPARATUS AND METHOD

BACKGROUND OF THE INVENTION

The need for security in systems utilized in various types of financial, governmental, retail, manufacturing and other establishments, in order to prevent use of the system, or entry into the system, by unauthorized parties is a current and pressing problem. One solution to the problem is to provide reliable means to verify that the party requesting use of, or entry into, the system is, in fact, the person he or she claims to be. For the purpose of verifying the identity of an individual, some unique personal characteristics such as, for example, facial features, fingerprints, voice patterns or signature of the individual may be employed.

One suitable characteristic is the force pattern of an individual's signature. Systems have been developed which are capable of distinguishing between a forged signature and a valid signature on this basis. This may be accomplished by detecting individually distinctive force characteristics of a signature to be tested and converting them into electrical signals which can be automatically processed and compared with the stored representation of an authentic signature, for determination of whether or not the tested signature is a valid one.

A number of United States Patents have issued which are directed to signature verification, including U.S. Pat. Nos. 3,480,911; 3,579,186; 3,618,019; 3,818,443; 3,859,515; 3,906,444; 3,959,769; 3,962,679; 3,983,535; 4,028,674; 4,035,769; 4,040,011; 4,040,012; and 4,086,567.

A continuing need exists for signature verification systems which provide increased accuracy, reliability and speed of operation. The system which is the subject of the present invention offers a novel arrangement which is readily and conveniently implemented to provide the signature vectors which enable comparisons to be carried out for the purpose of verification with a high degree of accuracy.

SUMMARY OF THE INVENTION

This invention relates to signature verification systems, and more particularly relates to such a system wherein an analog waveform derived from a signature is used in the generation of Haar coefficients included in a signature vector representative of such signature.

In accordance with one of the embodiments of the invention, apparatus for identifying the writer of handwritten information comprises a source of identifying indicia corresponding to the individual handwriting characteristics of said writer and comprising a reference vector and a threshold; means responsive during the writing of such information for generating a first signal representative thereof; means for deriving an information vector representative of said first signal; means for comparing said information vector with said reference vector and including means for generating a second signal indicative of said comparison; and means for comparing said second signal with said threshold and including means for providing an identifying signal whenever said second signal bears a predetermined relationship to said threshold.

In accordance with another embodiment of the invention, a method for verifying the identity of a person from samples of handwriting comprises the steps of deriving an information vector from a handwriting sample of a person whose identity is to be verified; providing identification indicia assigned to the person whose signature is to be verified; comparing said information vector with a reference vector associated with the identification indicia provided to derive an error value representing the variance between the two vectors; comparing said derived error value with a threshold value associated with the identification inidicia provided; and providing indication of acceptance if the derived error value is less than the threshold value and providing indication of rejection if the derived error value is greater than the threshold value.

It is accordingly an object of the present invention to provide an improved signature verification system.

Another object is to provide an improved method of signature verification.

An additional object is to provide an improved system and method for signature verification employing Haar coefficients.

A further object is to provide a method and apparatus for providing a compressed digitized representation of an analog signal.

A further object is to provide a method and apparatus for providing a compressed digitized representation of a signature.

A further object is to provide a method and apparatus for deriving a standard for verifying the identity of a person from samples of handwriting.

A further object is to provide a method and apparatus for deriving an information vector for verifying the identity of a person from a handwriting sample.

With these and other objects, which will become apparent from the following description, in view, the invention includes certain novel features of construction and combinations of parts, one form of embodiment of which is hereinafter described with reference to the drawings which accompany and form a part of this specification.

BRIEF DESCRIPTION OF THE DRAWINGS

FIG. 1 is a block diagram showing the hardware components of the signature verification system of the present invention.

FIGS. 4A and 4B together form a detailed flow diagram of the sequence of operations performed by the system in generating a compressed table of values for each signature.

FIG. 5 is a diagrammatic showing of various memory locations contained in the memory of the microcomputer system and the associated "secondary" storage units.

FIGS. 7A and 7B together form a detailed flow diagram showing the operation of the system in the reference mode.

FIGS. 10A, 10B, 10C and 10D together form a detailed flow diagram showing the operation of the system in computing the signature vector, used in both the reference and verification modes.

FIG. 14 is a detailed flow diagram showing the operation of the system in generating reference values used in the reference mode.

FIG. 16 is a detailed flow diagram showing the operation of the system in analyzing signature vectors, said operation being used in the reference mode.

DESCRIPTION OF THE PREFERRED EMBODIMENT

Figure 2A:
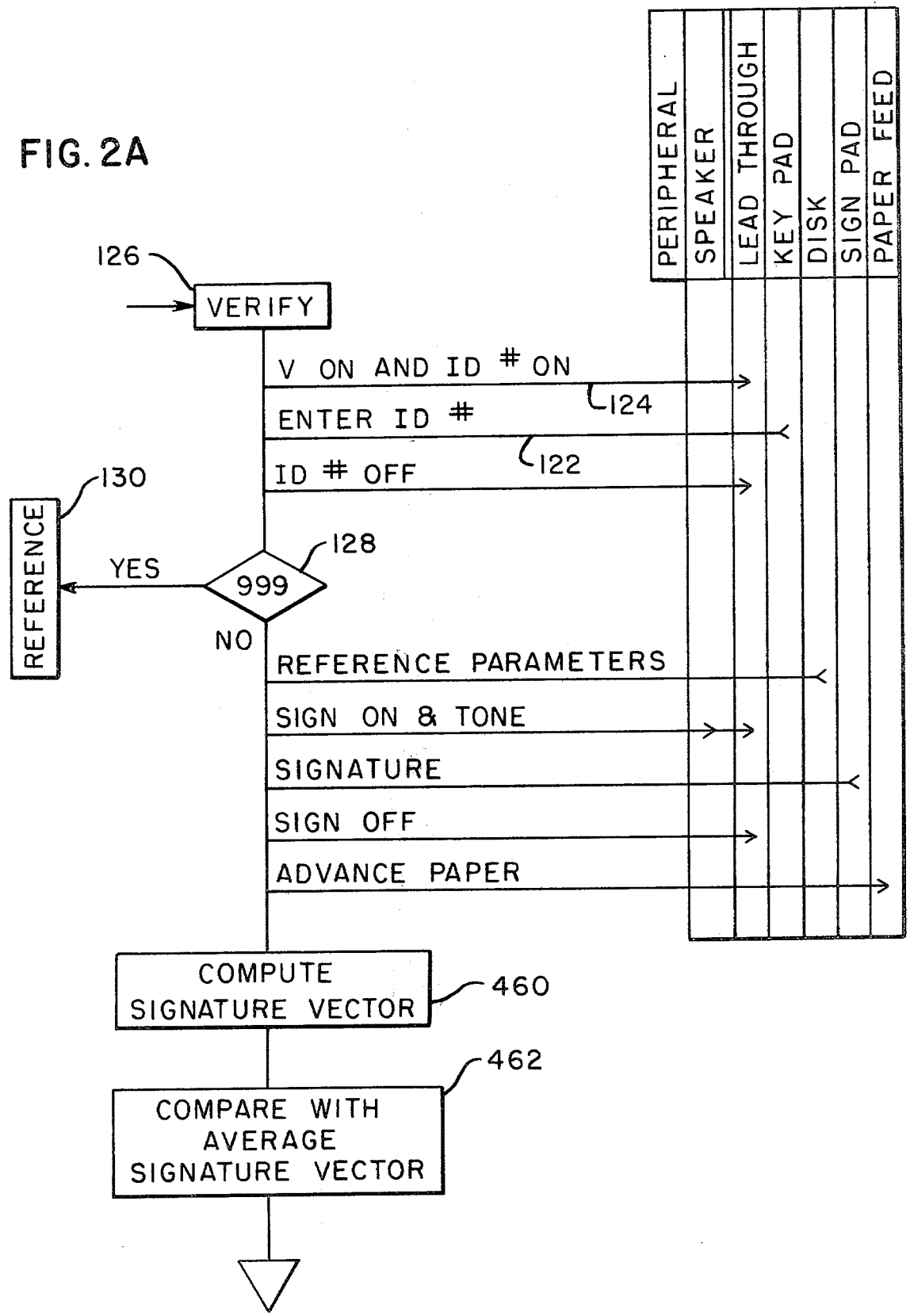
FIGS. 2A, 2B and 2C together form a generalized flow diagram of the operation of the signature verification system of the present invention in the verification and reference modes.

Referring now to the drawing, a signature verification system is shown in block form in FIG. 1. This system comprises a central processor unit 100, which includes a suitable microcomputer system, such as, for example, an Intel 80/10 microcomputer system. The unit 100 controls, by means of a software operating system, the input-output peripheral units which are connected to a common data bus 102 and also contains all algorithms and performs all computations required for the personal verification system.

The unit 100 includes a memory 80, a partial map of which is shown in FIG. 5. Included in said memory are a location 82 for storage of programs during operation, a location 84 for storage of data representing signatures or other handwritten data made for reference or verification purposes by customers, a location 86 for storing data representing five different signature samples, a common storage location 88 in which the data for the individual signature tables is collected, a location 90 used in performing normalizing operations, a location 92 for receiving reference signature data to be used in verification operations from a storage location 94 in "secondary" storage unit 116, and initially calculating such data for storing in location 94 of storage unit 116, a location 96 in which signature vectors for five signatures are stored, and a common storage location 98 which is used in generation of the individual signature vectors. As used herein, the term "signature vector" refers to a digital representation of certain defined characteristics of a handwriting sample, which may be a signature, but is not limited to such. The term "information vector" could be used in place of "signature vector", if desired.

A plurality of customer interface units are provided to enable the customer to perform the required actions for verification of identity, and to guide the customer in performing the necessary actions in the proper sequence.

A first such unit connected to the data bus 102 is the lead-through unit 104, which provides instructions to the customers as to the sequence of operations to be followed. The various indicators and their significance are tabulated below:

| | |
|---|---|
| ID # | Enter identity claim number |
| SIGN | Sign on signature pad |
| ACCEPT | Positive verification |
| REJECT | Negative verification |
| REF | System is in reference mode |
| VERIFY | System is in verify mode |

A second unit connected to the data bus 102 which may be employed is a speaker 106 which provides an audible tone each time that a signature is required by the system.

An additional unit connected to the data bus 102 is the signature pad unit 108 on which the customer executes the signature to be verified. A window 110, located above a force-sensitive surface, over which a record medium for receiving the signature travels, defines the signing area, and an associated paper feed mechanism 112, also connected to the data bus 102, advances the record medium after the signature has been completed. Any suitable signature pad structure may be employed, with one such suitable unit being disclosed in the U.S. Pat. No. 4,143,357, issued Mar. 6, 1979, inventors Donald W. Baver et al., and assigned to the assignee of the present application. Any suitable means may be employed for compensation for drift of the signature table or pad from a null position, one such method and apparatus being disclosed in the co-pending application Ser. No. 016,677, filed Mar. 1, 1979, inventor Robert M. Whitely, and assigned to the assignee of the present application.

Another unit connected to the data bus 102 is a key pad 114, by means of which information, such as a customer identification number, can be entered into the system. In the illustrated embodiment, the key pad unit contains twelve keys, including ten digits, one "clear" and one "enter" key.

In addition to the customer interface units described above, two other units are connected to the data bus 102 in the illustrated embodiment.

One of these is a storage unit 116, which in the illustrated embodiment takes the form of a dual drive diskette which is used to store information required by the system, such as standards generated from the signatures of those customers who have been made a part of the system, programs for the system, and associated information utilized in performing the operations for which the system is designed.

Another unit is a printer/keyboard unit 118, which may be used to input commands to load programs from the storage unit 116, and to provide means for outputting the results of transactions performed on the system, as for example during testing operations.

The operating system software provides two operating modes: reference and verification.

The reference mode is utilized for enrollment of a person into the system so that his identity can be verified by the system at subsequent times whenever desired. In the reference mode, an ID claim number is assigned for each customer, a number (five in the illustrated embodiment) of signatures are requested by the system and are made by the customer, a "standard" or "reference" is generated by the system from the five signatures, and the standard is stored in the storage unit 116 for later accessing by the ID number in subsequent verification of customer identity.

In the verification mode of operation, a customer enters his or her ID number into the system via the key pad unit 114, the standard for such ID number is fetched from location 94, a signature is requested by the system through the lead-through unit 104, the signature is made by the customer on the signature pad unit 108, the signature is compared to the standard, and the result is displayed on the unit 104. It will be recognized that the customer ID number could be entered into the system by other means than manual keying, such as, for example, a transaction card on which the ID number is stored magnetically, optically or by other means. Multiple tries, up to a predetermined number, may be permitted by the system if desired.

Figure 2B:
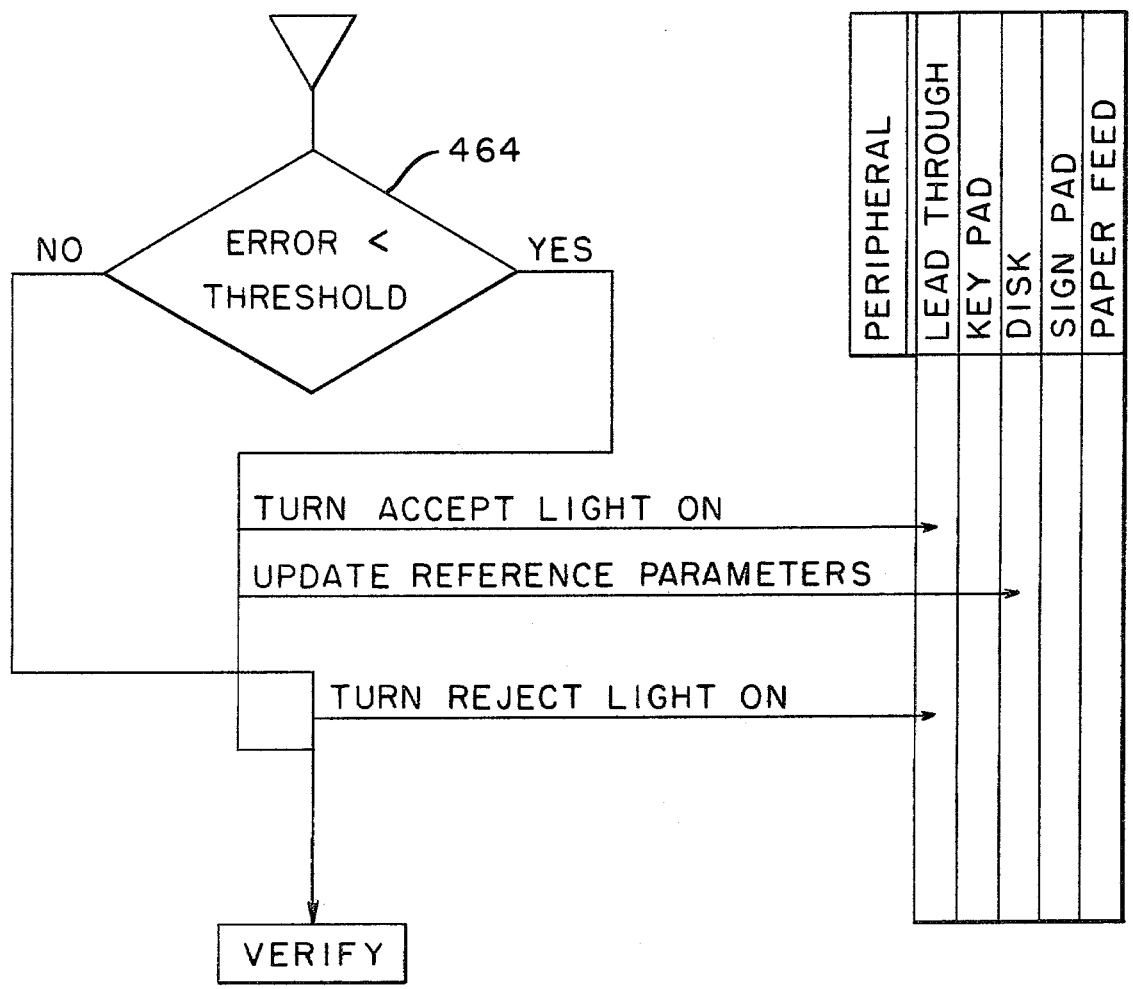
Figure 2C:
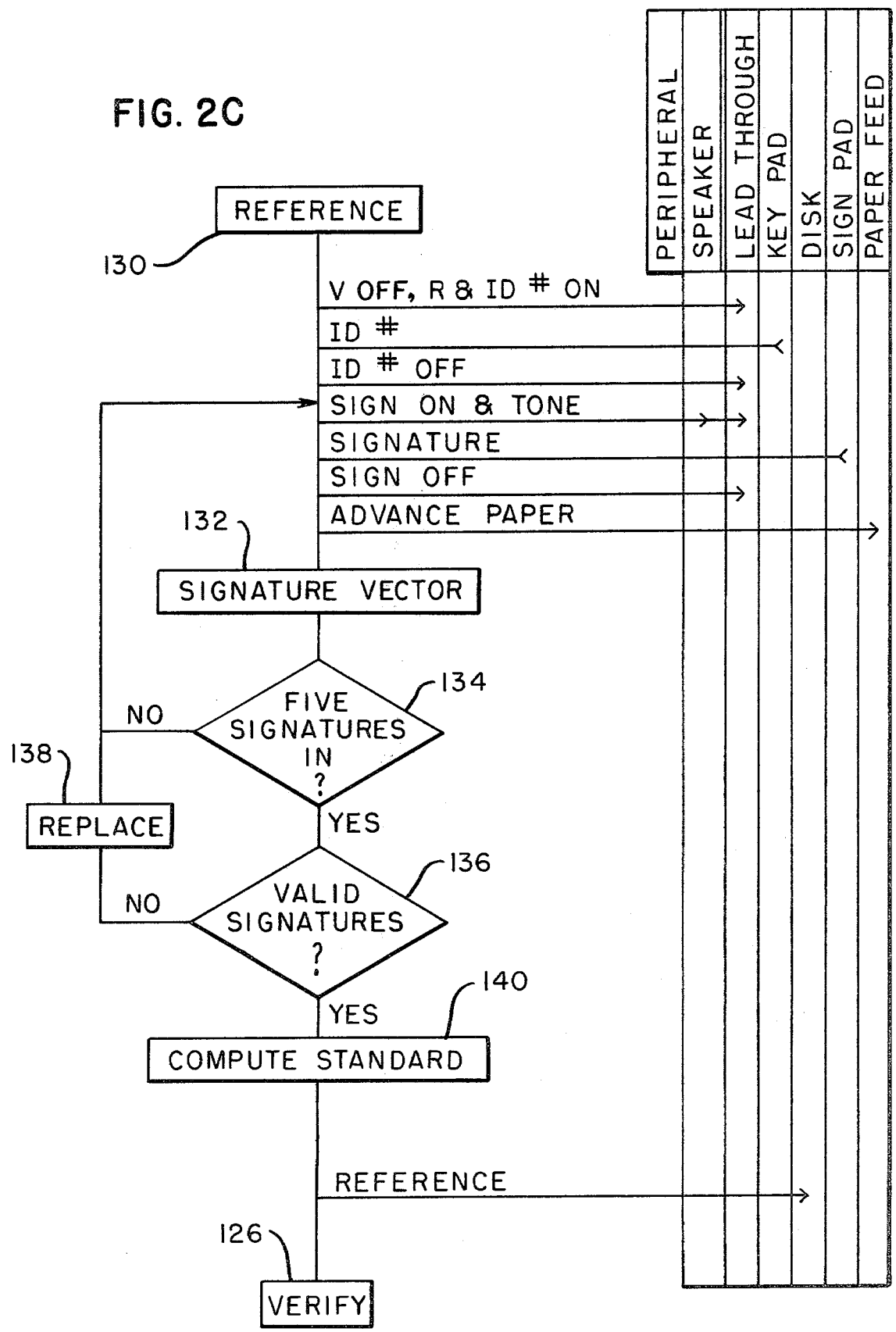

FIGS. 2A, 2B and 2C provide a generalized flow diagram of system operation, and also include, by means of the block representations at the right of these figures connected to flow diagrams by horizontal lines, a reference to the system peripheral units which are involved in the various steps of the operations. It may be noted that appropriate software for driving these peripheral units is provided, and interacts with the system programs which control the overall operations, and which are loaded from the storage unit 116 (FIG. 1) into the microcomputer system 100.

With the system on and in condition to commence operation, it is in the "verify" mode, as represented by block 126 (FIG. 2A); the lead-through unit 104 shows the verify indicator "V" on and the "ID#" indicator on, as represented by line 124; and the system is ready to accept an identity claim number (ID#) from the key pad unit 114, as indicated by line 122. If a special code (illustratively 999) is entered as an ID#, in place of the normal customer ID# which would be used in the verification mode, the system will switch through a decision block 128 to the reference mode, represented by block 130, for generating a standard. One standard is maintained for each customer using the system. It is generated in the reference mode, is updated after each successful verification attempt, and is stored in the storage unit 116, being indexed by ID#.

Referring now to the generalized flow diagram of FIG. 2C, it may be seen that with the system in the reference mode, as indicated by block 130, the lead-through unit 104 shows the verify indicator V off, and the reference and ID# indicators on. The customer then enters his or her assigned ID#, which causes the ID# indicator to go off, the sign indicator to go on, and an audible tone to sound from the speaker unit 106. The customer then signs a signature on the pad 108, which causes the sign indicator to go off and the record medium to be advanced. A signature vector is computed, using the force relationships generated by the signature, in a manner to be subsequently described, as designated by the signature vector block 132. This process is repeated until five sample signatures have been written, a signature vector is computed for each, and each vector is tested for validity with respect to the vectors taken as a whole to detect abnormal signatures, as represented by the decision blocks 134 and 136. Any invalid signatures are replaced, as indicated by the block 138.

Utilizing the signature vectors of the five valid signatures, a reference is then computed, as represented by block 140, and the reference is then stored in the storage unit 116. The system then returns to the verify mode, as represented by block 126.

Figure 3A:
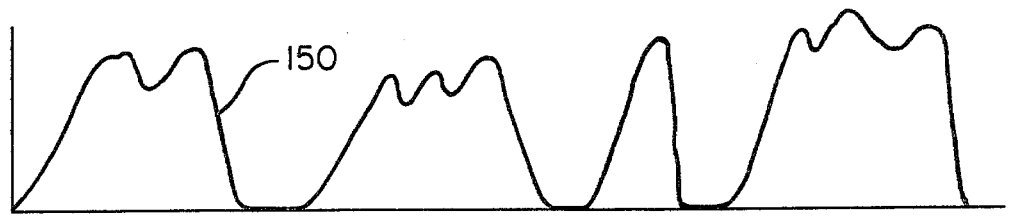
FIGS. 3A, 3B, 3C and 3D show waveform representations of a signature at various stages of processing by the system.

A significant aspect of the system described herein is the generation of signature vectors from the signing of signatures by the customer on the signature pad 108, such signature vectors being used in both the reference and verification modes. The action of the writing instrument on the writing surface produces a force versus time relationship which is translated by the unit 108 into a voltage versus time relationship. A graphical representation of a typical signature is shown in FIG. 3A, with time represented by the horizontal coordinate and voltage by the vertical coordinate. The waveform 150 of FIG. 3A is then digitized by sampling it at a predetermined rate, which may typically be one hundred samples per second, as represented by the vertical lines 152 in FIG. 3B. Thus if making a signature takes seven seconds, there will be a total of seven hundred samples. The amplitudes of the samples thus derived are stored in memory.

Figure 3B:
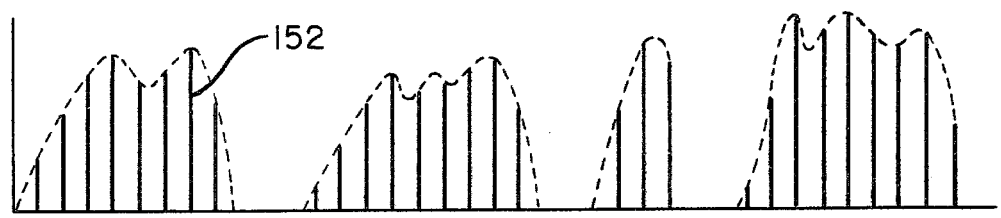
Figure 18:
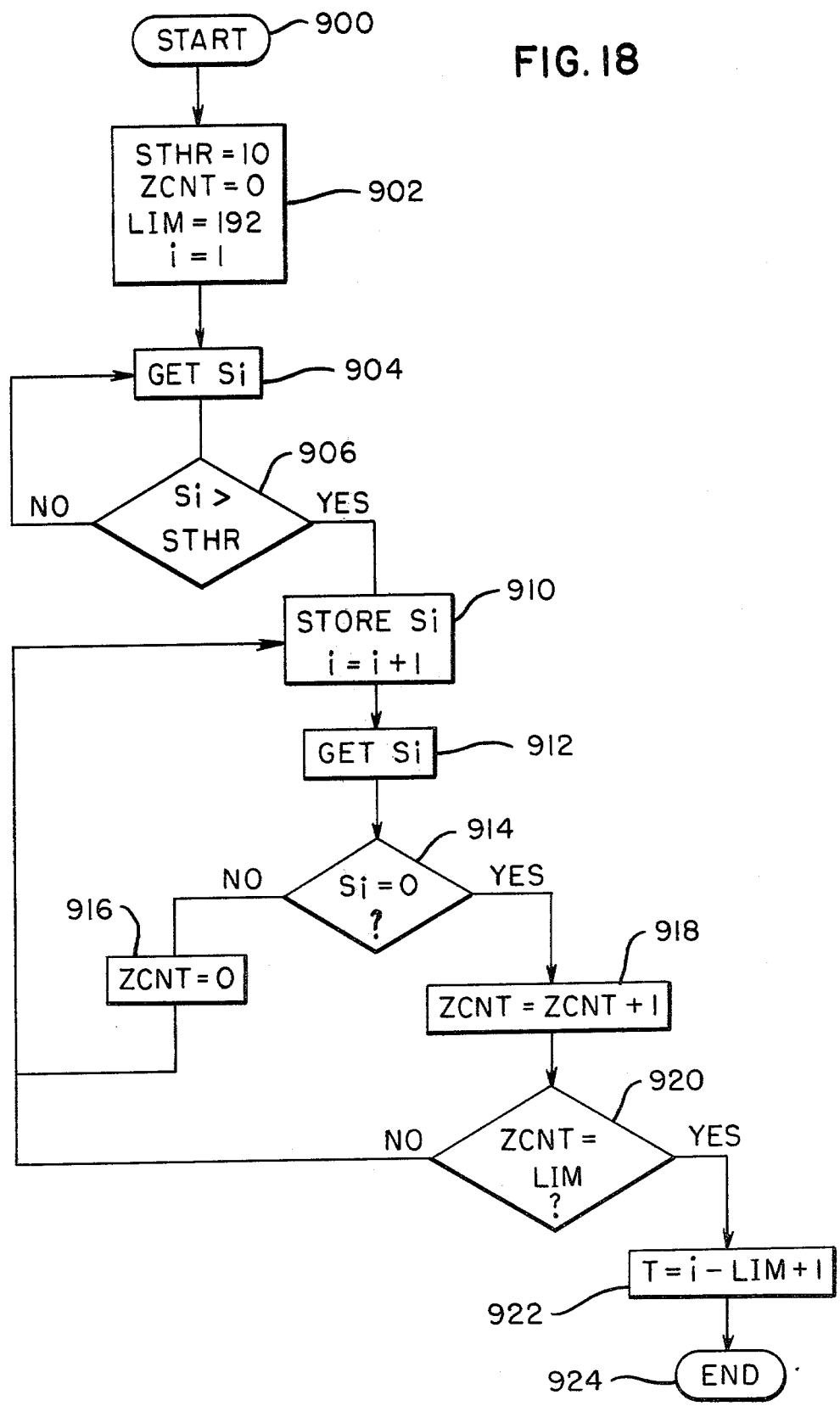
FIG. 18 is a detailed flow diagram showing the operation of the system in saving the signature samples in memory.

The flow diagram of FIG. 18 sets forth the sequence of operations performed by the system in storing the magnitudes of the digitized samples represented by FIG. 3B in memory location 84 of memory 80, FIG. 5. In commencing this operation, the microcomputer system 100 of FIG. 1, after turning the SIGN indicator of unit 104 on, and sending an audible tone on unit 10, is ready to receive the digitized values from signature pad unit 108. In order to detect the start of a signature the magnitudes of the signature samples received are compared to an arbitrarily determined threshold value STHR. The first sample with magnitude larger than STHR marks the start of the signature. It will also be noted that the digitized values in the illustrated implementation of this invention may range from zero to a maximum 255. To detect the end of a signature, the number of consecutive zero magnitude samples encountered in the waveform is compared to a numerical value equal to a number of sample times sufficient in duration to exceed the vast majority of inter-signature pauses, or "pen lifts", by the writer, so that when this value is exceeded, a clear indication is provided that the signature has actually terminated. In the illustrated embodiment, the number 192 has been found to be a suitable value. This value is represented in FIG. 18 by LIM, which provides a means for distinguishing between "pen lift" situations and the end of a signature. It may be noted that the operation following commencement as indicated by the START block 900 (FIG. 18), proceeds under the conditions set forth in block 902. STHR may suitably be set equal to 10 in the illustrated embodiment; LIM may suitably be set equal to 192 in the illustrated embodiment, as previously described; ZCNT, representing the number of successive zero magnitude samples, is set equal to zero; i, representing the time, in number of samples, since the start of the signature, is set equal to one. Operation proceeds to block 904, where the system accepts one digitized value representing the magnitude of the waveform for sample number i, denoted by $S_i$. The operation then proceeds to decision block 906 where the value $S_i$ is compared to STHR.

Assuming $S_i$ is less than or equal to STHR, the operation loops back to block 904, where the system waits for the next sample to be generated by writing of a signature on signature pad unit 108 (FIG. 1). The same operational sequence is repeated until, in decision block 906, the magnitude of the sample $S_i$ is larger than the value STHR. The sample $S_i$ is then stored in memory location 86 as represented by block 910. It may be noted that the value i was maintained equal to one throughout this operation. The value i is now incremented by one, and the operation proceeds to block 912, where the system waits and accepts the next sample $S_i$. Assuming that the magnitude $S_i$ is not equal to zero, the operation will loop through decision block 914, to block 916, where ZCNT is set to zero, and then back to block 910, where $S_i$ is stored in memory location 86. For the case that $S_i=0$, operation will continue to block 918 where the zero counter is incremented by 1. Assuming that the current count i does not equal the predetermined limit of 192, as determined in decision block 920, the processing loop proceeds to blocks 910 and 912 to store the current sample $S_i$ and to receive the next sample. Let it be assumed that $S_i$ represents the end of the signature, so that sample amplitude thereafter equals zero for the required 192 samples. The operation will then loop through blocks 912, 914, 918, 920, 910 back to 912 until the zero counter reaches the value LIM equal to 192. At this time the operation continues to block 922 where the value T, representing the total signature time in number of samples, is computed by subtracting the value LIM from the current value i and adding one. The operation of storing the signature samples in memory location 84 is completed as shown by block 924. In the illustrated embodiment, each signature sample is represented by an 8-bit word.

Figure 3C:
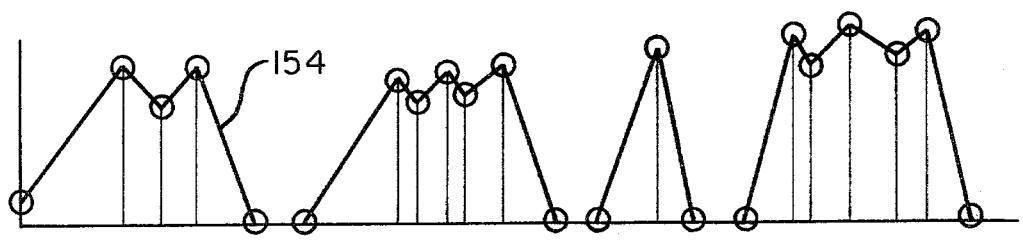
Figure 3D:
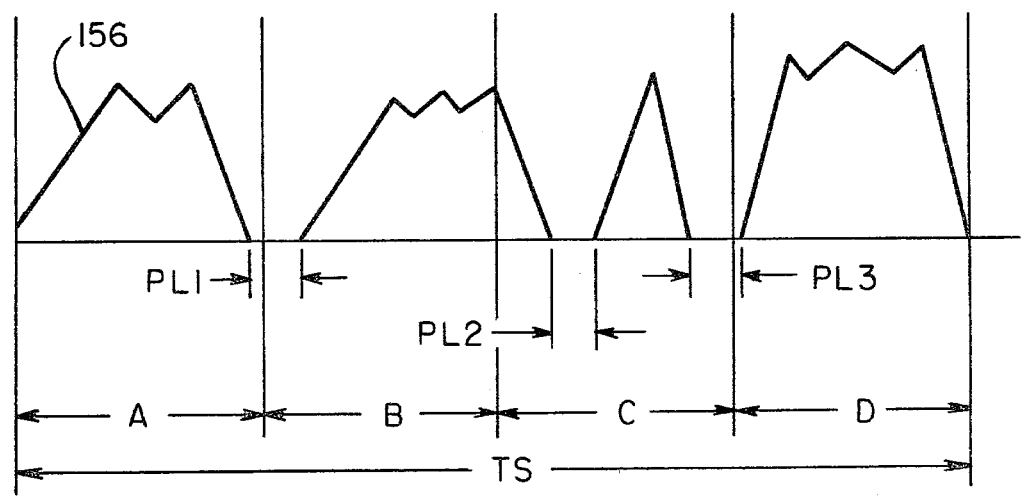

The stored signature data is then processed to achieve a data compression of the digitized samples. If desired, this processing could be done in real time, rather than from storage, as is done in the illustrated embodiment. The process waveform 154 is shown in FIG. 3C. The waveform 156 of FIG. 3D is essentially the same as the waveform of FIG. 3C and shows certain of the time intervals and relationships relevant in processing the signature vector.

The flow diagram of FIGS. 4A and 4B sets forth the sequence of operations performed by the system of the present invention in generating a compressed table of values for each signature from which a signature vector can be computed in accordance with another sequence of operations, to be subsequently described. The flow diagram of FIGS. 4A and 4B will be described in association with reference to FIG. 6, which is an illustrative waveform representing a portion of a signature, not corresponding to the waveform of FIGS. 3A to 3D inclusive. A total of twenty-one sampling points are represented in FIG. 6, with the sample number corresponding to one of the twenty-one equal time divisions, and the corresponding point on the waveform representing a voltage amplitude. Certain of the sample numbers are identified by the designation S1, S2, etc.

Processing and compression of the signature data involves the determination of maximum and minimum points in the signature waveform and measurements of certain time characteristics of the signature. In order to be selected as a maximum or a minimum point, a sample value must not only reflect a change of sign in the slope of the waveform, as defined later, but must also differ in value from the preceding sample by more than a given threshold amount.

Figure 4A:
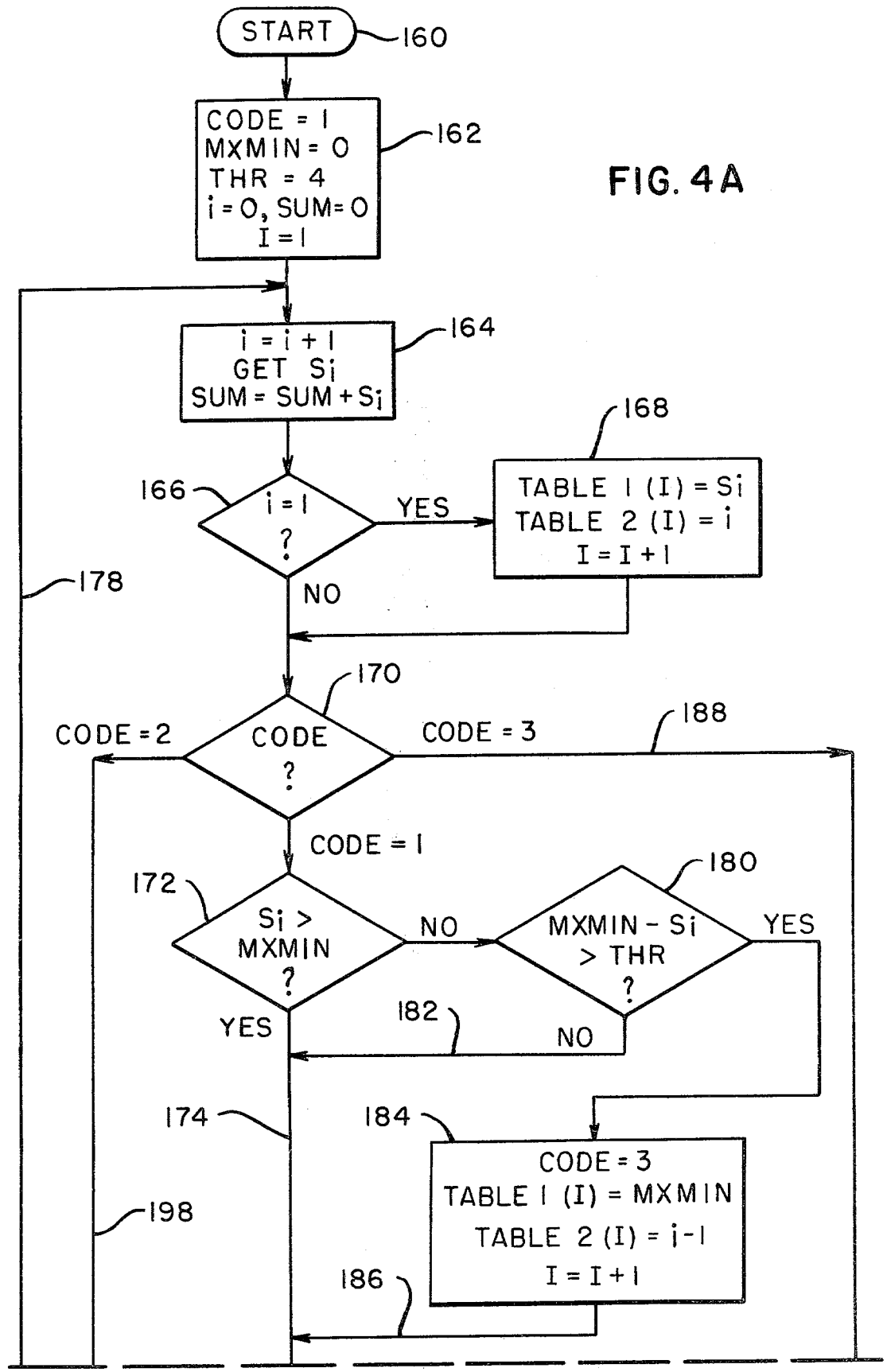

Referring to FIGS. 4A and 4B, it may be noted that $S_i$ represents the digitized value of the "ith" sample of the waveform. The value "i" represents the time, in number of samples, since the start of a signature. "MXMIN" represents the last maximum or minimum sample value maintained in storage. The values assigned to CODE are employed to describe certain waveform conditions during the operation. A value of one assigned to CODE means that the slope of the waveform is positive ($S_{i+1} > S_i$); a value of two assigned to CODE means that the sample value $S_i$ is 0; and a value of three assigned to CODE means that the slope of the waveform is negative ($S_{i+1} < S_i$).

In commencing the data compression operation from the START block 160 of FIG. 4A, a number representing the magnitude of the first sample $S_i$ is stored in TABLE 1 of the memory location 88 (FIG. 5), represented by block 168 of FIG. 4A, while the corresponding time (namely one) is stored in TABLE 2 of said memory location. It may be noted that the operation is commenced under the conditions set forth in block 162, namely CODE value set equal to 1; MXMIN value set equal to zero; a value of four assigned for the threshold THR; i, representing the sample number, is set equal to zero; and a SUM value, in which a cumulative total of sample magnitudes is maintained for the purpose of generating one of the values to be used in determining a signature vector, is set equal to zero. The value I, representing the entry number in TABLE 1 and TABLE 2, is set to one.

As shown in block 164, the system increments the value of i by one for each sample, fetches the corresponding sample value from memory location 84, and accumulates a running sum of sample magnitudes, which can be used in calculating a signature vector. Since $i=1$ at the beginning of the operation, the sample amplitude value $S_1$ is stored as the first entry (I equals 1) in TABLE 1, and the i value of 1, representing sample time, is stored as the first entry in TABLE 2 of memory location 88. The value I is then incremented by one, as shown in block 168. The value I is now equal to two, as shown in block 168.

Figures 6A, 6B:
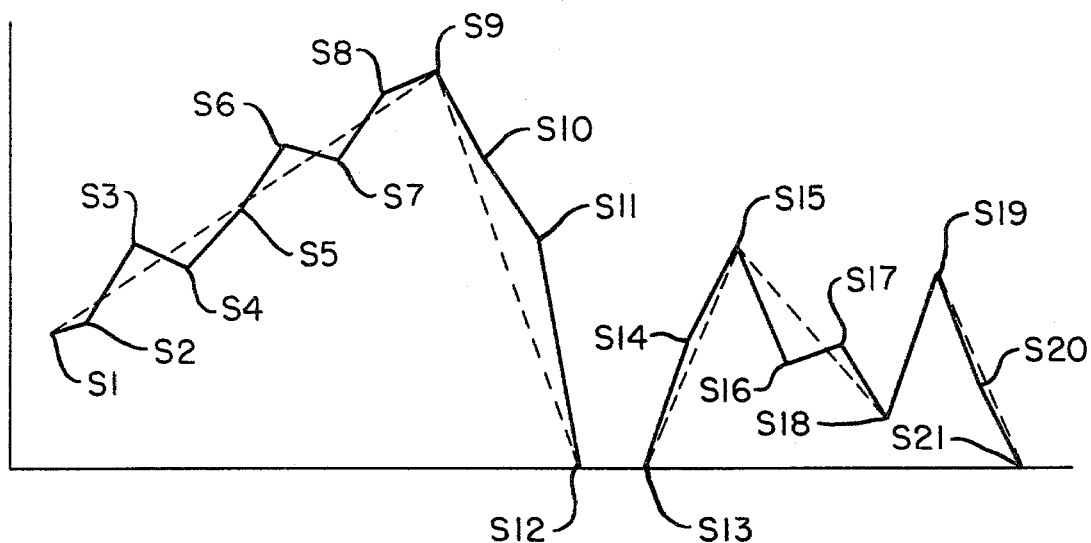
FIG. 6A is a diagrammatic showing of a digitized representation of a typical signature or segment thereof.
FIG. 6B is a table showing compressed values of data representing the waveform of FIG. 6A.

The first sample, for which $i=1$, which is fetched out of memory location 84, corresponds to point S1 on the waveform of FIG. 6A. System operation proceeds through decision blocks 170, 172 and over path 174 and said first sample is stored, as shown in block 176 (FIG. 4B) in an appropriate memory location (not shown) in memory 80 by virtue of the fact that the system is in CODE 1 condition and that the sample value exceeds MXMIN, which was initially set to zero.

The system then operates through a loop which includes path 178. The next sample, corresponding to point S2 on the waveform of FIG. 6A, is then routed through decision blocks 166, 170 and 172 of FIG. 4A, it being noted that S2 is greater in amplitude than the previous MXMIN of sample S1, and over path 174, and is stored in memory 80 in place of the previous stored S1 sample as the new MXMIN, as shown in block 176. Processing of samples continues with sample S3, which is greater in amplitude than previous sample S2, and which is stored in its place as the new MXMIN.

The fourth sample S4, which is less in magnitude than sample S3, as shown in FIG. 6A, is next processed. As a consequence of its comparison with MXMIN in block 172, it is then tested, as shown in block 180, to determine whether it is lesser in amplitude than MXMIN by a factor exceeding the previously established threshold of four. Since it is not, system operation loops back over path 182 to path 174, and sample S4 is then stored as the new MXMIN, in place of the previously stored S3. The system then loops back over path 178 to receive the next sample, as previously described.

The same sequence of operation as described above continues as samples S5 to S9 inclusive are processed by the system. In each case, the new sample replaces the previous sample as MXMIN, as represented in block 176.

When sample S10 is processed, it is substantially lower in amplitude than MXMIN as determined in block 172, and is therefore tested in block 180. Since MXMIN exceeds S10 by more than the threshold of four, processing continues as shown in block 184, in which the CODE is changed from 1 to 3, and the previous MXMIN (corresponding to S9) is stored in TABLE 1 of the selected memory location 88, as the second entry (I is two) in that table, while i minus 1 (which equals 9) is stored in TABLE 2, also as the second entry. The value of I is then incremented by one, assuming a value of three. System operation then loops back over path 186 to path 174, and sample S10 is stored as the new MXMIN, in place of the previously stored S9. The system then loops back over path 178 to receive the next sample.

When sample S11 is processed, the CODE is now 3, and processing therefore proceeds over path 188 to decision block 190 (FIG. 4B) for a determination of whether or not the magnitude of sample S11 equals zero. Since it does not, processing continues to decision block 192, where the sample S11 is compared to the MXMIN, and found to be lesser in magnitude, so that processing continues along path 194 and sample S11 is stored in place of the current MXMIN, as shown in block 176.

Sample S12 is then processed through blocks 170 and 190, and since its magnitude is equal to zero, processing continues as shown in block 196. The CODE is changed from 3 to 2, zero is stored as the third entry (I equals three) in TABLE 1 of memory location 88, representing the magnitude of sample S12, and 12 is stored as the third entry in TABLE 2 representing the sample time. The value I is incremented by 1, to four. Operation continues to block 202, where the current value of i is compared to the total number of samples T. As it is not equal to the total number of samples T, operation of the system then loops back over path 178 to receive the next sample.

Since CODE is equal to two, and sample S13 is also zero in magnitude, processing proceeds from block 170 over path 198, to block 200, and the processing loop returns to block 164 to receive the next sample.

Since sample S14 has a positive amplitude, system processing continues from block 200 to block 204, where the code is changed from 2 to 1, zero is stored as the fourth entry in TABLE 1, and thirteen (14-1) is stored as the fourth entry in TABLE 2, representing sample time; I is incremented by one, so that I equals five. Processing proceeds over path 174 and the amplitude of sample S14 is stored as MXMIN, as shown in block 176, after which the system loops over path 178 to receive the next sample.

It may be noted that the interval between the two zeroes stored in TABLE 1, as measured by the sample times stored in TABLE 2, represents a "pen lift" during the signature process, such as may take place between the signing of first and last names, or between a name and an initial.

Processing of samples S15 and S16 is accomplished in the manner previously described, resulting in the storage of the amplitude $S_i$ and time i of sample S15, in TABLE 1 and TABLE 2 respectively for I=5. Similarly, the processing of samples S17 and S18 is carried on. When sample S19 is processed, the system follows the CODE 3 path 188 from block 170 through decision blocks 190, 192 and 206 to perform the functions set forth in block 208. The CODE is changed from 3 to 1; the MXMIN value, corresponding to the amplitude of sample S18, is stored in TABLE 1, and the sample time value of 18 is stored in TABLE 2. Thereafter the amplitude of sample S19 is stored as MXMIN.

Samples S20 and S21 are then processed in the manner described above. Let it be assumed that sample S21 represents the end of the signature, so that sample amplitude thereafter equals zero for the required one hundred ninety-two samples. It will be seen that sample S21 will cause the CODE to be changed from 3 to 2; zero is stored as the Ith entry in TABLE 1 of memory location 88, representing the magnitude of sample S21, and 21 is stored as the Ith entry in TABLE 2, representing the sample time. The value I is incremented by one. Operation proceeds to decision block 202. This time the value i is equal to the total number of samples T, at which the system functions as shown in block 210, to save the current amounts stored in TABLE 1 and TABLE 2, the number of entries NKX, and the sum of the sample magnitudes SUM, by shifting them from memory location 88 to the appropriate location in the memory area 86, and to stop, as shown in block 212.

TABLE 1 and TABLE 2 are thus loaded in location 88 to store the compressed significant information concerning the signature just made, and these tables, when shifted to location 86, can then be employed to derive a signature vector which can be used in either the reference or the verification mode of operation of the system.

FIG. 6B shows TABLE 1 and TABLE 2 entries corresponding to the waveform of FIG. 6A for the various entries $I_1$ to $I_8$. For this waveform, NKX equals eight, and SUM equals 253, which represents the sum of all of the values of $S_i$ from i equals 1 to i equals 21.

A detailed description of the operation of the system in the reference mode will now be provided, in connection with the flow diagram appearing in FIGS. 7A and 7B, as well as certain additional flow diagrams which set forth in greater detail specific parts of FIGS. 7A and 7B.

As shown in FIG. 7A, system operation in the reference mode is commenced by entering an ID# "k" into the keyboard unit 114. This number is saved in an appropriate location in storage, as indicated in block 220. A quantity "J", representing the number in a suitable memory location of a group of signatures to be made by a customer to establish a standard, is set equal to zero in block 222. A quantity "W", representing the number of times that a customer "k" is permitted to replace invalid signatures, is set equal to zero in block 223. The quantity "J" is incremented by one in block 224.

The customer is then directed in block 226 to make a signature on unit 108, which converts said signature to digital voltage samples in block 228. TABLE 1 and TABLE 2 are computed from said samples in block 230, utilizing the process shown in FIGS. 4A, 4B, as previously described, and stored in memory location 86 (FIG. 5), as represented in block 232. Decision block 234 causes this process to be repeated until tables for five signatures have been computed and stored, at which time the process continues over path 236 to block 238, where time normalizing parameters are computed. The time normalization process is required to compensate for the differences in the duration of the pen lift regions of different signatures of the same person.

Figure 8:
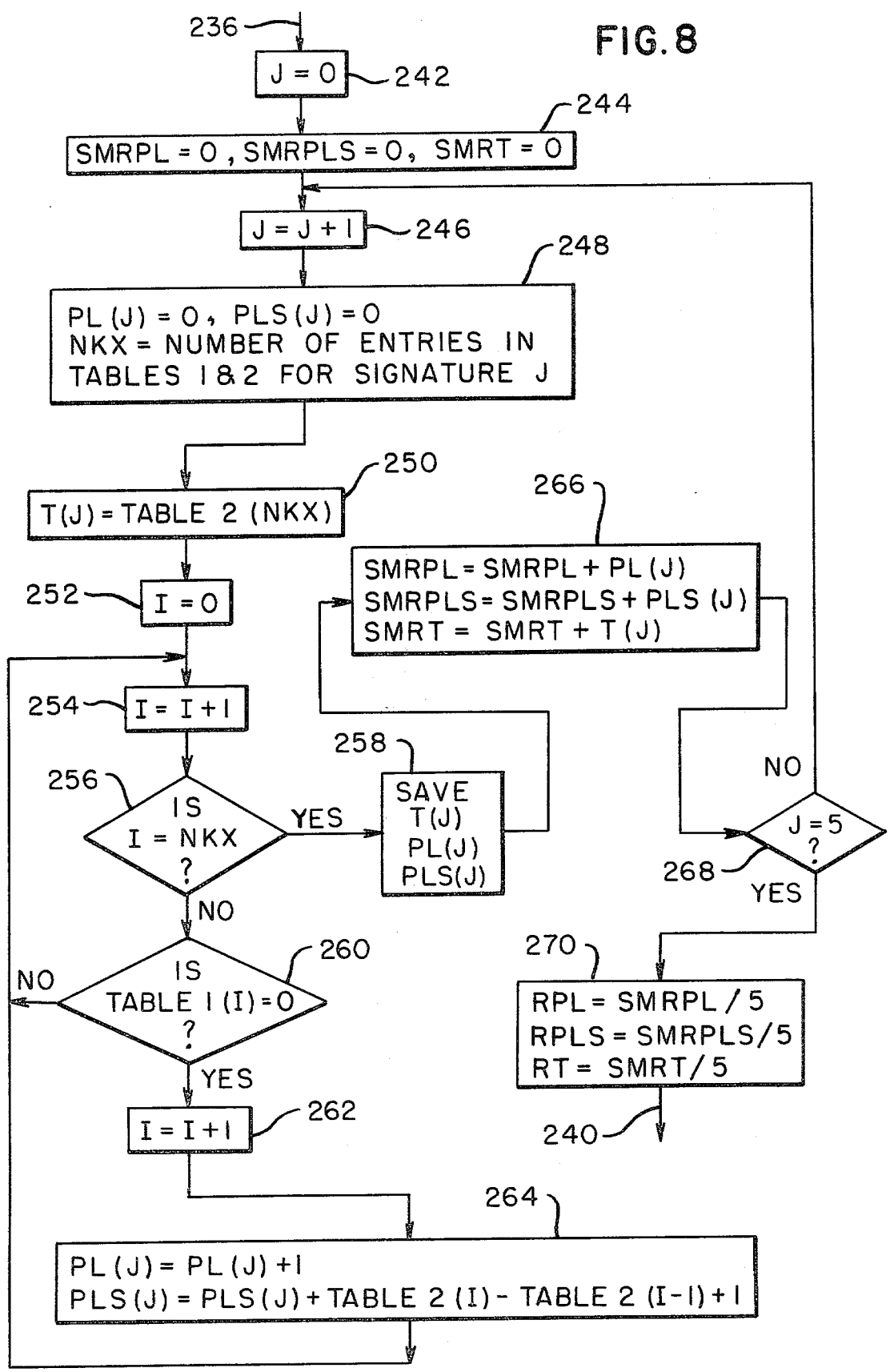
FIG. 8 is a detailed flow diagram showing the operation of the system in computing time normalizing parameters, used in the reference mode.

The detailed flow diagram for block 238 of FIG. 7B is shown in FIG. 8. The time normalizing process is commenced in block 242 by the setting to zero of the signature number "J" in an appropriate memory location.

As represented by block 244, a number of quantities stored in suitable memory locations are set to zero, including the following, which have meanings as described below:

SMRPL—is the sum of the pen lifts in all of the signatures to be considered (five in the illustrated embodiment).

SMRPLS—is the sum of the samples in the pen lifts in all of the signatures to be considered.

SMRT—is the sum of the time durations of all of the signatures to be considered.

In block 246, the signature number (J) is incremented by one, and in block 248, the quantities PL(J) and PLS(J) are set equal to zero. PL(J) represents the number of pen lifts in a signature (J), during which force and therefore voltage amplitude are zero, and PLS(J) represents the number of samples taken during the pen lifts in a signature (J). In addition, in block 248, the quantity NKX in an appropriate memory location is set equal to the total of the number of entries in TABLE 1, which equals the number of entries in TABLE 2, for the signature (J).

In block 250, a quantity T(J) in a suitable memory location is set to be equal to the total time duration, measured in number of samples, of the signature (J), which corresponds to the last entry of Table 2 for that signature. In block 252, a quantity corresponding to the entry number I for TABLE 2, in a suitable memory location, is set equal to zero, and in block 254, the entry number I is incremented by one.

The incremented entry number is then compared in decision block 256 to determine whether or not it is equal to the total number of entries in TABLE 1 or TABLE 2 for the signature being examined. If so, the system continues with the operation as represented by block 258, in a manner to be subsequently described. If not, the value of the Ith entry in TABLE 1 is checked against zero in decision block 260. This is for the purpose of determining a zero entry, indicating commencement of a pen lift, for this signature. If the entry is not zero, the operation loops back to block 254 to test the next entry. However if the entry value is zero, the entry number of incremented by one, as indicated in block 262, which will give the table entry corresponding to the end of the pen lift. After this, partial totals for number of pen lifts and number of pen lift samples for the signature J are computed as shown in block 264, by adding sums for the signature being tested to the corresponding existing partial sums for these quantities. The operation then loops back to block 254 to test the next entry.

This testing of entries in TABLE 1 continues until the comparison shown in block 256 indicates that I is equal to NKX, the last entry of TABLE 2. The system then branches to block 258, in which T(J), the last entry of TABLE 2, PL(J), the total number of pen lifts, and PLS(J), the pen lift sample total, all for signature J, are stored in an appropriate memory location in memory 80. Following this, the cumulative quantities SMRPL, SMRPLS and SMRT for the signatures processed thus far are calculated, as shown in block 266.

The system then determines whether all five signatures have been tested, as shown in decision block 268. If not, the operation of the system loops back to block 246 for processing on the next signature. If J=5, indicating that all five signatures have been processed, the quantities RPL, RPLS and RT are next determined, as shown in block 270, by dividing the quantities SMRPL, SMRPLS, and SMRT, respectively, by five. The quantities PL, PLS, T, RPL, RPLS and RT are identified as follows:

PL—is the number of pen lifts in the signature bein considered.

PLS—is the number of samples in pen lifts in the signature being considered.

T—is the total signature time, in number of samples.

RPL—is the average number of pen lifts per signature in the signatures being processed.

RPLS—is the average number of samples in pen lifts per signature in the signatures being processed.

RT—is the average time duration per signature in the signatures being processed.

From block 270, the description of system operation returns to FIG. 7B, over path 240. As shown in block 272 of FIG. 7B, J is set equal to zero, and then is incremented by one, as shown in block 274. Following this, time normalizing tables are computed as shown in block 278, following path 276. The computation of time normalizing tables represented generally in block 278 is shown in greater detail in FIG. 9.

The necessity for use of time normalization of pen lift regions of a signature when that signature is to be compared with another signature of the same person arises from the observation that the number of pen lifts and the time durations of pen lifts for a person change significantly from signature to signature. In order to provide that consistency necessary for reliable comparisons in force waveforms of different signatures of the same person, it is necessary to align the pen lift regions of the signatures.

An algorithm which may be employed for time alignment of pen lift regions is derived in the manner described below, employing the quantities RPL, RPLS, RT, PL, PLS, T and PLFCTR. PL, PLS, T, RPL, RPLS and RT have been previously defined. PLFCTR is a factor derived by a subsequent equation by which the number of pen lift samples in a signature is multiplied in a normalizing operation.

For purposes of this discussion, "current signature" will be considered to be a signature having the quantities PL, PLS and T; and "reference signature" a signature having the quantities RPL, RPLS and RT. This algorithm will align the pen lift regions of the current signature to the corresponding pen lift regions of the reference signature.

The change in the number of pen lift samples due to difference of number of pen lifts between the reference and current signatures is:

$$\Delta PLS = RPLS/RPL(\pm RPL \mp PL) \tag{1}$$

An adjusted value PLS' of the number of pen lift samples for the current signature is derived in accordance with the following expression, which incorporates a quantity equal to one half of ΔPLS:

$$PLS' = (RPLS \mp (\tfrac{1}{2})\Delta PLS)\cdot(T'/RT) \quad (2)$$

Replacing (1) into (2), $$PLS' = \frac{RPLS}{RT} \cdot \frac{1 + \frac{PL}{RPL}}{2} \cdot T' \quad (3)$$

It should be noted that by adjusting the pen lift regions of the current signature, the total time of the current signature does not remain T, as indicated in equations (2) and (3) by T'.
To determine the value of T' it should be noted that the "pen down" or writing time between the current signature and the adjusted one remains constant:

$$\text{writing time} = T - PLS = T' - PLS' \quad (4)$$

$$\text{Let } X = \frac{RPLS}{RT} \cdot \frac{1 + \frac{PL}{RPL}}{2} \quad (5)$$

then, $$T - PLS = T' - X \cdot T'$$

$$T' = (T - PLS/1 - X) \quad (6)$$

$$PLS' = (X/1 - X)(T - PLS) \quad (7)$$

The actual number of samples in the pen lift regions of the current signature is PLS: therefore the adjusted number of samples in each pen lift of the current signature will be found by multiplying the actual number of pen lift samples in each pen lift by the following factor:

$$PLFCTR = (X/1 - X)(T/PLS - 1) \quad (8)$$

where x is given in equation (5).

Referring once again to FIG. 9, the pen lift multiplying factor is computed from equation (8), as shown in block 282. Tables TABLE 1 and TABLE 2 for signature J are transferred from memory location 86 of memory 80 (FIG. 5) to memory location 88. Following this, as shown in block 284, the quantity NKX, in a suitable location in the memory 80, is set equal to the number of entries in TABLE 1. The quantity "CHANGE", in a suitable location in memory 80, representing the difference between the normalized number of samples and the original number of samples in TABLE 2 for a given signature, is set equal to zero. In addition, the entry number I for TABLE 1 and TABLE 2, stored in a suitable location in memory 80, is set equal to zero.

The system then continues operation by incrementing the quantity I by one, as shown in block 286, and proceeds to decision block 288 for a determination of whether or not I is equal to the total entries of TABLE 1 (or TABLE 2, since they are the same) plus one. If so, the operation of the system proceeds over path 280 back to the sequence shown in FIG. 7B. If not, the system proceeds to the operations shown in block 290, in which the quantity stored in location 88 of memory 80 (FIG. 5) for the I entry of TABLE 1 is stored in location 90 of memory 80 as NORMALIZED TABLE 1, and in which the quantity stored in location 88 for the I entry of TABLE 2 is modified by the CHANGE quantity and is stored in location 90 as NORMALIZED TABLE 2.

Next, as shown in decision block 292, a determination is made as to whether or not the original I entry of TABLE 1 is equal to zero. If not, operation of the system loops over path 294 back to block 286. If so, operation of the system proceeds with the computations shown in block 296. Entry I is set equal to I+1. The I entry of NORMALIZED TABLE 1 is set equal to zero. The pen lift period is calculated by subtracting the I−1 entry of TABLE 2 from the I entry of TABLE 2 and adding one. The normalized pen lift period is calculated by multiplying the original pen lift period by the factor PLFCTR, previously computed in block 282.

Operation of the system then proceeds as shown in block 298 with calculation of the I entry of NORMALIZED TABLE 2 by adding the integer closest to the previously calculated normalized pen lift period to the I−1 entry of NORMALIZED TABLE 2 and subtracting one. CHANGE is then computed by subtracting the I entry of TABLE 2 from the I entry of NORMALIZED TABLE 2.

System operation then loops back over paths 300 and 294 to block 286 and continues, with the calculated CHANGE quantity being used in block 290. As previously described, system operation continues until the incremented I entry value in block 286, equals the total number of entries in TABLE 1, plus 1, at which time the system operation continues over path 280 to block 302 of FIG. 7B, in which the information stored in location 90 of memory 80 (FIG. 5) is utilized in computing the signature vector for signature J. The computation of the signature vector is shown in greater detail in FIGS. 10A, 10B, 10C and 10D.

Figure 10A:
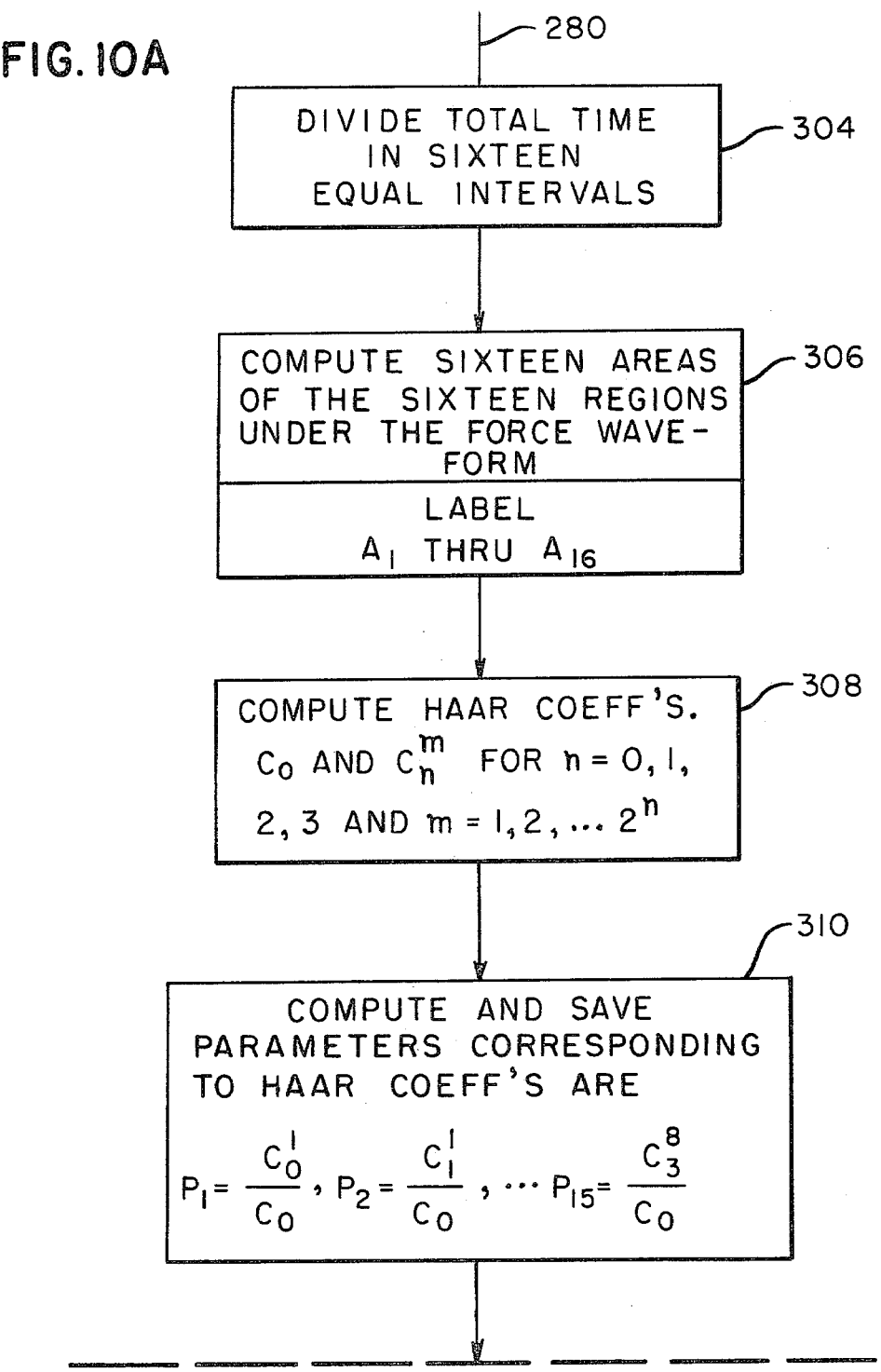

As shown in block 304 of FIG. 10A, system operation proceeds by dividing the total time required for a signature J into sixteen equal intervals, providing sixteen distinct regions or divisions of the force pattern. This is accomplished by dividing the total number of signature samples by sixteen. Next, as shown in block 306, the sixteen areas of the sixteen regions under the signature force waveform are computed and labelled A1 through A16.

These sixteen areas are used in computing Haar coefficients. The Haar system of functions was originally formulated by A. Haar, and is described in "Zur Theorie der Orthogonalen Funktionensysteme", Math. Annalen., Vol. 69, pp. 331–371, 1910, by A. Haar. It is a set of complete orthogonal functions defined over the interval [0, 1]. In the non-normalized form, Haar functions are described by 1's, −1's and 0, and therefore can be conveniently represented in a digital computer.

An important feature of the Haar transformation is that it samples the input waveform at progressively coarser intervals starting with the highest resolution and decreasing in powers of two. This feature makes the Haar transformation both locally sensitive and globally sensitive.

The Haar function system has been used for several applications since 1968. Andrews and others use it for optical data processing and signal processing by considering the Haar transformation as another class of Fourier transforms. See Andrews, H. C., Computer Techniques in Image Processing, Academic Press, 1970; Andrews, H. C. and Kane, Jr., "Kronecker Matrices, Computer Implementation, and Generalized Spectra", JACM, Vol. 17, pp. 260–268, April 1970. Andrews, H. C. and Caspari, K. L., "A Generalized Technique for Spectral Analysis", IEEE Trans. on Computers, Vol. C-19, No. 1, pp. 16–25, January 1970. Bremmerman and Meltzer use Haar transformation for speech recognition and speech synthesis. See Bremmerman, H. J., "Pattern Recognition, Functionals, and Entropy", IEEE Trans. on Bio-Med. Eng., Vol. BME-15, pp. 201–207, 1968; Meltzer, D., "Speech Synthesis by Haar Functions with Comparison to a Terminal Analog Device", Ph.D. Dissertation, Ohio State University, 1972; and Meltzer, D., Lehiste, I., "Vowel and Speaker Identification in Natural and Synthetic Speech", JASA, Vol. 51, p. 131 (A), Janurary 1972. The Haar transformations have also been used in recognition of patterns by feature selection through orthogonal expansions. See Andrews, H. C., "Multidimensional Rotations in Feature Selection", IEEE Trans. on Computers, Vol. C-20, No. 9, pp. 1045–1051, September 1971.

Fifteen components of a signature vector are determined by computing Haar coefficients, as shown in block 308. The Haar coefficients of order n for a function $f(t)$, which function represents the force waveform of a signature, are defined as $$C_0 = \int_0^1 \phi_0(t) \cdot f(t) \cdot dt \quad (9)$$

$$C_n^m = \int_0^1 \phi_n^m(t) \cdot f(t) \cdot dt \quad (10)$$

where m is dependent on n, and for each value of n, m will have a total number of values equal to $2^n$, such values being all of the integers in the interval 1 to $2^n$, there being a number of Haar functions equal to the total number of values of m; and where $\phi_0(t)$ and $\phi_n^m(t)$ are Haar functions which form a set of complete orthogonal functions defined over the interval [0, 1]. The Haar functions are defined as follows:

$$\phi_0(t) = 1 \quad (11)$$
$$\phi_n^m(t) = 2^{n/2} \text{ for } (2m - 2)\alpha \leq t \leq (2m - 1)\alpha; \quad (12)$$
$$= -2^{n/2} \text{ for } (2m - 1)\alpha < t \leq 2m\alpha;$$
$$= 0 \text{ for all other } t \text{ between } [0, 1].$$

where $\alpha = 2^{-n-1}$; n=0, 1, 2 ..., and m=1, $2\text{-}2^n$.

Figure 11:
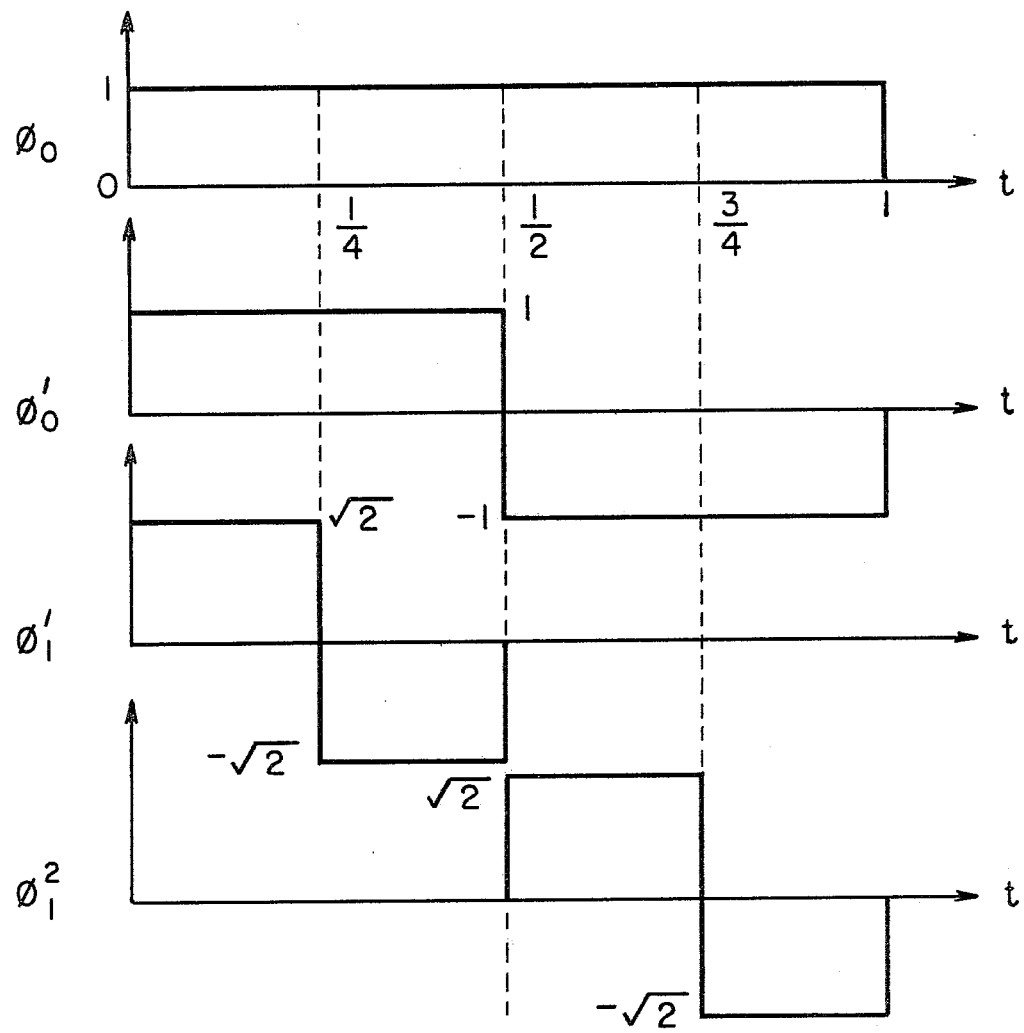
FIG. 11 is a diagrammatic representation of certain Haar functions.

The four Haar functions for $\phi_0$ and $\phi_n^m$ for n equals zero and n equals one, and the variation of these functions over the time interval (0, 1), which may correspond to the total time interval of the signature force pattern, are shown in FIG. 11.

The function, $f(t)$, for the force pattern may be represented by Haar series as $$f(t) = C_0 \phi_0(t) + \sum_{n=0}^{\infty} \sum_{m=1}^{2^n} C_n^m \phi_n^m(t) \quad (13)$$

As mentioned above, the total time T of the waveform represented by function $f(t)$ is normalized to unity since the Haar functions are defined in the interval [0, 1]. For the computation of Haar coefficients from Eq. (10), the nonnormalized form of the Haar functions of Eq. (12) is described as follows:

$$\phi_0(t) = 1 \quad (14)$$

$$\phi_n^m(t) = \begin{cases} 1 \text{ for } (2m - 2) \leq t \leq (2m - 1)\alpha \\ -1 \text{ for } (2m - 1) < t \leq 2m\alpha \\ 0 \text{ for all other } t \, \theta \, [0, 1] \end{cases} \quad (15)$$

where $\alpha = 2^{-n-1}$, n=0,1,2, ..., and m=1,2, ..., $2^n$.

The Haar coefficients of $f(t)$ computed from Eq. (10) are divided by $C_0$, which represents the average amplitude of $f(t)$, i.e., the average force applied during the writing of the signature, and stored in a suitable memory location of the memory 80, as shown in block 310. These new coefficients are designated $P_r$, and constitute the first fifteen components $P_1$ to $P_{15}$ of the signature vector:

$$P_r = C_n^m / C_0 \text{ for } n = 1, 2, 3. \quad (16)$$

As an example, the computation of Haar coefficient $C_2^3$ (n=2, m=3) is presented below. $C_2^3$ is found from Eq. (10) using $\phi_2^3(t)$ from Eq. (15)

$$\alpha = 2^{-n-1} = \tfrac{1}{8}$$

and $$\phi_2^3(t) = \begin{cases} 1 \text{ for } \tfrac{1}{2} \leq t \leq \tfrac{5}{8} \\ -1 \text{ for } \tfrac{5}{8} < t \leq \tfrac{3}{4} \\ 0 \text{ for } 0 \leq t < \tfrac{1}{2} \text{ and } \tfrac{3}{4} < t \leq 1 \end{cases} \quad (17)$$

or $$\phi_2^3(t) = \begin{cases} 0 \text{ for } 0 \leq t < \tfrac{1}{2} \\ 1 \text{ for } \tfrac{1}{2} \leq t \leq \tfrac{5}{8} \\ -1 \text{ for } \tfrac{5}{8} < t \leq \tfrac{3}{4} \\ 0 \text{ for } \tfrac{3}{4} < t \leq 1 \end{cases}$$

Figure 13:
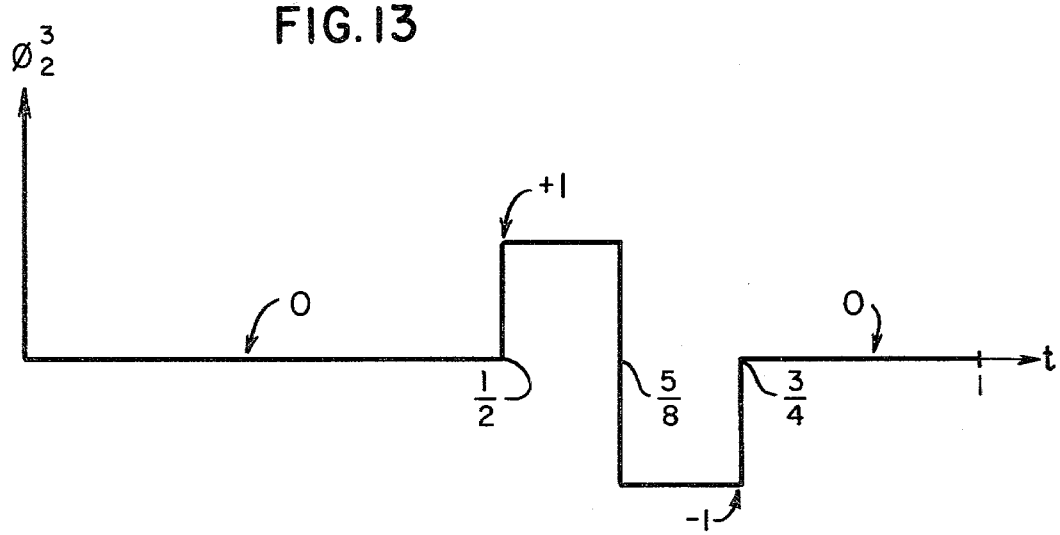
FIG. 13 is a graphical representation of the varying value of a given Haar function over a specified range.

$\phi_2^3(t)$ is graphically represented in FIG. 13. From Eqs. (10) and (16)

$$C_2^3 = \int_0^1 \phi_2^3(t) \cdot f(t) \cdot dt \quad (18)$$

$$= \int_0^{\tfrac{1}{2}} 0 \cdot f(t) \cdot dt + \int_{\tfrac{1}{2}}^{\tfrac{5}{8}} 1 \cdot f(t) \cdot dt +$$

$$\int_{\tfrac{5}{8}}^{\tfrac{3}{4}} (-1) \cdot f(t) \cdot dt \cdot \int_{\tfrac{3}{4}}^{1} 0 \cdot f(t) \cdot dt$$

$$= \int_{\tfrac{1}{2}}^{\tfrac{5}{8}} f(t) \cdot dt - \int_{\tfrac{5}{8}}^{\tfrac{3}{4}} f(t) \cdot dt$$

In Eq. (17), $\int_{\tfrac{1}{2}}^{\tfrac{5}{8}} f(t)dt$ represents the area $A_9 + A_{10}$ shown in the time normalized waveform $f(t)$ of FIG. 12 under the portion from $t=\tfrac{1}{2}$ to $t=\tfrac{5}{8}$; and $\int_{\tfrac{5}{8}}^{\tfrac{3}{4}} f(t)dt$ represents the area $A_{11} + A_{12}$ shown in FIG. 12 under the portion from $t=\tfrac{5}{8}$ to $t=\tfrac{3}{4}$. The difference of these two areas is Haar coefficient $C_2^3$, as shown in Eq. (18), which is normalized in accordance with Eq. (16) to provide the desired parameter $P_r$.

For the purpose of signature verification, it has been observed that the first fifteen parameters $P_n^m$ computed for n=0 (m=1), n=1 (m=1,2), n=2 (m=1,2,3,4), and n=3 (m=1,2, ..., 8), are quite satisfactory. These fifteen parameters are labeled as $p_1, p_2, -, p_{15}$. In these parameter equations, n and m have the same significance as described above in connection with the Haar coefficients $C_n^m$.

Figure 12:
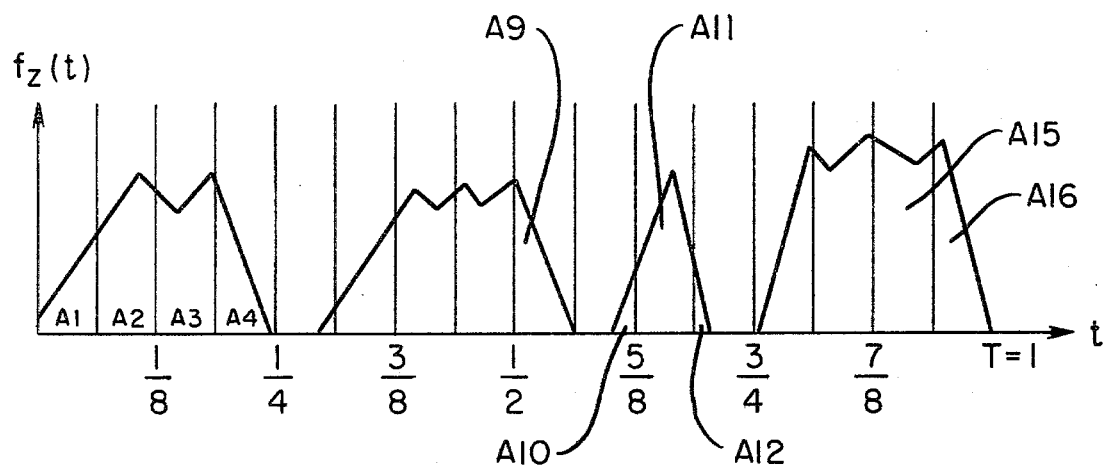
FIG. 12 is a graphical representation of a signature waveform divided into a number of areas which are utilized in computing Haar coefficients.

The fifteen values of $C_n^m$ are computed in the following manner: Time T=1 is divided in sixteen equal time regions as shown in FIG. 12, and sixteen areas $A_1, A_2, \ldots, A_{16}$, under the waveform f(t) in the sixteen regions, are computed. Then $C_3^1 = A_1 - A_2$
$C_3^2 = A_3 - A_4$
$C_3^3 = A_5 - A_6$
$C_3^4 = A_7 - A_8$
$C_3^5 = A_9 - A_{10}$
$C_3^6 = A_{11} - A_{12}$
$C_3^7 = A_{13} - A_{14}$
$C_3^8 = A_{15} - A_{16}$
$C_2^1 = (A_1 + A_2) - (A_3 + A_4)$
$C_2^2 = (A_5 + A_6) - (A_7 + A_8)$
$C_2^3 = (A_9 + A_{10}) - (A_{11} + A_{12})$
$C_2^4 = (A_{13} + A_{14}) - (A_{15} + A_{16})$
$C_1^1 = (A_1 + A_2 + A_3 + A_4) - (A_5 + A_6 + A_7 + A_8)$
$C_1^2 = (A_9 + A_{10} + A_{11} + A_{12}) - (A_{13} + A_{14} + A_{15} + A_{16})$
$C_o^1 = (A_1 + A_2 + \ldots + A_8) - (A_9 + A_{10} + \ldots + A_{16})$ and $C_o = A_1 + A_2 + \ldots + A_{16}$ These results may be easily verified from Eqs. (10) and (14).

From block 310, system operation proceeds to block 312 (FIG. 10B) for commencement of the derivation of additional parameters for the signature vector based upon selection and manipulation of certain physical features of the signature waveform. A number of different such physical features can be utilized if desired, and while the features chosen for use in the device described herein are suitable to provide a satisfactory signature vector, it should be recognized that other features of the signature waveform could also be enployed. Also, if a less precise standard of signature verification is adequate for certain applications, the use of some or all physical features in the signature vector could be omitted, so that only parameters based upon Haar coefficients could be employed.

The following physical features have been selected for use in the illustrated embodiment: signature time, pen lift time, pin lift number, slope change and peak. These are defined as follows:

Signature time is the total number of digitized samples obtained from the signature.

Pen lift time is the total number of samples taken during the time that the writing instrument is not in contact with the writing surface during the act of signing.

Pen lift number is the number of times that the writing instrument is not in contact with the writing surface during the act of signing.

Slope change is a change in the signature waveform from positive slope to negative slope.

Peak is a value corresponding to the number of times in a signature that there is one and only one slope change between two pen lifts.

In generation of a signature vector, two groupings of physical features are considered. A total of twenty-two different parameters, as described below, are provided from these physical features.

The first of the two groups provides six parameters from measures that relate to the overall force pattern of the signature, as follows:

P16 is the total signature time.
P17 is the average force applied.
P18 is the total pen lift time.
P19 is the total number of pen lifts.
P20 is the total number of slope changes.
P21 is total number of peaks.

The second of the two groups contains measures that are obtained by dividing the total signature time into a number of equal time intervals. Four such intervals, such as those designated A, B, C and D in FIG. 3D, appear to provide best results. It may also be noted that in FIG. 3D, the total signature time is designated TS, and the pen lift times are designated PL1, PL2 and PL3. The following parameters measure quantities as described below, each parameter within a category being for one of the four equal intervals.

P22 to P25 are the pen lift time parameters during each interval.

P26 to P29 are number of pen lifts per interval.

P30 to P33 are the number of slope changes per interval.

P34 to P37 are the number of peaks per interval.

In block 312, all of the quantities shown therein are initialized. F, referring to the time interval number in the waveform, is set equal to zero. I, referring to the entry or index number for TABLE 1 and TABLE 2, is set equal to zero. NKX is set equal to the number of entries in TABLE 1 and TABLE 2. Physical feature parameters P16 to P37 inclusive are set equal to zero. An arbitrary value VAL, to be subsequently described, is set equal to zero. A pen lift region indicator ZFLG is set equal to zero. An indicator IFLG, which indicates transition between intervals, is set equal to zero. A peak indicator PKFLG is set equal to zero.

In block 314, a quantity T stored in an appropriate location in memory 80 is set equal to the value of the last entry in TABLE 2, which corresponds to the total number of samples in the signature.

System operation then proceeds to block 316, wherein time interval number F is set equal to F+1, and the upper limit in number of samples in the new interval is computed according to the expression $ILIM(F) = (T.F./4)$. Following this, as shown in block 318, the entry number I is incremented by one. The system operation then proceeds to decision block 320, in which I is compared to NKX. Since in the initial operation, I will not be greater than NKX, operation proceeds to decision block 322, in which the current entry I of TABLE 2 is compared to ILIM(F). In the initial operation, TABLE 2 (I), will be less than ILIM(F), and the system operation proceeds to decision block 324, in which the current entry I of TABLE 1 is compared to the quantity VAL. Originally, TABLE 1 entry I will not be equal to or less than VAL, and therefore operation continues to block 326, in which the quantity VAL is set equal to the entry I of TABLE 1.

System operation then loops back over path 328 to block 318, in which I is again incremented by one. Operation then continues through blocks 320, 322 and 324. The comparison made in block 324 now shows that TABLE 1 entry I is less than VAL since the signature waveform has a negative slope at this point. Therefore operation proceeds to decision block 330, where ZFLG is compared to one. Since ZFLG was initially set equal to zero, operation proceeds to block 332, where a number of actions take place. PKFLG is incremented by one. The quantity VAL is set equal to zero. The parameter P20 is incremented by one, as is the quantity P(29+F). Operation then proceeds to decision block 334, where the I entry of TABLE 1 is compared to zero. If this quantity is not equal to zero, operation loops back over path 328 to block 318. If this quantity is equal to zero, the operation proceeds to block 336 (FIG. 10C), where a quantity STZ, representing the starting sample number of a pen lift is set equal to entry I of TABLE 2, and a quantity ENZ, representing the ending sample number of the pen lift, is set equal to entry (I+1) of TABLE 2. Also the quantity ZFLG is set equal to one.

Operation then proceeds to decision block 338, where the quantity PKFLG is compared to one. If PKFLG equals one, parameter P21 is set equal to P21+1 and the quantity P(33+F) is set equal to P(33+F)+1, and these two quantities are stored in memory location 98 of memory 80 (FIG. 5), as shown in block 340. Operation then loops back over path 328 to block 318. If PKFLG is not equal to one, operation loops directly from block 338 to block 318 over path 328.

Now let it be assumed that when system operation has proceeded to decision block 330 (FIG. 10B), ZFLG is found to be equal to one. In such case, operation proceeds to block 342 (FIG. 10C), where the quantities ZFLG and PKFLG are set equal to zero, and then continues to decision block 344 where IFLG is compared to one. Let it also be assumed that IFLG, representing the between intervals indicator, is equal to zero, and therefore not equal to one, indicating that there has been no change in the interval. In such case, the pen lift quantity PL is set equal to one as shown in block 346 and operation proceeds to block 350. On the other hand, if the interval has changed, so that IFLG is equal to one, operation proceeds to block 348, where PL is set equal to one minus the previous value stored in PL, IFLG is set equal to zero, and operation then proceeds to block 350.

In block 350, PLS, representing the number of pen lift samples, is set equal to ENZ minus STZ. Also, parameter P19 is set equal to P19 +PL and the result is stored; quantity P(2+5F) is set equal to P(25+F)+PL and the result is stored; P18 is set equal to P18 +PLS and the result is stored; and the quantity P(21+F) is set equal to P(21+F)+PLS and the result is stored. All such storage is in location 98 of memory 80 (FIG. 5). System operation then loops back over path 328 to block 318.

Figure 10B:
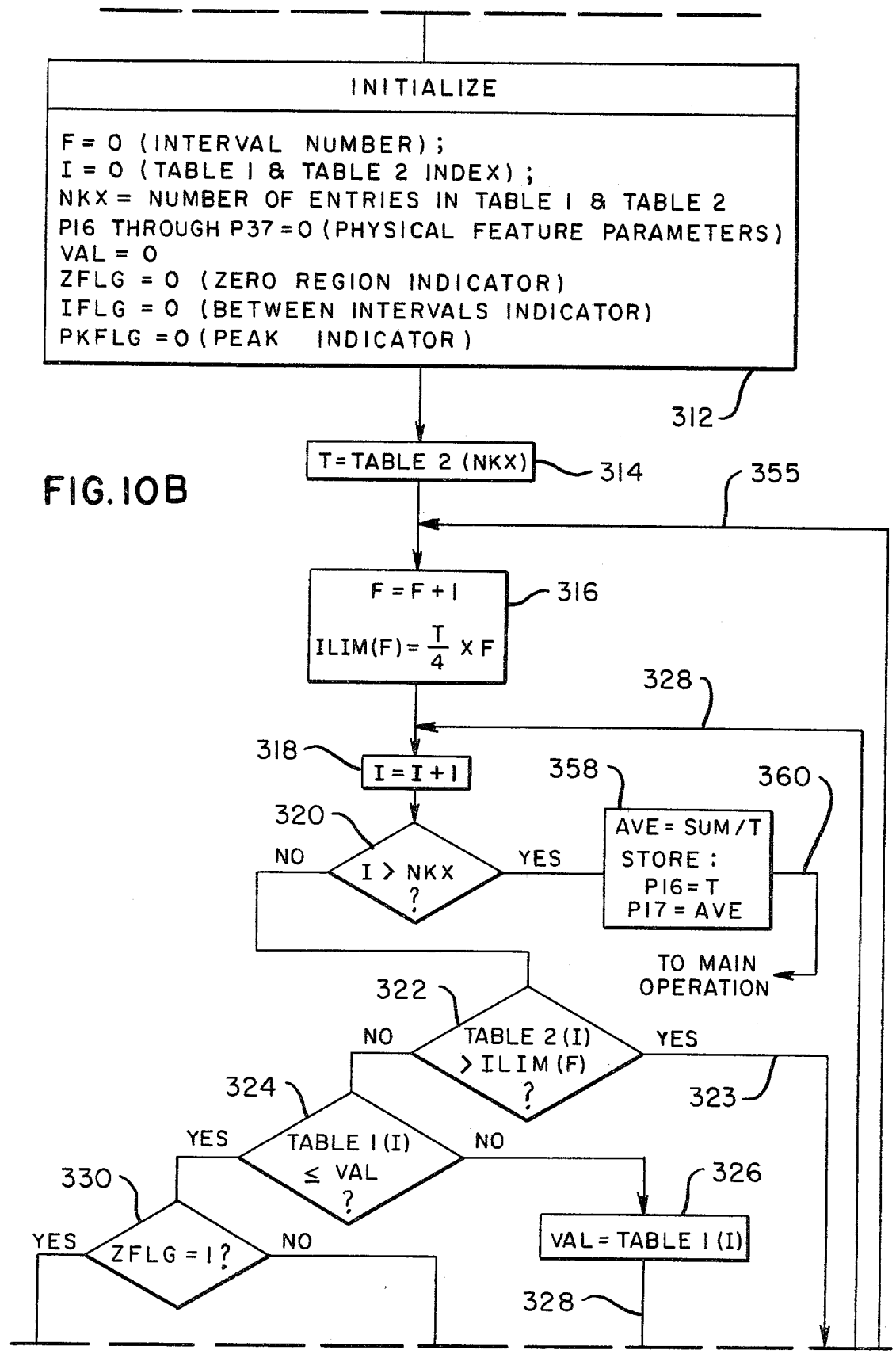
Figure 10D:
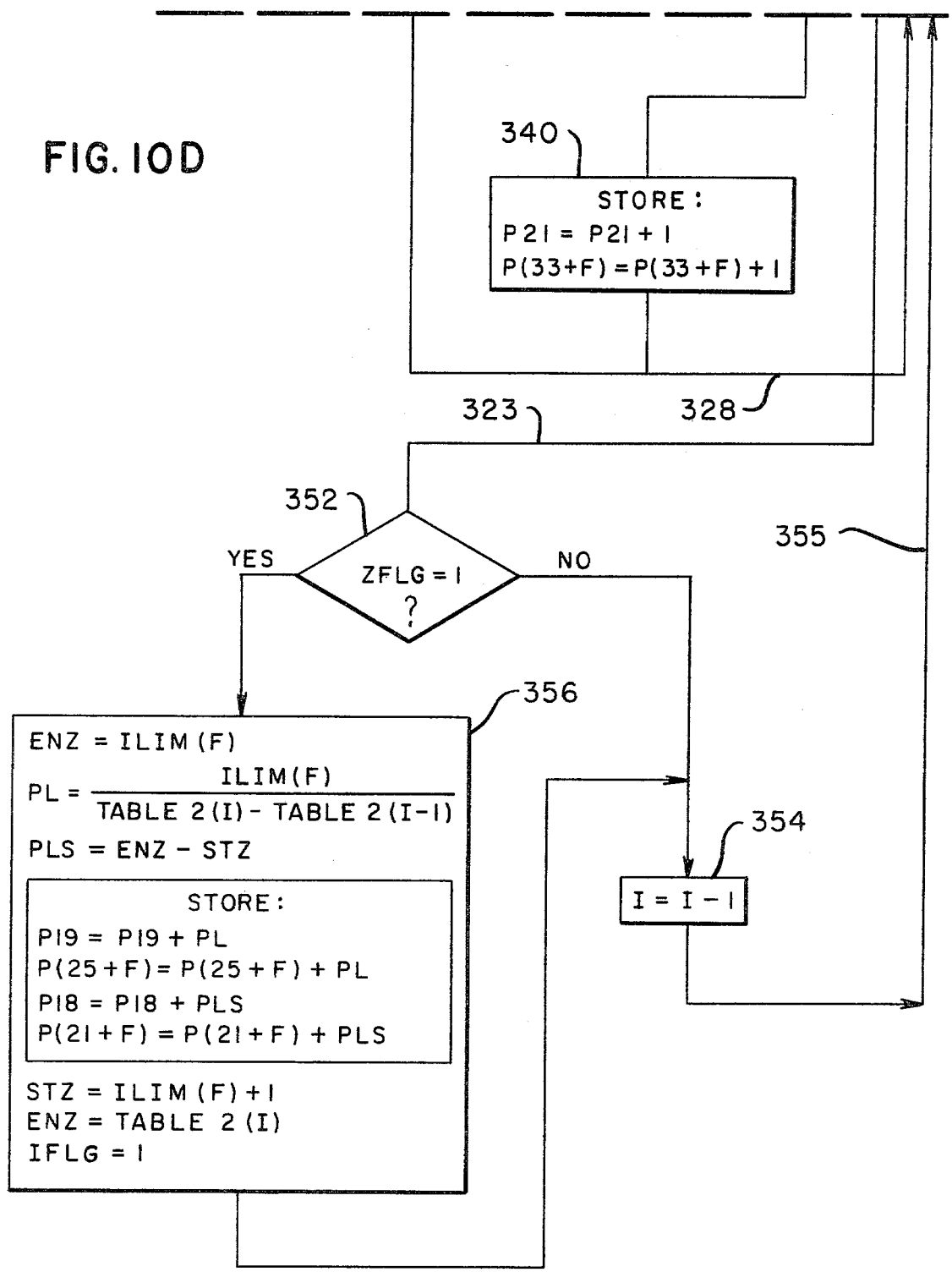

Now let it be assumed that when system operation has proceeded to decision block 322 (FIG. 10B), the I entry of TABLE 2 is found to be greater than ILIM(F). In such case, operation proceeds over path 323 to decision block 352, (FIG. 10D), where the quantity ZFLG is compared to one. If ZFLG is not equal to one, the current I entry in TABLE 2 is not in a pen lift region and operation continues with the decrementing by one of I, as shown in block 354, after which the system operation loops back over path 355 to block 316 (FIG. 10B). If ZFLG is equal to one, operation proceeds to block 356. ENZ is set equal to ILIM(F); PL is set equal to ILIM(F)/TABLE 2 (I)−TABLE 2 (I−1); and PLS is set equal to ENZ minus STZ. The following values are computed in accordance with the following assignments and stored in memory location 98 (FIG. 5):

P19=P19 +PL
P(25+F)=P(25+F)+PL
P18=P18+PLS
P(21+F)=P(21+F)+PLS.

In addition, the following quantities are computed and put in temporary storage:

STZ=ILIM(F)+1
ENZ=TABLE 2 (I)
IFLG=1.

Following this, system operation loops back to block 354.

Now let it be assumed that when system operation has proceeded to decision block 320, (FIG. 10B), the current I entry is found to be greater than NKX. In such case, operation proceeds to block 358 (FIG. 10B), where average force is computed by dividing the quantity SUM (see block 164 of FIG. 4A) by T, which was computed in block 314. In addition, the value T is stored in location 98 as parameter P16, and the value AVE is stored in location 98 as parameter P17.

From block 358, system operation returns over path 360 to block 362 of FIG. 7B, it being noted that by means of the operations of FIGS. 10A, 10B, 10C and 10D, all of the parameters of a signature vector for a given signature (J) have been derived and stored in location 98 (FIG. 5). This signature vector is now stored in the appropriate memory location 96, as shown in block 362, FIG. 7B.

System operation then proceeds to decision block 364, and is caused to loop repetitively over path 366 through blocks 274, 278, 302 and 362 until five signature vectors have been derived and stored in memory location 96. When J is found to be equal to five in block 364, operation proceeds over path 368 to block 370 (FIG. 7A), in which a reference for a given person is generated.

The operation represented generally in block 370 is shown in greater detail in FIG. 14. It will be recalled that for each signature vector P1 to P5 inclusive, there are thirty-seven components $P_{j,r}$ where j equals 1 to 5 inclusive and r equals 1 to 37 inclusive.

As shown in block 374 of FIG. 14, an average vector P, representing an average of the five signature vectors and having thirty-seven components $\overline{P}_r$, is computed in accordance with the equation contained in block 374, and is stored in memory location 92 of the memory 80 (FIG. 5). Following this, a single variance vector V is computed, utilizing all of the signature vectors P1 to P5, together with the average vector $\overline{P}$, as shown in block 376, in accordance with the equation contained therein, and is placed in a temporary storage location.

Next, as shown in block 378, a normalizing vector Q is computed and is stored in memory location 92 of memory 80 (FIG. 5). The normalizing vector Q comprises thirty-seven components $Q_r$, where each component $Q_r$ is computed in accordance with one of the three equations appearing in block 378, depending in each case upon the values of four quantities $B_r$, $P_r$, $SP_r$ and $V_r$.

The quantities $SP_r$ and $B_r$ are individual components of modifiers SP and B, where r=1, 2, 3–37; where SP is an average vector derived from signatures of different people in a sample population tested; and where B is a variance vector derived from comparison of signatures of different people in said sample population from the average.

Due to the small statistical significance that can be given to the estimation of parameters from the five signatures used during the reference procedure, it is necessary to modify the variance vector V for person "k", for those components which present large deviations from the corresponding values obtained for the overall population tested.

In the illustrated embodiment, the vectors B and SP are generated from signature vectors collected for fifty persons. These vectors are generated only one time during the system design phase. They then are part of the global data area of the reference mode program and are loaded into memory as a part of said program.

The modified variance vector for person "k" is called the normalizing vector Q.

Figure 15A:
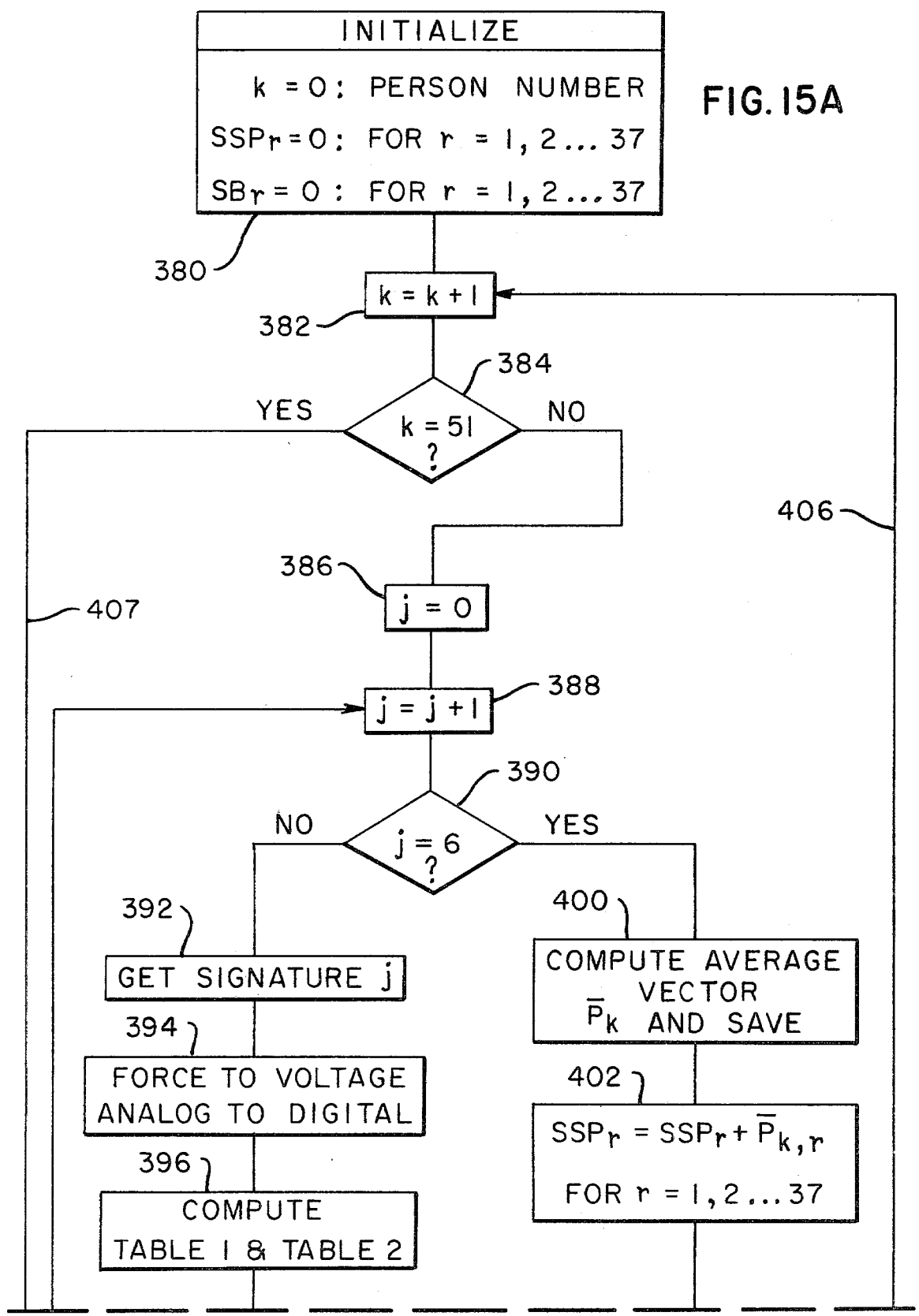
FIGS. 15A and 15B taken together form a detailed flow diagram showing the operation of the system in generating certain special values used in the reference mode.
Figure 15B:
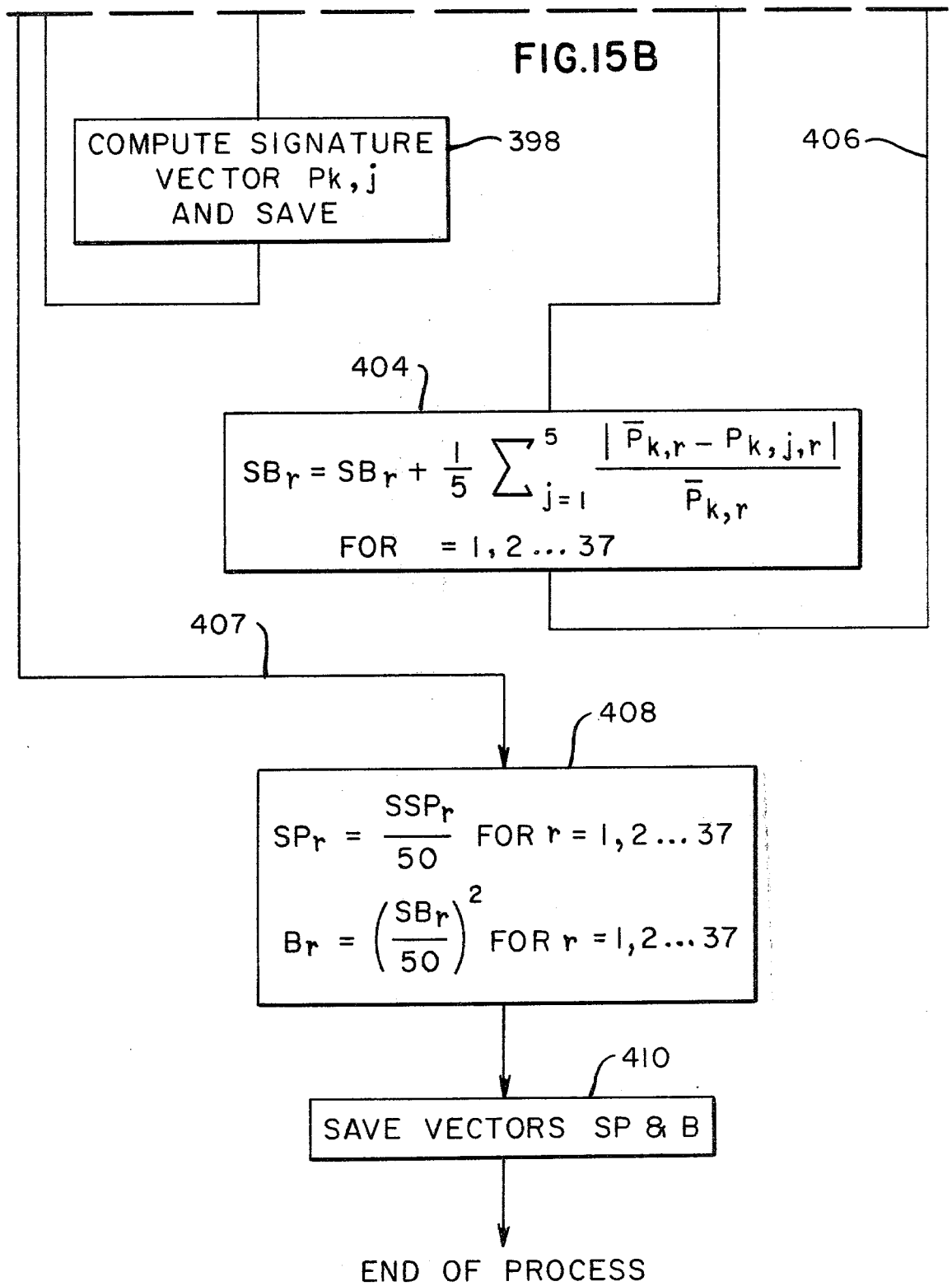

A method for generating vectors B and SP is shown in FIGS. 15A and 15B, and the process illustrated therein will now be described.

As shown in block 380 (FIG. 15A), the quantity k representing the person number, where it will be recalled that k equals 1, 2, 3–50, is set equal to zero. The quantities $SB_r$ and $SSP_r$, representing sums of quantities $B_r$ and $SP_r$, respectively, are also set equal to zero. It will be recalled that r equals 1, 2, 3–37.

The process then proceeds by setting k equal to k+1, as shown in block 382, and continues to decision block 384, where k is compared to the quantity fifty-one. Since at this point in the process, k is not equal to fifty-one, the process continues to block 386, where signature number j is initialized to zero, and subsequently is incremented by one, as shown in block 388.

In the next step, a comparison is made in block 390 as to whether j is equal to six. Assuming it is not, a signature j is obtained in block 392, a waveform is derived therefrom in block 394, TABLE 1 and TABLE 2 are computed in block 396, and a signature vector $P_{k,j}$ is computed and saved in temporary storage in block 398 (FIG. 15B). It will be recognized that these steps are essentially the same as those described elsewhere for obtaining a signature vector, except that no time normalizing takes place. This process is continued until five signature vectors have been obtained, after which the process takes a path from decision block 390 to a block 400 (FIG. 15A), in which an average signature vector $\overline{P}_k$ is obtained in a conventional averaging process and saved in temporary storage.

Next, as shown in block 402, the sum $SSP_r$, is computed by adding the last derived quantity $\overline{P}_{k,r}$ to the previous sum $SSP_r$, where $\overline{P}_{k,r}$ is the "R" component of $\overline{P}_k$, where r=1, 2–37. In block 404 (FIG. 15B), the sum $SB_r$ is computed in accordance with the equation contained therein.

The process then loops back over path 406 to block 382, where the quantity k is incremented by one, and then proceeds to decision block 384, from whence the process continues until signatures have been obtained from fifty people, after which the process proceeds over path 407 to block 408 (FIG. 15B). In that block, the quantities $SP_r$ and $B_r$ are computed in accordance with the equations found therein. The modifiers SP and B, comprised of all of the "r" components of $SP_r$ and $B_r$, are then stored in permanent storage locations 97 and 99 of memory 80 (FIG. 5), as indicated in block 410.

Now, returning to block 378 of FIG. 14, the normalizing vector Q is computed as previously described, following which, in block 412, an error quantity $E_j$ is computed for each of the five signature vectors which have been obtained, in accordance with the equation appearing therein. A threshold value T is then computed in accordance with the equation shown in block 414. In the illustrated embodiment, a value of 4 has been assigned to the quantity KT, which is a constant by which the average error is multiplied to provide a threshold value.

From block 414, the process returns over path 372 to the reference mode diagram of FIG. 7A. Since the next block 416 of FIG. 7A, designated "ANALYZE SIGNATURE VECTORS", represents another complex group of operations, it is shown in detail in FIG. 16, in which the path 372 continues to the operation shown in block 418. In this operation, the error values $E_j$, which were computed in block 412, are sorted and placed in ascendant order with respect to magnitude of error, with the smallest error being designated $E_{h1}$ and the largest error being designated $E_{h5}$. In addition, a record is kept in temporary storage of the relationship of the signature number j to the relative magnitude of error h. Thus, $j_1$, for example, would correspond to $h_3$ if the error in the first signature vector were the third greatest in magnitude.

Next, an acceptance value EVS is computed in accordance with the equation shown in block 420, equal to two times the average of the three lowest error values. This value EVS is compared in decision block 422 to the error value $E_{h4}$.

If the value $E_{h4}$ exceeds EVS, then it is known that both of the signatures corresponding to $E_{h4}$ and $E_{h5}$ exceed the maximum permissible error. As shown in block 424, the signatures corresponding to $E_{h4}$ and $E_{h5}$ are determined, using the record generated in block 418, and the corresponding j values are placed in temporary storage.

If the value $E_{h4}$ does not exceed the value EVS in the comparison made in decision block 422, a further comparison is made in block 426 to determine whether the value $E_{h5}$ exceeds the value EVS. If not, an indication is provided by block 430 that five acceptable signatures are present. However if $E_{h5}$ exceeds EVS, then it is known that the signature corresponding to $E_{h5}$ exceeds the maximum permissible error. As shown in block 428, the signature corresponding to $E_{h5}$ is determined, using the record generated in block 418, and the corresponding j value is placed in temporary storage.

The reference process then returns from FIG. 16 back to FIG. 7A over path 432 and proceeds to decision block 434, where a determination is made as to whether or not additional signatures are required, in accordance with the information stored from operations defined in blocks 424, 428 and 430 of FIG. 16.

Let it be assumed that no additional signatures are required. In such case, the process proceeds over path 436 to block 438 (FIG. 7B) in which the previously generated quantities, average signature vector $\overline{P}_k$, the normalizing vector $Q_K$ and the threshold value $T_k$ are taken from memory location 92 (FIG. 5) and permanently stored on reference disk unit 94 (FIGS. 5 and 7B) which is part of storage unit 116 (FIG. 1). This completes the system operation of the reference mode, as indicated by block 439.

If, on the other hand, additional signatures are required, system operation proceeds from decision block 434 to block 440, in which the number of times "W" that a customer is permitted to replace invalid signatures is incremented by one. In decision block 442, the new quantity W is compared to the quantity five. If five signature replacements have already been made, operation proceeds over path 444 to the end of the reference mode operation, as represented by block 439. This limitation of number of signature replacements is provided in order to prevent the unusual situation from arising in which an indefinite number of replacement signatures would be called for by the system operation.

If additional signatures are required, and fewer than five replacements have been made, the operation proceeds to block 446, in which the number "J" of the invalid signature is identified, and a new signature J is obtained in block 448 by having the customer write his signature on the unit 108 (FIG. 1). In the same manner as previously described, the forces generated by writing the signature are converted to a waveform and digitized in block 450, and TABLE 1 and TABLE 2 for signature J are computed in block 452. These table values then replace the previous values for signature J in memory location 86 (FIG. 5) as indicated in block 454.

Operation then proceeds to the decision block 456 (FIG. 7B), in which a determination is made as to whether or not all of the invalid signatures have been replaced. If not, the operation loops back over path 458 to block 446, so that the remaining invalid signature can be replaced.

Once all of the invalid signatures have been replaced, operation proceeds from decision block 456 to block 238, so that the signature vectors for the five signatures now stored in location 86 can be computed and saved, as previously described in connection with blocks 238, 272, 274, 278, 302 and 362.

The process then again loops over path 368 to block 370 for generation of the reference values $\overline{P}_k$, $Q_K$ and $T_k$, as previously described. The signature vectors are then analyzed again, as indicated by block 416, to determine whether any invalid signatures are present in this new group of signatures. A determination is then made once more in block 434 so as to determine whether any additional signatures are required. If not, as previously described, the new reference values $\overline{P}_k$, Q and $T_k$ are stored on reference disk 94. If so, an additional operation may be required, as previously described, unless five replacements have already been made, in which case reference mode operation is terminated in any event.

Once the reference parameters for a particular individual "k" have been computed and placed in secondary storage on reference disk 94, the identity of that person "k" can be verified whenever desired by comparing a signature vector generated by his or her writing a signature on the unit 108 with the reference parameters so stored.

Returning to the generalized flow diagram of FIGS. 2A, 2B and 2C, it will be recalled that the verify mode is entered at block 126, at which time the system is ready to accept an identity claim number (ID#) from the key pad unit 114, as indicated by the lead-through unit 104, on which the "verify" and "ID#" indicators are on. The customer then enters the ID# assigned to him or her, which shall be designated as "k", on the key-pad unit 114. Follwing this, the ID# indicator is turned off.

Since it will be assumed for purpose of this description that the ID# entered is not the special reference code (999 for purpose of illustration), as determined in block 128, the reference parameters are fetched from disk 94 and placed in storage location 92, as shown in FIG. 5. An audible tone from unit 106 and a "sign" indicator on unit 104 then indicate to the customer that a signature should be made on unit 108. After the customer provides the signature, the "sign" indicator of unit 104 goes off, and the record medium on which the signature has been made is advanced by unit 112.

Following this, a signature vector is computed as shown in block 460, and compared with the average signature vector $\overline{P}_k$ as shown in block 462. An error value is derived from this comparison, and by use of the normalizing vector $Q_K$. This error quantity is then compared in block 464 with the threshold value $T_k$.

If the error value is less than the threshold value, the "accept" indicator of the unit 104 is turned on, and the reference parameters for that customer are updated. The identity of the customer has thus been verified, and the system may control other apparatus or additional transaction steps to permit customer entry thereto.

On the other hand, if the error value is larger than the threshold value, the "reject" indicator of the unit 104 is turned on. The identity of the customer in this case has not been verified, and access of the customer to other apparatus or additional transaction steps may be denied.

Figure 17A:
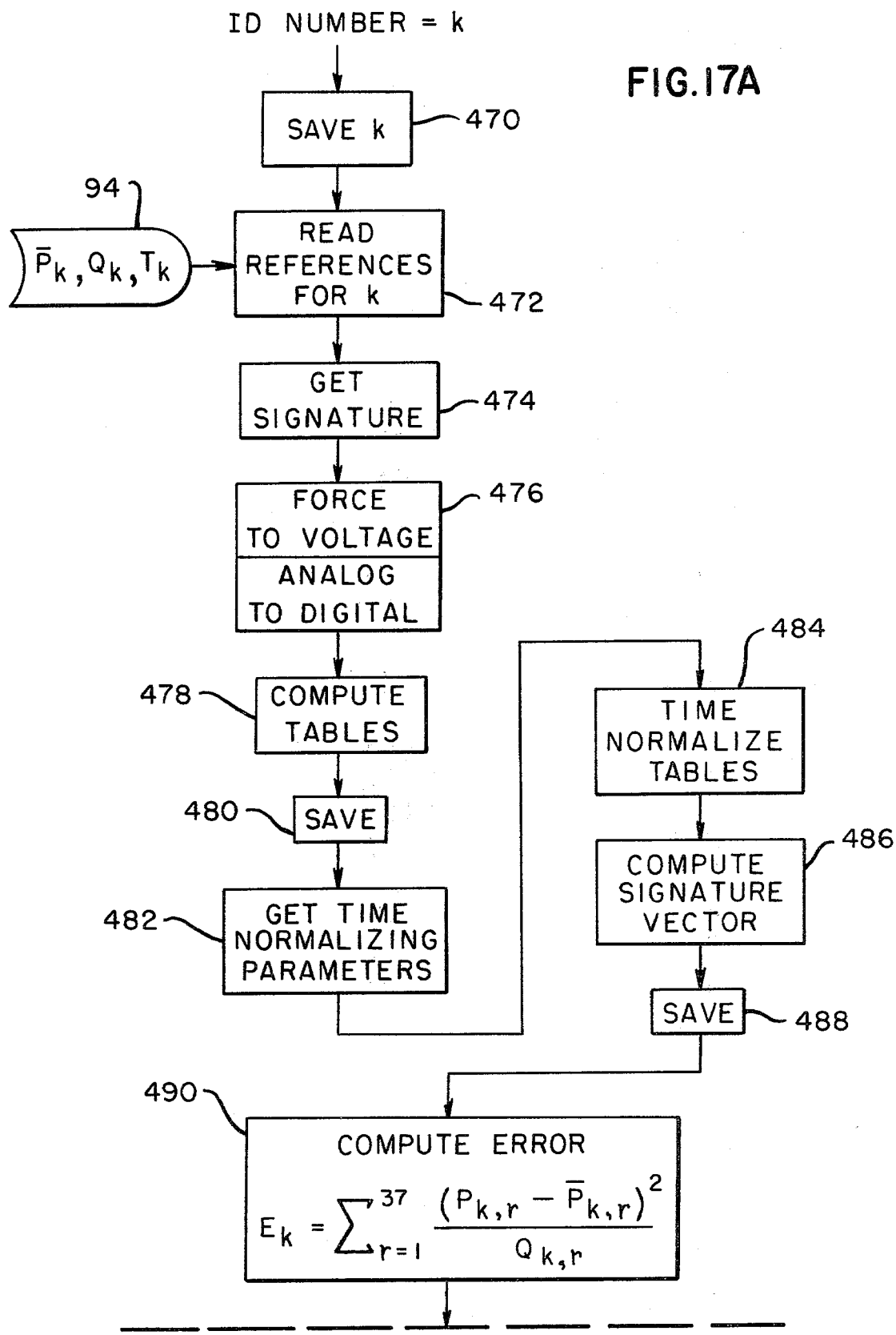
FIGS. 17A and 17B together form a detailed flow diagram showing the operation of the system in the verification mode.
Figure 17B:
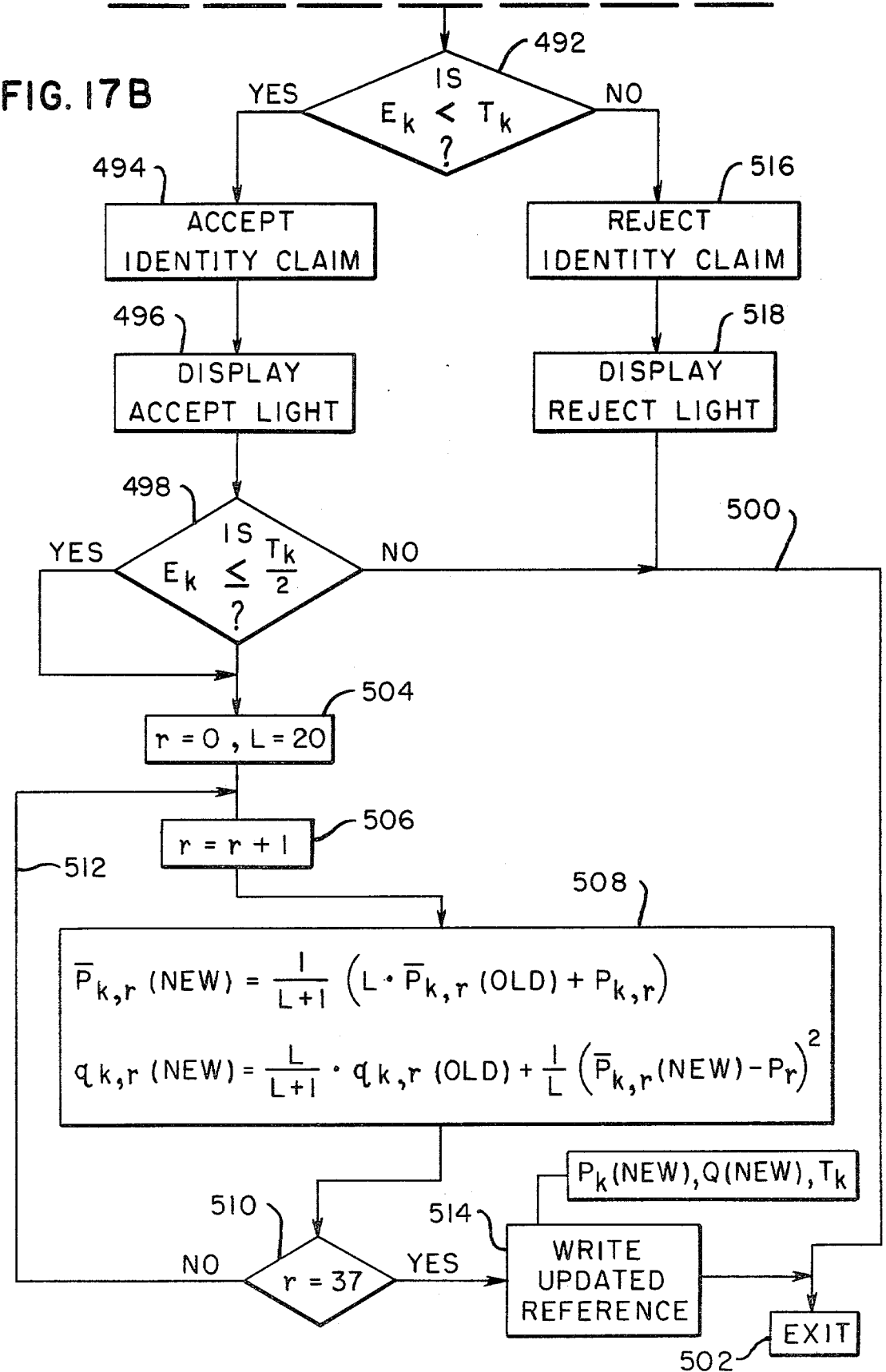

A detailed description of the operation of the system in the verification mode will now be provided, in connection with the flow diagram of FIGS. 17A and 17B.

System operation in the verify mode is commenced by entering an ID# 37 k" into the keyboard unit 114. This number is saved in an appropriate location in storage, as indicated in block 470.

The reference parameters $\overline{P}_k$, $Q_k$ and $T_k$ are then fetched from their location on reference disk 94 and are stored in location 92 of memory 80, as indicated by block 472.

The customer is then directed in block 474 to make a signature on unit 108, which converts said signature to digital voltage samples in block 476. TABLE 1 and TABLE 2 are computed from said samples in block 478, utilizing the process shown in FIGS. 4A, 4B, as previously described, and stored in location 86 of memory 80 (FIG. 5), for J equals 1, as represented in block 480.

Following this, time normalizing parameters RT, RPL and RPLS, representing the average of the total signature time, the average of the total number of pen lifts and the average of the total pen lift times, respectively, are taken from the average signature vector $\overline{P}$ which is stored in location 92, as indicated in block 482. The parameters RT, RPL and RPLS are equal to the physical features $\overline{P16}$, $\overline{P19}$ and $\overline{P18}$, respectively, which constitute components of the average signature vector $\overline{P}$.

Figure 9:
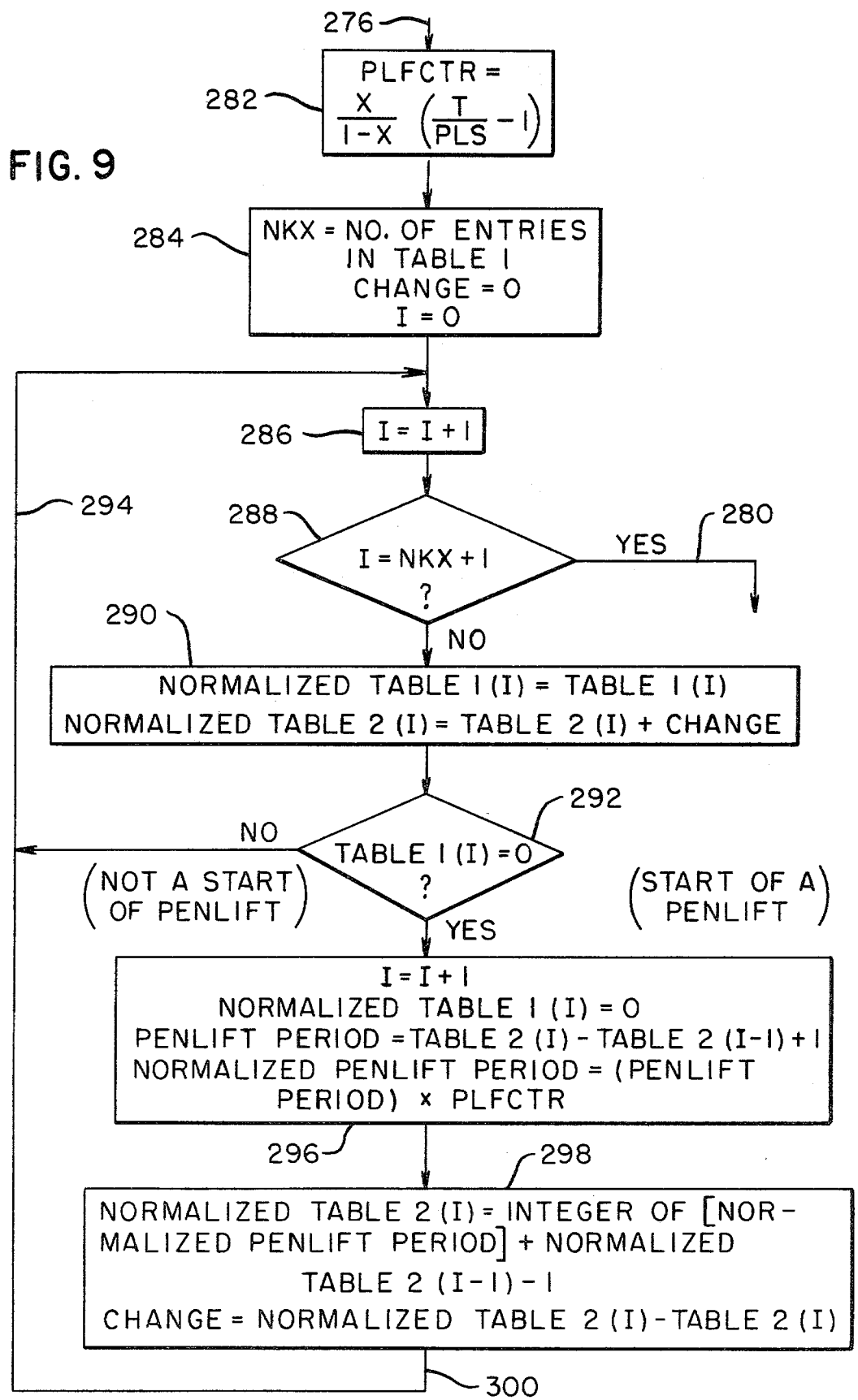
FIG. 9 is a detailed flow diagram showing the operation of the system in computing time normalizing tables, used in the reference and verification modes.

As represented by block 484, TABLE 1 and TABLE 2 for J equals 1 are then transferred to location 88 and normalized in accordance with the process shown in detail in FIG. 9 and previously described, and saved in location 90.

The system operation then continues as represented in block 486 by computing a signature vector for the signature being tested, in the manner previously described in connection with FIGS. 10A to 10D inclusive. This signature vector is saved (block 488) in location 96 of memory 80 (FIG. 5) as signature vector P1.

As the next step in system operation, the error value for this signature is computed in block 490, in accordance with the equation contained therein. It will be noted that this computation is similar to the computation performed in block 412 of FIG. 14. In the equation of block 490, $E_k$ is the error value for the signature of person "k"; $\overline{P}_{k,r}$ is the "r" component of the signature vector $\overline{P}$ for the signature of person k; $P_{k,r}$ is the "r" component of the average signature vector P for the reference signatures of person k; and $Q_{k,r}$ is the "r" component of the normalizing vector Q for the reference signatures of person k.

After the error value $E_k$ has been obtained, system operation proceeds to decision block 492 (FIG. 17B) in which the error value $E_k$ is compared to the reference threshold value $T_k$. Let it be assumed that the error value $E_k$ is less than the threshold value $T_k$. In such case, the identity claim is accepted, as indicated in block 494 to enable the next desired transaction to take place, and the "ACCEPT" light on lead-through unit 104 is illuminated, as indicated in block 496.

Following this, the value $E_k$ is compared to onehalf of the threshold value $T_k$ as shown in decision block 498. If $E_k$ is not equal to or less than $T_{k/2}$, the verification process is completed, as indicated by path 500 proceeding to "EXIT" block 502. However, if $E_k$ is equal to or less than $T_{k/2}$, then this signature vector is used to update the reference vectors $\overline{P}_k$ and $Q_k$.

In such case, system operation proceeds to block 504, where "r" is set equal to zero and a quantity L, representing a weighting factor, is set equal to 20. In block 506, "r" is incremented by one, following which, in block 508, the new values for $\overline{P}_{k,r}$ and $Q_{k,r}$ are computed in accordance with the equations set forth therein.

System operation then proceeds to decision block 510, where the numerical value of "r", representing the component number of vectors $\overline{P}_k$ and $Q_k$, is compared to 37, which is the total number of such components. System operation loops back over path 512 to block 506, and continues to do so until values $\overline{P}_k$ and $Q_k$ have been computed for each of the 37 components, at which time the system operation proceeds to block 514 in which updated reference values $\overline{P}_k$ and $Q_k$, together with the existing value $T_k$, are stored on the disk 94. The verification process is thereby completed as indicated by block 502.

Returning to decision block 492, it will be noted that in the event that the error value $E_k$ for signature k is not less than the threshold value $T_k$, the identity claim is rejected as indicated in block 516, so that further transactions may be prevented, and the "REJECT" light on lead-through unit 104 is illuminated, as shown in block 518. The verification operation is completed, as indicated by path 500 to EXIT block 502.

Included as an attached appendix is a group of program listings in Intel 8080 assembly language for the system operations described above, together with other included functions, such as gathering of experimental data relating to signature samples, testing and analyzing, which are not directly pertinent to the present invention.

While the form of the invention shown and described herein is admirably adapted to fulfill the objects aforesaid, it is to be understood that other and further modifications of the disclosed method and apparatus within the scope of the following claims may be made without departing from the spirit of the invention. For example, an implementation to be utilized in a system having relatively lower security requirements might omit certain portions of the processing procedures disclosed herein.

```
ASM80 :F1:MAINPR.VP NO OBJECT NOSYMBOLS PRINT(:LP:)

ISIS-II 8080/8085 MACRO ASSEMBLER, V2.0          MODULE   PAGE   1

LOC  OBJ          SEQ        SOURCE STATEMENT 1
                       2
                       3    ; MAIN PROGRAM
                       4
                       5
    0F94               6  DELY   EQU    0F94H
    0FE8               7  MLTPL  EQU    0FE8H
    0FEE               8  SUM    EQU    0FEEH
    0FFD               9  MTDEC  EQU    0FFDH
    0F70              10  ERMG   EQU    0F70H
    3E73              11  INIT   EQU    3E73H
    3D32              12  SAV    EQU    3D32H
    3D83              13  INPX   EQU    3D83H
    3D00              14  REPL   EQU    3D00H
    3D71              15  IO2    EQU    3D71H
    0F8E              16  CRLF   EQU    0F8EH
    0FA9              17  NRMLZ  EQU    0FA9H
    0FB2              18  TYMES  EQU    0FB2H
    0FB5              19  MOVE   EQU    0FB5H
    0FC1              20  REARF  EQU    0FC1H
    0FC4              21  WRTRF  EQU    0FC4H
    3F34              22  WRTR2  EQU    3F34H
    0FCA              23  UPDT   EQU    0FCAH
    0FCD              24  DCSN   EQU    0FCDH
    0FD0              25  VALID  EQU    0FD0H
    0FD3              26  THR    EQU    0FD3H
    0FD6              27  ERROR  EQU    0FD6H
    50D0              28  AVRG   EQU    50D0H
    0FE2              29  HAAR   EQU    0FE2H
    0FF1              30  FEAT   EQU    0FF1H
                      31
                      32   ; LOCATIONS IN MEMORY
                      33
    42F6              34  RPL    EQU    42F6H    ; NRMLIZING COEFFS.
    7FBE              35  STK    EQU    7FBEH
    6900              36  TBLE1  EQU    6900H    ; FIRST TBLE TABLES
    7210              37  TBLEI  EQU    7210H    ; COMMON LOCATION FOR TBLE TBLS
    73E0              38  TBLEN  EQU    73E0H    ; NORMALIZED TBLE TABLES
    7294              39  SCNT   EQU    TBLEI + 80H + 04H
    7299              40  ZTOT   EQU    TBLEI + 80H + 09H
    72A0              41  PLIFT  EQU    TBLEI + 80H + 10H
    7600              42  RPAR   EQU    7600H    ; REF. SIGN. VECTOR .
    7700              43  PAR1   EQU    7700H    ; FIRST SIGN. VECTOR.
    7980              44  PARI   EQU    7980H    ; COMMON LOCAT. FOR SIGN. VECTOR
    7E99              45  RNAM2  EQU    7E99H
    7EA0              46  DESTB  EQU    7EA0H
    7EB1              47  NINT   EQU    7EB1H
    7EB2              48  NSECT  EQU    7EB2H
    7ED6              49  RNAME  EQU    7ED6H
    7ED9              50  LCW    EQU    7ED9H
    7EDA              51  WIN    EQU    7EDAH
    7EE2              52  RVFL   EQU    7EE2H
```

```
ISIS-II 8080/8085 MF  ASSEMBLER, V2.0         MODULE   PAGE   2

LOC  OBJ          SEQ           SOURCE STATEMENT

7EE5              53  SAVFL   EQU    7EE5H
      7EE6              54  NPAR    EQU    7EE6H
      7EEA              55  W       EQU    7EEAH
      7EEB              56  DESTA   EQU    7EEBH
      7EEE              57  CFFLG   EQU    7EEEH
      7F80              58  MODE    EQU    7F80H
      7EDE              59  NSM     EQU    7EDEH
      0090              60  MCMD2   EQU    090H
      00EB              61  PPI2C   EQU    0EBH
                        62
                        63
                        64  ; OTHERS
                        65
      00E9              66  FPRT    EQU    00E9H   ; PAPER FEED PORT E9-BIT1
      00E9              67  DISPL   EQU    00E9H   ; DISPLAY PORT    E9-BITS 2-7
      0084              68  OFF1    EQU    0084H
      0080              69  GAPP    EQU    0080H   ; SIGN. VECTOR' GAP
      01D0              70  GAPKX   EQU    01D0H   ; TBLE GAP
                        71
                        72  ; CODE ASSIGNMENT FOR LIGHTS  DISPLAY
                        73
      00EF              74  IDNOL   EQU    0EFH
      00DF              75  SIGNL   EQU    0DFH
      00BF              76  ACCPL   EQU    0BFH
      007F              77  REJEL   EQU    07FH
      00FB              78  VERML   EQU    0FBH
      00F7              79  REFML   EQU    0F7H
      00FF              80  NONEL   EQU    0FFH
                        81
                        82
                        83  ; ****************************************************
                        84
                        85  ;              START OF MAIN PROGRAM
                        86
                        87  ; ****************************************************
                        88
                        89
      5C00              90          ORG    5C00H
                        91
      5C00 31BE7F       92  MAIN:   LXI    SP,STK   ; SET STACK POINTER
      5C03 3E01         93          MVI    A,01
      5C05 32807F       94          STA    MODE     ; DISK MODE IS BINARY
                        95
                        96                           ; INITIALIZE 8255 PPS NO. 2
                        97                           ; MODE 0
                        98                           ; PORT A INPUT (A/D)
                        99                           ; PORT B OUTPUT (DISPLAY LIGHTS)
                        100
      5C08 32B05E       101         STA    RNAM3    ; TO CHECK ID DURING VERIFICATIO
                        102                          ; ONLY 3 TIMES SAME ID NO.
                        103
      5C0B 3E90         104         MVI    A,MCMD2  ; LOAD MODE COMMAND WORD
      5C0D D3EB         105         OUT    PPI2C    ; INITITALIZE PPI2
                        106
      5C0F 3EFF         107         MVI    A,0FFH
```

```
LOC   OBJ        SEQ            SOURCE STATEMENT

5C11  32D97E     108            STA    LCW
5C14  D3E9       109            OUT    DISPL   ; INITITALIZE DISPLAY
                 110
5C16  3E25       111            MVI    A,37    ; # SIGN. VECTOR COMPONENTS.
5C18  32E67E     112            STA    NPAR
5C1B  3E04       113            MVI    A,04
5C1D  32B17E     114            STA    NINT
5C20  3E08       115            MVI    A,08
5C22  32B27E     116            STA    NSECT
5C25  CD733E     117            CALL   INIT    ; INITIALIZE PROGRAM
                 118
5C28  AF         119  MAIN1:    XRA    A
5C29  32E27E     120            STA    RVFL    ; VERIF MODE RVFL = 0
5C2C  3C         121            INR    A
5C2D  32DE7E     122            STA    NSM     ; NO. SIGNATURES
5C30  3EFB       123            MVI    A,VERML
5C32  32D97E     124            STA    LCW     ; SET DISPLAY CNTRL BYTE
5C35  D3E9       125            OUT    DISPL   ; VER LIGHT ON
5C37  CD8E0F     126            CALL   CRLF
5C3A  CDB20F     127            CALL   TYMES
5C3D  20564552   128            DB     ' VER. MODE',00
5C41  2E204D4F
5C45  4445
5C47  00
                 129
5C48  CD385E     130  MAIN2:    CALL   ENTER   ; TURN  ID# LIGHT ON
                 131                           ; TYPE  ID#
                 132                           ; GET   ID# FROM KEYPAD INTO WIN
                 133                           ; TRNF  WIN TO RNAME
                 134                           ; TURN  ID#, ACC & REJ LIGHTS ON
5C4B  3ADA7E     135            LDA    WIN
5C4E  FE39       136            CPI    39H
5C50  C2805C     137            JNZ    VERM    ; VERIFICATION MODE
                 138
                 139
                 140  ; *********************************************************
                 141
                 142  ;                    REFERENCE MODE
                 143
                 144  ; *********************************************************
                 145
5C53  3E01       146  REFM:     MVI    A,01    ; REFERENCE MODE
5C55  32E27E     147            STA    RVFL
5C58  3E05       148            MVI    A,05
5C5A  32DE7E     149            STA    NSM
5C5D  3EF7       150            MVI    A,REFML
5C5F  32D97E     151            STA    LCW
5C62  D3E9       152            OUT    DISPL   ; TURN REF LIGHT ON
5C64  CD8E0F     153            CALL   CRLF
5C67  CDB20F     154            CALL   TYMES
5C6A  5245462E   155            DB     'REF. MODE',00
5C6E  4D4F4445
5C72  00
5C73  CD385E     156            CALL   ENTER   ; TURN ID# LIGHT ON
                 157                           ; TYPE ID#
```

| LOC | OBJ | SEQ | | SOURCE STATEMENT | | |
|---|---|---|---|---|---|---|
| | | 158 | | | | ; GET    ID# FROM KEYPAD INTO WIN |
| | | 159 | | | | ; TRNF   WIN TO RNAME |
| | | 160 | | | | ; TURN   ID#, ACC, REJ LIGHTS OFF |
| | | 161 | | | | |
| 5C76 | CDE15C | 162 | | CALL | REFSB | ; REFERENCE SUBROUTINE |
| 5C79 | B7 | 163 | | ORA | A | |
| 5C7A | C4700F | 164 | | CNZ | ERMG | ; ERROR MESSAGE |
| 5C7D | C3285C | 165 | | JMP | MAIN1 | |
| | | 166 | | | | |
| | | 167 | | | | |
| | | 168 | ; **************************************************** | | | |
| | | 169 | | | | |
| | | 170 | ; | | VERIFICATION   MODE | |
| | | 171 | | | | |
| | | 172 | ; **************************************************** | | | |
| | | 173 | | | | |
| | | 174 | VERM: | | | |
| 5C80 | 21D67E | 175 | | LXI | H, RNAME | |
| 5C83 | 3AB05E | 176 | | LDA | RNAM3 | |
| 5C86 | 96 | 177 | | SUB | M | |
| 5C87 | C2A55C | 178 | | JNZ | VMM1 | |
| 5C8A | 23 | 179 | | INX | H | |
| 5C8B | 3AB15E | 180 | | LDA | RNAM3+1 | |
| 5C8E | 96 | 181 | | SUB | M | |
| 5C8F | C2A55C | 182 | | JNZ | VMM1 | |
| 5C92 | 23 | 183 | | INX | H | |
| 5C93 | 3AB25E | 184 | | LDA | RNAM3+2 | |
| 5C96 | 96 | 185 | | SUB | M | |
| 5C97 | C2A55C | 186 | | JNZ | VMM1 | |
| | | 187 | | | | |
| 5C9A | 3AB35E | 188 | | LDA | CNT1 | ; NO. OF VERIF. ATTEMPTS |
| 5C9D | FE04 | 189 | | CPI | 04 | ; ALLOWS 3 VERIFICATION ATTEMPTS |
| | | 190 | | | | ; PERSON K |
| | | 191 | | | | |
| 5C9F | C2B55C | 192 | | JNZ | VERMM | ; CONTINUE |
| 5CA2 | C3485C | 193 | | JMP | MAIN2 | |
| | | 194 | | | | |
| 5CA5 | 0E03 | 195 | VMM1: | MVI | C, 03 | ; NO. OF BYTES |
| 5CA7 | 3E01 | 196 | | MVI | A, 01 | |
| 5CA9 | 32B35E | 197 | | STA | CNT1 | |
| 5CAC | 21D67E | 198 | | LXI | H, RNAME | ; SOURCE |
| 5CAF | 11B05E | 199 | | LXI | D, RNAM3 | ; DEST |
| 5CB2 | CDB50F | 200 | | CALL | MOVE | |
| | | 201 | | | | |
| 5CB5 | AF | 202 | VERMM: | XRA | A | ; VERIFICATION MODE |
| 5CB6 | 47 | 203 | | MOV | B, A | ; DETERMINE TYPE OF SUBJECT |
| | | 204 | | | | ; ID # 001 - 199 IS CUSTOMER |
| | | 205 | | | | ;                CFFLG = 0 |
| | | 206 | | | | ;      201 - 299 IS FORGER I |
| | | 207 | | | | ;                CFFLG = 1 |
| | | 208 | | | | ;      401 - 599 IS FORGER II |
| | | 209 | | | | ;                CFFLG = 2 |
| 5CB7 | 3AD67E | 210 | | LDA | RNAME | |
| 5CBA | 32997E | 211 | | STA | RNAM2 | ; SAVE MOST SIGNIF BYTE |
| 5CBD | D632 | 212 | | SUI | 32H | |

ISIS-II 8080/8085 MACRO ASSEMBLER, V2.0                          MODULE    PAGE    5

```
LOC    OBJ           SEQ              SOURCE STATEMENT

5CBF   FACB5C        213              JM      VERM1
5CC2   04            214              INR     B
5CC3   D602          215              SUI     02H
5CC5   FACB5C        216              JM      VERM1
5CC8   04            217              INR     B
5CC9   D602          218              SUI     02H
5CCB   C632          219  VERM1:      ADI     32H
5CCD   32D67E        220              STA     RNAME
5CD0   78            221              MOV     A,B
5CD1   32EE7E        222              STA     CFFLG
5CD4   3AB35E        223              LDA     CNT1
5CD7   3C            224              INR     A
5CD8   32B35E        225              STA     CNT1
                     226
5CDB   CD635D        227              CALL    VERSB      ; VERIFICATION SUBROUTINE
5CDE   C3485C        228              JMP     MAIN2
                     229
                     230
                     231  ; ********** ********** ********** **********
                     232  ;                REFERENCE SUBROUTINE
                     233
                     234  REFSB:
5CE1   AF            235              XRA     A
5CE2   32EE7E        236              STA     CFFLG
5CE5   3E01          237              MVI     A,01
5CE7   32EA7E        238              STA     W          ; COUNT REPLACEMENTS
5CEA   210069        239              LXI     H,TBLE1
5CED   22A07E        240              SHLD    DESTB
5CF0   0605          241              MVI     B,05       ; SIGNATURES
5CF2   C5            242  REF1:       PUSH    B
5CF3   CD795E        243              CALL    INPX1
                     244                                 ;        FOR TABLE INFL = 0
                     245                                 ; TURN   SIGN LIGHT ON
                     246                                 ; SMPL   A/D
                     247                                 ; TURN   SIGN LIGHT OFF
                     248                                 ; COMP   TBLEI
                     249
                     250                                 ;        FOR DISK  INFL = 01
                     251                                 ; TYPE   SMPL:
                     252                                 ; TURN   ID# LIGHT ON
                     253                                 ; GET    ID# FROM KEYPD INTO WIN
                     254                                 ; TRNF   ID# FROM XIN TO SVNAM
                     255                                 ; TURN   ID# LIGHT OFF
                     256                                 ; READ   S-FILE FOR SVNAM
                     257                                 ; COMP   TBLEI
5CF6   3AE57E        258              LDA     SAVFL
5CF9   B7            259              ORA     A
5CFA   CC323D        260              CZ      SAV
                     261
                     262
5CFD   CDF95D        263              CALL    TRNF1      ; TRNSF TBLEI TO TBLE1
5D00   EB            264              XCHG
5D01   22A07E        265              SHLD    DESTB
5D04   C1            266              POP     B
5D05   05            267              DCR     B
```

ISIS-II 8080/8085 MACRO ASSEMBLER, V2.0          MODULE   PAGE   6

| LOC | OBJ | SEQ | | SOURCE STATEMENT | | |
|---|---|---|---|---|---|---|
| 5D06 | C2F25C | 268 | | JNZ | REF1 | ; CHECK FOR 5 SIGNATS |
| | | 269 | | | | |
| 5D09 | CDA95D | 270 | NEWPR: | CALL | AVRG3 | ; COMP  PLIFT , ZCNT & ZTOT AVRG |
| | | 271 | | | | ;       (NRMLZ FACTORS) AT RPAR1 |
| | | 272 | | | | ;       RAPR2 & RPAR3 |
| | | 273 | | | | |
| 5D0C | 210076 | 274 | | LXI | H,RPAR | ; TRNF  NRMLZ FACTORS |
| | | 275 | | | | ;       TO RPAR38, RPAR39 & RPAR40 |
| | | 276 | | | | |
| 5D0F | 11F642 | 277 | | LXI | D,RPL | |
| 5D12 | 0E09 | 278 | | MVI | C,09 | ;       MOVE 9 BYTES |
| 5D14 | CDB50F | 279 | | CALL | MOVE | |
| | | 280 | | | | |
| 5D17 | 210069 | 281 | | LXI | H,TBLE1 | ; NRMLZ TBLE TABLES |
| 5D1A | 22A07E | 282 | | SHLD | DESTB | |
| 5D1D | 210077 | 283 | | LXI | H,PAR1 | |
| 5D20 | 22EB7E | 284 | | SHLD | DESTA | |
| 5D23 | 0605 | 285 | | MVI | B,05 | |
| 5D25 | C5 | 286 | CPAR1: | PUSH | B | |
| 5D26 | CD0B5E | 287 | | CALL | TRNF2 | ; TRNSF TBLE1 TO TBLEI |
| 5D29 | 22A07E | 288 | | SHLD | DESTB | |
| 5D2C | CDA90F | 289 | | CALL | NRMLZ | |
| 5D2F | CDE20F | 290 | | CALL | HAAR | |
| 5D32 | CDF10F | 291 | | CALL | FEAT | |
| | | 292 | | | | |
| | | 293 | | | | ;       SIGN. VECTOR COMP'S. AT |
| 5D35 | CD155E | 294 | | CALL | TRNF3 | ; TRNSF PARI TO PAR1 |
| 5D38 | EB | 295 | | XCHG | | |
| 5D39 | 22EB7E | 296 | | SHLD | DESTA | |
| 5D3C | C1 | 297 | | POP | B | |
| 5D3D | 05 | 298 | | DCR | B | |
| 5D3E | C2255D | 299 | | JNZ | CPAR1 | ; CONTINUE WITH NEXT TABLE |
| | | 300 | | | | |
| 5D41 | CDD050 | 301 | | CALL | AVRG | ; COMP  RPAR |
| 5D44 | CDD60F | 302 | | CALL | ERROR | ; COMP  5 ERRORS |
| 5D47 | CDD00F | 303 | | CALL | VALID | ; CHECK FOR 5 VALID SIGNS |
| 5D4A | CDD30F | 304 | | CALL | THR | |
| 5D4D | 3AEA7E | 305 | | LDA | W | |
| 5D50 | 3C | 306 | | INR | A | |
| 5D51 | FE06 | 307 | | CPI | 06H | |
| 5D53 | C8 | 308 | | RZ | | ; ERROR RETURN (ACC = 6) |
| 5D54 | 32EA7E | 309 | | STA | W | |
| 5D57 | CD003D | 310 | | CALL | REPL | ; REPLACE SIGNATS IF NECESSARY |
| 5D5A | B7 | 311 | | ORA | A | |
| 5D5B | C2095D | 312 | | JNZ | NEWPR | ; REPLACEMET MADE |
| | | 313 | | | | |
| 5D5E | CDC40F | 314 | | CALL | WRTRF | |
| | | 315 | | | | ; PACK   REFERENCE |
| | | 316 | | | | ; WRT    TO DISK |
| 5D61 | AF | 317 | | XRA | A | |
| 5D62 | C9 | 318 | | RET | | ; NORMAL RETURN (ACC = 0 ) |
| | | 319 | | | | |
| | | 320 | ; *********** *********** *********** *********** | | | |
| | | 321 | ;       VERIFICATION SUBROUTINE | | | |
| | | 322 | | | | |

ISIS-II 8080/8085 MACRO ASSEMBLER, V2.0     MODULE    PAGE    7

| LOC | OBJ | SEQ | | SOURCE STATEMENT | | |
|---|---|---|---|---|---|---|
| 5D63 | CDC10F | 323 | VERSB: | CALL | REARF | ; READ R-FILE FROM DISK |
| | | 324 | | | | ; NAME IS RNAME |
| 5D66 | C27D5D | 325 | | JNZ | VERB2 | ; CONTINUE |
| 5D69 | CDB20F | 326 | | CALL | TYMES | |
| 5D6C | 20204E4F | 327 | | DB | ' NO SUCH REF. ',00 | |
| 5D70 | 20535543 | | | | | |
| 5D74 | 48205245 | | | | | |
| 5D78 | 462E20 | | | | | |
| 5D7B | 00 | | | | | |
| 5D7C | C9 | 328 | | RET | | |
| | | 329 | | | | |
| | | 330 | VERB2: | | | |
| 5D7D | CD795E | 331 | | CALL | INPX1 | |
| | | 332 | | | | ; FOR TABLE INFL = 0 |
| | | 333 | | | | ; TURN SIGN LIGHT ON |
| | | 334 | | | | ; SMPL A/D |
| | | 335 | | | | ; TURN SIGN LIGHT OFF |
| | | 336 | | | | ; COMP TBLEI |
| | | 337 | | | | |
| | | 338 | | | | ; FOR DISK INFL = 01 |
| | | 339 | | | | ; TYPE SMPL: |
| | | 340 | | | | ; TURN ID# LIGHT ON |
| | | 341 | | | | ; GET ID# FROM KEYPD INTO WIN |
| | | 342 | | | | ; TRNF ID# FROM XIN TO SVNAM |
| | | 343 | | | | ; TURN ID# LIGHT OFF |
| | | 344 | | | | ; READ S-FILE FOR SVNAM |
| | | 345 | | | | ; COMP TBLEI |
| | | 346 | | | | |
| 5D80 | CD505E | 347 | | CALL | TRNF4 | ; COMPUTE & TRANSFER 3 NRMLIZING |
| | | 348 | | | | ; COEFFICIENTS. |
| 5D83 | CDA90F | 349 | | CALL | NRMLZ | ; NRMLZ TBLEI TO TBLEN |
| 5D86 | CDE20F | 350 | | CALL | HAAR | |
| 5D89 | CDF10F | 351 | | CALL | FEAT | |
| | | 352 | | | | ; COMP SIGN . VECTOR AT PARI |
| 5D8C | 110077 | 353 | | LXI | D,PAR1 | |
| 5D8F | CD195E | 354 | | CALL | TRF3A | ; TRNSF PARI TO PAR1 |
| 5D92 | CDD60F | 355 | | CALL | ERROR | ; COMP ERROR BETWEEN |
| | | 356 | | | | ; PAR1 & RPAR |
| | | 357 | | | | |
| 5D95 | CDCD0F | 358 | | CALL | DCSN | ; COMP ERROR : THRESH |
| | | 359 | | | | ; TYPE ACCEPT/REJECT |
| | | 360 | | | | ; TURN ACCEPT/REJECT LIGHTS ON |
| | | 361 | | | | ; COMP IF UPDATE NECESSARY |
| | | 362 | | | | ; ACC=0 UPDATE |
| | | 363 | | | | |
| 5D98 | F5 | 364 | | PUSH | PSW | |
| 5D99 | 3AE57E | 365 | | LDA | SAVFL | |
| 5D9C | B7 | 366 | | ORA | A | |
| 5D9D | CC323D | 367 | | CZ | SAV | ; WRIT S-FILE ON DISK UNIT |
| | | 368 | | | | ; NAME IS SVNAM |
| | | 369 | | | | |
| 5DA0 | F1 | 370 | | POP | PSW | |
| 5DA1 | B7 | 371 | | ORA | A | |
| 5DA2 | C4CA0F | 372 | | CNZ | UPDT | ; COMP NEW RPAR & VARS. |
| 5DA5 | CD343F | 373 | | CALL | WRTR2 | ; TRNSF SUMMARY AREA TO STANDARD |

ISIS-II 8080/8085 MACRO ASSEMBLER, V2.0       MODULE  PAGE  8

```
LOC   OBJ          SEQ          SOURCE STATEMENT

374                              ; PACK  SIGN VECTOR'S AND VAR'S
                   375                              ; WRTE  UPDATED REFERENCE
                   376
5DA8 C9            377          RET                 ; RETURN
                   378
                   379  ; ********** ********** ********** **********
                   380  ;          AVRG3 SUBROUTINE
                   381
                   382  ; COMPUTE AVERAGES FOR PLIFT, ZTOT, SCNT
                   383  ; NORMALIZING FACTORS
                   384
5DA9 210077        385  AVRG3:  LXI      H,PAR1
5DAC 22EB7E        386          SHLD     DESTA
5DAF 218469        387          LXI      H,TBLE1 + OFF1
5DB2 22A07E        388          SHLD     DESTB
5DB5 0605          389.         MVI      B,05
5DB7 C5            390  AVR31:  PUSH     B
5DB8 116474        391          LXI      D,TBLEN + OFF1
5DBB 2AA07E        392          LHLD     DESTB
5DBE 0E10          393          MVI      C,10H
5DC0 CDB50F        394          CALL     MOVE      ; TRNSF TBLE1 (PARTIAL)
                   395                             ;    TO TBLEN (PARTIAL)
                   396
                   397
5DC3 2AEB7E        398          LHLD     DESTA     ; TRNF  PLIFT, ZTOT & SCNT
                   399                             ;       FROM TBLEN TO PAR1
                   400
5DC6 3600          401          MVI      M,0
5DC8 23            402          INX      H
5DC9 3A7074        403          LDA      PLIFT + GAPKX
5DCC 77            404          MOV      M,A
5DCD 23            405          INX      H
5DCE 3600          406          MVI      M,0
5DD0 23            407          INX      H
5DD1 EB            408          XCHG
5DD2 2A6974        409          LHLD     ZTOT + GAPKX
5DD5 EB            410          XCHG
5DD6 72            411          MOV      M,D
5DD7 23            412          INX      H
5DD8 73            413          MOV      M,E
5DD9 23            414          INX      H
5DDA 3600          415          MVI      M,0
5DDC 23            416          INX      H
5DDD EB            417          XCHG
5DDE 2A6474        418          LHLD     SCNT + GAPKX
5DE1 EB            419          XCHG
5DE2 72            420          MOV      M,D
5DE3 23            421          INX      H
5DE4 73            422          MOV      M,E
5DE5 23            423          INX      H
5DE6 3600          424          MVI      M,0
5DE8 CD225E        425          CALL     NXTPR     ; SET   DESTA = DESTA + GAPP
5DEB CD2D5E        426          CALL     NXTKX     ; SET   DESTB = DESTB + GAPKX
5DEE C1            427          POP      B
5DEF 05            428          DCR      B
```

ISIS-II 8080/8085 MACRO ASSEMBLER, V2.0        MODULE    PAGE    9

```
 LOC   OBJ          SEQ           SOURCE STATEMENT

5DF0 C2B75D         429           JNZ      AVR31
5DF3 3E03           430           MVI      A,03
5DF5 CDD350         431           CALL     AVRG + 3
5DF8 C9             432           RET
                    433
                    434 ; ********** ********** ********** **********
                    435 ;        TRNF1 SUBROUTINE
                    436
                    437 ; TRANSFER TBLEI TO TBLE1
                    438
5DF9 2AA07E         439 TRNF1:    LHLD     DESTB
5DFC EB             440           XCHG
5DFD 211072         441           LXI      H,TBLEI
5E00 0EFF           442 TRNF:     MVI      C,0FFH
5E02 CDB50F         443           CALL     MOVE
5E05 0ED1           444           MVI      C,0D1H
5E07 CDB50F         445           CALL     MOVE
5E0A C9             446           RET
                    447
                    448 ; ********** ********** ********** **********
                    449 ;        TRNF2 SUBROUTINE
                    450
                    451 ; TRANSFER TBLE1 TO TBLEI
                    452
5E0B 211072         453 TRNF2:    LXI      H,TBLEI
5E0E EB             454           XCHG
5E0F 2AA07E         455           LHLD     DESTB
5E12 C3005E         456           JMP      TRNF
                    457
                    458 ; ********** ********** ********** **********
                    459 ;        TRNF3 SUBROUTINE
                    460
                    461 ; TRANSFER PARI TO PAR1
                    462
5E15 2AEB7E         463 TRNF3:    LHLD     DESTA
5E18 EB             464           XCHG
5E19 218079         465 TRF3A:    LXI      H,PARI
5E1C 0E80           466           MVI      C,080H
5E1E CDB50F         467           CALL     MOVE
5E21 C9             468           RET
                    469
                    470 ; ********** ********** ********** **********
                    471 ;        NXTPR SUBROUTINE
                    472
                    473 ; SET DESTA TO NEXT SIGN VECTOR. ADDRESS
                    474 ; DESTA = DESTA + GAPP (PAR GAP)
                    475
5E22 118000         476 NXTPR:    LXI      D,GAPP
5E25 2AEB7E         477           LHLD     DESTA
5E28 19             478           DAD      D
5E29 22EB7E         479           SHLD     DESTA
5E2C C9             480           RET
                    481
                    482 ; ********** ********** ********** **********
                    483 ;        NXTKX SUBROUTINE
```

```
LOC   OBJ          SEQ           SOURCE STATEMENT 484
                   485   ; SET DESTB TO NEXT TBLE TABLE ADDR.
                   486   ; DESTB = DESTB + GAPKX (TBLE GAP)
                   487
5E2D  11D001       488   NXTKX:  LXI    D,GAPKX
5E30  2AA07E       489           LHLD   DESTB
5E33  19           490           DAD    D
5E34  22A07E       491           SHLD   DESTB
5E37  C9           492           RET
                   493
                   494   ; ********** ********** ********** **********
                   495   ;     ENTER SUBROUTINE
                   496
                   497   ; TURN ID# LIGHT ON
                   498   ; SEL  KEYPDAD
                   499   ; GET  ENTRY INTO WIN
                   500   ; TURN ID# LIGHT OFF
                   501   ; TRNF WIN TO RNAME
                   502
5E38  CD8E0F       503   ENTER:  CALL   CRLF
5E3B  CDB20F       504           CALL   TYMES
5E3E  2049442E     505           DB     ' ID. # : ',00
5E42  2023203A
5E46  20
5E47  00
5E48  11D67E       506           LXI    D,RNAME
5E4B  D5           507           PUSH   D
5E4C  CD713D       508           CALL   IO2       ; TURN  ID# LIGHT ON
                   509                             ; GET   3 ASCII CHARS FROM
                   510                             ;       KEYPAD UNIT
                   511                             ; TURN  ID# LIGHT OFF
                   512                             ; TRNSF ASCII CHARS TO (DE)
                   513
5E4F  C9           514           RET
                   515
5E50  213C76       516   TRNF4:  LXI    H,RPAR+20*3   ; ZERO TIME TO DEC
5E53  CDFD0F       517           CALL   MTDEC
5E56  D5           518           PUSH   D
5E57  212D76       519           LXI    H,RPAR+15*3   ; WRITE TIME TO HLB
5E5A  56           520           MOV    D,M
5E5B  23           521           INX    H
5E5C  5E           522           MOV    E,M
5E5D  23           523           INX    H
5E5E  46           524           MOV    B,M
5E5F  EB           525           XCHG
5E60  D1           526           POP    D
5E61  CDEE0F       527           CALL   SUM       ; HLB + DEC TOTAL TIME
5E64  EB           528           XCHG
5E65  21FC42       529           LXI    H,RPL+6
5E68  72           530           MOV    M,D
5E69  23           531           INX    H
5E6A  73           532           MOV    M,E
5E6B  23           533           INX    H
5E6C  70           534           MOV    M,B
5E6D  213976       535           LXI    H,RPAR+19*3
```

ISIS-II 8080/8085 MACRO ASSEMBLER, V2.0        MODULE    PAGE  11

```
LOC   OBJ          SEQ           SOURCE STATEMENT

5E70  11F642       536           LXI    D,RPL
5E73  0E06         537           MVI    C,06
5E75  CDB50F       538           CALL   MOVE
5E78  C9           539           RET
                   540
                   541
                   542   ; INPX1 SUBROUTINE
                   543
5E79  CD833D       544   INPX1:  CALL   INPX      ; GET SIGNATURE FROM TABLE
5E7C  F5           545           PUSH   PSW
5E7D  CD8E5E       546           CALL   FEED      ; FEED PAPER
5E80  F1           547           POP    PSW
5E81  B7           548           ORA    A
5E82  C8           549           RZ               ; A=0  GOOD SIGNATURE
                   550
5E83  FE06         551           CPI    06
5E85  DA795E       552           JC     INPX1
                   553                            ; A=2  SIGNAT. TOO SHORT
                   554                            ; A=3  SIGNT. TOO LONG
                   555                            ; A=4  TBLE FULL
5E88  21BE7F       556           LXI    H,STK     ; A=FF SIGNAT ABORTED BY OPRTOR
5E8B  C3285C       557           JMP    MAIN1
                   558
                   559
                   560   ; PAPER FEED SUBROUTINE
                   561
5E8E  0E05         562   FEED:   MVI    C,05
5E90  3AD97E       563           LDA    LCW
5E93  E6FD         564   F2:     ANI    0FDH
5E95  D3E9         565           OUT    FPRT
5E97  CDA65E       566           CALL   DELFE
5E9A  F602         567           ORI    02H
5E9C  D3E9         568           OUT    FPRT
5E9E  0D           569           DCR    C
5E9F  C8           570           RZ
5EA0  CDA65E       571           CALL   DELFE
5EA3  C3935E       572           JMP    F2
                   573
5EA6  0666         574   DELFE:  MVI    B,66H
5EA8  CD940F       575   D2E:    CALL   DELY
5EAB  05           576           DCR    B
5EAC  C2A85E       577           JNZ    D2E
5EAF  C9           578           RET
                   579
                   580
                   581
0003               582   RNAM3:  DS     03
5EB3  00           583   CNT1:   DB     00
                   584
                   585           END
```

ASSEMBLY COMPLETE,    NO ERRORS

ASM80 :F1:KXSMTB.VP NOOBJECT NOSYMBOLS PRINT(:LP:)

ISIS-II 8080/8085 MACRO ASSEMBLER, V2.0          MODULE   PAGE   1

```
LOC    OBJ        SEQ           SOURCE STATEMENT

1   ;  TITLE        'KXSM SBR WITH ALERT TONE (KXSAT.SRC), 2
                    2
                    3   ;  SBC 80/10, 8-BIT A/D, 8253 TIMER-INTERRUPT,
                    4   ;  SUCCESSIVE-SAMPLE DECISION ALGORITHM,
                    5   ;  ALERT TONE GENERATION...
                    6
                    7   ;  KXSM SUBROUTINE HAS OPTIONS SELECTED BY FLAGS, 'INFL',
                    8   ;  AND 'SAVFL', (REFER TO 'GLOBAL EQUATES') AS FOLLOWS:
                    9
                   10   ;  INFL = 01:  SAMPLES ARE FETCHED FROM THE I/O BUFFER,
                   11   ;                IOBUF, WHICH MUST BE LOADED WITH DESIRED
                   12   ;                SIGNATURE SAMPLES PRIOR TO CALLING.
                   13
                   14   ;  INFL = 00:  SAMPLES ARE INPUT FROM THE A/D CONVERTER.
                   15
                   16   ;  NOTE:  FOR ALL OPTIONS, THE KXSM MATRIX IS CONSTRUCTED
                   17
                   18
                   19
                   20
                   21   ;  ABNORMAL RETURNS ARE CODED IN THE ACCUMULATOR
                   22   ;  AS FOLLOWS:
                   23
                   24   ;    CODE    CARRY              SIGNIFICANCE
                   25   ;    ----    -----    -----------------------------------
                   26   ;     02       0      SIGNATURE TOO SHORT      (NON FATAL)
                   27   ;     03       0      SIGNATURE TOO LONG       (NON FATAL)
                   28   ;     04       0      KXSM TABLE FULL          (NONFATAL)
                   29
                   30
                   31   ;  NOTE:  THE DATA BUS TO THE ANALOG INTERFACE
                   32   ;         CARD IS INVERTED, THUS ALL DATA OUTPUT
                   33   ;         FROM THE CPU MUST BE COMPLEMENTED...
                   34
                   35   ;         THE A/D OUTPUT IS COMPLEMENTED BINARY,
                   36   ;         THUS A/D INPUT TO THE CPU MUST NOT
                   37   ;         BE COMPLEMENTED...
                   38
                   39
4300               40           ORG      4300H
                   41
                   42
                   43   ;  GLOBAL EQUATES...
                   44
7EE3               45   INFL    EQU      7EE3H        ; 'INPUT' FLAG MEMORY LOCATION
7ED9               46   LCW     EQU      7ED9H        ; LED CONTROL WORD LOCATION
                   47
                   48   ;  LOCAL EQUATES...
                   49
00C0               50   ECNT    EQU      192D         ; SIGNATURE END COUNT
05DC               51   MAXCT   EQU      1500D        ; MAXIMUM NUMBER OF SAMPLES
0040               52   MINCT   EQU      64D          ; MINIMUM NUMBER OF SAMPLES
```

ISIS-II 8080/8085 MACRO ASSEMBLER, V2.0                    MODULE    PAGE    2

```
LOC  OBJ          SEQ         SOURCE STATEMENT 0004              53  THR     EQU    04              ; THRESHOLD VALUE
0080              54  MAXNE   EQU    128D
000A              55  THLD2   EQU    0AH
                  56
                  57 ; INPUT PORT ASSIGNMENTS...
                  58
0063              59  ADIN    EQU    63H             ; A/D DATA INPUT PORT
00E8              60  PADIN   EQU    0E8H            ; KEYPAD DATA INPUT PORT
                  61
                  62 ; OUTPUT PORT ASSIGNMENTS...
                  63
00E9              64  DISPL   EQU    0E9H            ; LED DISPLAY PORT
                  65
                  66
                  67 ; 8253 COUNTER/TIMER EQUATES...
                  68
0073              69  CTR0    EQU    73H             ; COUNTER NO. 0
0072              70  CTR1    EQU    72H             ; COUNTER NO. 1
0071              71  CTR2    EQU    71H             ; COUNTER NO. 2
0070              72  CTRCRL  EQU    70H             ; COUNTER CONTROL PORT
FFFE              73  OSCT    EQU    NOT 1           ; ONE-SHOT COUNT
AFFF              74  SCT     EQU    NOT 20480D      ; SAMPLING LOOP COUNT
FF37              75  TCT     EQU    NOT 200D        ; THRESHOLD LOOP COUNT
FFAD              76  TCMD1   EQU    NOT 01010010B   ; MODE 1: CTR NO. 1
FFEB              77  TCMD2   EQU    NOT 00010100B   ; MODE 2: LOAD 1 BYTE
FFCB              78  TCMD3   EQU    NOT 00110100B   ; MODE 2: LOAD 2 BYTES
                  79
                  80 ; 8255 PPI EQUATES...
                  81
FFF6              82  EICMD   EQU    NOT 00001001B   ; SET INTERRUPT F/F
FFF7              83  DICMD   EQU    NOT 00001000B   ; RESET INTERRUPT F/F
FFF0              84  EADSC   EQU    NOT 00001111B   ; ENABLE A/D STROBE CTR
FFF1              85  DADSC   EQU    NOT 00001110B   ; DISABLE A/D STROBE CTR
FF4F              86  MDCMD   EQU    NOT 10110000B   ; PORT A MODE 1 INPUT
0060              87  PPI3C   EQU    60H             ; PPI NO. 3 CONTROL PORT
                  88
                  89
                  90 ; REFERENCED ROUTINES & SUBROUTINES...
                  91
0F8E              92  CRLF    EQU    0F8EH           ; CRLF SBR IN MONITOR
0217              93  MNTR    EQU    0217H           ; MONITOR ENTRY POINT
0F8B              94  HILO    EQU    0F8BH           ; SBC 80 MONITOR SBR
0F97              95  CLRM    EQU    0F97H           ; 'CLEAR MEMORY' SBR
0F70              96  ERMSG   EQU    0F70H           ; 'ERROR MESSAGE' SBR
                  97
                  98
                  99 ; INITIALIZATION...
                  100
                  101
4300 F3           102 KXSM:   DI                     ; DISABLE INTERRUPTS
4301 210000       103         LXI    H,0000          ; CLEAR HL
4304 39           104         DAD    SP              ; GET SP IN HL
4305 220A7E       105         SHLD   SAVSP           ; SAVE STACK POINTER
4308 3EC9         106         MVI    A,(RET)         ; LOAD 'RET' OPCODE
430A 323D3C       107         STA    3C3DH           ; MOVE 'RET' OPCODE TO 'USRBR'
```

ISIS-II 8080/8085 MACRO ASSEMBLER, V2.0       MODULE   PAGE   3

```
LOC  OBJ         SEQ         SOURCE STATEMENT 108
                 109 ; CLEAR KXSM TABLE AREA   (7210H - 73DFH)...
                 110
                 111 CLRTBL:
430D 211072      112         LXI     H,KXTBL   ; POINT TO STORAGE BEGINNING
4310 06D0        113         MVI     B,0D0H    ; LOAD COUNTER (208 BYTES)
4312 CD970F      114         CALL    CLRM      ; CLEAR 7210H - 72DFH
4315 CD970F      115         CALL    CLRM      ; CLEAR 72E0H - 73DFH
                 116
                 117 ; NOTE: THE ACCUMULATOR IS CLEARED BY THE 'CLRM'
                 118 ; SUBROUTINE CALLED ABOVE...
                 119
4318 211072      120         LXI     H,KXTBL   ; INITIALIZE KX POINTER
431B 22007E      121         SHLD    KXPTR
431E 21E072      122         LXI     H,SMTBL   ; INITIALIZE SM POINTER
4321 22047E      123         SHLD    SMPTR
4324 21BF62      124         LXI     H,IOBUF-1 ; INITIALIZE IOBUF POINTERS
4327 22067E      125         SHLD    INPTR     ;      "       "       "
432A 22087E      126         SHLD    OUTPTR    ;      "       "       "
432D 3AE37E      127         LDA     INFL      ; GET INPUT FLAG
4330 FE01        128         CPI     01        ; FETCH MEMORY SAMPLES?
4332 C23843      129         JNZ     IHDW      ; NO, INITIALIZE HARDWARE
4335 C39E43      130         JMP     FIRST     ; GO STORE & CONTINUE
                 131
                 132
                 133
                 134 ; INITIALIZE 8255 PPI ON ANALOG BOARD...
                 135
                 136 IHDW:
4338 3E4F        137         MVI     A,MDCMD   ; LOAD MODE COMMAND
433A D360        138         OUT     PPI3C     ; INITIALIZE MODE 1 INPUT
                 139
                 140 ;   INITIALIZE 8253 COUNTER NO.1 FOR
                 141 ;   ONE-SHOT MODE (MODE 1)...
                 142
433C 3EAD        143         MVI     A,TCMD1 AND 0FFH ; LOAD COMMAND WORD
433E D370        144         OUT     CTRCRL
4340 3EFE        145         MVI     A,OSCT AND 0FFH  ; LOAD ONE-SHOT COUNT
4342 D372        146         OUT     CTR1
                 147
                 148 ; INITIALIZE 8253 COUNTER NO.0 FOR
                 149 ; APPROX. 100-MICROSECOND SAMPLING TIME...
                 150
4344 3EEB        151         MVI     A,TCMD2 AND 0FFH ; LOAD COMMAND WORD
4346 D370        152         OUT     CTRCRL
4348 3E37        153         MVI     A,TCT AND 0FFH   ; LOAD COUNT BYTE
434A D373        154         OUT     CTR0
                 155
                 156
                 157 ; ENABLE 8255 PPI INTERRUPT AND A/D STROBE COUNTER...
                 158
434C 3EF6        159         MVI     A,EICMD AND 0FFH ; LOAD COMMAND WORD
434E D360        160         OUT     PPI3C     ; ENABLE PPI INTERRUPT
4350 3EF0        161         MVI     A,EADSC AND 0FFH ; LOAD COMMAND WORD
4352 D360        162         OUT     PPI3C     ; ENABLE A/D STROBE CTR
```

```
LOC  OBJ          SEQ         SOURCE STATEMENT 163
                  164
                  165 ; TONE GENERATION:  A SQUARE WAVEFORM IS
                  166 ; GENERATED ON THE LSB OUTPUT LINE OF THE
                  167 ; KEYPAD LED DISPLAY PORT (DISPL)...
                  168
4354 3A2F45       169         LDA     TFREQ       ; GET TONE FREQUENCY CONSTANT
4357 5F           170         MOV     E,A         ; SAVE TFREQ IN E
4358 2A3045       171         LHLD    TTIME       ; GET TONE TIME CONSTANT
435B 3AD97E       172         LDA     LCW         ; GET LED CONTROL WORD
435E E6DE         173         ANI     0DEH        ; MASK TO TURN-ON 'SIGN' LED
                  174                             ; AND SET LSB LINE LOW
4360 4F           175         MOV     C,A         ; SAVE MASKED LCW
                  176
                  177 TONE:
4361 79           178         MOV     A,C         ; PUT LCW MASK IN ACCUM.
4362 EE01         179         XRI     01          ; SWITCH LSB
4364 4F           180         MOV     C,A         ; AND SAVE MODIFIED MASK
4365 D3E9         181         OUT     DISPL       ; SWITCH PORT LSB LINE
4367 43           182         MOV     B,E         ; LOAD TFREQ INTO LOOP CNTR.
                  183
                  184 ; THRESHOLD LOOP...
                  185 ; (SAMPLING TIME APPROX. 100 MICROSECONDS)
                  186
                  187 TLOOP:
4368 DBE8         188         IN      PADIN       ; IS ESCAPE DESIRED?
436A 17           189         RAL
436B D27343       190         JNC     TL1         ; NO, CONTINUE
436E 3EFF         191         MVI     A,0FFH      ; YES, PUT CODE IN ACCUM.
4370 C3AC44       192         JMP     RSPPI       ; RESET PPI & RETURN
                  193 TL1:
4373 FB           194         EI                  ; ENABLE INTERRUPT
4374 76           195         HLT                 ; WAIT FOR INTERRUPT
4375 DB63         196         IN      ADIN        ; GET KX(T) FROM A/D
4377 57           197         MOV     D,A         ; SAVE KX(T) IN D
4378 3A2E45       198         LDA     STHLD       ; GET STARTING THRESHOLD
437B BA           199         CMP     D           ; IS KX(T) > STHLD
437C DA8C43       200         JC      TLEX        ; YES, LEAVE TLOOP
                  201
437F 7C           202         MOV     A,H         ; TEST FOR END OF TIME
4380 B5           203         ORA     L           ;   "    "   "   "   "
4381 CA6843       204         JZ      TLOOP       ; CONTINUE IN TLOOP ONLY
                  205
4384 05           206         DCR     B           ; DECREMENT LOOP COUNT
4385 C26843       207         JNZ     TLOOP       ; CONTINUE
                  208
4388 2B           209         DCX     H           ; DECREMENT TIME COUNT
4389 C36143       210         JMP     TONE        ; GO SWITCH LSB
                  211
                  212 TLEX:
438C 79           213         MOV     A,C         ; PUT LCW MASK IN ACCUM.
438D CD2445       214         CALL    SINOFF      ; 'SIGN' LIGHT OFF; LSB LOW
                  215
                  216
                  217 ; NOW, REINITIALIZE 8253 COUNTER NO. 0
```

ISIS-II 8080/8085 MACRO ASSEMBLER, V2.0                 MODULE    PAGE    5

LOC   OBJ         SEQ           SOURCE STATEMENT

218 ; FOR APPROX. 10-MILLISECOND SAMPLING
                  219 ; TIME...
                  220 ; (20,480 COUNTS = 5000H = AFFFH COMP.)
                  221
4390 3ECB         222           MVI     A,TCMD3 AND 0FFH ; LOAD COMMAND WORD
4392 D370         223           OUT     CTRCRL
4394 3EFF         224           MVI     A,SCT AND 0FFH   ; LOAD COUNT LBYTE
4396 D373         225           OUT     CTR0
4398 3EAF         226           MVI     A,SCT SHR 8      ; LOAD COUNT HBYTE
439A D373         227           OUT     CTR0
                  228
439C DB63         229           IN      ADIN             ; RESET 8255 INTR LINE
                  230
                  231 ; NOTE: THE BC REGISTER PAIR IS DEDICATED AS THE
                  232 ; SAMPLE COUNTER IN THE REMAINDER OF THE ROUTINE &
                  233 ; MUST BE PROTECTED...
                  234
                  235
439E 3E01         236 FIRST:    MVI     A,01
43A0 32117E       237           STA     CODE             ; CODE=1
43A3 010000       238           LXI     B,00             ; I=0
43A6 AF           239           XRA     A
43A7 320E7E       240           STA     MXMIN            ; MXMIN=0
43AA 329172       241           STA     SUM
43AD 329272       242           STA     SUM+1            ; SUM=0
43B0 329372       243           STA     SUM+2
43B3 CDC144       244 GETSI:    CALL    GETS
43B6 F5           245           PUSH    PSW              ; SAVE SI
43B7 F5           246           PUSH    PSW
43B8 78           247           MOV     A,B
43B9 FE00         248           CPI     00
43BB C2F243       249           JNZ     CKCOA
43BE 79           250           MOV     A,C
43BF FE01         251           CPI     01
43C1 C2F243       252           JNZ     CKCOA
43C4 F1           253           POP     PSW
43C5 CD0045       254           CALL    IIS1
43C8 3A117E       255 CKCO:     LDA     CODE
43CB FE02         256           CPI     02
43CD CA3644       257           JZ      COD2
43D0 FE01         258           CPI     01
43D2 CA4F44       259           JZ      COD1
                  260 COD3:
43D5 F1           261           POP     PSW
43D6 FE00         262           CPI     00
43D8 CAF643       263           JZ      CO3E
43DB 57           264 CO3F:     MOV     D,A              ; SI
43DC 3A0E7E       265           LDA     MXMIN
43DF BA           266           CMP     D
43E0 D2EB43       267           JNC     STSI
43E3 5F           268 CO3B:     MOV     E,A
43E4 7A           269           MOV     A,D
43E5 93           270           SUB     E
43E6 FE04         271           CPI     THR
43E8 D22644       272           JNC     CO3C

ISIS-II 8080/8085 MACRO ASSEMBLER, V2.0      MODULE    PAGE    6

```
LOC   OBJ        SEQ         SOURCE STATEMENT

43EB  7A         273  STSI:    MOV    A, D
43EC  320E7E     274  STSIB:   STA    MXMIN
43EF  C3B343     275           JMP    GETSI
43F2  F1         276  CKCOA:   POP    PSW
43F3  C3C843     277           JMP    CKCO
43F6  3E02       278  CO3E:    MVI    A, 2
43F8  32117E     279           STA    CODE
43FB  AF         280           XRA    A
43FC  CD0045     281           CALL   IIS1
43FF  3AE37E     282           LDA    INFL
4402  FE01       283           CPI    01
4404  CA1544     284           JZ     CO3A
4407  2A067E     285           LHLD   INPTR      ; HARDWARE
440A  22087E     286           SHLD   OUTPTR
440D  60         287           MOV    H, B
440E  69         288           MOV    L, C
440F  229472     289           SHLD   SCNT
4412  C3B343     290           JMP    GETSI
4415  2ABC62     291  CO3A:    LHLD   LSADR
4418  EB         292           XCHG
4419  2A067E     293           LHLD   INPTR
441C  23         294           INX    H
441D  CD8B0F     295           CALL   HILO
4420  DA8344     296           JC     CO3D
4423  C3B343     297           JMP    GETSI
4426  3E01       298  CO3C:    MVI    A, 01
4428  32117E     299           STA    CODE
442B  3A0E7E     300           LDA    MXMIN
442E  0B         301           DCX    B
442F  CD0045     302           CALL   IIS1
4432  03         303           INX    B
4433  C3EB43     304           JMP    STSI
4436  F1         305  COD2:    POP    PSW        ; GET SI
4437  FE00       306           CPI    00
4439  CA6F44     307           JZ     CO2A
443C  57         308           MOV    D, A
443D  AF         309           XRA    A
443E  329672     310           STA    ZCNT
4441  3E01       311           MVI    A, 01
4443  32117E     312           STA    CODE
4446  AF         313           XRA    A
4447  0B         314           DCX    B
4448  CD0045     315           CALL   IIS1
444B  03         316           INX    B
444C  C3EB43     317           JMP    STSI
444F  3A0E7E     318  COD1:    LDA    MXMIN
4452  57         319           MOV    D, A       ; MXMIN=D
4453  F1         320           POP    PSW
4454  BA         321           CMP    D
4455  D2EC43     322           JNC    STSIB
                 323
4458  92         324  CO1A:    SUB    D          ; SI-MXMIN
4459  FE04       325           CPI    THR
445B  DAEC43     326           JC     STSIB
445E  57         327           MOV    D, A       ; SI
```

ISIS-II 8080/8085 MACRO ASSEMBLER, V2.0　　　　　MODULE　　PAGE　7

| LOC | OBJ | SEQ | | SOURCE STATEMENT | | |
|---|---|---|---|---|---|---|
| 445F | 3E03 | 328 | | MVI | A,03 | |
| 4461 | 32117E | 329 | | STA | CODE | |
| 4464 | 3A0E7E | 330 | | LDA | MXMIN | |
| 4467 | 0B | 331 | | DCX | B | |
| 4468 | CD0045 | 332 | | CALL | IIS1 | |
| 446B | 03 | 333 | | INX | B | |
| 446C | C3EB43 | 334 | | JMP | STSI | |
| 446F | 3AE37E | 335 | CO2A: | LDA | INFL | |
| 4472 | FE01 | 336 | | CPI | 01 | |
| 4474 | CAB343 | 337 | | JZ | GETSI | |
| 4477 | 3A9672 | 338 | | LDA | ZCNT | |
| 447A | 3C | 339 | | INR | A | |
| 447B | 329672 | 340 | | STA | ZCNT | |
| 447E | FEC0 | 341 | | CPI | ECNT | |
| 4480 | DAB343 | 342 | | JC | GETSI | |
| 4483 | 3A9072 | 343 | CO3D: | LDA | NKX | |
| 4486 | D601 | 344 | | SUI | 01 | |
| 4488 | 329072 | 345 | | STA | NKX | |
| 448B | 3AE37E | 346 | | LDA | INFL | |
| 448E | FE01 | 347 | | CPI | 01 | |
| 4490 | CAC044 | 348 | | JZ | SBREX | |
| 4493 | 2A087E | 349 | | LHLD | OUTPTR | ; GET OUTPUT POINTER |
| 4496 | 22BC62 | 350 | | SHLD | LSADR | ; TRANSFER TO LSADR |
| 4499 | 2A9472 | 351 | | LHLD | SCNT | ; STORE SAMPLE COUNT |
| 449C | 22BE62 | 352 | | SHLD | T | ; STORE SAMPLE COUNT IN IOBUF |
| | | 353 | | | | |
| 449F | 11C0FF | 354 | | LXI | D,-MINCT | ; LOAD MINIMUM COUNT LIMIT |
| 44A2 | 19 | 355 | | DAD | D | ; SCNT - MINIMUM LIMIT |
| 44A3 | 3E02 | 356 | | MVI | A,02 | ; LOAD ERROR CODE |
| 44A5 | D2A944 | 357 | | JNC | ABORT | ; SIGNATURE TOO SHORT |
| 44A8 | AF | 358 | | XRA | A | ; CLEAR ACCUM. & CARRY |
| | | 359 | | | | |
| | | 360 | ABORT: | | | |
| 44A9 | CD700F | 361 | | CALL | ERMSG | ; TYPE ERROR MESSAGE |
| 44AC | F5 | 362 | RSPPI: | PUSH | PSW | |
| 44AD | 3A97E | 363 | | LDA | LCW | ; GET LCW |
| 44B0 | CD2445 | 364 | | CALL | SINOFF | ; 'SIGN' OFF; LSB LOW |
| 44B3 | 3EF7 | 365 | | MVI | A,DICMD AND 0FFH | ; LOAD COMMAND WORD |
| 44B5 | D360 | 366 | | OUT | PPI3C | ; RESET INTERRUPT F/F |
| 44B7 | 3EF1 | 367 | | MVI | A,DADSC AND 0FFH | ; LOAD COMMAND WORD |
| 44B9 | D360 | 368 | | OUT | PPI3C | ; STOP A/D STROBE CTR. |
| 44BB | F1 | 369 | | POP | PSW | |
| 44BC | 2A0A7E | 370 | | LHLD | SAVSP | |
| 44BF | F9 | 371 | | SPHL | | |
| | | 372 | | | | |
| | | 373 | SBREX: | | | |
| 44C0 | C9 | 374 | | RET | | ; TO CALLING ROUTINE |
| | | 375 | | | | |
| | | 376 | GETS: | | | ; BLOCK164 SUBROUTINE |
| 44C1 | 3AE37E | 377 | | LDA | INFL | |
| 44C4 | FE01 | 378 | | CPI | 01 | |
| 44C6 | CAE544 | 379 | | JZ | MEMSAV | |
| 44C9 | 2124FA | 380 | | LXI | H,-MAXCT | |
| 44CC | 09 | 381 | | DAD | B | |
| 44CD | 3F | 382 | | CMC | | |

ISIS-II 8080/8085 MACRO ASSEMBLER, V2.0         MODULE    PAGE   8

```
LOC  OBJ        SEQ         SOURCE STATEMENT

44CE 3E03       383             MVI     A,03
44D0 D2A944     384             JNC     ABORT
44D3 FB         385             EI
44D4 76         386             HLT
44D5 DB63       387             IN      ADIN        ; ACCUMULATOR
44D7 FE0A       388             CPI     THLD2
44D9 D2DD44     389             JNC     GETSA
44DC AF         390             XRA     A
44DD 2A067E     391 GETSA:      LHLD    INPTR
44E0 23         392             INX     H
44E1 77         393             MOV     M,A
44E2 C3EA44     394             JMP     NOSAV
44E5 2A067E     395 MEMSAV:     LHLD    INPTR
44E8 23         396             INX     H
44E9 7E         397             MOV     A,M
44EA 22067E     398 NOSAV:      SHLD    INPTR
44ED 5F         399             MOV     E,A
44EE 1600       400             MVI     D,00
44F0 2A9172     401             LHLD    SUM
44F3 19         402             DAD     D
44F4 229172     403             SHLD    SUM
44F7 D2FE44     404             JNC     SKIP1
44FA 219372     405             LXI     H,SUM+2
44FD 34         406             INR     M
44FE 03         407 SKIP1:      INX     B
44FF C9         408             RET
                409 IIS1:                           ; BLOCK168 SUBROUTINE
4500 2A007E     410             LHLD    KXPTR
4503 77         411             MOV     M,A
4504 23         412             INX     H
4505 22007E     413             SHLD    KXPTR
4508 2A047E     414             LHLD    SMPTR
450B 70         415             MOV     M,B
450C 23         416             INX     H
450D 71         417             MOV     M,C
450E 23         418             INX     H
450F 22047E     419             SHLD    SMPTR
4512 3A9072     420             LDA     NKX
4515 3C         421             INR     A
4516 329072     422             STA     NKX
4519 FE80       423             CPI     MAXNE
451B DA2345     424             JC      IIS10
451E 3E04       425             MVI     A,04
4520 C3A944     426             JMP     ABORT
                427 IIS10:
4523 C9         428             RET
                429 SINOFF:
4524 E6FE       430             ANI     0FEH        ; SET LSB LOW
4526 F620       431             ORI     20H
4528 D3E9       432             OUT     DISPL       ; DO IT
452A 32D97E     433             STA     LCW         ; STORE UPDATE LCW
452D C9         434             RET                 ; DONE
                435
                436
452E 0A         437 STHLD:      DB      0AH         ; STARTING THRESHOLD
```

```
ISIS-II 8080/8085 MACRO ASSEMBLER, V2.0        MODULE    PAGE    9

LOC  OBJ          SEQ           SOURCE STATEMENT 452F 03           438 TFREQ:   DB      03H           ; TONE FREQUENCY CONSTANT
   4530 0005         439 TTIME:   DW      0500H         ; TONE DURATION CONSTANT
                     440
                     441
                     442 ; DEFINITION OF GLOBAL DATA AREAS...
                     443
   62BC              444          ORG     62BCH
                     445
   62BC 0000         446 LSADR:   DW      00            ; LAST SAMPLE ADDRESS
   62BE 0000         447 T:       DW      00            ; SAMPLE COUNT
   05DD              448 IOBUF:   DS      MAXCT+1       ; I/O BUFFER
                     449
   689C              450 BUFEND   EQU     $-1           ; END OF I/O BUFFER
                     451
                     452
   7210              453          ORG     7210H
                     454
   0080              455 KXTBL:   DS      128D          ; KX TABLE
                     456
   7290 00           457 NKX:     DB      00            ; NR. ENTRIES IN MATRIX
   0003              458 SUM:     DS      03            ; SUM OF SAMPLE VALUES
   7294 0000         459 SCNT:    DW      00            ; SAMPLE COUNT
                     460
   7296 00           461 ZCNT:    DB      00            ; ZERO'S COUNT FOR PEN LIFT
                     462
   0049              463 MISC:    DS      73D
   0100              464 SMTBL:   DS      256D          ; SM TABLE
   73DF              465 SMEND    EQU     $-1           ; END OF SM TABLE
                     466
                     467
   7E00              468          ORG     7E00H
                     469
   7E00 0000         470 KXPTR:   DW      00            ; KX TABLE POINTER
   7E02 0000         471 PLPTR:   DW      00            ; PEN-LIFT TABLE POINTER
   7E04 0000         472 SMPTR:   DW      00            ; SM TABLE POINTER
   7E06 0000         473 INPTR:   DW      00            ; INPUT POINTER
   7E08 0000         474 OUTPTR:  DW      00            ; OUTPUT POINTER
   7E0A 0000         475 SAVSP:   DW      00            ; STACK POINTER STORAGE
   7E0C 0000         476 MAXVCT:  DW      00            ; MAXIMUM VALUE SAMPLE COUNT
   7E0E 00           477 MXMIN:   DB      00            ; MINIMUM VALUE
   7E0F 0000         478 MINVCT:  DW      00            ; MINIMUM VALUE SAMPLE COUNT
   7E11 00           479 CODE:    DB      00
                     480
                     481 END                            ; RMW

ASSEMBLY COMPLETE,  NO ERRORS
```

ASM80 :F1:KEYPD. VP NOOBJECT NOSYMBOLS PRINT(:LP:)

ISIS-II 8080/8085 MACRO ASSEMBLER, V2.0           MODULE     PAGE    1

```
 LOC  OBJ         SEQ          SOURCE STATEMENT 1
                   2
                   3
                   4  ; KEYPAD SUBROUTINE FOR INTEL SBC 80/10 COMPUTER
                   5
                   6
 4030              7          ORG     4030H         ; REORIGINATED FROM 43D0H
                   8
                   9
 07B2             10  DELAY   EQU     07B2H         ; 1.0 MILLISECOND DELAY SBR
 7ED9             11  LCC     EQU     7ED9H         ; LED CONTROL CODE LOC.
 00E9             12  LEDS    EQU     0E9H          ; LED OUTPUT PORT
 00E8             13  PADIN   EQU     0E8H          ; KEYPAD INPUT PORT
 7EDA             14  KBUF    EQU     7EDAH         ; KEYPAD BUFFER
 0090             15  MCMD2   EQU     10010000B     ; PPI NO. 2 MODE COMMAND
 00EB             16  PPI2C   EQU     0EBH          ; PPI NO. 2 CONTROL PORT
                  17
                  18
 4030 C5          19  KEYPD:  PUSH    B             ; SAVE BC
 4031 D5          20          PUSH    D             ; SAVE DE
 4032 E5          21          PUSH    H             ; SAVE HL
                  22
                  23
                  24  ; FOLLOWING 2 INSTRUCTIONS DELETED
                  25  ; INITIALIZATION MADE IN MAIN PROGRAM
                  26  ; INITIALIZE 8255 PPI NO. 2 ON SBC 80 BOARD...
                  27  ; MODE 0, PORT A INPUT, PORT B OUTPUT
                  28
 4033 00          29          NOP
 4034 00          30          NOP
 4035 00          31          NOP
 4036 00          32          NOP
                  33
 4037 21DA7E      34  KSTRT:  LXI     H,KBUF        ; POINT TO KEYPAD BUFFER
 403A 1600        35          MVI     D,00          ; CLEAR DIGIT COUNT
                  36
 403C DBE8        37  KEYUP:  IN      PADIN         ; INPUT KEYPAD DATA
 403E 17          38          RAL                   ; IS DATA PRESENT?
 403F D23C40      39          JNC     KEYUP         ; NO, CONTINUE LOOPING
                  40
                  41  ; DEBOUNCE KEY DEPRESSION...
                  42
 4042 CDC240      43          CALL    DBOUN         ; TIME OUT
 4045 DBE8        44          IN      PADIN         ; GET DATA FOR 2ND TEST
 4047 17          45          RAL                   ; TEST STROBE FLAG
 4048 D23C40      46          JNC     KEYUP         ; IF CARRY, KEY BOUNCED
                  47
                  48  ; DECODE KEYS...
                  49
 404B 1F          50          RAR                   ; REPOSITION ACCUM.
 404C E60F        51          ANI     0FH           ; STRIP STROBE FLAG BIT
 404E EE08        52          XRI     08H           ; INVERT BIT #3 (LSB+3)
```

ISIS-II 8080/8085 MACRO ASSEMBLER, V2.0      MODULE      PAGE   2

| LOC | OBJ | SEQ | | SOURCE STATEMENT | | |
|---|---|---|---|---|---|---|
| 4050 | FE0A | 53 | | CPI | 10D | ; FILTER KEYPAD DATA |
| 4052 | DA9540 | 54 | | JC | NUMER | ; NIBBLE IS < 10 |
| 4055 | CABC40 | 55 | | JZ | CLEAR | ; NIBBLE = 10 (CLEAR KEY) |
| | | 56 | | | | |
| | | 57 | ; 'ENTER' KEY HAS BEEN DEPRESSED- TEST FOR VALID ENTRY.. | | | |
| | | 58 | | | | |
| 4058 | 7A | 59 | | MOV | A,D | ; GET DIGIT COUNT |
| 4059 | FE03 | 60 | | CPI | 03 | ; MAXIMUM COUNT? |
| 405B | C26540 | 61 | | JNZ | ERROR | ; NO, AN ERROR |
| 405E | CDAC40 | 62 | | CALL | KEYDN | ; YES, WAIT FOR KEY RELEASE |
| 4061 | E1 | 63 | | POP | H | ; RESTORE HL |
| 4062 | D1 | 64 | | POP | D | ; RESTORE DE |
| 4063 | C1 | 65 | | POP | B | ; RESTORE BC |
| 4064 | C9 | 66 | | RET | | ; VALID ENTRY, RETURN |
| | | 67 | | | | |
| 4065 | CDAC40 | 68 | ERROR: | CALL | KEYDN | ; WAIT FOR KEY RELEASE |
| 4068 | 3AD97E | 69 | | LDA | LCC | ; GET LED CONTROL CODE |
| 406B | F5 | 70 | | PUSH | PSW | ; SAVE A COPY OF LCC |
| 406C | 57 | 71 | | MOV | D,A | ; COPY INTO D |
| 406D | 7A | 72 | BLINK: | MOV | A,D | ; GET PRIOR LCC |
| 406E | EE10 | 73 | | XRI | 10H | ; INVERT BIT 4 (ID LED) |
| 4070 | 57 | 74 | | MOV | D,A | ; STORE MODIFIED LCC |
| 4071 | D3E9 | 75 | | OUT | LEDS | ; OUTPUT MODIFIED LCC |
| 4073 | 0EA0 | 76 | | MVI | C,0A0H | ; LOAD LOOP CONSTANT |
| 4075 | CDB207 | 77 | BLNKLP: | CALL | DELAY | ; 1.0 MILLISECOND DELAY |
| 4078 | DBE8 | 78 | | IN | PADIN | ; GET KEYPAD DATA |
| 407A | E60F | 79 | | ANI | 0FH | ; STRIP UPPER NIBBLE |
| 407C | EE08 | 80 | | XRI | 08H | ; INVERT BIT #3 (LSB+3) |
| 407E | FE0A | 81 | | CPI | 10D | ; 'CLEAR' KEY? |
| 4080 | CA8A40 | 82 | | JZ | CLRKEY | ; YES |
| 4083 | 0D | 83 | | DCR | C | ; NO, DECREMENT LOOP COUNT |
| 4084 | C27540 | 84 | | JNZ | BLNKLP | ; CONTINUE UNTIL C = 0 |
| 4087 | C36D40 | 85 | | JMP | BLINK | ; GO START NEXT CYCLE |
| | | 86 | | | | |
| 408A | CDAC40 | 87 | CLRKEY: | CALL | KEYDN | ; WAIT FOR KEY RELEASE |
| 408D | F1 | 88 | | POP | PSW | ; GET ORIGINAL LCC |
| 408E | E6EF | 89 | | ANI | 0EFH | ; TURN ON 'ENTER ID' LED |
| 4090 | D3E9 | 90 | | OUT | LEDS | ; OUTPUT LCC TO LEDS |
| 4092 | C33740 | 91 | | JMP | KSTRT | ; AND RESTART |
| | | 92 | | | | |
| | | 93 | | | | |
| 4095 | F5 | 94 | NUMER: | PUSH | PSW | ; SAVE KEYPAD DATA |
| 4096 | 14 | 95 | | INR | D | ; INCREMENT DIGIT COUNT |
| 4097 | 3E03 | 96 | | MVI | A,03 | ; LOAD MAX. COUNT |
| 4099 | BA | 97 | | CMP | D | ; IS COUNT .LE. MAX.? |
| 409A | D2A140 | 98 | | JNC | OK | ; YES, CONTINUE |
| 409D | F1 | 99 | | POP | PSW | ; NO, COUNT .GT. 3 |
| 409E | C36540 | 100 | | JMP | ERROR | ; ERROR-- GO RESTART |
| 40A1 | F1 | 101 | OK: | POP | PSW | ; GET KEYPAD DATA AGAIN |
| 40A2 | F630 | 102 | | ORI | 30H | ; MAKE ASCII NUMERIC |
| 40A4 | 77 | 103 | | MOV | M,A | ; STORE IN KBUF |
| 40A5 | 23 | 104 | | INX | H | ; INCREMENT KBUF POINTER |
| 40A6 | CDAC40 | 105 | | CALL | KEYDN | ; WAIT FOR KEY RELEASE |
| 40A9 | C33C40 | 106 | | JMP | KEYUP | ; GO WAIT FOR NEXT KEY |
| | | 107 | | | | |

ISIS-II 8080/8085 MACRO ASSEMBLER, V2.0                MODULE    PAGE   3

LOC   OBJ         SEQ          SOURCE STATEMENT

40AC  DBE8        108  KEYDN:  IN     PADIN     ; GET KEYPAD DATA
40AE  17          109          RAL              ; IS STROBE FLAG SET?
40AF  DAAC40      110          JC     KEYDN     ; YES, KEY IS DOWN
40B2  CDC240      111          CALL   DBOUN     ; TIME OUT
40B5  DBE8        112          IN     PADIN     ; TEST AGAIN
40B7  17          113          RAL              ; IS STROBE FLAG SET?
40B8  DAAC40      114          JC     KEYDN     ; YES, KEY IS STILL DOWN
40BB  C9          115          RET              ; NO, KEY RELEASED
                  116
40BC  CDAC40      117  CLEAR:  CALL   KEYDN     ; WAIT FOR KEY RELEASE
40BF  C33740      118          JMP    KSTRT     ; RESTART
                  119
40C2  CDB207      120  DBOUN:  CALL   DELAY     ; 1.0 MILLISECOND DELAY
40C5  C3B207      121          JMP    DELAY     ; DELAY AGAIN
                  122  END

ASSEMBLY COMPLETE,  NO ERRORS

ASM80 :F1:SUBRS. VP NOOBJECT NOSYMBOLS PRINT(:LP:)

ISIS-II 8080/8085 MACRO ASSEMBLER, V2.0        MODULE   PAGE   1

```
LOC   OBJ         SEQ         SOURCE STATEMENT

1   ; VERSION 03/16//78
                   2
                   3   ; CALLED SUBROUTINES
                   4
5DF5               5   TRNF1   EQU    5DF5H     ; IN MAIN PROGRAM ONLY ***
5E75               6   INPX1   EQU    5E75H
                   7                            ; ****************************
0F8E               8   CROUT   EQU    0F8EH
0FA0               9   TAB     EQU    0FA0H
0FA3              10   TAB3    EQU    0FA3H
0FB5              11   MOVE    EQU    0FB5H
0FB2              12   TYMES   EQU    0FB2H
0FF4              13   KEYP    EQU    0FF4H
556E              14   PRX     EQU    556EH
0FF7              15   KXSM    EQU    0FF7H
0F94              16   DEL2    EQU    0F94H
0FAC              17   TYSTR   EQU    0FACH
08A8              18   WRTE    EQU    08A8H
09F8              19   READ    EQU    09F8H
09DE              20   WHEX    EQU    09DEH
09D1              21   RHEX    EQU    09D1H
09EA              22   FILL    EQU    09EAH
596D              23   SOH     EQU    596DH
0FA9              24   NRMLZ   EQU    0FA9H
0FE2              25   HAAR    EQU    0FE2H
0FF1              26   FEAT    EQU    0FF1H
0FE5              27   DIV     EQU    0FE5H
0F97              28   CLRM    EQU    0F97H
0FA6              29   SHFTL   EQU    0FA6H
                  30
                  31   ; DISK FILE CONTROL PARS
                  32
3CE4              33   ISIZE   EQU    3CE4H
3CE6              34   ITRK    EQU    3CE6H
3CE7              35   ISCTR   EQU    3CE7H
3CE8              36   ICNTR   EQU    3CE8H
3CE9              37   OSIZE   EQU    3CE9H
3CEB              38   OTRK    EQU    3CEBH
3CEC              39   OSCTR   EQU    3CECH
3CED              40   OCNTR   EQU    3CEDH
                  41
                  42   ; S-FILE MEMORY AREA
                  43
62B0              44   SFMEM   EQU    62B0H
62B9              45   SIDNO   EQU    SFMEM+09H
62BC              46   SLMDR   EQU    SFMEM+0CH
62BE              47   SCNT    EQU    SFMEM+0EH
                  48
                  49   ; JUMP LOCATIONS
                  50
0000              51   VER1    EQU    0000H
                  52
```

```
ISIS-II 8080/8085 MACRO ASSEMBLER, V2.0                    MODULE    PAGE    2

LOC  OBJ          SEQ           SOURCE STATEMENT
                     53  ; REFERENCED LOCATIONS
                     54
  6900               55  KXTB1   EQU     6900H
  7700               56  PAR1    EQU     7700H
  7600               57  AVRG    EQU     7600H
  7680               58  VAR     EQU     7680H
  7980               59  PARS    EQU     7980H
  76EC               60  SUMMR   EQU     76ECH    ; SUMMARY R-FILE
  7A90               61  SUMMI   EQU     7A90H    ; SUMMARY AREA
                     62
                     63  ; CONSTANTS
                     64
  01D0               65  GAPKX   EQU     01D0H
  00E9               66  DISPL   EQU     00E9H    ; DISPAY OUTPUT PORT
                     67
                     68
  3D00               69          ORG     3D00H
                     70
                     71  ; ********** ********** ********** **********
                     72
                     73  ;       SUBROUTINE REPL
                     74  ;       REPLACES NOT VALID SIGNATURES
                     75
                     76  ; ********** ********** ********** **********
                     77
  3D00 21CE7E        78  REPL:   LXI     H,VALFL  ; FIVE SIGNAT FLAGS
  3D03 E5            79          PUSH    H        ; 00 SIGN OK
                     80                           ; 01 REPL SIGN.
  3D04 0E00          81          MVI     C,00
  3D06 213067        82          LXI     H,KXTB1-GAPKX
  3D09 22A07E        83          SHLD    DESTB
  3D0C 0606          84          MVI     B,06
                     85
  3D0E E1            86  NEW1:   POP     H
  3D0F 05            87          DCR     B
  3D10 C2153D        88          JNZ     NEW2
  3D13 79            89          MOV     A,C
  3D14 C9            90          RET              ; A = 0 NO REPLACEMENT MADE
                     91                           ; A = 1    REPLACEMENT MADE
                     92
                     93
  3D15 7E            94  NEW2:   MOV     A,M
  3D16 23            95          INX     H
  3D17 E5            96          PUSH    H
  3D18 F5            97          PUSH    PSW
  3D19 CD1B40        98          CALL    KXNXT    ; POINT TO NEXT KXSM TABLE
  3D1C F1            99          POP     PSW
  3D1D B7           100          ORA     A
  3D1E CA0E3D       101          JZ      NEW1
                    102
  3D21 4F           103  NEW3:   MOV     C,A
  3D22 C5           104          PUSH    B
  3D23 CD755E       105          CALL    INPX1    ; READ SIGNAT & COMPUTE KX/SM
  3D26 C3955A       106          JMP     REPAT    ; PATCH IF SAVFL=0 CALL SAV
  3D29 C1           107  REBAK:  POP     B
```

ISIS-II 8080/8085 MACRO ASSEMBLER, V2.0          MODULE  PAGE   3

```
LOC  OBJ           SEQ              SOURCE STATEMENT

3D2A C30E3D        108              JMP      NEW1
                   109
                   110
                   111   ; ********** ********** ********** **********
                   112
                   113   ; SUBROUTINE SAV
                   114   ; SAVES SIGNATURE SAMBLES ON DISK
                   115
                   116
                   117   ; ********** ********** ********** **********
3D32               118              ORG 3D32H
                   119
                   120   SAV:
3D32 C3605A        121              JMP      SAVPT    ; PATCH
                   122                                ; IF ( SNAME. EQ. 250 ) SNAME=00
                   123                                ; GO TO SAV3
                   124                                ; OTHERWISE  WRITE S-FILE
3D35 CD8E0F        125   SAV3:      CALL     CROUT
3D38 CDB20F        126              CALL     TYMES
3D3B 20524550      127              DB       ' REPLACE DISK ',00
3D3F 4C414345
3D43 20444953
3D47 4B20
3D49 00
3D4A CDF40F        128              CALL     KEYP
3D4D C3805A        129              JMP      SAV2
3D50 3AE27E        130   SAV1:      LDA      RVFL
3D53 B7            131              ORA      A
3D54 CA623D        132              JZ       ADVSM
3D57 CD8E0F        133              CALL     CROUT
3D5A 0606          134              MVI      B,06H
3D5C CDA00F        135              CALL     TAB
3D5F CD6E55        136              CALL     PRX
                   137   ADVSM:
3D62 21E17E        138              LXI      H,SVNAM+2
3D65 C3863F        139              JMP      INCR1    ; INCR SVNAME BY 1
                   140                                ; AND RETURNS
                   141
                   142
                   143   ; ********** ********** ********** **********
                   144
                   145   ;     SUBROUTINE IO2
                   146   ;     ACCEPTS KEY PAD INPUT
                   147   ;     MOVES 3 ASCII CHARS TO  D,E
                   148
                   149   ; ********** ********** ********** **********
                   150
3D71               151              ORG 3D71H
                   152
3D71 CDE83D        153   IO2:       CALL     KEYL
3D74 CDFC3D        154              CALL     TYPAD
3D77 0E03          155              MVI      C,03
3D79 E1            156              POP      H
3D7A D1            157              POP      D
3D7B E5            158              PUSH     H
```

```
ISIS-II 8080/8085 MACRO ASSEMBLER, V2.0                    MODULE    PAGE    4

LOC   OBJ         SEQ              SOURCE STATEMENT

3D7C  21DA7E      159              LXI     H,WIN
3D7F  CDB50F      160              CALL    MOVE
3D82  C9          161              RET
                  162
                  163
                  164   ; ********** ********** ********** **********
                  165
                  166   ;       SUBROUTINE INPX
                  167   ;       SIGNATURE SAMPLES FROM PEN OR DISK INTO MEMORY
                  168
                  169   ;****************************************************
                  170
                  171
                  172   INPX:
3D83  3AE37E      173              LDA     INFL
3D86  B7          174              ORA     A
3D87  CAB83D      175              JZ      PEX
                  176
                  177   DIX:
3D8A  CD8E0F      178              CALL    CROUT
3D8D  CDB20F      179              CALL    TYMES
3D90  534D504C    180              DB      'SMPL: ',00
3D94  3A20
3D96  00
3D97  11D37E      181              LXI     D,SNAME
3D9A  D5          182              PUSH    D
3D9B  CD713D      183              CALL    IO2
3D9E  CD463E      184              CALL    REASF   ; READ S-FILE
3DA1  B7          185              ORA     A
3DA2  CAB83D      186              JZ      PEX     ; NORMAL READ
3DA5  CDB20F      187              CALL    TYMES
3DA8  4E4F2053    188              DB      'NO SUCH FILE',00
3DAC  55434820
3DB0  46494C45
3DB4  00
3DB5  C38A3D      189              JMP     DIX
                  190
3DB8  CDF70F      191   PEX:       CALL    KXSM
3DBB  C9          192              RET
                  193
3DBC  3AD97E      194   PEX1:      LDA     LCW
3DBF  F5          195              PUSH    PSW
3DC0  E67F        196              ANI     07FH
3DC2  D3E9        197              OUT     DISPL
3DC4  CDDE3D      198              CALL    DEL1
3DC7  F1          199              POP     PSW
3DC8  D3E9        200              OUT     DISPL
3DCA  C3833D      201              JMP     INPX
                  202
                  203
                  204   ; ********** ********** ********** **********
                  205
                  206   ;       DEL1 SUBROUTINE
                  207
                  208   ; ********** ********** ********** **********
```

```
ISIS-II 8080/8085 MACRO ASSEMBLER, V2.0          MODULE   PAGE    5

LOC  OBJ            SEQ          SOURCE STATEMENT 209
  3DDE                210          ORG    3DDEH
                      211
  3DDE 0610           212 DEL1:    MVI    B,10H
  3DE0 CD940F         213 DELX:    CALL   DEL2      ; AT 3731H
  3DE3 05             214          DCR    B
  3DE4 C8             215          RZ
  3DE5 C3E03D         216          JMP    DELX
                      217
                      218
                      219 ; ********* ********** ********** **********
                      220
                      221 ;        KEYL SUBROUTINE
                      222 ;        TURN ON ENTER ID LIGHT
                      223 ;        ACCEPTS 3 ASCII CHARACTERS FROM KEYPAD
                      224
                      225 ; ********* ********** ********** **********
                      226
                      227
  3DE8 3AD97E         228 KEYL:    LDA    LCW
  3DEB F5             229          PUSH   PSW
  3DEC E6EF           230          ANI    0EFH
  3DEE D3E9           231          OUT    DISPL
  3DF0 CDF40F         232          CALL   KEYP
  3DF3 F1             233          POP    PSW
  3DF4 F6C0           234          ORI    0C0H
  3DF6 32D97E         235          STA    LCW
  3DF9 D3E9           236          OUT    DISPL
  3DFB C9             237          RET
                      238
                      239
                      240 ; ********* ********** ********** **********
                      241
                      242 ;        TYPDAD  SUBROUTINE
                      243 ;        PRINT INPUT BUFFER
                      244
                      245 ; ********* ********** ********** **********
                      246
  3DFC 21DA7E         247 TYPAD:   LXI    H,WIN
  3DFF 0603           248          MVI    B,03
  3E01 CDAC0F         249          CALL   TYSTR
  3E04 C9             250          RET
                      251
                      252 ; ********* ********** ********** **********
                      253
                      254 ; WRTSF SUBROUTINE   WRITE S-FILE
                      255
                      256 ; ********* ********** ********** **********
                      257
  3E05 3AE27E         258 WRTSF:   LDA    RVFL      ; SET UP S-FILE HEADER
  3E08 32B062         259          STA    SFMEM     ; S-FILE MEMORY AREA
  3E0B AF             260          XRA    A
  3E0C 32B162         261          STA    SFMEM+1
  3E0F 0E04           262          MVI    C,04
  3E11 21B97E         263          LXI    H,DATE
```

ISIS-II 8080/8085 MACRO ASSEMBLER, V2.0                MODULE    PAGE    6

```
LOC   OBJ       SEQ           SOURCE STATEMENT

3E14  11B262    264           LXI     D, SFMEM+2
3E17  CDB50F    265           CALL    MOVE            ; DATE
3E1A  0E03      266           MVI     C, 03
3E1C  21DF7E    267           LXI     H, SVNAM
3E1F  CDB50F    268           CALL    MOVE            ; SEQ #
3E22  0E03      269           MVI     C, 03
3E24  21D67E    270           LXI     H, RNAME
3E27  CDB50F    271           CALL    MOVE            ; ID #
3E2A  3AEE7E    272           LDA     CFFLG
3E2D  B7        273           ORA     A
3E2E  CA393E    274           JZ      HEADB
3E31  3AB962    275           LDA     SIDNO
3E34  C605      276           ADI     05H
3E36  32B962    277           STA     SIDNO
3E39  CD533E    278 HEADB:    CALL    SDISK           ; SET UP S-FILE PARAMETERS
3E3C  2ABC62    279           LHLD    SLMDR
3E3F  227D7F    280           SHLD    ENDA
3E42  CDA808    281           CALL    WRTE
3E45  C9        282           RET
                 283
                 284  ; ********** ********** ********** **********
                 285
                 286  ; REASF SUBROUTINE   READ S-FILE
                 287
                 288  ; ********** ********** ********** **********
                 289
3E46  CD533E    290 REASF:    CALL    SDISK           ; SET UP S-FILE PARAMETERS
3E49  210070    291           LXI     H, 7000H        ; END ADDRESS
3E4C  227D7F    292           SHLD    ENDA
3E4F  CDF809    293           CALL    READ
3E52  C9        294           RET
                 295
                 296  ; ********** ********** ********** **********
                 297
                 298
                 299  ;         SDISK SUBROUTINE
                 300                                  ; SET PARAMETERS FOR
                 301                                  ; READ/WRITE S-FILE.
                 302
                 303  ; ********** ********** ********** **********
                 304
                 305
3E53  21747F    306 SDISK:    LXI     H, FCBN
3E56  3E53      307           MVI     A, 'S'
3E58  77        308           MOV     M, A
3E59  23        309           INX     H
3E5A  3E30      310           MVI     A, '0'
3E5C  77        311           MOV     M, A
3E5D  23        312           INX     H
3E5E  11D37E    313           LXI     D, SNAME
3E61  EB        314           XCHG
3E62  0E03      315           MVI     C, 03H
3E64  CDB50F    316           CALL    MOVE
3E67  21B062    317           LXI     H, SFMEM
3E6A  227B7F    318           SHLD    STAA
```

ISIS-II 8080/8085 MACRO ASSEMBLER, V2.0          MODULE   PAGE   7

```
LOC   OBJ           SEQ            SOURCE STATEMENT

3E6D  3E40          319            MVI     A,40H
3E6F  32797F        320            STA     UNIT      ; UNIT 1 FOR SAMPLES
3E72  C9            321            RET
                    322
                    323   ; ********** ********** ********** **********
                    324
                    325   ;         INIT SUBROUTINE
                    326   ;         INITIALIZE FLAGS AND LIGHTS FOR RUN
                    327
                    328   ; ********** ********** ********** **********
                    329
                    330                              ; INPUT SOURCE
                    331                              ; INFL = 0  A/D
                    332                              ;      = 1  DISK
                    333
                    334                              ; VIFL IS DONTCARE
                    335
                    336                              ; SAVFL = 0 SAVE ON DISK
                    337                              ; SAVFL = 1 NOSAVE
                    338
3E73  CD8E0F        339   INIT:    CALL    CROUT
3E76  CDB20F        340            CALL    TYMES
3E79  494E4954      341            DB      'INIT: ',00
3E7D  3A20
3E7F  00
3E80  11E37E        342            LXI     D,INFL
3E83  D5            343            PUSH    D
3E84  CD713D        344            CALL    IO2       ; ENTER FLAGS
3E87  11E37E        345            LXI     D,INFL
3E8A  0E03          346            MVI     C,03
3E8C  1A            347   INIT2:   LDAX    D
3E8D  D630          348            SUI     30H
3E8F  12            349            STAX    D
3E90  13            350            INX     D
3E91  0D            351            DCR     C
3E92  C28C3E        352            JNZ     INIT2
3E95  3EFF          353            MVI     A,0FFH
3E97  32D97E        354            STA     LCW
3E9A  D3E9          355            OUT     DISPL
3E9C  CD6D59        356            CALL    SOH
3E9F  CD8E0F        357            CALL    CROUT
3EA2  CDB20F        358            CALL    TYMES
3EA5  44415445      359            DB      'DATE: ',00
3EA9  3A20
3EAB  00
3EAC  11B97E        360            LXI     D,DATE
3EAF  0603          361            MVI     B,03
3EB1  C5            362   DAT1:    PUSH    B
3EB2  D5            363            PUSH    D
3EB3  CDE83D        364            CALL    KEYL
3EB6  3E20          365            MVI     A,20H
3EB8  32DC7E        366            STA     WIN+2
3EBB  CDFC3D        367            CALL    TYPAD     ; ENTER DATE AS MOXDAXYEX
3EBE  0E02          368            MVI     C,02
3EC0  21DA7E        369            LXI     H,WIN
```

ISIS-II 8080/8085 MACRO ASSEMBLER, V2.0                MODULE   PAGE   8

| LOC | OBJ | SEQ | | SOURCE STATEMENT | | |
|---|---|---|---|---|---|---|
| 3EC3 | D1 | 370 | | POP | D | |
| 3EC4 | CDB50F | 371 | | CALL | MOVE | |
| 3EC7 | C1 | 372 | | POP | B | |
| 3EC8 | 05 | 373 | | DCR | B | |
| 3EC9 | C2B13E | 374 | | JNZ | DAT1 | |
| 3ECC | CD8E0F | 375 | | CALL | CROUT | |
| 3ECF | CDB20F | 376 | | CALL | TYMES | |
| 3ED2 | 534D504C | 377 | | DB | 'SMPL: ',00 | |
| 3ED6 | 3A20 | | | | | |
| 3ED8 | 00 | | | | | |
| 3ED9 | 11DF7E | 378 | | LXI | D,SVNAM | |
| 3EDC | D5 | 379 | | PUSH | D | |
| 3EDD | CD713D | 380 | | CALL | IO2 | ; ASSIGN NUMBER TO S-FILE |
| 3EE0 | C9 | 381 | | RET | | |
| | | 382 | | | | |
| | | 383 | | | | |
| | | 384 | ; | ********** ********** ********** ********** | | |
| | | 385 | | | | |
| | | 386 | ; | SUBROUTINE TO DETERMINE | | |
| | | 387 | ; | START TRACK/SECTOR FOR | | |
| | | 388 | ; | REFERENCE NUMBER IN RNAME | | |
| | | 389 | | | | |
| | | 390 | ; | START TRACK IN REGISTER C | | |
| | | 391 | ; | START SECTR IN ACC. | | |
| | | 392 | | | | |
| 3EED | | 393 | | ORG | 3EEDH | |
| | | 394 | | | | |
| | | 395 | | | | |
| 3EED | 21D87E | 396 | DKRF1: | LXI | H,RNAME+2 | |
| 3EF0 | 7E | 397 | | MOV | A,M | ;ACC = UNITS DIGIT |
| 3EF1 | D630 | 398 | | SUI | 30H | ;MASK OFF ASCII |
| 3EF3 | 87 | 399 | | ADD | A | ;DOUBLE THE NUMBER |
| 3EF4 | 4F | 400 | | MOV | C,A | ;BC = UNITS REG. PAIR |
| 3EF5 | 0600 | 401 | | MVI | B,00H | |
| 3EF7 | 2B | 402 | | DCX | H | |
| 3EF8 | E5 | 403 | | PUSH | H | ;SAVE RNAME+1 |
| 3EF9 | 111400 | 404 | | LXI | D,20 | ;MULTIPLY TO FIND TENS |
| 3EFC | CD163F | 405 | | CALL | MULT | ;DIGIT VALUE & DOUBLE IT. |
| 3EFF | EB | 406 | | XCHG | | ;SAVE ANSWER IN DE |
| 3F00 | E1 | 407 | | POP | H | ;HL = RNAME+1 |
| 3F01 | D5 | 408 | | PUSH | D | |
| 3F02 | 2B | 409 | | DCX | H | ;HL = RNAME |
| 3F03 | 11C800 | 410 | | LXI | D,200 | ;GET HUNDREDS VALUE DOUBLED |
| 3F06 | CD163F | 411 | | CALL | MULT | |
| 3F09 | D1 | 412 | | POP | D | ;DE = TENS DIGIT VALUE |
| 3F0A | 19 | 413 | | DAD | D | ;HL = HUNDREDS + TENS |
| 3F0B | 09 | 414 | | DAD | B | ;ADD IN UNITS VALUE |
| 3F0C | 2B | 415 | | DCX | H | ;AND DECREMENT BY ONE |
| 3F0D | 44 | 416 | | MOV | B,H | ;SET UP BC FOR |
| 3F0E | 4D | 417 | | MOV | C,L | ;DIVIDE SUBROUTINE |
| 3F0F | 161A | 418 | | MVI | D,26 | ;D = NO. OF SECTR/TRACK |
| 3F11 | CDE50F | 419 | | CALL | DIV | ;FIND CORRECT TRACK & SECTR |
| 3F14 | 78 | 420 | | MOV | A,B | ;ACC = STARTING SECTOR |
| 3F15 | C9 | 421 | | RET | | |
| | | 422 | | | | |

ISIS-II 8080/8085 MACRO ASSEMBLER, V2.0　　　　MODULE　PAGE　9

```
LOC  OBJ          SEQ           SOURCE STATEMENT

423   ; ********** ********** ********** **********
              424
              425   ;       MULTIPLY SUBROUTINE
              426   ;       INPUT: HL = ADR CONTAINING MULTIPLICAND
              427   ;              D  = MULTIPLIER
              428   ;       OUTPUT:HL = PRODUCT
              429
3F16 7E       430 MULT:   MOV   A,M             ;GET DIGIT
3F17 210000   431         LXI   H,0000H         ;CLEAR HL
3F1A D630     432         SUI   30H             ;MASK OFF ASCII
              433
3F1C C8       434 MULT1:  RZ                    ;RETURN IF ACC = 0
3F1D 19       435         DAD   D               ;ADD ANOTHER FACTOR
3F1E 3D       436         DCR   A
3F1F C31C3F   437         JMP   MULT1
              438
              439   ; ********** ********** ********** **********
              440
              441   ;       WRITE R-FILE TO DISK
              442
3F22 21907A   443 WRTRF:  LXI   H,SUMMI         ; INITITALIZE SUMMARY AREA
3F25 E5       444         PUSH  H
3F26 0614     445         MVI   B,14H
3F28 CD970F   446         CALL  CLRM
3F2B D1       447         POP   D
3F2C 21B97E   448         LXI   H,DATE
3F2F 0E04     449         MVI   C,04
3F31 CDB50F   450         CALL  MOVE
3F34 CD923F   451 WRTR2:  CALL  PACK1           ; ENTRY FOR UPDATE REF
3F37 210002   452 WRTR3:  LXI   H,0200H         ; NO. OF SECTORS
3F3A 22E93C   453         SHLD  OSIZE
3F3D CDED3E   454         CALL  DKRF1           ;GET STARTING TRACK & SECTR
3F40 32EC3C   455         STA   OSCTR
3F43 79       456         MOV   A,C             ;STARTING TRACK
3F44 32EB3C   457         STA   OTRK
3F47 AF       458         XRA   A
3F48 C3A25A   459         JMP   WRPAT           ; OCNTR = 0
              460                               ; UNIT = 00
              461
3F4B 11FF76   462 WRBAK:  LXI   D,AVRG+0FFH
3F4E 210076   463         LXI   H,AVRG
3F51 CDDE09   464         CALL  WHEX
3F54 CDEA09   465         CALL  FILL
3F57 C9       466         RET
              467
              468   ; ********** ********** ********** **********
              469
              470   ;       READ R-FILE FROM DISK
              471
3F58 210003   472 RERRFS:LXI   H,0300H          ; NUMBER OF SECTS + 1
3F5B 22E43C   473         SHLD  ISIZE
3F5E CDED3E   474         CALL  DKRF1           ;GET STARTING TRACK & SECTR
3F61 3D       475         DCR   A
3F62 32E73C   476         STA   ISCTR           ;STARTING SECTOR - 1
3F65 79       477         MOV   A,C
```

```
LOC   OBJ        SEQ           SOURCE STATEMENT

3F66  32E63C     478           STA    ITRK
3F69  AF         479           XRA    A
3F6A  32E83C     480           STA    ICNTR
3F6D  11FF76     481           LXI    D,AVRG+0FFH
3F70  210076     482           LXI    H,AVRG
3F73  CDD109     483           CALL   RHEX
3F76  21EC76     484           LXI    H,AVRG+0ECH
3F79  7E         485           MOV    A,M
3F7A  FEFF       486           CPI    0FFH        ;WAS THERE ANY DATA THERE?
3F7C  C8         487           RZ                 ;NO
3F7D  CDDC3F     488           CALL   EXPND
3F80  3E00       489           MVI    A,00H       ;YES, SUCCESSFUL READ
3F82  C9         490           RET
                 491
                 492
                 493
                 494  ; ********** ********** ********** **********
                 495
                 496  ;     SUBROUTINE TO INCREMENT
                 497  ;     REFERENCE NUMBER
                 498
3F83  21D87E     499  INCR:    LXI    H,RNAME+2   ;HL = UNITS DIGIT OF RNAME
3F86  34         500  INCR1:   INR    M
3F87  7E         501           MOV    A,M
3F88  FE3A       502           CPI    3AH         ;WAS LAST DIGIT A 9?
3F8A  C0         503           RNZ
3F8B  3E30       504           MVI    A,30H       ;IF SO, SET MEMORY = 30.
3F8D  77         505           MOV    M,A
3F8E  2B         506           DCX    H
3F8F  C3863F     507           JMP    INCR1       ;GO INCR NEXT POWER OF 10.
                 508
                 509  ; ********** ********** ********** *******
                 510
                 511  ;     PACK - PACKS PARAMETERS FROM
                 512  ;            HIGH-LOW-EXP TO LOW-EXP+8
                 513
                 514
3F92  210076     515  PACK1:   LXI    H,AVRG
3F95  AF         516           XRA    A
3F96  32AB5A     517           STA    CHECK
3F99  22AC5A     518  PACK2:   SHLD   TBLPT
3F9C  0E28       519           MVI    C,40        ; C = NO. OF PARAMETERS (40)
                 520
3F9E  56         521  PACK3:   MOV    D,M         ; D = HIGH BYTE
3F9F  23         522           INX    H
3FA0  5E         523           MOV    E,M         ; E = LOW BYTE
3FA1  23         524           INX    H
3FA2  46         525           MOV    B,M         ; B = EXPONENT
3FA3  E5         526           PUSH   H           ; SAVE EXPANDED TBL ADR
3FA4  EB         527           XCHG               ; DE =   "      "    "
3FA5  CDA60F     528           CALL   SHFTL
3FA8  78         529           MOV    A,B
3FA9  C608       530           ADI    08H         ; ADD 8 TO EXPONENT
3FAB  EB         531           XCHG
3FAC  2AAC5A     532           LHLD   TBLPT       ; HL = PACKED TBL ADR
```

```
ISIS-II 8080/8085 MACRO ASSEMBLER, V2.0                MODULE    PAGE  11

LOC   OBJ        SEQ           SOURCE STATEMENT

3FAF  72         533           MOV     M,D        ; MOVE LOW BYTE INTO MEM.
3FB0  23         534           INX     H
3FB1  77         535           MOV     M,A        ; MOVE EXP+8 INTO MEM.
3FB2  23         536           INX     H
3FB3  22AC5A     537           SHLD    TBLPT
3FB6  E1         538           POP     H          ; HL = EXPANDED TBL ADR
3FB7  23         539           INX     H
3FB8  0D         540           DCR     C          ; ALL PARAMETERS PACKED?
3FB9  C29E3F     541           JNZ     PACK3      ; NO
                 542
3FBC  3AAB5A     543           LDA     CHECK
3FBF  FE00       544           CPI     00         ; HAS 7680,76FF BEEN PACKED?
3FC1  CAD03F     545           JZ      PACK4      ; NO
                 546
3FC4  11EC76     547           LXI     D,SUMMR    ; MOVE SUMMARY BACK INTO TBL
3FC7  21907A     548           LXI     H,SUMMI
3FCA  0E14       549           MVI     C,14H
3FCC  CDB50F     550           CALL    MOVE
3FCF  C9         551           RET
                 552
3FD0  3C         553 PACK4:    INR     A
3FD1  32AB5A     554           STA     CHECK
3FD4  218076     555           LXI     H,VAR
3FD7  C3993F     556           JMP     PACK2      ; PACK 7680,768F
                 557
                 558 ; *********** *********** *********** ***********
                 559
                 560
3FDC             561           ORG 3FDCH
                 562
                 563 ;         EXPAND - EXPANDS PACKED PARAMETERS TO
                 564 ;                  (00(+) OR FF(-)) - LOW - EXP+8
                 565
3FDC  21EC76     566 EXPND:    LXI     H,SUMMR    ; MOVE SUMMARY OUT OF TABLE
3FDF  11907A     567           LXI     D,SUMMI
3FE2  0E14       568           MVI     C,14H
3FE4  CDB50F     569           CALL    MOVE
3FE7  214F76     570 XPND1:    LXI     H,AVRG+80-1       ; HL = END OF PACK PARS
3FEA  117776     571           LXI     D,AVRG+120-1      ; DE = END OF UNPACK PAR
3FED  AF         572           XRA     A
3FEE  32AB5A     573           STA     CHECK
3FF1  0E28       574 XPND2:    MVI     C,40       ; MAX NO. OF PARS
                 575
3FF3  7E         576 XPND3:    MOV     A,M
3FF4  12         577           STAX    D          ; STORE EXPONENT
3FF5  1B         578           DCX     D
3FF6  2B         579           DCX     H
3FF7  7E         580           MOV     A,M
3FF8  12         581           STAX    D          ; STORE LOW BYTE
3FF9  E680       582           ANI     80H        ; NEGATIVE NUMBER?
3FFB  CA0040     583           JZ      XPND4      ; NO, HIGH BYTE IS SET TO 0
3FFE  3EFF       584           MVI     A,0FFH     ; YES, SET HIGH BYTE = FF
4000  1B         585 XPND4:    DCX     D
4001  12         586           STAX    D          ; STORE HIGH BYTE
4002  1B         587           DCX     D
```

ISIS-II 8080/8085 MACRO ASSEMBLER, V2.0                MODULE    PAGE   12

```
LOC    OBJ          SEQ          SOURCE STATEMENT 4003   2B           588          DCX     H
4004   0D           589          DCR     C         ; ALL PARAMETERS EXP'D?
4005   C2F33F       590          JNZ     XPND3     ; NO, CONTINUE
                    591
4008   3AAB5A       592          LDA     CHECK
400B   FE00         593          CPI     00        ; HAS 7680,76CF BEEN EXP'D?
400D   C0           594          RNZ               ; YES
400E   3C           595          INR     A         ; NO
400F   32AB5A       596          STA     CHECK
4012   21CF76       597          LXI     H, VAR+80-1
4015   11F776       598          LXI     D, VAR+120-1
4018   C3F13F       599          JMP     XPND2     ; EXPAND 7680-76CF
                    600
                    601  ; POINT TO NEXT KXSM TABLE POSITION
                    602
401B   11D001       603  KXNXT:  LXI     D, GAPKX
401E   2AA07E       604          LHLD    DESTB
4021   19           605          DAD     D
4022   22A07E       606          SHLD    DESTB
4025   C9           607          RET
                    608
                    609
5A60                610          ORG     5A60H
                    611                            ; PATCH AREA
5A60   3ADF7E       612  SAVPT:  LDA     SVNAM
5A63   FE32         613          CPI     32H
5A65   C2805A       614          JNZ     SAV2
5A68   3AE07E       615          LDA     SVNAM+1
5A6B   FE35         616          CPI     35H
5A6D   C2805A       617          JNZ     SAV2
5A70   3E30         618          MVI     A, 30H
5A72   32DF7E       619          STA     SVNAM
5A75   32E07E       620          STA     SVNAM + 1
5A78   3E31         621          MVI     A, 31H
5A7A   32E17E       622          STA     SVNAM+2
5A7D   C3353D       623          JMP     SAV3
5A80   21DF7E       624  SAV2:   LXI     H, SVNAM  ; SOURCE
5A83   11D37E       625          LXI     D, SNAME  ; DEST
5A86   0E03         626          MVI     C, 03     ; BYTES
5A88   CDB50F       627          CALL    MOVE
5A8B   CD053E       628          CALL    WRTSF     ; ERITE S-FILE
5A8E   B7           629          ORA     A
5A8F   CA503D       630          JZ      SAV1
5A92   C3353D       631          JMP     SAV3
                    632
5A95   3AE57E       633  REPAT:  LDA     SAVFL     ; REPLACE SIGNSTS PATCH
5A98   B7           634          ORA     A
5A99   CC323D       635          CZ      SAV
5A9C   CDF55D       636          CALL    TRNF1
5A9F   C3293D       637          JMP     REBAK
                    638
5AA2   32ED3C       639  WRPAT:  STA     OCNTR     ; WRITE R-FILE PATCH
5AA5   32797F       640          STA     UNIT
5AA8   C34B3F       641          JMP     WRBAK
                    642
```

```
ISIS-II 8080/8085 MACRO ASSEMBLER, V2.0       MODULE    PAGE  13

LOC  OBJ         SEQ           SOURCE STATEMENT 643
                    644
                    645
                    646  ; ******************************************
                    647
                    648
                    649  ; TEMP STORAGE
                    650
   5AAB 00          651 CHECK:  DB    00
   5AAC 0000        652 TBLPT:  DW    0000H    ; PACKED TABLE POINTER
                    653
                    654  ; GLOBAL CONSTANTS
                    655
   7EA0             656          ORG  7EA0H
                    657
   7EA0 0000        658 DESTB:  DW    0000H    ; TEMP KX ADDR
   000F             659 MXMNE:  DS    15       ; SORTED ERRORS
   7EB1 00          660 NINT:   DB    00       ; FEATS. # OF INTERV. IN SIGNAT.
   7EB2 00          661 NSECT:  DB    00       ; FEATS. NO. SECTORS PER INT.
   7EB3 0000        662 ZCNT:   DW    0000     ; # ZEROS IN SIGNAT.
   7EB5 00          663 NATT:   DB    00       ; # VER ATTEMPTS
   0003             664 IDNO:   DS    03       ; ID CLAIM
   0006             665 DATE:   DS    06       ; DATE ENTERED DURING INIT.
   000F             666 ERRV:   DS    15       ; ERRORS ( UP TO 5 )
   0005             667 VALFL:  DS    05       ; VALIDATE FLAGS (5)
   0003             668 SNAME:  DS    03       ; S-FILE NUMBER
   0003             669 RNAME:  DS    03       ; R:FILE NUMBER (ASCII)
   7ED9 00          670 LCW:    DB    00       ; LIGHTS CONTROL WORD
   0003             671 WIN:    DS    03       ; KEYPAD INPUT AREA (3 ASCII'S)
   7EDD 00          672 NU1:    DB    00       ; NOT USED
   7EDE 00          673 NSM:    DB    00       ; # OF SIGNAT'S
   0003             674 SVNAM:  DS    03       ; SAVE S-FILE #
   7EE2 00          675 RVFL:   DB    00       ; REF OR VER RUN FLAG
   7EE3 00          676 INFL:   DB    00       ; SIGNAT FROM PEN OR DISK FLAG
   7EE4 00          677 VIFL:   DB    00       ; VER OR IDENT MODE FLAG
   7EE5 00          678 SAVFL:  DB    00       ; SAV NOSAV S-FILE FLAG
   7EE6 00          679 NPAR:   DB    00       ; # OF PARAMETERS
   7EE7 0000        680 LMADR:  DW    0000     ; LAST ADDR. OF S-FILE AREA
   7EE9 00          681 FLGX:   DB    00       ; DONT RMEMBER
   7EEA 00          682 CNT1:   DB    00       ; MAX NO OF ATTEMPTS TO FORM REF
   7EEB 0000        683 DESTA:  DW    0000     ; DESTINAT ADDR. FOR PARI'S
   7EED 00          684 NVER:   DB    00       ; DONT REMEMBER
   7EEE 00          685 CFFLG:  DB    00       ; CUST/FORG FLAG
   7EEF 00          686 NU2:    DB    00       ; NOT USED 2
                    687
                    688
                    689  ; DISK AREA
                    690
   0079             691 B1:     DS    121      ; BUFFER1
   000B             692 B2:     DS    11       ; BUFFER2 (OVERFLOW)
   0005             693 FCBN:   DS    05       ; START OF DISK FILE CONTROL BLO
                    694                        ; FILE NAME
   7F79 00          695 UNIT:   DB    00       ; UNIT
   7F7A 00          696 FLG:    DB    00       ; DONT KNOW
   7F7B 0000        697 STAA:   DW    0000     ; START ADDR. ( FILE MEMORY AREA
```

```
ISIS-II 8080/8085 MACRO ASSEMBLER, V2.0                MODULE   PAGE   14

LOC  OBJ          SEQ          SOURCE STATEMENT

7F7D 0000         698 ENDA:   DW      0000      ; END    ADDR.
   7F7F 00           699 TEST:   DB      00        ; DONT REMEMBER
   7F80 00           700 MODE:   DB      00        ; BINARY OR ASCII
                     701
                     702         END

ASSEMBLY COMPLETE,  NO ERRORS
```

ASM80 :F1:HAARCF.VP NUOBJECT NOSYMBOLS PRINT(:LP:)

ISIS-II 8080/8085 MACRO ASSEMBLER, V2.0        MODULE    PAGE    1

```
LOC   OBJ         SEQ             SOURCE STATEMENT 1
                    2
                    3   ;REFERENCED SUBROUTINES..........
                    4
0FEE                5   SUM     EQU     0FEEH
0FE8                6   MLTPL   EQU     0FE8H
0FEB                7   DIVID   EQU     0FEBH
0F85                8   NEGHL   EQU     0F85H
0F8B                9   HILO    EQU     0F8BH
0FFD               10   MTDEC   EQU     0FFDH
                   11
                   12
                   13
                   14  ;REFERENCED MEMORY LOCATIONS.....
                   15
                   16
73E0               17   KXNAD   EQU     73E0H
74B0               18   SMNAD   EQU     74B0H     ;                              SM.
7B00               19   TIMEA   EQU     7B00H     ;T(1)..T(17) STORED.
7B40               20   PMGAD   EQU     7B40H
7B73               21   LPMGA   EQU     7B73H
7B80               22   SUMAD   EQU     7B80H
7BB0               23   LSUMA   EQU     7BB0H
7980               24   HCAD    EQU     7980H
62BE               25   SCNT    EQU     62BEH     ;IT'S TT.
                   26
                   27
                   28
4D00               29           ORG     4D00H
                   30
                   31
                   32
4D00 21027B        33   T1T17:  LXI     H,TIMEA+2
4D03 0611          34           MVI     B,11H
4D05 0EFC          35           MVI     C,0FCH
4D07 71            36   STREX:  MOV     M,C
4D08 23            37           INX     H
4D09 23            38           INX     H
4D0A 23            39           INX     H
4D0B 05            40           DCR     B
4D0C C2074D        41           JNZ     STREX
4D0F 21007B        42           LXI     H,TIMEA
4D12 3600          43           MVI     M,0
4D14 23            44           INX     H
4D15 3610          45           MVI     M,10H
4D17 23            46           INX     H
4D18 23            47           INX     H
4D19 221C7E        48           SHLD    TMEAL
4D1C 0610          49           MVI     B,10H
4D1E 2ABE62        50           LHLD    SCNT
4D21 EB            51           XCHG
4D22 1B            52           DCX     D
```

ISIS-II 8080/8085 MACRO ASSEMBLER, V2.0           MODULE   PAGE   2

| LOC | OBJ | SEQ | | SOURCE | STATEMENT |
|---|---|---|---|---|---|
| 4D23 | 211000 | 53 | | LXI | H,0010H |
| 4D26 | 19 | 54 | GENT: | DAD | D |
| 4D27 | EB | 55 | | XCHG | |
| 4D28 | E5 | 56 | | PUSH | H |
| 4D29 | 2A1C7E | 57 | | LHLD | TMEAL |
| 4D2C | 72 | 58 | | MOV | M,D |
| 4D2D | 23 | 59 | | INX | H |
| 4D2E | 73 | 60 | | MOV | M,E |
| 4D2F | 23 | 61 | | INX | H |
| 4D30 | 23 | 62 | | INX | H |
| 4D31 | 221C7E | 63 | | SHLD | TMEAL |
| 4D34 | E1 | 64 | | POP | H |
| 4D35 | EB | 65 | | XCHG | |
| 4D36 | 05 | 66 | | DCR | B |
| 4D37 | C2264D | 67 | | JNZ | GENT |
| | | 68 | | | |
| | | 69 | | | |
| 4D3A | 21407B | 70 | P1P17: | LXI | H,PMGAD |
| 4D3D | 221E7E | 71 | | SHLD | PMGAL |
| 4D40 | 21737B | 72 | | LXI | H,LPMGA |
| 4D43 | 22207E | 73 | | SHLD | LPMGL |
| 4D46 | 21007B | 74 | | LXI | H,TIMER |
| 4D49 | 221C7E | 75 | | SHLD | TMEAL |
| 4D4C | 21E073 | 76 | STRT1: | LXI | H,KXNAD |
| 4D4F | 22007E | 77 | | SHLD | KXNAL |
| 4D52 | 21B074 | 78 | | LXI | H,SMNAD |
| 4D55 | 22027E | 79 | | SHLD | SMNAL |
| 4D58 | CDEB4F | 80 | | CALL | MOVSM |
| 4D5B | 22077E | 81 | | SHLD | SMJ |
| 4D5E | CDFA4F | 82 | | CALL | MOVKX |
| 4D61 | 220B7E | 83 | | SHLD | KXJ |
| 4D64 | 2A1C7E | 84 | | LHLD | TMEAL |
| 4D67 | 46 | 85 | | MOV | B,M |
| 4D68 | 23 | 86 | | INX | H |
| 4D69 | 4E | 87 | | MOV | C,M |
| 4D6A | 23 | 88 | | INX | H |
| 4D6B | 23 | 89 | | INX | H |
| 4D6C | 221C7E | 90 | | SHLD | TMEAL |
| 4D6F | 2A097E | 91 | TMSM: | LHLD | SMJP1 |
| 4D72 | 29 | 92 | | DAD | H |
| 4D73 | 29 | 93 | | DAD | H |
| 4D74 | 29 | 94 | | DAD | H |
| 4D75 | 29 | 95 | | DAD | H |
| 4D76 | CD850F | 96 | | CALL | NEGHL |
| 4D79 | 09 | 97 | | DAD | B |
| 4D7A | F5 | 98 | | PUSH | PSW |
| 4D7B | 7D | 99 | | MOV | A,L |
| 4D7C | B4 | 100 | | ORA | H |
| 4D7D | CADF4D | 101 | | JZ | PMAG2 |
| 4D80 | F1 | 102 | | POP | PSW |
| 4D81 | D2994D | 103 | | JNC | PMAG1 |
| 4D84 | 2A097E | 104 | | LHLD | SMJP1 |
| 4D87 | 22077E | 105 | | SHLD | SMJ |
| 4D8A | 2A0D7E | 106 | | LHLD | KXJP1 |
| 4D8D | 220B7E | 107 | | SHLD | KXJ |

ISIS-II 8080/8085 MACRO ASSEMBLER, V2.0          MODULE   PAGE   3

| LOC  | OBJ    | SEQ  |        | SOURCE STATEMENT |        |
|------|--------|------|--------|------------------|--------|
| 4D90 | CDEB4F | 108  |        | CALL             | MOVSM  |
| 4D93 | CDFA4F | 109  |        | CALL             | MOVKX  |
| 4D96 | C36F4D | 110  |        | JMP              | TMSM   |
| 4D99 | 2A077E | 111  | PMAG1: | LHLD             | SMJ    |
| 4D9C | 29     | 112  |        | DAD              | H      |
| 4D9D | 29     | 113  |        | DAD              | H      |
| 4D9E | 29     | 114  |        | DAD              | H      |
| 4D9F | 29     | 115  |        | DAD              | H      |
| 4DA0 | CD850F | 116  |        | CALL             | NEGHL  |
| 4DA3 | E5     | 117  |        | PUSH             | H      |
| 4DA4 | 09     | 118  |        | DAD              | B      |
| 4DA5 | EB     | 119  |        | XCHG             |        |
| 4DA6 | 2A097E | 120  |        | LHLD             | SMJP1  |
| 4DA9 | 29     | 121  |        | DAD              | H      |
| 4DAA | 29     | 122  |        | DAD              | H      |
| 4DAB | 29     | 123  |        | DAD              | H      |
| 4DAC | 29     | 124  |        | DAD              | H      |
| 4DAD | C1     | 125  |        | POP              | B      |
| 4DAE | 09     | 126  |        | DAD              | B      |
| 4DAF | EB     | 127  |        | XCHG             |        |
| 4DB0 | 010000 | 128  |        | LXI              | B,0    |
| 4DB3 | CDEB0F | 129  |        | CALL             | DIVID  |
| 4DB6 | 48     | 130  |        | MOV              | C,B    |
| 4DB7 | D5     | 131  |        | PUSH             | D      |
| 4DB8 | 2A0D7E | 132  |        | LHLD             | KXJP1  |
| 4DBB | EB     | 133  |        | XCHG             |        |
| 4DBC | 2A0B7E | 134  |        | LHLD             | KXJ    |
| 4DBF | CD850F | 135  |        | CALL             | NEGHL  |
| 4DC2 | 19     | 136  |        | DAD              | D      |
| 4DC3 | 0600   | 137  |        | MVI              | B,00H  |
| 4DC5 | D1     | 138  |        | POP              | D      |
| 4DC6 | CDE80F | 139  |        | CALL             | MLTPL  |
| 4DC9 | 48     | 140  |        | MOV              | C,B    |
| 4DCA | 2A0B7E | 141  |        | LHLD             | KXJ    |
| 4DCD | 0600   | 142  |        | MVI              | B,00H  |
| 4DCF | CDEE0F | 143  |        | CALL             | SUM    |
| 4DD2 | EB     | 144  |        | XCHG             |        |
| 4DD3 | 2A1E7E | 145  |        | LHLD             | PMGAL  |
| 4DD6 | CD0950 | 146  |        | CALL             | DEBTM  |
| 4DD9 | 221E7E | 147  |        | SHLD             | PMGAL  |
| 4DDC | C3F14D | 148  |        | JMP              | LSTST  |
| 4DDF | F1     | 149  | PMAG2: | POP              | PSW    |
| 4DE0 | 2A0D7E | 150  |        | LHLD             | KXJP1  |
| 4DE3 | EB     | 151  |        | XCHG             |        |
| 4DE4 | 2A1E7E | 152  |        | LHLD             | PMGAL  |
| 4DE7 | 72     | 153  |        | MOV              | M,D    |
| 4DE8 | 23     | 154  |        | INX              | H      |
| 4DE9 | 73     | 155  |        | MOV              | M,E    |
| 4DEA | 23     | 156  |        | INX              | H      |
| 4DEB | 97     | 157  |        | SUB              | A      |
| 4DEC | 77     | 158  |        | MOV              | M,A    |
| 4DED | 23     | 159  |        | INX              | H      |
| 4DEE | 221E7E | 160  |        | SHLD             | PMGAL  |
| 4DF1 | EB     | 161  | LSTST: | XCHG             |        |
| 4DF2 | 2A207E | 162  |        | LHLD             | LPMGL  |

ISIS-II 8080/8085 MACRO ASSEMBLER, V2.0      MODULE   PAGE   4

| LOC | OBJ | SEQ | | SOURCE | STATEMENT |
|---|---|---|---|---|---|
| 4DF5 | EB | 163 | | XCHG | |
| 4DF6 | CD8B0F | 164 | | CALL | HILO |
| 4DF9 | 23 | 165 | | INX | H |
| 4DFA | D24C4D | 166 | | JNC | STRT1 |
| | | 167 | | | |
| | | 168 | | | |
| 4DFD | 21B07B | 169 | S1S16: | LXI | H,LSUMA |
| 4E00 | 22A7E | 170 | | SHLD | LSUML |
| 4E03 | 21007B | 171 | | LXI | H,TIMEA |
| 4E06 | 221C7E | 172 | | SHLD | TMEAL |
| 4E09 | 21407B | 173 | | LXI | H,PMGAD |
| 4E0C | 221E7E | 174 | | SHLD | PMGAL |
| 4E0F | 21807B | 175 | | LXI | H,SUMAD |
| 4E12 | 22207E | 176 | | SHLD | SUMAL |
| 4E15 | 2A1C7E | 177 | STRT2: | LHLD | TMEAL |
| 4E18 | 56 | 178 | | MOV | D,M |
| 4E19 | 23 | 179 | | INX | H |
| 4E1A | 5E | 180 | | MOV | E,M |
| 4E1B | 23 | 181 | | INX | H |
| 4E1C | 23 | 182 | | INX | H |
| 4E1D | EB | 183 | | XCHG | |
| 4E1E | 220B7E | 184 | | SHLD | TIMES |
| 4E21 | EB | 185 | | XCHG | |
| 4E22 | 221C7E | 186 | | SHLD | TMEAL |
| 4E25 | 56 | 187 | | MOV | D,M |
| 4E26 | 23 | 188 | | INX | H |
| 4E27 | 5E | 189 | | MOV | E,M |
| 4E28 | 23 | 190 | | INX | H |
| 4E29 | EB | 191 | | XCHG | |
| 4E2A | 22107E | 192 | | SHLD | TIMEE |
| 4E2D | 22157E | 193 | | SHLD | TIMET |
| 4E30 | 2A1E7E | 194 | | LHLD | PMGAL |
| 4E33 | 56 | 195 | | MOV | D,M |
| 4E34 | 23 | 196 | | INX | H |
| 4E35 | 5E | 197 | | MOV | E,M |
| 4E36 | 23 | 198 | | INX | H |
| 4E37 | 7E | 199 | | MOV | A,M |
| 4E38 | 23 | 200 | | INX | H |
| 4E39 | EB | 201 | | XCHG | |
| 4E3A | 220D7E | 202 | | SHLD | PMGS |
| 4E3D | 320F7E | 203 | | STA | PMGSE |
| 4E40 | EB | 204 | | XCHG | |
| 4E41 | 221E7E | 205 | | SHLD | PMGAL |
| 4E44 | 56 | 206 | | MOV | D,M |
| 4E45 | 23 | 207 | | INX | H |
| 4E46 | 5E | 208 | | MOV | E,M |
| 4E47 | 23 | 209 | | INX | H |
| 4E48 | 7E | 210 | | MOV | A,M |
| 4E49 | EB | 211 | | XCHG | |
| 4E4A | 22127E | 212 | | SHLD | PMGE |
| 4E4D | 22177E | 213 | | SHLD | PMGT |
| 4E50 | 32147E | 214 | | STA | PMGEE |
| 4E53 | 32197E | 215 | | STA | PMGTE |
| 4E56 | 210000 | 216 | | LXI | H,0000H |
| 4E59 | 22047E | 217 | | SHLD | TSUMA |

ISIS-II 8080/8085 MACRO ASSEMBLER, V2.0      MODULE      PAGE   5

| LOC | OBJ | SEQ | | SOURCE STATEMENT | |
|-----|-----|-----|---|------|------|
| 4E5C | 21E073 | 218 | | LXI | H, KXNAD |
| 4E5F | 22007E | 219 | | SHLD | KXNAL |
| 4E62 | 21B074 | 220 | | LXI | H, SMNAD |
| 4E65 | 22027E | 221 | | SHLD | SMNAL |
| 4E68 | 2A007E | 222 | LPSM: | LHLD | KXNAL |
| 4E6B | 5E | 223 | | MOV | E, M |
| 4E6C | 23 | 224 | | INX | H |
| 4E6D | 22007E | 225 | | SHLD | KXNAL |
| 4E70 | 1600 | 226 | | MVI | D, 0 |
| 4E72 | EB | 227 | | XCHG | |
| 4E73 | 22097E | 228 | | SHLD | KXJAD |
| 4E76 | 2A027E | 229 | | LHLD | SMNAL |
| 4E79 | 56 | 230 | | MOV | D, M |
| 4E7A | 23 | 231 | | INX | H |
| 4E7B | 5E | 232 | | MOV | E, M |
| 4E7C | 23 | 233 | | INX | H |
| 4E7D | 22027E | 234 | | SHLD | SMNAL |
| 4E80 | EB | 235 | | XCHG | |
| 4E81 | 29 | 236 | | DAD | H |
| 4E82 | 29 | 237 | | DAD | H |
| 4E83 | 29 | 238 | | DAD | H |
| 4E84 | 29 | 239 | | DAD | H |
| 4E85 | 22077E | 240 | | SHLD | SMJAD |
| 4E88 | CD850F | 241 | | CALL | NEGHL |
| 4E8B | EB | 242 | | XCHG | |
| 4E8C | 2A0B7E | 243 | | LHLD | TIMES |
| 4E8F | 19 | 244 | | DAD | D |
| 4E90 | DA684E | 245 | | JC | LPSM |
| 4E93 | 2A077E | 246 | | LHLD | SMJAD |
| 4E96 | EB | 247 | | XCHG | |
| 4E97 | 2A107E | 248 | | LHLD | TIMEE |
| 4E9A | CD850F | 249 | | CALL | NEGHL |
| 4E9D | 19 | 250 | | DAD | D |
| 4E9E | DAD84E | 251 | | JC | TSUML |
| 4EA1 | EB | 252 | | XCHG | |
| 4EA2 | 22107E | 253 | | SHLD | TIMEE |
| 4EA5 | EB | 254 | | XCHG | |
| 4EA6 | 2A097E | 255 | | LHLD | KXJAD |
| 4EA9 | 22127E | 256 | | SHLD | PMGE |
| 4EAC | AF | 257 | | XRA | A |
| 4EAD | 32147E | 258 | | STA | PMGEE |
| 4EB0 | CDAF4F | 259 | | CALL | PTSUM |
| 4EB3 | 2A077E | 260 | | LHLD | SMJAD |
| 4EB6 | 220B7E | 261 | | SHLD | TIMES |
| 4EB9 | 2A097E | 262 | | LHLD | KXJAD |
| 4EBC | 220D7E | 263 | | SHLD | PMGS |
| 4EBF | AF | 264 | | XRA | A |
| 4EC0 | 320F7E | 265 | | STA | PMGSE |
| 4EC3 | 2A157E | 266 | | LHLD | TIMET |
| 4EC6 | 22107E | 267 | | SHLD | TIMEE |
| 4EC9 | 2A177E | 268 | | LHLD | PMGT |
| 4ECC | 22127E | 269 | | SHLD | PMGE |
| 4ECF | 3A197E | 270 | | LDA | PMGTE |
| 4ED2 | 32147E | 271 | | STA | PMGEE |
| 4ED5 | C3684E | 272 | | JMP | LPSM |

ISIS-II 8080/8085 MACRO ASSEMBLER, V2.0          MODULE   PAGE   6

```
LOC   OBJ         SEQ         SOURCE STATEMENT

4ED8 CDAF4F       273 TSUML:  CALL    PTSUM
4EDB EB           274         XCHG
4EDC 2A207E       275         LHLD    SUMAL
4EDF CD0950       276         CALL    DEBTM
4EE2 22207E       277         SHLD    SUMAL
4EE5 EB           278         XCHG
4EE6 2A1A7E       279         LHLD    LSUML
4EE9 EB           280         XCHG
4EEA CD8B0F       281         CALL    HILO
4EED 23           282         INX     H
4EEE D2154E       283         JNC     STRT2
                  284
                  285
                  286
                  287 ;GENERATE SUM(17)....SUM(31).
                  288
                  289
4EF1 217F7B       290 FSUMS:  LXI     H,SUMAD-1
4EF4 22007E       291         SHLD    SUM1L
4EF7 060F         292         MVI     B,0FH
4EF9 C5           293 STRT3:  PUSH    B
4EFA 2A007E       294         LHLD    SUM1L
4EFD 23           295         INX     H
4EFE CDFD0F       296         CALL    MTDEC
4F01 7E           297         MOV     A,M
4F02 23           298         INX     H
4F03 46           299         MOV     B,M
4F04 23           300         INX     H
4F05 22007E       301         SHLD    SUM1L
4F08 66           302         MOV     H,M
4F09 68           303         MOV     L,B
4F0A 44           304         MOV     B,H
4F0B 67           305         MOV     H,A
4F0C CDEE0F       306         CALL    SUM
4F0F EB           307         XCHG
4F10 2A207E       308         LHLD    SUMAL
4F13 CD0950       309         CALL    DEBTM
4F16 22207E       310         SHLD    SUMAL
4F19 C1           311         POP     B
4F1A 05           312         DCR     B
4F1B C2F94E       313         JNZ     STRT3
                  314
                  315
                  316
                  317 ;NORMALIZE:  SUM(I)=16*SUM(I)/SUM(31).
                  318
                  319
4F1E 21807B       320 NORM:   LXI     H,SUMAD
4F21 22007E       321         SHLD    SMAL1
4F24 061E         322         MVI     B,1EH
4F26 C5           323 STRT4:  PUSH    B
4F27 2A007E       324         LHLD    SMAL1
4F2A 56           325         MOV     D,M
4F2B 23           326         INX     H
4F2C 5E           327         MOV     E,M
```

```
ISIS-II 8080/8085 MACRO ASSEMBLER, V2.0              MODULE    PAGE    7

LOC   OBJ           SEQ            SOURCE STATEMENT

4F2D  23            328            INX     H
4F2E  7E            329            MOV     A,M
4F2F  C604          330            ADI     04
4F31  47            331            MOV     B,A
4F32  22007E        332            SHLD    SMAL1
4F35  2ADA7B        333            LHLD    SUMAD+5AH         ; SUM 31.
4F38  7C            334            MOV     A,H
4F39  65            335            MOV     H,L
4F3A  6F            336            MOV     L,A
4F3B  EB            337            XCHG
4F3C  3ADC7B        338            LDA     SUMAD+5CH         ; SUM 31 EXP.
4F3F  4F            339            MOV     C,A
4F40  CDEB0F        340            CALL    DIVID
4F43  2A007E        341            LHLD    SMAL1
4F46  2B            342            DCX     H
4F47  2B            343            DCX     H
4F48  CD0950        344            CALL    DEBTM
4F4B  22007E        345            SHLD    SMAL1
4F4E  C1            346            POP     B
4F4F  05            347            DCR     B
4F50  C2264F        348            JNZ     STRT4
                    349
                    350
                    351
                    352
                    353  ; GENERATE 15 HAAR COEFFICIENTS....
                    354
                    355
4F53  218079        356  HC15:     LXI     H,HCAD
4F56  22007E        357            SHLD    HCAL
4F59  21D37B        358            LXI     H,SUMAD+53H
4F5C  22027E        359            SHLD    SMPTR
4F5F  0601          360            MVI     B,1
4F61  CD864F        361            CALL    HRCF
4F64  21C77B        362            LXI     H,SUMAD+47H
4F67  22027E        363            SHLD    SMPTR
4F6A  0602          364            MVI     B,2
4F6C  CD864F        365            CALL    HRCF
4F6F  21AF7B        366            LXI     H,SUMAD+2FH
4F72  22027E        367            SHLD    SMPTR
4F75  0604          368            MVI     B,4
4F77  CD864F        369            CALL    HRCF
4F7A  217F7B        370            LXI     H,SUMAD-1
4F7D  22027E        371            SHLD    SMPTR
4F80  0608          372            MVI     B,8
4F82  CD864F        373            CALL    HRCF
4F85  C9            374            RET
                    375
                    376  ; END OF MAIN SUBROUTINE FOR HAAR COEFFICIENTS.
                    377
                    378
                    379
                    380
                    381
                    382  ; SUBROUTINE FOR HC15...
```

```
LOC   OBJ          SEQ            SOURCE STATEMENT 383
                   384
4F86  C5           385  HRCF:    PUSH    B
4F87  2A027E       386           LHLD    SMPTR
4F8A  23           387           INX     H
4F8B  CDFD0F       388           CALL    MTDEC
4F8E  7E           389           MOV     A,M
4F8F  23           390           INX     H
4F90  46           391           MOV     B,M
4F91  23           392           INX     H
4F92  22027E       393           SHLD    SMPTR
4F95  66           394           MOV     H,M
4F96  68           395           MOV     L,B
4F97  44           396           MOV     B,H
4F98  67           397           MOV     H,A
4F99  CD850F       398           CALL    NEGHL
4F9C  CDEE0F       399           CALL    SUM
4F9F  EB           400           XCHG
4FA0  2A007E       401           LHLD    HCAL
4FA3  CD0950       402           CALL    DEBTM
4FA6  22007E       403           SHLD    HCAL
4FA9  C1           404           POP     B
4FAA  05           405           DCR     B
4FAB  C2864F       406           JNZ     HRCF
4FAE  C9           407           RET
                   408
                   409
                   410
                   411
                   412
                   413
                   414  ;SUBROUTINE FOR SUM(1)...SUM(16).
                   415
                   416
                   417
                   418
4FAF  2A0D7E       419  PTSUM:   LHLD    PMGS
4FB2  EB           420           XCHG
4FB3  3A0F7E       421           LDA     PMGSE
4FB6  4F           422           MOV     C,A
4FB7  2A127E       423           LHLD    PMGE
4FBA  3A147E       424           LDA     PMGEE
4FBD  47           425           MOV     B,A
4FBE  CDEE0F       426           CALL    SUM
4FC1  05           427           DCR     B
4FC2  E5           428           PUSH    H
4FC3  2A107E       429           LHLD    TIMEE
4FC6  EB           430           XCHG
4FC7  2A0B7E       431           LHLD    TIMES
4FCA  CD850F       432           CALL    NEGHL
4FCD  19           433           DAD     D
4FCE  EB           434           XCHG
4FCF  E1           435           POP     H
4FD0  0E00         436           MVI     C,00H
4FD2  CDE80F       437           CALL    MLTPL
```

ISIS-II 8080/8085 MACRO ASSEMBLER, V2.0    MODULE    PAGE  9

| LOC | OBJ | SEQ | | SOURCE STATEMENT | |
|---|---|---|---|---|---|
| 4FD5 | 78 | 438 | | MOV | A,B |
| 4FD6 | D604 | 439 | | SUI | 04H |
| 4FD8 | 4F | 440 | | MOV | C,A |
| 4FD9 | 2A047E | 441 | | LHLD | TSUMA |
| 4FDC | 3A067E | 442 | | LDA | TSUME |
| 4FDF | 47 | 443 | | MOV | B,A |
| 4FE0 | CDEE0F | 444 | | CALL | SUM |
| 4FE3 | 22047E | 445 | | SHLD | TSUMA |
| 4FE6 | 78 | 446 | | MOV | A,B |
| 4FE7 | 32067E | 447 | | STA | TSUME |
| 4FEA | C9 | 448 | | RET | |
| | | 449 | | | |
| | | 450 | | | |
| | | 451 | | | |
| | | 452 | | | |
| | | 453 | ;SUBROUTINES FOR PMAG(1)...PMAG(17). | | |
| | | 454 | | | |
| | | 455 | | | |
| | | 456 | | | |
| 4FEB | 2A027E | 457 | MOVSM: | LHLD | SMNAL |
| 4FEE | 56 | 458 | | MOV | D,M |
| 4FEF | 23 | 459 | | INX | H |
| 4FF0 | 5E | 460 | | MOV | E,M |
| 4FF1 | 23 | 461 | | INX | H |
| 4FF2 | 22027E | 462 | | SHLD | SMNAL |
| 4FF5 | EB | 463 | | XCHG | |
| 4FF6 | 22097E | 464 | | SHLD | SMJP1 |
| 4FF9 | C9 | 465 | | RET | |
| | | 466 | | | |
| | | 467 | | | |
| | | 468 | | | |
| | | 469 | | | |
| 4FFA | 2A007E | 470 | MOVKX: | LHLD | KXNAL |
| 4FFD | 5E | 471 | | MOV | E,M |
| 4FFE | 23 | 472 | | INX | H |
| 4FFF | 22007E | 473 | | SHLD | KXNAL |
| 5002 | 1600 | 474 | | MVI | D,0 |
| 5004 | EB | 475 | | XCHG | |
| 5005 | 220D7E | 476 | | SHLD | KXJP1 |
| 5008 | C9 | 477 | | RET | |
| | | 478 | | | |
| | | 479 | | | |
| | | 480 | | | |
| 5009 | 72 | 481 | DEBTM: | MOV | M,D |
| 500A | 23 | 482 | | INX | H |
| 500B | 73 | 483 | | MOV | M,E |
| 500C | 23 | 484 | | INX | H |
| 500D | 70 | 485 | | MOV | M,B |
| 500E | 23 | 486 | | INX | H |
| 500F | C9 | 487 | | RET | |
| | | 488 | | | |
| | | 489 | | | |
| | | 490 | | | |
| | | 491 | | | |
| | | 492 | | | |

```
ISIS-II 8080/8085 MACRO ASSEMBLER, V2.0                 MODULE    PAGE    10

LOC  OBJ          SEQ           SOURCE STATEMENT

493    ;TEMPORARY STORAGE.......
                     494
                     495
   7E00              496           ORG     7E00H
                     497
                     498
   7E00 0000         499    KXNAL:  DW      00
   7E02 0000         500    SMNAL:  DW      00
   7E04 0000         501    TSUMA:  DW      00
   7E06 00           502    TSUME:  DB      00
   7E07 0000         503    SMJAD:  DW      00
   7E09 0000         504    KXJAD:  DW      00
   7E0B 0000         505    TIMES:  DW      00
   7E0D 0000         506    PMGS:   DW      00
   7E0F 00           507    PMGSE:  DB      00
   7E10 0000         508    TIMEE:  DW      00
   7E12 0000         509    PMGE:   DW      00
   7E14 00           510    PMGEE:  DB      00
   7E15 0000         511    TIMET:  DW      00
   7E17 0000         512    PMGT:   DW      00
   7E19 00           513    PMGTE:  DB      00
   7E1A 0000         514    LSUML:  DW      00
   7E1C 0000         515    TMEAL:  DW      00
   7E1E 0000         516    PMGAL:  DW      00
   7E20 0000         517    SUMAL:  DW      00
                     518
                     519
                     520
                     521    ;COMMON STORAGE.....
                     522
                     523
                     524
   7E00              525    SUM1L   EQU     KXNAL
   7E00              526    SMAL1   EQU     KXNAL
   7E00              527    HCAL    EQU     KXNAL
   7E02              528    SMPTR   EQU     SMNAL
   7E20              529    LPMGL   EQU     SUMAL
   7E07              530    SMJ     EQU     SMJAD
   7E09              531    SMJP1   EQU     KXJAD
   7E0B              532    KXJ     EQU     TIMES
   7E0D              533    KXJP1   EQU     PMGS
                     534
                     535
                     536
                     537
                     538    END

ASSEMBLY COMPLETE,  NO ERRORS
```

ASM80 :F1:NRMLZ.VP NOOBJECT NOSYMBOLS PRINT(:LP:)

ISIS-II 8080/8085 MACRO ASSEMBLER, V2.0        MODULE    PAGE    1

```
LOC   OBJ        SEQ        SOURCE STATEMENT

1   ; VERSION 05/09/78
                  2   ;                1. NRMLZ...NORMALIZE PENLIFT REGIONS.
                  3   ;                2. INTCN...INTEGER CONVERSION.
                  4
                  5
                  6
                  7   ; REFERENCED SUBROUTINES.....
                  8
0F85              9   NEGHL   EQU    0F85H
0F82             10   NEGDE   EQU    0F82H
0FEE             11   SUM     EQU    0FEEH
0FEB             12   DIVID   EQU    0FEBH
0FE8             13   MLTPL   EQU    0FE8H
0FA6             14   SHFTL   EQU    0FA6H
0F7F             15   SHFTR   EQU    0F7FH
0FAC             16   TYSTR   EQU    0FACH
0FFD             17   MTDEC   EQU    0FFDH
0FB5             18   MOVE    EQU    0FB5H   ;
                 19
                 20
                 21   ; REFERENCED MEMORY LOXATIONS......
                 22
7290             23   NEKX    EQU    7290H
7210             24   KXADR   EQU    7210H
72E0             25   SMADR   EQU    72E0H
73E0             26   KXNAD   EQU    73E0H
74B0             27   SMNAD   EQU    74B0H
72A0             28   PL      EQU    72A0H
7299             29   PLS     EQU    7299H   ;LOW HIGH BYTES.
7294             30   TT      EQU    7294H   ;LOW HIGH BYTES.
42F6             31   RPL     EQU    42F6H
42F9             32   RPLS    EQU    42F9H
42FC             33   RT      EQU    42FCH
62BE             34   SMCNT   EQU    62BEH   ;STORAGE FOR # OF SAMPLES
7294             35   SCNT    EQU    7294H   ; IN KXSM TABLES N0 OF SAMPLES
                 36
                 37
                 38
                 39   ;.............PATCH FOR NRMLZ.............
                 40
4120             41           ORG    4120H
                 42
4120 7A          43   PNRMLZ: MOV    A, D
4121 B3          44           ORA    E
4122 CA2C41      45           JZ     DONOT   ;DO NOT NORMALIZE. RPL.NE.0.
4125 3AA072      46           LDA    PL
4128 B7          47           ORA    A
4129 C26941      48           JNZ    CNRMLZ  ;CONTINUE NORMALIZE SUBROUTINE.
412C 0E7F        49   DONOT:  MVI    C, 7FH
412E 211072      50           LXI    H, KXADR
4131 11E073      51           LXI    D, KXNAD
4134 CDB50F      52           CALL   MOVE
```

| LOC | OBJ | SEQ | | SOURCE | STATEMENT |
|---|---|---|---|---|---|
| 4137 | 0EFF | 53 | | MVI | C,0FFH |
| 4139 | 21E072 | 54 | | LXI | H,SMADR |
| 413C | 11B074 | 55 | | LXI | D,SMNAD |
| 413F | CDB50F | 56 | | CALL | MOVE |
| 4142 | 3A9472 | 57 | | LDA | SCNT |
| 4145 | 32BE62 | 58 | | STA | SMCNT |
| 4148 | C9 | 59 | | RET | |
| | | 60 | | | |
| | | 61 | | | |
| | | 62 | | | |
| | | 63 | | | |
| 4160 | | 64 | | ORG | 4160H |
| | | 65 | | | |
| | | 66 | ; SUBROUTINE NRMLZ........ | | |
| | | 67 | | | |
| 4160 | 21F642 | 68 | NRMLZ: | LXI | H,RPL |
| 4163 | CDFD0F | 69 | | CALL | MTDEC |
| 4166 | C32041 | 70 | | JMP | PNRMLZ |
| 4169 | 6F | 71 | CNRMLZ: | MOV | L,A |
| 416A | AF | 72 | | XRA | A |
| 416B | 67 | 73 | | MOV | H,A |
| 416C | 47 | 74 | | MOV | B,A |
| 416D | CDEB0F | 75 | | CALL | DIVID |
| 4170 | EB | 76 | | XCHG | |
| 4171 | 110100 | 77 | | LXI | D,1 |
| 4174 | 0E00 | 78 | | MVI | C,0 |
| 4176 | CDEE0F | 79 | | CALL | SUM |
| 4179 | 05 | 80 | | DCR | B |
| 417A | E5 | 81 | | PUSH | H |
| 417B | 21F942 | 82 | | LXI | H,RPLS |
| 417E | CDFD0F | 83 | | CALL | MTDEC |
| 4181 | E1 | 84 | | POP | H |
| 4182 | CDE80F | 85 | | CALL | MLTPL |
| 4185 | D5 | 86 | | PUSH | D |
| 4186 | 21FC42 | 87 | | LXI | H,RT |
| 4189 | CDFD0F | 88 | | CALL | MTDEC |
| 418C | E1 | 89 | | POP | H |
| 418D | CDEB0F | 90 | | CALL | DIVID |
| 4190 | EB | 91 | | XCHG | |
| 4191 | 22087E | 92 | | SHLD | YADRS |
| 4194 | 78 | 93 | | MOV | A,B |
| 4195 | 320A7E | 94 | | STA | YEXP |
| 4198 | CD850F | 95 | | CALL | NEGHL |
| 419B | 110100 | 96 | | LXI | D,1 |
| 419E | 0E00 | 97 | | MVI | C,0 |
| 41A0 | CDEE0F | 98 | | CALL | SUM |
| 41A3 | EB | 99 | | XCHG | |
| 41A4 | 48 | 100 | | MOV | C,B |
| 41A5 | 2A087E | 101 | | LHLD | YADRS |
| 41A8 | 3A0A7E | 102 | | LDA | YEXP |
| 41AB | 47 | 103 | | MOV | B,A |
| 41AC | CDEB0F | 104 | | CALL | DIVID |
| 41AF | EB | 105 | | XCHG | |
| 41B0 | 220B7E | 106 | | SHLD | YRADR |
| 41B3 | 78 | 107 | | MOV | A,B |

ISIS-II 8080/8085 MACRO ASSEMBLER, V2.0         MODULE  PAGE   3

| LOC | OBJ | SEQ | | SOURCE STATEMENT | |
|---|---|---|---|---|---|
| 41B4 | 320D7E | 108 | | STA | YREXP |
| 41B7 | 2A9972 | 109 | | LHLD | PLS |
| 41BA | EB | 110 | | XCHG | |
| 41BB | 2A9472 | 111 | | LHLD | TT |
| 41BE | 010000 | 112 | | LXI | B,0 |
| 41C1 | CDEB0F | 113 | | CALL | DIVID |
| 41C4 | EB | 114 | | XCHG | |
| 41C5 | 11FFFF | 115 | | LXI | D,-1 |
| 41C8 | 0E00 | 116 | | MVI | C,0 |
| 41CA | CDEE0F | 117 | | CALL | SUM |
| 41CD | EB | 118 | | XCHG | |
| 41CE | 48 | 119 | | MOV | C,B |
| 41CF | 2A0B7E | 120 | | LHLD | YRADR |
| 41D2 | 3A0D7E | 121 | | LDA | YREXP |
| 41D5 | 47 | 122 | | MOV | B,A |
| 41D6 | CDE80F | 123 | | CALL | MLTPL |
| 41D9 | EB | 124 | | XCHG | |
| 41DA | 220E7E | 125 | | SHLD | ZNF |
| 41DD | 78 | 126 | | MOV | A,B |
| 41DE | 32107E | 127 | | STA | ZNFE |
| 41E1 | 210000 | 128 | | LXI | H,0 |
| 41E4 | 22117E | 129 | | SHLD | ADDCN |
| 41E7 | 211072 | 130 | | LXI | H,KXADR |
| 41EA | 22007E | 131 | | SHLD | KXALC |
| 41ED | 21E072 | 132 | | LXI | H,SMADR |
| 41F0 | 22027E | 133 | | SHLD | SMALC |
| 41F3 | 21E073 | 134 | | LXI | H,KXNAD |
| 41F6 | 22047E | 135 | | SHLD | KXNAL |
| 41F9 | 21B074 | 136 | | LXI | H,SMNAD |
| 41FC | 22067E | 137 | | SHLD | SMNAL |
| 41FF | 3A9072 | 138 | | LDA | NEKX |
| 4202 | 32137E | 139 | | STA | NEKXN |
| 4205 | CD8242 | 140 | BEGIN: | CALL | SMOLD |
| 4208 | 2A117E | 141 | | LHLD | ADDCN |
| 420B | 09 | 142 | | DAD | B |
| 420C | 22BE62 | 143 | | SHLD | SMCNT |
| 420F | E5 | 144 | | PUSH | H |
| 4210 | E5 | 145 | | PUSH | H |
| 4211 | EB | 146 | | XCHG | |
| 4212 | C5 | 147 | | PUSH | B |
| 4213 | D5 | 148 | | PUSH | D |
| 4214 | C1 | 149 | | POP | B |
| 4215 | CD8D42 | 150 | | CALL | SMNEW |
| 4218 | C1 | 151 | | POP | B |
| 4219 | CD7142 | 152 | | CALL | KXMOV |
| 421C | 78 | 153 | | MOV | A,B |
| 421D | B7 | 154 | | ORA | A |
| 421E | C26442 | 155 | | JNZ | LSTST |
| 4221 | 21137E | 156 | | LXI | H,NEKXN |
| 4224 | 35 | 157 | | DCR | M |
| 4225 | CA6E42 | 158 | | JZ | FINIS |
| 4228 | CD7142 | 159 | | CALL | KXMOV |
| 422B | CD8242 | 160 | | CALL | SMOLD |
| 422E | 2A117E | 161 | | LHLD | ADDCN |
| 4231 | 09 | 162 | | DAD | B |

ISIS-II 8080/8085 MACRO ASSEMBLER, V2.0　　　　　　　MODULE　PAGE　4

```
LOC   OBJ         SEQ         SOURCE STATEMENT

4232  D1          163              POP     D
4233  CD820F      164              CALL    NEGDE
4236  19          165              DAD     D
4237  23          166              INX     H
4238  EB          167              XCHG
4239  0E00        168              MVI     C,0
423B  D5          169              PUSH    D
423C  2A0E7E      170              LHLD    ZNF
423F  3A107E      171              LDA     ZNFE
4242  47          172              MOV     B,A
4243  CDE80F      173              CALL    MLTPL
4246  EB          174              XCHG
4247  CD9842      175              CALL    INTCN
424A  EB          176              XCHG
424B  E1          177              POP     H
424C  CD850F      178              CALL    NEGHL
424F  19          179              DAD     D
4250  44          180              MOV     B,H
4251  4D          181              MOV     C,L
4252  2A117E      182              LHLD    ADDCN
4255  09          183              DAD     B
4256  22117E      184              SHLD    ADDCN
4259  E1          185              POP     H
425A  19          186              DAD     D
425B  2B          187              DCX     H
425C  44          188              MOV     B,H
425D  4D          189              MOV     C,L
425E  CD8D42      190              CALL    SMNEW
4261  C36642      191              JMP     LSTST+2
4264  F1          192  LSTST:      POP     PSW
4265  F1          193              POP     PSW
4266  21137E      194              LXI     H,NEKXN
4269  35          195              DCR     M
426A  C20542      196              JNZ     BEGIN
426D  C9          197              RET
                  198
426E  F1          199  FINIS:      POP     PSW
426F  F1          200              POP     PSW
4270  C9          201              RET
                  202
                  203
                  204
                  205  ; SUBROUTINES.....
                  206
4271  2A007E      207  KXMOV:      LHLD    KXALC
4274  46          208              MOV     B,M
4275  23          209              INX     H
4276  22007E      210              SHLD    KXALC
4279  2A047E      211              LHLD    KXNAL
427C  70          212              MOV     M,B
427D  23          213              INX     H
427E  22047E      214              SHLD    KXNAL
4281  C9          215              RET
                  216
                  217
```

ISIS-II 8080/8085 MACRO ASSEMBLER, V2.0  MODULE  PAGE  5

```
LOC   OBJ       SEQ         SOURCE STATEMENT 218
4282 2A027E     219  SMOLD: LHLD    SMALC
4285 46         220         MOV     B,M
4286 23         221         INX     H
4287 4E         222         MOV     C,M
4288 23         223         INX     H
4289 22027E     224         SHLD    SMALC
428C C9         225         RET
                226
                227
                228
428D 2A067E     229  SMNEW: LHLD    SMNAL
4290 70         230         MOV     M,B
4291 23         231         INX     H
4292 71         232         MOV     M,C
4293 23         233         INX     H
4294 22067E     234         SHLD    SMNAL
4297 C9         235         RET
                236
                237
                238
                239  ; SUBROUTINE TO CONVERT A NUMBER HI-LO-EXP
                240  ; TO INTEGER HI-LO.
                241  ; NUMBER IN HL,B.  RESULT IN HL.
                242
4298 7C         243  INTCN: MOV     A,H
4299 B5         244         ORA     L
429A C8         245         RZ
429B 1600       246         MVI     D,0
429D 7C         247         MOV     A,H
429E B7         248         ORA     A
429F F2A642     249         JP      PSTV
42A2 14         250         INR     D
42A3 CDEB42     251         CALL    NGHL8
42A6 CDA60F     252  PSTV:  CALL    SHFTL
42A9 78         253         MOV     A,B
42AA B7         254         ORA     A
42AB CAB742     255         JZ      ADJSN
42AE F2BD42     256         JP      TSTMR
42B1 AF         257         XRA     A
42B2 90         258         SUB     B
42B3 4F         259         MOV     C,A
42B4 CD7F0F     260         CALL    SHFTR
42B7 7A         261  ADJSN: MOV     A,D
42B8 B7         262         ORA     A
42B9 C8         263         RZ
42BA C3850F     264         JMP     NEGHL
42BD 3D         265  TSTMR: DCR     A
42BE C2CF42     266         JNZ     ERMSG
42C1 7C         267         MOV     A,H
42C2 EE40       268         XRI     40H
42C4 B5         269         ORA     L
42C5 C2CF42     270         JNZ     ERMSG
42C8 7A         271         MOV     A,D
42C9 B7         272         ORA     A
```

```
LOC   OBJ        SEQ           SOURCE STATEMENT

42CA  CACF42     273           JZ      ERMSG
42CD  29         274           DAD     H
42CE  C9         275           RET
42CF  21D742     276  ERMSG:   LXI     H,MSGAD
42D2  0614       277           MVI     B,14H
42D4  C3AC0F     278           JMP     TYSTR
                 279
                 280
42D7  0A         281  MSGAD:   DB      10,13,'INTEGER OVERFLOW',10,13
42D8  0D
42D9  494E5445
42DD  47455220
42E1  4F564552
42E5  464C4F57
42E9  0A
42EA  0D
0014             282  MSGL     EQU     $-MSGAD
                 283
                 284
                 285  ; SUBROUTINE.......
                 286
42EB  7C         287  NGHL8:   MOV     A,H
42EC  EE80       288           XRI     80H
42EE  B5         289           ORA     L
42EF  C2850F     290           JNZ     NEGHL
42F2  2640       291           MVI     H,40H
42F4  04         292           INR     B
42F5  C9         293           RET
                 294
                 295
                 296
                 297
7E00             298           ORG     7E00H
                 299
                 300  ; TEMPORARY STORAGE.....
                 301
7E00  0000       302  KXALC:   DW      0000
7E02  0000       303  SMALC:   DW      0000
7E04  0000       304  KXNAL:   DW      0000
7E06  0000       305  SMNAL:   DW      0000
7E08  0000       306  YADRS:   DW      0000
7E0A  00         307  YEXP:    DB      00
7E0B  0000       308  YRADR:   DW      0000
7E0D  00         309  YREXP:   DB      00
7E0E  0000       310  ZNF:     DW      0000
7E10  00         311  ZNFE:    DB      00
7E11  0000       312  ADDCN:   DW      0000
7E13  00         313  NEKXN:   DB      00
                 314
                 315
                 316
                 317
                 318
                 319
                 320  END

ASSEMBLY COMPLETE,  NO ERRORS
```

ASM80 :F1:FEATRS. VP NUOBJECT NOSYMBOLS PRINT(:LP:)

ISIS-II 8080/8085 MACRO ASSEMBLER, V2.0           MODULE   PAGE   1

```
LOC   OBJ         SEQ        SOURCE STATEMENT 1
                    2   ;  FEATURES SUBR.
                    3   ;  VERSION 05/12/77
                    4   ;  DIVIDES SIGNATURES INTO
                    5   ;       NINT INTERVALS
                    6   ;       NSECT SECTORS
                    7   ;       NPER PERIODS
                    8   ;  MAXIMUN VALUES: NINT=6 NSECT=8
                    9
                   10
                   11   ;       SUBROTUINE CALLS
                   12
0FEB               13   DIVID   EQU     0FEBH
0F88               14   SBHDD   EQU     0F88H    ; SUBT  DE - HL = DE
0F73               15   SRDLH   EQU     0F73H
0FFA               16   DECTM   EQU     0FFAH
0F97               17   CLRM    EQU     0F97H
0FD9               18   NDVD    EQU     0FD9H
0F91               19   INTCN   EQU     0F91H
0FA6               20   SHFTL   EQU     0FA6H
0FEE               21   SUM     EQU     0FEEH
0FE5               22   DIV.    EQU     0FE5H
                   23
                   24   ;       REFERENCE LOCATIONS
                   25
62BE               26   CNT     EQU     62BEH         ; ADJUSTED BY NRMLZ
7291               27   TSUM    EQU     7291H         ; 3 BYTES LMH
7980               28   PARI    EQU     7980H         ; PARAM (N)
79AD               29   FEATI   EQU     PARI + 15*3   ; 16TH PARAM.
7EB1               30   NINT    EQU     7EB1H         ; INTERVALS
7EB2               31   NSECT   EQU     7EB2H         ; SECTIONS PER INTERVAL
                   32
                   33   ;  NROMALIZED KX/SM TABLES
                   34
73E0               35   KX      EQU     73E0H
74B0               36   SM      EQU     KX+80H+50H
                   37
4630               38           ORG     4630H
                   39
                   40   ; **********    **********
                   41
                   42
4630 3AB17E        43   START:  LDA     NINT       ; OFF1 = NINT * 6 + 3
4633 4F            44           MOV     C,A
4634 81            45           ADD     C
4635 81            46           ADD     C
4636 47            47           MOV     B,A
4637 80            48           ADD     B
4638 3C            49           INR     A
4639 3C            50           INR     A
463A 3C            51           INR     A
463B 32217E        52           STA     OFF1       ; PEN LIFT OFFSET
```

ISIS-II 8080/8085 MACRO ASSEMBLER, V2.0                MODULE    PAGE    2

```
LOC   OBJ         SEQ           SOURCE STATEMENT 463E  3AB27E       53                  LDA     NSECT
4641  47           54                  MOV     B,A
4642  AF           55                  XRA     A
4643  80           56  FEAT1:          ADD     B
4644  0D           57                  DCR     C
4645  C24346       58                  JNZ     FEAT1
4648  32007E       59                  STA     NPER
464B  2ABE62       60                  LHLD    CNT
464E  0600         61                  MVI     B,0
4650  5F           62                  MOV     E,A
4651  AF           63                  XRA     A
4652  4F           64                  MOV     C,A
4653  57           65                  MOV     D,A
4654  CDEB0F       66                  CALL    DIVID    ; HLB (CNT) / DEC (NPER) =
                   67                                   ; DEB (SMPPE)
4657  EB           68                  XCHG
4658  22097E       69                  SHLD    SMPPE
465B  78           70                  MOV     A,B
465C  320B7E       71                  STA     SMPPE+2
465F  CD910F       72                  CALL    INTCN    ; HLB (SMPPE) TO HL (SMPPP)
4662  7D           73                  MOV     A,L
4663  32087E       74                  STA     SMPPP    ; SAMPLES PER PERIOD
4666  210000       75                  LXI     H,0
4669  22197E       76                  SHLD    STZ      ; START ZERO ADDRESS IN SM/KX
466C  220C7E       77                  SHLD    CMPSM    ; COMPUTED SM VALUE
466F  AF           78                  XRA     A
4670  320E7E       79                  STA     CMPSM+2
4673  21B374       80                  LXI     H,SM+3   ; ST.ADDR (HI) OF SM
4676  22017E       81                  SHLD    SMA
4679  22037E       82                  SHLD    SMA1
467C  21E073       83                  LXI     H,KX
467F  22227E       84                  SHLD    KXA
4682  3E01         85                  MVI     A,01
4684  32107E       86                  STA     UP
4687  32117E       87                  STA     PKF
468A  21BA79       88                  LXI     H,FEATI+6*3-5
468D  22057E       89                  SHLD    CHNA
4690  21AD79       90                  LXI     H,FEATI
4693  0653         91                  MVI     B,83
4695  CD970F       92                  CALL    CLRM     ; CLEAR MEMORY
                   93
4698  AF           94  MAINF:          XRA     A
4699  32127E       95                  STA     J1       ; INTERVAL
469C  3A127E       96  FEAT2:          LDA     J1
469F  3C           97                  INR     A
46A0  32127E       98                  STA     J1
46A3  AF           99                  XRA     A
46A4  32137E      100                  STA     J2       ; SECTION
46A7  2A057E      101                  LHLD    CHNA
46AA  23          102                  INX     H
46AB  23          103                  INX     H
46AC  23          104                  INX     H
46AD  22057E      105                  SHLD    CHNA
                  106
46B0  3A137E      107  FEAT4:          LDA     J2
```

ISIS-II 8080/8085 MACRO ASSEMBLER, V2.0    MODULE    PAGE    3

```
LOC   OBJ        SEQ          SOURCE STATEMENT

46B3  3C         108          INR    A
46B4  32137E     109          STA    J2
                 110
46B7  CDD746     111          CALL   FPERT      ; NO. ENTRIES IN SM/KX FOR S2
46BA  CD1D47     112          CALL   FFEAT      ; FIND FEATURES FOR J3
                 113
46BD  3AB27E     114          LDA    NSECT
46C0  47         115          MOV    B,A
46C1  3A137E     116          LDA    J2
46C4  B8         117          CMP    B
46C5  C2B046     118          JNZ    FEAT4
46C8  3AB17E     119          LDA    NINT
46CB  47         120          MOV    B,A
46CC  3A127E     121          LDA    J1
46CF  B8         122          CMP    B
46D0  C29C46     123          JNZ    FEAT2
46D3  CD2A49     124          CALL   TOTS
46D6  C9         125          RET
                 126
                 127   ; **********    **********
                 128
46D7  AF         129  FPERT:  XRA    A
46D8  320F7E     130          STA    PERT
46DB  2A157E     131          LHLD   CMPI
46DE  22177E     132          SHLD   CMPIM
46E1  2A0C7E     133          LHLD   CMPSM
46E4  3A0E7E     134          LDA    CMPSM+2
46E7  EB         135          XCHG
46E8  4F         136          MOV    C,A
46E9  2A097E     137          LHLD   SMPPE
46EC  3A0B7E     138          LDA    SMPPE+2
46EF  47         139          MOV    B,A
46F0  CDEE0F     140          CALL   SUM        ; HLB (SMPPE) + DEC (CMPSM) =
                 141                             ; HLB (CMPSM)
46F3  220C7E     142          SHLD   CMPSM
46F6  78         143          MOV    A,B
46F7  320E7E     144          STA    CMPSM+2
46FA  CD910F     145          CALL   INTCN
46FD  22157E     146          SHLD   CMPI       ; INTEGER SM
4700  EB         147          XCHG              ; DE = CMPI
4701  2A017E     148          LHLD   SMA
4704  7E         149  FPER1:  MOV    A,M        ; SM VALUE LOW BYTE
4705  93         150          SUB    E
4706  2B         151          DCX    H
4707  7E         152          MOV    A,M        ; SM VALUE HI BYTE
4708  23         153          INX    H
4709  9A         154          SBB    D
470A  D21947     155          JNC    FPER3
470D  3A0F7E     156  FPER2:  LDA    PERT
4710  3C         157          INR    A
4711  320F7E     158          STA    PERT
4714  23         159          INX    H
4715  23         160          INX    H
4716  C30447     161          JMP    FPER1
4719  22017E     162  FPER3:  SHLD   SMA
```

```
ISIS-II 8080/8085 MACRO ASSEMBLER, V2.0           MODULE    PAGE    4

LOC  OBJ         SEQ           SOURCE STATEMENT

471C C9          163           RET            ;              RETURN
                 164
                 165    ; **********    **********
                 166
                 167    ; FEATURES SUBR.
                 168    ; NUMBER OF CHANGES, PEAKS, ZERO TIME
                 169    ; AND PEN LIFTS FOR J2
                 170
                 171    ; PERT CONTAINS NO. OF ENTRIES IN SM/KX
                 172    ; TABLES FOR J2
                 173    ; SMA1 FIRST ENTRY IN SM TABLE FOR J2
                 174
471D 3A0F7E      175  FFEAT:   LDA    PERT
4720 FE00        176           CPI    0         ; NO ENTRIES?
4722 CA4447      177           JZ     PERT0     ; CHECK IF IN PEN LIFT
4725 320F7E      178  FEAA1:   STA    PERT
4728 2A037E      179           LHLD   SMA1
472B E5          180           PUSH   H
472C D1          181           POP    D
472D 23          182           INX    H
472E 23          183           INX    H
472F 22037E      184           SHLD   SMA1
4732 2A227E      185           LHLD   KXA
4735 23          186           INX    H
4736 22227E      187           SHLD   KXA
4739 CD4E47      188           CALL   PERT1     ; FEATURES FOR ENTRY
473C 3A0F7E      189           LDA    PERT
473F 3D          190           DCR    A
4740 C22547      191           JNZ    FEAA1
4743 C9          192           RET               ;              RETURN
4744 3A107E      193  PERT0:   LDA    UP
4747 FE02        194           CPI    2         ; INSIDE PEN LIFT?
4749 C0          195           RNZ              ; NO           RETURN
474A CD9248      196           CALL   ZBET      ; YES
474D C9          197           RET              ;              RETURN
                 198
                 199    ; **********    **********
                 200
                 201    ; PERT1 SUBR.
                 202    ; DETERMINE FEATURES FOR SM/KX ENTRY
                 203    ; HL CONTAIS KX ADDRESS OF ENTRY
                 204    ; DE CONTINS SM ADDRESS OF ENTRY
                 205    ; UP DEFINES SOLPE IN
                 206    ; UP = 0        NEGATIVE SLOPE
                 207    ; UP = 1        POSITIVE SLOPE
                 208    ; UP = 2        ZERO    SLOPE
                 209    ; PKF = 1       POSSIBLE PEAK
                 210
474E 3A107E      211  PERT1:   LDA    UP
4751 FE00        212           CPI    0
4753 C26B47      213           JNZ    UP12
4756 7E          214           MOV    A,M
4757 FE00        215           CPI    0
4759 C26547      216           JNZ    NUP1      ; NEW UP=1
475C 3E02        217           MVI    A,2
```

ISIS-II 8080/8085 MACRO ASSEMBLER, V2.0   MODULE   PAGE   5

```
LOC   OBJ         SEQ             SOURCE STATEMENT 4758  32107E      218             STA     UP
4761  CD9247      219             CALL    ZIN     ; START OF NEW ZERO
4764  C9          220             RET             ;                 RETURN
                  221
4765  3E01        222 NUP1:       MVI     A,01
4767  32107E      223             STA     UP
476A  C9          224             RET             ;                 RETURN
476B  FE01        225 UP12:       CPI     1
476D  C28647      226             JNZ     UP2
4770  3A117E      227             LDA     PKF
4773  FE01        228             CPI     1
4775  C27B47      229             JNZ     NUP0
4778  CD0449      230             CALL    PEAK
477B  CDDC48      231 NUP0:       CALL    CHANG   ; ADD CHANGE
477E  AF          232             XRA     A
477F  32107E      233             STA     UP
4782  32117E      234             STA     PKF
4785  C9          235             RET             ;                 RETURN
4786  CDA248      236 UP2:        CALL    ZOUT    ; END OF ZERO
4789  3E01        237             MVI     A,1
478B  32117E      238             STA     PKF
478E  32107E      239             STA     UP
4791  C9          240             RET             ;                 RETURN
                  241
                  242 ; **********    **********
                  243
                  244 ; ZIN SUBR.
                  245 ; NEW ZERO
                  246
4792  AF          247 ZIN:        XRA     A
4793  32207E      248             STA     PZERF   ; 0 = PARTIAL
                  249                             ; 1 = TOTAL
4796  EB          250             XCHG            ; DE = SM ADDRESS
4797  2B          251             DCX     H
4798  56          252             MOV     D,M
4799  23          253             INX     H
479A  5E          254             MOV     E,M
479B  EB          255             XCHG
479C  2B          256             DCX     H
479D  22197E      257             SHLD    STZ     ; START ZERO (SM VALUE)
47A0  EB          258             XCHG
47A1  23          259             INX     H
47A2  56          260             MOV     D,M
47A3  23          261             INX     H
47A4  5E          262             MOV     E,M
47A5  EB          263             XCHG
47A6  221B7E      264             SHLD    ENZ     ; END ZERO (SM VALUE)
47A9  CD0148      265             CALL    SUBTX   ; DE (ZERO END) - HL (START)
                  266                             ; DE (ZERO TIME)
47AC  321E7E      267             STA     TEMP1   ; TOTAL ZERO TIME
47AF  3A0F7E      268             LDA     PERT
47B2  FE01        269             CPI     01
47B4  CAD847      270             JZ      ZIN1    ; PARTIAL ZERO
                  271
47B7  3E01        272             MVI     A,01    ; TOTAL ZERO
```

ISIS-II 8080/8085 MACRO ASSEMBLER, V2.0          MODULE    PAGE    6

| LOC | OBJ | SEQ | | SOURCE STATEMENT | | |
|---|---|---|---|---|---|---|
| 47B9 | 32207E | 273 | | STA | PZERF | ; FLAG CONDITION |
| 47BC | 3A1E7E | 274 | | LDA | TEMP1 | ; TOTAL ZERO TIME |
| 47BF | 321D7E | 275 | ZIN2: | STA | TEMP | |
| 47C2 | CD7048 | 276 | | CALL | FIRST | |
| 47C5 | B7 | 277 | | ORA | A | |
| 47C6 | CAEE47 | 278 | | JZ | ZINF | |
| 47C9 | CD7E48 | 279 | | CALL | LAST | |
| 47CC | B7 | 280 | | ORA | A | |
| 47CD | CAE147 | 281 | | JZ | ZINL | |
| 47D0 | 3A207E | 282 | | LDA | PZERF | ; MIDDLE SECTOR |
| 47D3 | B7 | 283 | | ORA | A | |
| 47D4 | C8 | 284 | | RZ | | |
| 47D5 | C30A48 | 285 | | JMP | JJ | ; (ZIN,T,M) |
| 47D8 | 2A157E | 286 | ZIN1: | LHLD | CMPI | ; PARTIAL ZERO |
| 47DB | CD0148 | 287 | | CALL | SUBTX | ; DE (CMPSM) - HL (STZ) = DE |
| 47DE | C3BF47 | 288 | | JMP | ZIN2 | |
| 47E1 | 3A207E | 289 | ZINL: | LDA | PZERF | ; LAST SECTION |
| 47E4 | B7 | 290 | | ORA | A | |
| 47E5 | C2FB47 | 291 | | JNZ | ZINLT | ; LAST,TOTAL |
| 47E8 | CD0A48 | 292 | ZINL2: | CALL | JJ | ; (ZIN,P,L) (ZBET,P,L) |
| 47EB | C3F447 | 293 | | JMP | ZINF2 | |
| 47EE | CD2148 | 294 | ZINF: | CALL | DIV2 | |
| 47F1 | CD0F48 | 295 | | CALL | JJM | ; (ZIN,T+P,1) |
| 47F4 | 3A157E | 296 | ZINF2: | LDA | CMPI | ; (ZIN,P,L) + (ZIN,T+P,1) |
| 47F7 | 32197E | 297 | | STA | STZ | |
| 47FA | C9 | 298 | | RET | | |
| 47FB | CD2148 | 299 | ZINLT: | CALL | DIV2 | |
| 47FE | C31848 | 300 | | JMP | JJP | ; (ZIN,T,L) |
| | | 301 | | | | |
| | | 302 | ; ********** | | ********** | |
| | | 303 | | | | |
| | | 304 | | | | |
| | | 305 | ; SUBTX SUBR. | | | |
| | | 306 | | | | |
| 4801 | EB | 307 | SUBTX: | XCHG | | |
| 4802 | 2A197E | 308 | | LHLD | STZ | |
| 4805 | CD880F | 309 | | CALL | SBHDD | ; DE - HL (STZ) = DE |
| 4808 | 7B | 310 | | MOV | A,E | |
| 4809 | C9 | 311 | | RET | | |
| | | 312 | | | | |
| | | 313 | ; ********** | | ********** | |
| | | 314 | | | | |
| | | 315 | ; J JJM JJP SUBR. S | | | |
| | | 316 | | | | |
| 480A | AF | 317 | JJ: | XRA | A | |
| 480B | CD4748 | 318 | | CALL | BSTOR | ; STORE TEMP AT J1 |
| 480E | C9 | 319 | | RET | | |
| | | 320 | | | | |
| 480F | CD0A48 | 321 | JJM: | CALL | JJ | |
| 4812 | 3EFD | 322 | | MVI | A,-3 | |
| 4814 | CD4748 | 323 | | CALL | BSTOR | ; STORE TEMP AT J1-1 |
| 4817 | C9 | 324 | | RET | | |
| | | 325 | | | | |
| 4818 | CD0A48 | 326 | JJP: | CALL | JJ | |
| 481B | 3E03 | 327 | | MVI | A,3 | |

ISIS-II 8080/8085 MACRO ASSEMBLER, V2.0  MODULE  PAGE 7

| LOC | OBJ | SEQ | | SOURCE STATEMENT | | |
|---|---|---|---|---|---|---|
| 481D | CD4748 | 328 | | CALL | BSTOR | ; STORE TEMP AT J1+1 |
| 4820 | C9 | 329 | | RET | | |
| | | 330 | | | | |
| | | 331 | ; ********** | ********** | | |
| | | 332 | | | | |
| | | 333 | ; DIV2 SUBR. | | | |
| | | 334 | | | | |
| 4821 | 3A1D7E | 335 | DIV2: | LDA | TEMP | |
| 4824 | 1F | 336 | | RAR | | |
| 4825 | FE01 | 337 | | CPI | 01 | |
| 4827 | D22C48 | 338 | | JNC | DIV21 | |
| 482A | 3E01 | 339 | | MVI | A,01 | |
| 482C | 321D7E | 340 | DIV21: | STA | TEMP | |
| 482F | C9 | 341 | | RET | | |
| | | 342 | | | | |
| | | 343 | ; ********** | ********** | | |
| | | 344 | | | | |
| | | 345 | ; DIVX SUBR. | | | |
| | | 346 | | | | |
| 4830 | AF | 347 | DIVX: | XRA | A | |
| 4831 | 47 | 348 | | MOV | B,A | |
| 4832 | 67 | 349 | | MOV | H,A | |
| 4833 | 3A1D7E | 350 | | LDA | TEMP | |
| 4836 | 6F | 351 | | MOV | L,A | |
| 4837 | 3A1E7E | 352 | | LDA | TEMP1 | |
| 483A | CDD90F | 353 | | CALL | NDVD | ; HLB (0 TEMP 0) / A (TEMP1) |
| | | 354 | | | | ; = DEB (PL FRACTION IN SECTION) |
| 483D | 3E03 | 355 | | MVI | A,03 | |
| 483F | 80 | 356 | | ADD | B | ; INCREASE EXPONENET BY 3 |
| 4840 | 47 | 357 | | MOV | B,A | |
| 4841 | EB | 358 | | XCHG | | |
| 4842 | CD910F | 359 | | CALL | INTCN | ; INTEGER CONV |
| | | 360 | | | | ; HLB ( PL FLOAT) = HL (PL INT) |
| 4845 | 7D | 361 | | MOV | A,L | |
| 4846 | C9 | 362 | | RET | | |
| | | 363 | | | | |
| | | 364 | ; ********** | ********** | | |
| | | 365 | | | | |
| | | 366 | ; BSTOR SUBR. | | | |
| | | 367 | | | | |
| 4847 | 47 | 368 | BSTOR: | MOV | B,A | ; ACC = 1, 0, -1 |
| 4848 | 3A217E | 369 | | LDA | OFF1 | |
| 484B | 80 | 370 | | ADD | B | |
| 484C | 5F | 371 | | MOV | E,A | |
| 484D | AF | 372 | | XRA | A | |
| 484E | 57 | 373 | | MOV | D,A | |
| 484F | D5 | 374 | | PUSH | D | |
| 4850 | CD3048 | 375 | | CALL | DIVX | |
| 4853 | D1 | 376 | | POP | D | |
| 4854 | 47 | 377 | | MOV | B,A | |
| 4855 | CD6848 | 378 | | CALL | STORE | |
| 4858 | 3AB17E | 379 | | LDA | NINT | ; E = E + 3 * NINT |
| 485B | 47 | 380 | | MOV | B,A | |
| 485C | 80 | 381 | | ADD | B | |
| 485D | 80 | 382 | | ADD | B | |

ISIS-II 8080/8085 MACRO ASSEMBLER, V2.0          MODULE   PAGE   8

```
LOC   OBJ         SEQ         SOURCE STATEMENT 485E  83          383              ADD     E
485F  5F          384              MOV     E,A
4860  3A1D7E      385              LDA     TEMP
4863  47          386              MOV     B,A
4864  CD6848      387              CALL    STORE
4867  C9          388              RET
                  389
                  390    ; **********  **********
                  391
                  392    ; STORE SUBR.
                  393
4868  2A057E      394    STORE:   LHLD    CHNA
486B  19          395              DAD     D
486C  7E          396              MOV     A,M
486D  80          397              ADD     B
486E  77          398              MOV     M,A
486F  C9          399              RET           ;            RETURN
                  400
                  401    ; **********  **********
                  402
                  403    ; FIRST SUBR.
                  404    ; AC=0 FIRST SECTION
                  405
4870  3A127E      406    FIRST:   LDA     J1    ; INTERVAL NUMBER
4873  FE01        407              CPI     01
4875  C8          408              RZ            ;            RETURN
4876  3A137E      409              LDA     J2
4879  FE01        410              CPI     01    ; FIRST SECTION ?
487B  C0          411              RNZ           ;            RETURN
487C  AF          412              XRA     A
487D  C9          413              RET           ;            RETURN
                  414
                  415    ; **********  **********
                  416
                  417    ; LAST SUBR.
                  418    ; AC=0 LAST SECTION
                  419
487E  3AB17E      420    LAST:    LDA     NINT
4881  47          421              MOV     B,A
4882  3A127E      422              LDA     J1
4885  B8          423              CMP     B     ; LAST INTERVAL ?
4886  C8          424              RZ            ;            RETURN
4887  3AB27E      425              LDA     NSECT
488A  47          426              MOV     B,A
488B  3A137E      427              LDA     J2
488E  B8          428              CMP     B     ; LAST SECTION ?
488F  C0          429              RNZ           ;            RETURN
4890  AF          430              XRA     A
4891  C9          431              RET           ;            RETURN
                  432
                  433    ; **********  **********
                  434
                  435    ; ZBET SUBR.
                  436    ; ZERO THROUGH THIS PERIOD
                  437
```

ISIS-II 8080/8085 MACRO ASSEMBLER, V2.0     MODULE   PAGE   9

```
LOC     OBJ         SEQ          SOURCE STATEMENT

4892  CD7E48       438  ZBET:   CALL    LAST
4895  C0           439          RNZ              ; 1ST OR MIDDLE SECTION
4896  2A157E       440          LHLD    CMPI     ; LAST SECTION
4899  CD0148       441          CALL    SUBTX
489C  321D7E       442          STA     TEMP
489F  C3E847       443          JMP     ZINL2
                   444
                   445  ; **********    **********
                   446
                   447  ; ZOUT SUBR.    END OF ZERO
                   448
48A2  3A207E       449  ZOUT:   LDA     PZERF
48A5  B7           450          ORA     A
48A6  C0           451          RNZ              ;            RETURN
48A7  CD7E48       452          CALL    LAST
48AA  B7           453          ORA     A
48AB  CABB48       454          JZ      LASTS    ; LAST SECTOR
48AE  2A1B7E       455          LHLD    ENZ      ; 1ST OR MIDDLE SECTOR
48B1  CD0148       456          CALL    SUBTX    ; DE (ENZ) - HL (STZ)
                   457                           ; = DE (ZERO TIME IN J1)
48B4  321D7E       458          STA     TEMP
48B7  CD0A48       459          CALL    JJ       ; STORE TEMP IN J1
48BA  C9           460          RET
                   461
48BB  2A177E       462  LASTS:  LHLD    CMPIM    ; ZOUT IN LAST SECTOR
48BE  CD0148       463          CALL    SUBTX    ; DE (CMPIM) - HL (STZ) =
                   464                           ; DE (ZERO TIME)
48C1  321D7E       465          STA     TEMP
48C4  CD0A48       466          CALL    JJ       ; STORE TEMP IN J1
48C7  2A1B7E       467          LHLD    ENZ
48CA  EB           468          XCHG
48CB  2A177E       469          LHLD    CMPIM    ; CMPI MINUS
48CE  CD880F       470          CALL    SBHDD    ; DE (ENZ) - HL (CMPIM) =
                   471                           ; DE (ZERO TIME)
48D1  7B           472          MOV     A,E
48D2  321D7E       473          STA     TEMP
48D5  CD2148       474          CALL    DIV2
48D8  CD1848       475          CALL    JJP      ; STORE TEMP IN J1 AND J1+1
48DB  C9           476          RET
                   477

479
                   480  ; CHANG SUBR.
                   481  ; COUNT CHANGE
                   482
48DC  2A057E       483  CHANG:  LHLD    CHNA
48DF  CD7048       484  STCOP:  CALL    FIRST
48E2  B7           485          ORA     A
48E3  C2F248       486          JNZ     CHAN1
                   487
48E6  7E           488  CHAN3:  MOV     A,M
48E7  C602         489          ADI     02
48E9  77           490          MOV     M,A
48EA  23           491          INX     H
48EB  23           492          INX     H
```

```
LOC    OBJ         SEQ              SOURCE STATEMENT

48EC   23          493              INX     H
48ED   7E          494              MOV     A,M
48EE   C602        495              ADI     02
48F0   77          496              MOV     M,A
48F1   C9          497              RET             ;          RETURN
48F2   CD7E48      498   CHAN1:     CALL    LAST
48F5   23          499              INX     H
48F6   23          500              INX     H
48F7   23          501              INX     H
48F8   B7          502              ORA     A
48F9   C2FF48      503              JNZ     CHAN2
48FC   C3E648      504              JMP     CHAN3
                   505
48FF   7E          506   CHAN2:     MOV     A,M
4900   C604        507              ADI     04
4902   77          508              MOV     M,A
4903   C9          509              RET             ;          RETURN
                   510
                   511
                   512   ; **********        **********
                   513
                   514   ; PEAK SUBR.
                   515   ; CHECK IF PEAK CONDITIONS
                   516   ; ARE MET:
                   517   ;       BETWEEN ZEROS
                   518   ;       TIME DURATION = OR < DELT1
                   519
4904   23          520   PEAK:      INX     H
4905   7E          521              MOV     A,M
4906   B7          522              ORA     A
4907   C0          523              RNZ             ;          RETURN
4908   EB          524              XCHG
4909   23          525              INX     H
490A   56          526              MOV     D,M
490B   23          527              INX     H
490C   5E          528              MOV     E,M
490D   2A1B7E      529              LHLD    ENZ
4910   CD880F      530              CALL    SBHDD   ; DE (SM+1 VAL) - HL (ENZ) =
                   531                              ; DE (PEAK TIME)
4913   7A          532              MOV     A,D
4914   B7          533              ORA     A
4915   C0          534              RNZ             ;          RETURN
4916   7B          535              MOV     A,E
4917   FE20        536              CPI     32
4919   D0          537              RNC             ;          RETURN
491A   2A057E      538              LHLD    CHNA
491D   3AB17E      539              LDA     NINT
4920   5F          540              MOV     E,A
4921   83          541              ADD     E
4922   83          542              ADD     E
4923   5F          543              MOV     E,A
4924   AF          544              XRA     A
4925   57          545              MOV     D,A
4926   19          546              DAD     D
4927   C3DF48      547              JMP     STCOP
```

ISIS-II 8080/8085 MACRO ASSEMBLER, V2.0　　　　　MODULE　PAGE　11

```
LOC   OBJ      SEQ        SOURCE STATEMENT 548
               549  ; ********    ********
               550
               551        ; TOTS SUBR.
               552
492A  0604     553  TOTS:  MVI    B,4              ; 4 FEATURE TYPES
492C  21B379   554         LXI    H,FEATI+2*3      ; DESTINATION    HI BYTE
492F  EB       555         XCHG
4930  21BF79   556         LXI    H,FEATI+6*3      ; SOURCE         HI BYTE
4933  C5       557  TOT3:  PUSH   B
4934  3AB17E   558         LDA    NINT
4937  47       559         MOV    B,A
4938  AF       560         XRA    A
4939  321D7E   561         STA    TEMP
493C  23       562  TOT2:  INX    H                ; SOURCE         LO BYTE
493D  86       563         ADD    M
493E  D24A49   564         JNC    TOT5
4941  F5       565         PUSH   PSW
4942  3A1D7E   566         LDA    TEMP
4945  3C       567         INR    A
4946  321D7E   568         STA    TEMP
4949  F1       569         POP    PSW
               570  TOT5:
494A  23       571         INX    H                ; SOURCE         EX BYTE
494B  4F       572         MOV    C,A              ; SAVE SUM
494C  F1       573         POP    PSW
494D  F5       574         PUSH   PSW
494E  CDA449   575         CALL   STMM
4951  79       576         MOV    A,C              ; RESTORE SUM
4952  23       577         INX    H                ; SOURCE         HI BYTE
4953  05       578         DCR    B
4954  C23C49   579         JNZ    TOT2             ; ^
               580
4957  EB       581  TOT1:  XCHG
4958  F5       582         PUSH   PSW
4959  3A1D7E   583         LDA    TEMP
495C  77       584         MOV    M,A
495D  F1       585         POP    PSW
495E  23       586         INX    H                ; DESTINATION    LO BYTE
495F  77       587         MOV    M,A
4960  23       588         INX    H                ; DESTINATION    EX BYTE
4961  F1       589         POP    PSW
4962  F5       590         PUSH   PSW
4963  CDA449   591         CALL   STMM
4966  23       592         INX    H                ; DESTINATION    HI BYTE
4967  C1       593         POP    B
4968  05       594         DCR    B
4969  EB       595         XCHG
496A  C23349   596         JNZ    TOT3             ; ^
               597
496D  219372   598  AVRPR: LXI    H,TSUM+2         ; H BYTE
4970  5E       599         MOV    E,M
4971  AF       600         XRA    A
4972  57       601         MOV    D,A
4973  47       602         MOV    B,A
```

```
LOC   OBJ       SEQ         SOURCE STATEMENT 4974  0E10      603             MVI     C,16        ; DEC = (0) (H BYTE) (16)
4976  2A9172    604             LHLD    TSUM        ; L BYTE & M BYTE
                605                                 ; HLB = (M BYTE) (L BYTE) ( 0 )
4979  CD730F    606             CALL    SRDLH
497C  0601      607             MVI     B,01
497E  CDEE0F    608             CALL    SUM         ; HLB + DEC = HLB
4981  EB        609             XCHG
4982  2ABE62    610             LHLD    CNT
4985  0E00      611             MVI     C,0
4987  EB        612             XCHG
4988  D5        613             PUSH    D           ; CNT
4989  CDEB0F    614             CALL    DIVID       ; HLB (TOTAL SUM) / DEC (CNT) =
                615                                 ; DEB (P AVERAGE)
498C  48        616             MOV     C,B
498D  21B079    617             LXI     H,FEATI+3
4990  CDFA0F    618             CALL    DECTM
4993  D1        619     WRTM:   POP     D           ; CNT FROM STACK
4994  2ABC79    620             LHLD    FEATI+5*3   ; PL TIME
4997  7C        621             MOV     A,H
4998  65        622             MOV     H,L
4999  6F        623             MOV     L,A
499A  CD880F    624             CALL    SBHDD       ; DE ( CNT ) - HL ( PL TIME) =
                625                                 ; DE (WRITING TIME)
499D  21AD79    626             LXI     H,FEATI     ; TOTAL TIME
49A0  72        627             MOV     M,D
49A1  23        628             INX     H
49A2  73        629             MOV     M,E
49A3  C9        630             RET
                631
                632     ; **********    **********
                633
                634     ; STMM SUBROUTINE
                635
                636     STMM:                       ; FEATURE TYPE
49A4  FE03      637             CPI     3
49A6  F2B049    638             JP      STM2
49A9  FE02      639             CPI     2
49AB  C0        640             RNZ                 ; B = 1 ZERO TIME
49AC  3EFD      641             MVI     A,-3        ; B = 2 PEN LIFT
49AE  77        642             MOV     M,A
49AF  C9        643             RET
                644
49B0  3EFE      645     STM2:   MVI     A,-2        ; B = 3 OR 4
                646                                 ;      CHANGES & PEAKS
49B2  77        647             MOV     M,A
49B3  C9        648             RET
                649
                650
                651     ;                   DATA    AREA
                652
7E00            653             ORG     7E00H
                654
7E00  00        655     NPER:   DB      0
7E01  0000      656     SMA:    DW      0
7E03  0000      657     SMA1:   DW      0
```

ISIS-II 8080/8085 MACRO ASSEMBLER, V2.0    MODULE    PAGE  13

```
LOC   OBJ          SEQ           SOURCE STATEMENT

7E05  0000          658 CHNA:    DW      0
7E07  00            659 ZBETF:   DB      0
7E08  00            660 SMPPP:   DB      0
      0003          661 SMPPE:   DS      3
      0003          662 CMPSM:   DS      3
7E0F  00            663 PERT:    DB      0
7E10  00            664 UP:      DB      0
7E11  00            665 PKF:     DB      0
7E12  00            666 J1:      DB      0
7E13  00            667 J2:      DB      0
7E14  00            668 J3:      DB      0
7E15  0000          669 CMPI:    DW      0
7E17  0000          670 CMPIM:   DW      0
7E19  0000          671 STZ:     DW      0
7E1B  0000          672 ENZ:     DW      0
7E1D  00            673 TEMP:    DB      0
7E1E  00            674 TEMP1:   DB      0
7E1F  00            675 TEMP2:   DB      0
7E20  00            676 PZERF:   DB      0
7E21  00            677 OFF1:    DB      0
7E22  0000          678 KXA:     DW      0
                    679
                    680          END
```

ASSEMBLY COMPLETE, NO ERRORS

ASM80 :F1:VDUSBR. VP NUOBJECT NOSYMBOLS PRINT(:LP:)

ISIS-II 8080/8085 MACRO ASSEMBLER, V2.0    MODULE    PAGE    1

```
LOC   OBJ         SEQ         SOURCE STATEMENT
                   1  ; VERSION :03/13/78
                   2  ; VALID REFERENCE SIGNATURES.
                   3  ; PROGRAM BASED ON ...FIVE... SIGNATURES.
                   4
                   5  ;REFERENCED MEMORY LOCATIONS.....
                   6
767C               7  THR     EQU     767CH
7600               8  AVRG    EQU     7600H
7980               9  PARS    EQU     7980H
767F              10          NSF2    EQU     767FH
                  11
                  12  ; CONSTANTS
                  13
00BB              14  ACPTL   EQU     0BBH
007B              15  RJCTL   EQU     07BH
00E9              16  DISPL   EQU     0E9H
                  17
                  18  ; GLOBAL CONSTANTS
                  19
7EA2              20  MXMNE   EQU     7EA2H
7EB9              21  DATE    EQU     7EB9H
7EBF              22  ERRV    EQU     7EBFH
7ECE              23  VALFL   EQU     7ECEH
7ED9              24  LCW     EQU     7ED9H
7EDF              25  SVNAM   EQU     7EDFH
7EE6              26  NPAR    EQU     7EE6H
7EED              27  NVER    EQU     7EEDH
7EEE              28  CFFLG   EQU     7EEEH
                  29
                  30  ; S-FILE MEMORY AREA
                  31
62B0              32  SFMEM   EQU     62B0H
62BE              33  SCNT    EQU     SFMEM+0EH
                  34
                  35  ;REFERENCED SUBROUTINES......
                  36
0F97              37  CLRM    EQU     0F97H
0FFD              38  MTDEC   EQU     0FFDH
0FFA              39  DECTM   EQU     0FFAH
0FDC              40  CMPR    EQU     0FDCH
0FEE              41  SUM     EQU     0FEEH
0FE8              42  MLTPL   EQU     0FE8H
0FD9              43  NDVD    EQU     0FD9H
07CD              44  NEGDE   EQU     07CDH
07D3              45  NEGHL   EQU     07D3H
0FA3              46  TAB3    EQU     0FA3H
0FAC              47  TYSTR   EQU     0FACH
577D              48  PR1NO   EQU     577DH
5720              49  PRNEX   EQU     5720H
07D6              50  NGHL8   EQU     07D6H
0FB5              51  MOVE    EQU     0FB5H
                  52
```

ISIS-II 8080/8085 MACRO ASSEMBLER, V2.0     MODULE   PAGE   2

| LOC | OBJ | SEQ | | SOURCE STATEMENT | |
|---|---|---|---|---|---|
| | | 54 | | | |
| 5380 | 0605 | 55 | VALID: | MVI | B,05H |
| 5382 | 21CE7E | 56 | | LXI | H,VALFL |
| 5385 | CD970F | 57 | | CALL | CLRM |
| 5388 | 21A27E | 58 | | LXI | H,MXMNE |
| 538B | 22077E | 59 | | SHLD | MXNEA |
| 538E | 21027E | 60 | | LXI | H,MXMNI |
| 5391 | 22097E | 61 | | SHLD | MXNIA |
| 5394 | 0605 | 62 | | MVI | B,05H |
| 5396 | 21BF7E | 63 | LOOP1: | LXI | H,ERRV |
| 5399 | CDFD0F | 64 | | CALL | MTDEC |
| 539C | 22007E | 65 | | SHLD | ERRA |
| 539F | EB | 66 | | XCHG | |
| 53A0 | 220B7E | 67 | | SHLD | NBR1 |
| 53A3 | 79 | 68 | | MOV | A,C |
| 53A4 | 320D7E | 69 | | STA | NBR1+2 |
| 53A7 | 0E01 | 70 | | MVI | C,01H |
| 53A9 | 79 | 71 | | MOV | A,C |
| 53AA | 320E7E | 72 | | STA | INDX1 |
| 53AD | 0C | 73 | LOOP2: | INR | C |
| 53AE | 79 | 74 | | MOV | A,C |
| 53AF | 320F7E | 75 | | STA | INDX2 |
| 53B2 | C5 | 76 | | PUSH | B |
| 53B3 | 2A007E | 77 | | LHLD | ERRA |
| 53B6 | CDFD0F | 78 | | CALL | MTDEC |
| 53B9 | 22007E | 79 | | SHLD | ERRA |
| 53BC | 2A0B7E | 80 | | LHLD | NBR1 |
| 53BF | 3A0D7E | 81 | | LDA | NBR1+2 |
| 53C2 | 47 | 82 | | MOV | B,A |
| 53C3 | CDDC0F | 83 | | CALL | CMPR |
| 53C6 | 50 | 84 | | MOV | D,B |
| 53C7 | B7 | 85 | | ORA | A |
| 53C8 | C2D853 | 86 | | JNZ | CHK |
| 53CB | 220B7E | 87 | | SHLD | NBR1 |
| 53CE | 78 | 88 | | MOV | A,B |
| 53CF | 320D7E | 89 | | STA | NBR1+2 |
| 53D2 | 3A0F7E | 90 | | LDA | INDX2 |
| 53D5 | 320E7E | 91 | | STA | INDX1 |
| 53D8 | C1 | 92 | CHK: | POP | B |
| 53D9 | 79 | 93 | | MOV | A,C |
| 53DA | FE05 | 94 | | CPI | 05H |
| 53DC | C2AD53 | 95 | | JNZ | LOOP2 |
| 53DF | 4A | 96 | | MOV | C,D |
| 53E0 | EB | 97 | | XCHG | |
| 53E1 | 2A077E | 98 | | LHLD | MXNEA |
| 53E4 | CDFA0F | 99 | | CALL | DECTM |
| 53E7 | 22077E | 100 | | SHLD | MXNEA |
| 53EA | 3A0E7E | 101 | | LDA | INDX1 |
| 53ED | 2A097E | 102 | | LHLD | MXNIA |
| 53F0 | 77 | 103 | | MOV | M,A |
| 53F1 | 23 | 104 | | INX | H |
| 53F2 | 22097E | 105 | | SHLD | MXNIA |
| 53F5 | 4F | 106 | | MOV | C,A |
| 53F6 | 21BC7E | 107 | | LXI | H,ERRV-3 |

ISIS-II 8080/8085 MACRO ASSEMBLER, V2.0          MODULE   PAGE   3

| LOC | OBJ | SEQ | | SOURCE STATEMENT | |
|---|---|---|---|---|---|
| 53F9 | 110300 | 108 | | LXI | D,3 |
| 53FC | 19 | 109 | MXERV: | DAD | D |
| 53FD | 0D | 110 | | DCR | C |
| 53FE | C2FC53 | 111 | | JNZ | MXERV |
| 5401 | AF | 112 | | XRA | A |
| 5402 | 77 | 113 | | MOV | M,A |
| 5403 | 23 | 114 | | INX | H |
| 5404 | 77 | 115 | | MOV | M,A |
| 5405 | 05 | 116 | | DCR | B |
| 5406 | C29653 | 117 | | JNZ | LOOP1 |
| 5409 | 2AA87E | 118 | | LHLD | MXMNE+6 |
| 540C | 55 | 119 | | MOV | D,L |
| 540D | 5C | 120 | | MOV | E,H |
| 540E | 2AAA7E | 121 | | LHLD | MXMNE+8 |
| 5411 | 4D | 122 | | MOV | C,L |
| 5412 | 7C | 123 | | MOV | A,H |
| 5413 | 2AAC7E | 124 | | LHLD | MXMNE+0AH |
| 5416 | 44 | 125 | | MOV | B,H |
| 5417 | 67 | 126 | | MOV | H,A |
| 5418 | CDEE0F | 127 | | CALL | SUM |
| 541B | EB | 128 | | XCHG | |
| 541C | 48 | 129 | | MOV | C,B |
| 541D | 2AAE7E | 130 | | LHLD | MXMNE+0CH |
| 5420 | 7C | 131 | | MOV | A,H |
| 5421 | 65 | 132 | | MOV | H,L |
| 5422 | 6F | 133 | | MOV | L,A |
| 5423 | 3AB07E | 134 | | LDA | MXMNE+0EH |
| 5426 | 47 | 135 | | MOV | B,A |
| 5427 | CDEE0F | 136 | | CALL | SUM |
| 542A | E5 | 137 | | PUSH | H |
| 542B | 217D54 | 138 | | LXI | H,KVAL |
| 542E | CDFD0F | 139 | | CALL | MTDEC |
| 5431 | E1 | 140 | | POP | H |
| 5432 | CDE80F | 141 | | CALL | MLTPL |
| 5435 | 48 | 142 | | MOV | C,B |
| 5436 | CDCD07 | 143 | | CALL | NEGDE |
| 5439 | D5 | 144 | | PUSH | D |
| 543A | C5 | 145 | | PUSH | B |
| 543B | 2AA57E | 146 | | LHLD | MXMNE+3 |
| 543E | 7C | 147 | | MOV | A,H |
| 543F | 65 | 148 | | MOV | H,L |
| 5440 | 6F | 149 | | MOV | L,A |
| 5441 | 3AA77E | 150 | | LDA | MXMNE+5 |
| 5444 | 47 | 151 | | MOV | B,A |
| 5445 | CDEE0F | 152 | | CALL | SUM |
| 5448 | AF | 153 | | XRA | A |
| 5449 | 84 | 154 | | ADD | H |
| 544A | F26254 | 155 | | JP | END1 |
| 544D | C1 | 156 | | POP | B |
| 544E | D1 | 157 | | POP | D |
| 544F | 2AA27E | 158 | | LHLD | MXMNE |
| 5452 | 7C | 159 | | MOV | A,H |
| 5453 | 65 | 160 | | MOV | H,L |
| 5454 | 6F | 161 | | MOV | L,A |
| 5455 | 3AA47E | 162 | | LDA | MXMNE+2 |

ISIS-II 8080/8085 MACRO ASSEMBLER, V2.0　　　　　　MODULE　　PAGE　4

```
LOC   OBJ        SEQ           SOURCE STATEMENT 5458  47         163           MOV     B, A
5459  CDEE0F     164           CALL    SUM
545C  AF         165           XRA     A
545D  84         166           ADD     H
545E  F27054     167           JP      END2
5461  C9         168           RET
                 169
                 170
5462  C1         171 END1:     POP     B
5463  D1         172           POP     D
5464  3A037E     173           LDA     MXMNI+1
5467  21CD7E     174           LXI     H, VALFL-1
546A  5F         175           MOV     E, A
546B  1600       176           MVI     D, 0
546D  19         177           DAD     D
546E  3601       178           MVI     M, 01H
5470  3A027E     179 END2:     LDA     MXMNI
5473  21CD7E     180           LXI     H, VALFL-1
5476  5F         181           MOV     E, A
5477  1600       182           MVI     D, 0

547A  3601       184           MVI     M, 01H
547C  C9         185           RET
                 186
547D  5000       187 KVAL:     DW      0050H
547F  F2         188           DB      0F2H
                 189
                 190 ; ********** ********** ********** **********
                 191
                 192 ; DECISION SUBROUTINE
                 193
                 194
                 195 ; A=0   DO NOT UPDATE.
                 196 ; A. NE. 0   UPDATE. (ERROR. LE. 1/2 THRESHOLD
                 197 ;               IN A TYPICAL UPDATING CONDITION.)
5490             198           ORG     5490H
                 199
5490  21B97E     200 DCSN:     LXI     H, DATE
5493  11947A     201           LXI     D, DATE2
5496  0E04       202           MVI     C, 4
5498  CDB50F     203           CALL    MOVE
549B  3EAB       204           MVI     A, 0ABH
549D  329255     205           STA     TM        ; TM = 0  NO UPDATE
                 206                             ; TM = AB  UPDATE
                 207
54A0  CDA30F     208           CALL    TAB3
54A3  21BF7E     209           LXI     H, ERRV
54A6  CDFD0F     210           CALL    MTDEC
54A9  2A7C76     211           LHLD    THR
54AC  3A7E76     212           LDA     THR+2
54AF  47         213           MOV     B, A
54B0  E5         214           PUSH    H
54B1  C5         215           PUSH    B
54B2  D5         216           PUSH    D
54B3  C5         217           PUSH    B
```

ISIS-II 8080/8085 MACRO ASSEMBLER, V2.0       MODULE   PAGE   5

| LOC | OBJ | SEQ | | SOURCE | STATEMENT |
|---|---|---|---|---|---|
| 54B4 | D5 | 218 | | PUSH | D |
| 54B5 | C5 | 219 | | PUSH | B |
| 54B6 | E5 | 220 | | PUSH | H |
| 54B7 | C5 | 221 | | PUSH | B |
| 54B8 | CDD307 | 222 | | CALL | NEGHL |
| 54BB | CDEE0F | 223 | | CALL | SUM |
| 54BE | 7C | 224 | | MOV | A,H |
| 54BF | B7 | 225 | | ORA | A |
| 54C0 | F21455 | 226 | | JP | RJCT |
| 54C3 | 3EBB | 227 | ACPT: | MVI | A,ACPTL |
| 54C5 | D3E9 | 228 | | OUT | DISPL |
| 54C7 | 32D97E | 229 | | STA | LCW |
| 54CA | 21987A | 230 | | LXI | H,NCA |
| 54CD | 3AEE7E | 231 | | LDA | CFFLG |
| 54D0 | B7 | 232 | | ORA | A |
| 54D1 | CAD754 | 233 | | JZ | CACP |
| 54D4 | 219C7A | 234 | | LXI | H,NFA |
| 54D7 | 34 | 235 | CACP: | INR | M |
| 54D8 | C2DD54 | 236 | | JNZ | CORF1 |
| 54DB | 23 | 237 | | INX | H |
| 54DC | 34 | 238 | | INR | M |
| 54DD | C1 | 239 | CORF1: | POP | B |
| 54DE | 219355 | 240 | | LXI | H,KDCSN |
| 54E1 | CDFD0F | 241 | | CALL | MTDEC |
| 54E4 | E1 | 242 | | POP | H |
| 54E5 | CDE80F | 243 | | CALL | MLTPL |
| 54E8 | EB | 244 | | XCHG | |
| 54E9 | CDD307 | 245 | | CALL | NEGHL |
| 54EC | 78 | 246 | | MOV | A,B |
| 54ED | C1 | 247 | | POP | B |
| 54EE | D1 | 248 | | POP | D |
| 54EF | 47 | 249 | | MOV | B,A |
| 54F0 | CDEE0F | 250 | | CALL | SUM |
| 54F3 | 7C | 251 | | MOV | A,H |
| 54F4 | B7 | 252 | | ORA | A |
| 54F5 | 217A55 | 253 | | LXI | H,MSGAC |
| 54F8 | F23555 | 254 | | JP | NUPDT |
| 54FB | 21A07A | 255 | | LXI | H,CUP |
| 54FE | 3AEE7E | 256 | | LDA | CFFLG |
| 5501 | B7 | 257 | | ORA | A |
| 5502 | CA0855 | 258 | | JZ | CUPD |
| 5505 | 21A27A | 259 | | LXI | H,FUP |
| 5508 | 34 | 260 | CUPD: | INR | M |
| 5509 | C20E55 | 261 | | JNZ | CORF2 |
| 550C | 23 | 262 | | INX | H |
| 550D | 34 | 263 | | INR | M |
| 550E | 217A55 | 264 | CORF2: | LXI | H,MSGAC |
| 5511 | C33955 | 265 | | JMP | PRNT |
| 5514 | F1 | 266 | RJCT: | POP | PSW |
| 5515 | F1 | 267 | | POP | PSW |
| 5516 | F1 | 268 | | POP | PSW |
| 5517 | F1 | 269 | | POP | PSW |
| 5518 | 3E7B | 270 | | MVI | A,RJCTL |
| 551A | D3E9 | 271 | | OUT | DISPL |
| 551C | 32D97E | 272 | | STA | LCW |

ISIS-II 8080/8085 MACRO ASSEMBLER, V2.0                    MODULE    PAGE    6

| LOC | OBJ | SEQ | | SOURCE STATEMENT | | |
|---|---|---|---|---|---|---|
| 551F | 219A7A | 273 | | LXI | H,NCR | |
| 5522 | 3AEE7E | 274 | | LDA | CFFLG | |
| 5525 | B7 | 275 | | ORA | A | |
| 5526 | CA2C55 | 276 | | JZ | CRJC | |
| 5529 | 219E7A | 277 | | LXI | H,NFR | |
| 552C | 34 | 278 | CRJC: | INR | M | |
| 552D | C23255 | 279 | | JNZ | CORF3 | |
| 5530 | 23 | 280 | | INX | H | |
| 5531 | 34 | 281 | | INR | M | |
| 5532 | 218055 | 282 | CORF3: | LXI | H,MSGRJ | |
| 5535 | AF | 283 | NUPDT: | XRA | A | |
| 5536 | 329255 | 284 | | STA | TM | |
| 5539 | 0606 | 285 | PRNT: | MVI | B,06 | |
| 553B | CDAC0F | 286 | | CALL | TYSTR | |
| 553E | 0606 | 287 | | MVI | B,06 | |
| 5540 | 218655 | 288 | | LXI | H,MSGER | |
| 5543 | CDAC0F | 289 | | CALL | TYSTR | |
| 5546 | C1 | 290 | | POP | B | |
| 5547 | D1 | 291 | | POP | D | |
| 5548 | 79 | 292 | | MOV | A,C | |
| 5549 | CD7D57 | 293 | | CALL | PR1NO | |
| 554C | 0606 | 294 | | MVI | B,06 | |
| 554E | 218C55 | 295 | | LXI | H,MSGTH | |
| 5551 | CDAC0F | 296 | | CALL | TYSTR | |
| 5554 | F1 | 297 | | POP | PSW | ;PUSH B & POP PSW PUT B IN A. |
| 5555 | D1 | 298 | | POP | D | |
| 5556 | CD7D57 | 299 | | CALL | PR1NO | |
| 5559 | 2ABE62 | 300 | | LHLD | SCNT | |
| | | 301 | | | | |
| 555C | EB | 302 | DCSNC: | XCHG | | |
| 555D | CD2057 | 303 | | CALL | PRNEX | |
| 5560 | 21ED7E | 304 | | LXI | H,NVER | |
| 5563 | 5E | 305 | | MOV | E,M | |
| 5564 | 1C | 306 | | INR | E | |
| 5565 | 73 | 307 | | MOV | M,E | |
| 5566 | 1600 | 308 | | MVI | D,00H | |
| 5568 | CD2057 | 309 | | CALL | PRNEX | |
| 556B | CDA30F | 310 | | CALL | TAB3 | |
| 556E | 0603 | 311 | PRX: | MVI | B,03H | |
| 5570 | 21DF7E | 312 | | LXI | H,SVNAM | |
| 5573 | CDAC0F | 313 | | CALL | TYSTR | |
| 5576 | 3A9255 | 314 | | LDA | TM | |
| 5579 | C9 | 315 | | RET | | |
| | | 316 | | | | |
| 557A | 41434345 | 317 | MSGAC: | DB | 'ACCEPT' | |
| 557E | 5054 | | | | | |
| | | 318 | | | | |
| 5580 | 2A52454A | 319 | MSGRJ: | DB | '*REJCT' | |
| 5584 | 4354 | | | | | |
| | | 320 | | | | |
| 5586 | 20204552 | 321 | MSGER: | DB | '  ERR=' | |
| 558A | 523D | | | | | |
| | | 322 | | | | |
| 558C | 20205448 | 323 | MSGTH: | DB | '  THD=' | |
| 5590 | 443D | | | | | |

```
ISIS-II 8080/8085 MACRO ASSEMBLER, V2.0          MODULE   PAGE   7

LOC   OBJ          SEQ            SOURCE STATEMENT 324
5592  00           325  TM:     DB      00
5593  4000         326  KDCSN:  DW      0040H
5595  F1           327          DB      0F1H
                   328
                   329
                   330
                   331  ; ********** ********** ********** **********
                   332
                   333  ; SUBROUTINE UPDATE
                   334
55B0               335          ORG     55B0H
                   336
                   337
                   338
                   339  ; P K,J (NEW) BAR = (1/L+1)*(L*P K,J BAR (OLD) + PJ)
                   340
                   341  ; Q K,J (NEW) = (L/L+1)* Q K,J (OLD) + (1/L)*(P K,J(NE
                   342
55B0  210076       343  UPDTP:  LXI     H,AVRG
55B3  22107E       344          SHLD    SAVGA
55B6  3AE67E       345          LDA     NPAR
55B9  32197E       346          STA     CNT1
55BC  321A7E       347          STA     CNT2
55BF  47           348          MOV     B,A
55C0  80           349          ADD     B
55C1  80           350          ADD     B
55C2  3D           351          DCR     A
55C3  118000       352          LXI     D,80H
55C6  19           353          DAD     D
55C7  5F           354          MOV     E,A
55C8  19           355          DAD     D       ; END OF VARS
55C9  22127E       356          SHLD    SVARA
55CC  218079       357          LXI     H,PARS
55CF  22147E       358          SHLD    SPARA
55D2  2A107E       359  NWAVG:  LHLD    SAVGA
55D5  CDFD0F       360          CALL    MTDEC
55D8  22107E       361          SHLD    SAVGA
55DB  3A7F76       362          LDA     NSF2
55DE  6F           363          MOV     L,A
55DF  2600         364          MVI     H,00H
55E1  0600         365          MVI     B,00H
55E3  CDE80F       366          CALL    MLTPL
55E6  EB           367          XCHG
55E7  E5           368          PUSH    H
55E8  2A147E       369          LHLD    SPARA
55EB  CDFD0F       370          CALL    MTDEC
55EE  22147E       371          SHLD    SPARA
55F1  E1           372          POP     H
55F2  CDEE0F       373          CALL    SUM
55F5  3A7F76       374          LDA     NSF2
55F8  3C           375          INR     A
55F9  CDD90F       376          CALL    NDVD
55FC  2A107E       377          LHLD    SAVGA
55FF  2B           378          DCX     H
```

ISIS-II 8080/8085 MACRO ASSEMBLER, V2.0          MODULE    PAGE    8

| LOC | OBJ | SEQ | | SOURCE | STATEMENT |
|---|---|---|---|---|---|
| 5600 | 70 | 379 | | MOV | M,B |
| 5601 | 2B | 380 | | DCX | H |
| 5602 | 73 | 381 | | MOV | M,E |
| 5603 | 2B | 382 | | DCX | H |
| 5604 | 72 | 383 | | MOV | M,D |
| 5605 | 21197E | 384 | | LXI | H,CNT1 |
| 5608 | 35 | 385 | | DCR | M |
| 5609 | C2D255 | 386 | | JNZ | NWAVG |
| 560C | 2A107E | 387 | NWVAR: | LHLD | SAVGA |
| 560F | 2B | 388 | | DCX | H |
| 5610 | 46 | 389 | | MOV | B,M |
| 5611 | 2B | 390 | | DCX | H |
| 5612 | 5E | 391 | | MOV | E,M |
| 5613 | 2B | 392 | | DCX | H |
| 5614 | 56 | 393 | | MOV | D,M |
| 5615 | 22107E | 394 | | SHLD | SAVGA |
| 561B | 2B | 396 | | DCX | H |
| 561C | D5 | 397 | | PUSH | D |
| 561D | 4E | 398 | | MOV | C,M |
| 561E | 2B | 399 | | DCX | H |
| 561F | 5E | 400 | | MOV | E,M |
| 5620 | 2B | 401 | | DCX | H |
| 5621 | 56 | 402 | | MOV | D,M |
| 5622 | 22147E | 403 | | SHLD | SPARA |
| 5625 | E1 | 404 | | POP | H |
| 5626 | CDD607 | 405 | | CALL | NGHL8 |
| 5629 | CDEE0F | 406 | | CALL | SUM |
| 562C | 54 | 407 | | MOV | D,H |
| 562D | 5D | 408 | | MOV | E,L |
| 562E | 48 | 409 | | MOV | C,B |
| 562F | CDE80F | 410 | | CALL | MLTPL |
| 5632 | EB | 411 | | XCHG | |
| 5633 | 3A7F76 | 412 | | LDA | NSF2 |
| 5636 | CDD90F | 413 | | CALL | NDVD |
| 5639 | EB | 414 | | XCHG | |
| 563A | 22167E | 415 | | SHLD | TMHL |
| 563D | 78 | 416 | | MOV | A,B |
| 563E | 32187E | 417 | | STA | TME |
| 5641 | 3A7F76 | 418 | | LDA | NSF2 |
| 5644 | 6F | 419 | | MOV | L,A |
| 5645 | 2600 | 420 | | MVI | H,0 |
| 5647 | 0600 | 421 | | MVI | B,0 |
| 5649 | 3C | 422 | | INR | A |
| 564A | CDD90F | 423 | | CALL | NDVD |
| 564D | D5 | 424 | | PUSH | D |
| 564E | 2A127E | 425 | | LHLD | SVARA |
| 5651 | 4E | 426 | | MOV | C,M |
| 5652 | 2B | 427 | | DCX | H |
| 5653 | 5E | 428 | | MOV | E,M |
| 5654 | 2B | 429 | | DCX | H |
| 5655 | 56 | 430 | | MOV | D,M |
| 5656 | 2B | 431 | | DCX | H |
| 5657 | 22127E | 432 | | SHLD | SVARA |
| 565A | E1 | 433 | | POP | H |

ISIS-II 8080/8085 MACRO ASSEMBLER, V2.0          MODULE    PAGE    9

```
LOC   OBJ         SEQ         SOURCE STATEMENT

565B  CDE80F      434             CALL    MLTPL
565E  48          435             MOV     C,B
565F  2A167E      436             LHLD    TMHL
5662  3A187E      437             LDA     TME
5665  47          438             MOV     B,A
5666  CDEE0F      439             CALL    SUM
5669  EB          440             XCHG
566A  2A127E      441             LHLD    SVARA
566D  23          442             INX     H
566E  48          443             MOV     C,B
566F  CDFA0F      444             CALL    DECTM 5675  35          446             DCR     M
5676  C20C56      447             JNZ     NWVAR
5679  C9          448             RET
                  449
                  450     ; SUMMARY AREA
                  451
7A90              452             ORG     7A90H
                  453
0004              454     DATE1:  DS      4
0004              455     DATE2:  DS      4
0002              456     NCA:    DS      2
0002              457     NCR:    DS      2
0002              458     NFA:    DS      2
0002              459     NFR:    DS      2
0002              460     CUP:    DS      2
0002              461     FUP:    DS      2
                  462
                  463     ; TEMPORARY STORAGE......
                  464
7E00              465             ORG     7E00H
7E00  0000        466     ERRA:   DW      0000
0005              467     MXMNI:  DS      05
7E07  0000        468     MXNEA:  DW      00
7E09  0000        469     MXNIA:  DW      00
0003              470     NBR1:   DS      3
7E0E  00          471     INDX1:  DB      0
7E0F  00          472     INDX2:  DB      0
7E10  0000        473     SAVGA:  DW      0000
7E12  0000        474     SVARA:  DW      0000
7E14  0000        475     SPARA:  DW      0000
7E16  0000        476     TMHL:   DW      0000
7E18  00          477     TME:    DB      00
7E19  00          478     CNT1:   DB      00
7E1A  00          479     CNT2:   DB      00
                  480
                  481
                  482
                  483
                  484             END
```

ASSEMBLY COMPLETE,   NO ERRORS

ASM80 :F1:ERROR.VP NOOBJECT NOSYMBOLS PRINT(:LP:)

ISIS-II 8080/8085 MACRO ASSEMBLER, V2.0                MODULE    PAGE    1

```
LOC   OBJ         SEQ           SOURCE STATEMENT

1   ; VERSION 03/13/78
                    2
                    3   ; SUBROUTINE TO COMPUTE ERROR FOR EACH SAMPLE SIGNATURE
                    4   ; NSM CONTAINS THE NUMBER OF SIGNATURES
                    5
                    6   ; J IS SIGNATURE NUMBER
                    7   ; I IS PARAMETER NUMBER
                    8
7EDE                9   NSM     EQU     7EDEH
767C               10   THR     EQU     767CH
7EBF               11   ERRV    EQU     7EBFH
7EE6               12   NPAR2   EQU     7EE6H
7600               13   AV      EQU     7600H
7680               14   STDV    EQU     7680H
7A00               15   MSK     EQU     7A00H
7700               16   PAR     EQU     7700H
767B               17   NSF1    EQU     767BH
767F               18   NSF2    EQU     767FH
                   19
                   20   ; SUBROUTINES CALLED
                   21
0FEE               22   SUM     EQU     0FEEH
0FE8               23   MLTPL   EQU     0FE8H
0FEB               24   DIVID   EQU     0FEBH
0FD9               25   NDVD    EQU     0FD9H
07D3               26   NEGT    EQU     07D3H
0FFD               27   MTDEC   EQU     0FFDH
0FFA               28   DECTM   EQU     0FFAH
                   29
                   30
                   31
                   32   ; ERR(J) = 1/NPAR3 * SUM (  ( PAR(I) - AVR(I) )**2 / ST
                   33   ;           FOR MSK(I) NOT 0
                   34
                   35   ; OR
                   36
                   37   ; ERR(J) = 0
                   38   ;           FOR MSK(I) = 0
                   39
                   40   ; SUM IS BETWEEN I=1 AND I=NPAR2
                   41
                   42   ; NPAR3 = SUM (MSK(I) ) NOT ZERO
                   43
                   44   ; NPAR2 = NO. OF PARAMETERS
                   45
                   46
                   47
5230               48           ORG     5230H
                   49
                   50
5230 3ADE7E        51   ERROR:  LDA     NSM
5233 F5            52           PUSH    PSW     ; STACK         NO OF SIGNAT'S
```

ISIS-II 8080/8085 MACRO ASSEMBLER, V2.0        MODULE   PAGE   2

```
LOC   OBJ        SEQ         SOURCE STATEMENT 5234  21BF7E      53           LXI    H,ERRV
5237  220F7E      54           SHLD   ERRA
523A  210077      55           LXI    H,PAR
                  56
523D  22047E      57  ERR3:    SHLD   PAAD
5240  22067E      58           SHLD   PAAD2
5243  3AE67E      59           LDA    NPAR2
5246  47          60           MOV    B,A
5247  C5          61           PUSH   B          ; STACK       NO OF PARAM'S
5248  210076      62           LXI    H,AV
524B  22007E      63           SHLD   AVAD
524E  218076      64           LXI    H,STDV
5251  22027E      65           SHLD   SDAD
5254  21007A      66           LXI    H,MSK
5257  22087E      67           SHLD   MSKAD
525A  210000      68           LXI    H,0000H
525D  220A7E      69           SHLD   PSUM
5260  AF          70           XRA    A
5261  320C7E      71           STA    PSUM+2     ; PART SUM EXP
5264  32117E      72           STA    NPAR3      ; NO. OF MASKS = 1
                  73
5267  2A087E      74  ERR1:    LHLD   MSKAD
526A  C1          75           POP    B          ; STACK       NO OF PARAM'S
526B  05          76           DCR    B
526C  FACA52      77           JM     ERR2
526F  C5          78           PUSH   B          ; STACK       NO OF PARAM'S
5270  7E          79           MOV    A,M
5271  B7          80           ORA    A
5272  CAC452      81           JZ     MSKX       ; MASK THIS PARAMETER
                  82
5275  21117E      83           LXI    H,NPAR3
5278  34          84           INR    M
5279  2A067E      85           LHLD   PAAD2      ; GET NEXT PARAM INTO DEC
527C  CDFD0F      86           CALL   MTDEC
527F  22067E      87           SHLD   PAAD2
5282  D5          88           PUSH   D
5283  79          89           MOV    A,C        ; PAR(I) INTO STACK, ACC
5284  2A007E      90           LHLD   AVAD       ; GET NEXT AVERAGE
                  91                             ; AVER(I)
5287  CDFD0F      92           CALL   MTDEC
528A  22007E      93           SHLD   AVAD
528D  EB          94           XCHG
528E  41          95           MOV    B,C
528F  4F          96           MOV    C,A
5290  CDD307      97           CALL   NEGT       ; IN HLB, OUT HLB
                  98                             ; MINUS AVER(I)
5293  D1          99           POP    D          ; PAR(I) INTO DEC
                  100
5294  CDEE0F      101          CALL   SUM        ; HLB + DEC = HLB
                  102                            ; PAR(I) + -AVER(I)
                  103
5297  54          104          MOV    D,H
5298  5D          105          MOV    E,L
5299  48          106          MOV    C,B
                  107
```

```
LOC   OBJ      SEQ            SOURCE STATEMENT

529A  CDE80F   108            CALL    MLTPL    ; HLB * DEC = DEB
               109                             ; ( PAR(I) - AVER(I) ) ** 2
529D  D5       110            PUSH    D        ; STACK
529E  2A027E   111            LHLD    SDAD     ; GET NEXT ST DV INTO DEC
               112                             ; STDV(I)
52A1  CDFD0F   113            CALL    MTDEC
52A4  22027E   114            SHLD    SDAD
52A7  E1       115            POP     H        ; STACK
52A8  CDEB0F   116            CALL    DIVID    ; HLB / DEC = DEB
               117                             ; ERR(I) = ( PAR(I) - AVER(I) )
52AB  D5       118            PUSH    D        ; ERR(I) IN STCK, B
52AC  210A7E   119            LXI     H,PSUM
52AF  CDFD0F   120            CALL    MTDEC
52B2  E1       121            POP     H
52B3  CDEE0F   122            CALL    SUM      ; HLB + DEC = HLB
52B6  EB       123            XCHG
52B7  48       124            MOV     C,B
52B8  210A7E   125            LXI     H,PSUM
52BB  CDFA0F   126            CALL    DECTM
52BE  CD0B53   127            CALL    INCMK
52C1  C36752   128            JMP     ERR1
               129                             ;
52C4  CDF052   130  MSKX:     CALL    INCAD
52C7  C36752   131            JMP     ERR1
               132                             ;
52CA  210A7E   133  ERR2:     LXI     H,PSUM   ; END OF SIGNATURE J
52CD  CDFD0F   134            CALL    MTDEC
52D0  EB       135            XCHG
52D1  41       136            MOV     B,C
52D2  3A117E   137            LDA     NPAR3
52D5  CDD90F   138            CALL    NDVD     ; HLB(PSUM) / ACC (NPAR3)
               139                             ; = DEC (ERR(J))
52D8  48       140            MOV     C,B
52D9  2A0F7E   141            LHLD    ERRA
52DC  CDFA0F   142            CALL    DECTM
52DF  220F7E   143            SHLD    ERRA
               144
52E2  C1       145            POP     B
52E3  05       146            DCR     B
52E4  C8       147            RZ               ; RETURN TO MAIN
52E5  C5       148            PUSH    B        ; STACK NO OF SIGNAT'S LEFT
52E6  118000   149            LXI     D,80H
52E9  2A047E   150            LHLD    PAAD
52EC  19       151            DAD     D
52ED  C33D52   152            JMP     ERR3     ; TO NEXT SIGNATURE
               153
               154
               155                             ; INCREMENT ADDRESSES OF
               156                             ; PARAM, ST DEV., AVER.,
               157                             ; AND MASK
52F0  2A067E   158  INCAD:    LHLD    PAAD2
52F3  23       159            INX     H
52F4  23       160            INX     H
52F5  23       161            INX     H
52F6  22067E   162            SHLD    PAAD2
```

```
LOC   OBJ          SEQ           SOURCE STATEMENT

52F9  2A007E       163           LHLD    AVAD
52FC  23           164           INX     H
52FD  23           165           INX     H
52FE  23           166           INX     H
52FF  22007E       167           SHLD    AVAD
5302  2A027E       168           LHLD    SDAD
5305  23           169           INX     H
5306  23           170           INX     H
5307  23           171           INX     H
5308  22027E       172           SHLD    SDAD
530B  2A087E       173  INCMK:   LHLD    MSKAD
530E  23           174           INX     H
530F  22087E       175           SHLD    MSKAD
5312  C9           176           RET
                   177
5330               178           ORG     5330H
                   179
                   180   ;*********************************************
                   181   ; THRESHOLD SUBROUINE
                   182   ;*********************************************
                   183
                   184
                   185   ; THRESH = KTHR * ( ERR1 + ERR2 + ERR3 )
                   186
                   187   ; THREE MIDDLE ERRORS
                   188
                   189
5330  21A57E       190  THRES:   LXI     H, MXMNE+3
5333  220F7E       191           SHLD    ERRA
5336  210000       192           LXI     H, 00
5339  0E03         193           MVI     C, 03
533B  AF           194           XRA     A
533C  C5           195  TH1:     PUSH    B
                   196                                   ; COUNT ERROR VALUES
533D  47           197           MOV     B, A
533E  E5           198           PUSH    H
533F  2A0F7E       199           LHLD    ERRA
5342  CDFD0F       200           CALL    MTDEC           ; ERR(I) IN DEC
5345  220F7E       201           SHLD    ERRA
5348  E1           202           POP     H
5349  CDEE0F       203           CALL    SUM             ; HLB + DEC =HLB
534C  78           204           MOV     A, B
534D  C1           205           POP     B
534E  0D           206           DCR     C
534F  C23C53       207           JNZ     TH1
5352  E5           208           PUSH    H
5353  216F53       209           LXI     H, KTHR
5356  CDFD0F       210           CALL    MTDEC
5359  E1           211           POP     H
535A  47           212           MOV     B, A
535B  CDE80F       213           CALL    MLTPL           ; HLB (SUM ERR(I) ) * DEC (KTHR)
                   214                                   ; = DEB (THR)
535E  EB           215           XCHG
535F  227C76       216           SHLD    THR
5362  78           217           MOV     A, B
```

ISIS-II 8080/8085 MACRO ASSEMBLER, V2.0          MODULE    PAGE    5

```
LOC   OBJ         SEQ            SOURCE STATEMENT 5363  327E76      218            STA     THR+2
5366  3E20        219            MVI     A,20H
5368  327B76      220            STA     NSF1
536B  327F76      221            STA     NSF2
536E  C9          222            RET
                  223
                  224                            ; PROG CONSTANTS
                  225
536F  4000        226  KTHR:     DW      0040H
5371  F2          227  KTEX:     DB      0F2H
                  228
                  229
7E00              230            ORG     7E00H   ; TEMP
                  231
7E00  0000        232  AVAD:     DW      00
7E02  0000        233  SDAD:     DW      00
7E04  0000        234  PAAD:     DW      00
7E06  0000        235  PAAD2:    DW      00
7E08  0000        236  MSKAD:    DW      00
7E0A  0000        237  PSUM:     DW      00
7E0C  00          238  PSEX:     DB      00
7E0D  00          239  AVLO:     DB      0
7E0E  00          240  AVEX:     DB      00
7E0F  0000        241  ERRA:     DW      00
7E11  00          242  NPAR3:    DB      00
                  243
7EA2              244            ORG     7EA2H   ; GLOBAL
                  245
000F              246  MXMNE:    DS      15
                  247
                  248            END
```

ASSEMBLY COMPLETE,    NO ERRORS

ASM80 :F1:AVERGS.VP NUOBJECT NOSYMBOLS PRINT(:LP:)

ISIS-II 8080/8085 MACRO ASSEMBLER, V2.0          MODULE   PAGE    1

```
   LOC  OBJ         SEQ            SOURCE STATEMENT

1 ; 07/12/77
                     2 ; AVGS. , VARIANCES , MODIFY VARS.
                     3
                     4
   50D0              5          ORG     50D0H
                     6
                     7 ; REFERENCED MEMORY LOCATIONS...
                     8
   7EDE              9 NSM      EQU     7EDEH   ; NO. SIGNATURES AVERAGED
   7600             10 RAVGS    EQU     7600H   ; REFERENCE AVERAGES
   7680             11 RSTDS    EQU     7680H   ; REFERENCE STANDARD DEVIATIONS
   7700             12 RVECT    EQU     7700H   ; REFERENCE VECTORS STARTING ADR
   7EE6             13 NPAR     EQU     7EE6H   ; NO. PARAMETERS
   7A30             14 AVX      EQU     7A30H
   7A60             15 KJ       EQU     7A60H
                    16
                    17
                    18 ; REFERENCED SUBROUTINES...
                    19
   0FEB             20 DIVID    EQU     0FEBH   ; DIVIDE SUBROUTINE
   02A0             21 HILO     EQU     02A0H
   0FA6             22 SHFTL    EQU     0FA6H
   07CD             23 NEGDE    EQU     07CDH   ; FORM 2'S COMP. IN D & E
   07D3             24 NEGHL    EQU     07D3H
   0FE8             25 MLTPL    EQU     0FE8H   ; SOFTWARE MULTIPLY SBR
   0FEE             26 SUM      EQU     0FEEH   ; SUM SUBROUTINE
   0FFA             27 DECTM    EQU     0FFAH
   0FFD             28 MTDEC    EQU     0FFDH
                    29
                    30 ; CONSTANTS USED...
                    31
   007D             32 GAP      EQU     80H-3   ; 80H IS GAP BET. TWO
                    33                          ;      SETS OF PARAMETERS.
                    34
                    35
   50D0 3AE67E      36 AVRGS:   LDA     NPAR
   50D3 32127E      37          STA     COUNT
   50D6 210077      38          LXI     H,RVECT ; POINT TO FIRST SIGN. VECTOR
   50D9 22007E      39          SHLD    ALOC    ;
   50DC 220A7E      40          SHLD    BLOC    ;
   50DF 210076      41          LXI     H,RAVGS ; POINT TO REFERENCE AVERAGES
   50E2 22027E      42          SHLD    CLOC
   50E5 218076      43          LXI     H,RSTDS ; POINT TO REF. STANDARD DEV.
   50E8 220C7E      44          SHLD    DLOC
   50EB 21307A      45          LXI     H,AVX
   50EE 22137E      46          SHLD    AVXA
   50F1 21607A      47          LXI     H,KJ
   50F4 22157E      48          SHLD    KJA
   50F7 210000      49 NXTPR:   LXI     H,0000  ; CLEAR HL
   50FA 22047E      50          SHLD    XLOC    ;
   50FD 220E7E      51          SHLD    XSQ     ;
   5100 3ADE7E      52          LDA     NSM     ; GET NO. SIGNATURES
```

ISIS-II 8080/8085 MACRO ASSEMBLER, V2.0   MODULE   PAGE   2

| LOC | OBJ | SEQ | | SOURCE STATEMENT | | |
|---|---|---|---|---|---|---|
| 5103 | 32117E | 53 | | STA | N1 | ; PUT IN WORKING LOCATION |
| 5106 | 2A007E | 54 | SSQMX: | LHLD | ALOC | ; SUM, SQUARE & MAXIMUM. |
| 5109 | CDFD0F | 55 | | CALL | MTDEC | |
| 510C | C5 | 56 | | PUSH | B | ; |
| 510D | D5 | 57 | | PUSH | D | ; |
| 510E | 117D00 | 58 | | LXI | D, GAP | ; |
| 5111 | 19 | 59 | | DAD | D | ; |
| 5112 | 22007E | 60 | | SHLD | ALOC | ; |
| 5115 | D1 | 61 | | POP | D | ; |
| 5116 | D5 | 62 | | PUSH | D | ; |
| 5117 | 2A047E | 63 | | LHLD | XLOC | ; |
| 511A | 3A067E | 64 | | LDA | XELOC | ; |
| 511D | 47 | 65 | | MOV | B, A | ; |
| 511E | CDEE0F | 66 | | CALL | SUM | ; HLB (XLOC) + DEC (PARI) = |
| | | 67 | | | | ; HLB (XLOC) |
| | | 68 | | | | |
| 5124 | 78 | 70 | | MOV | A, B | ; |
| 5125 | 32067E | 71 | | STA | XELOC | ; |
| 5128 | D1 | 72 | | POP | D | ; |
| 5129 | C1 | 73 | | POP | B | ; |
| 512A | 62 | 74 | | MOV | H, D | ; |
| 512B | 6B | 75 | | MOV | L, E | ; |
| 512C | 41 | 76 | | MOV | B, C | ; |
| 512D | CDE80F | 77 | | CALL | MLTPL | ; HLB (PARI) * DEC (PARI) = |
| | | 78 | | | | ; DEB (PARI**2) |
| | | 79 | | | | |
| 5130 | 48 | 80 | | MOV | C, B | ; |
| 5131 | 2A0E7E | 81 | | LHLD | XSQ | ; |
| 5134 | 3A107E | 82 | | LDA | XSQE | ; |
| 5137 | 47 | 83 | | MOV | B, A | ; |
| 5138 | CDEE0F | 84 | | CALL | SUM | ; HLB (XSQ) + DEC (PARI**2) = |
| | | 85 | | | | ; HLB (XSQ) |
| | | 86 | | | | |
| 513B | 220E7E | 87 | | SHLD | XSQ | ; |
| 513E | 78 | 88 | | MOV | A, B | ; |
| 513F | 32107E | 89 | | STA | XSQE | ; |
| 5142 | 21117E | 90 | | LXI | H, N1 | |
| 5145 | 35 | 91 | | DCR | M | |
| 5146 | C20651 | 92 | | JNZ | SSQMX | ; |
| 5149 | 3A067E | 93 | | LDA | XELOC | |
| 514C | 47 | 94 | | MOV | B, A | |
| 514D | 2A047E | 95 | | LHLD | XLOC | ; |
| 5150 | 3ADE7E | 96 | | LDA | NSM | |
| 5153 | CD1052 | 97 | | CALL | NDVD | ; HLB (XLOC) / A (NSM) = |
| | | 98 | | | | ; DEB ( AVRG. ) |
| | | 99 | | | | |
| 5156 | D5 | 100 | | PUSH | D | ; SAVE AV |
| 5157 | C5 | 101 | | PUSH | B | |
| 5158 | 48 | 102 | | MOV | C, B | |
| 5159 | 2A027E | 103 | | LHLD | CLOC | ; |
| 515C | CDFA0F | 104 | | CALL | DECTM | ; |
| 515F | 22027E | 105 | | SHLD | CLOC | ; |
| 5162 | 62 | 106 | | MOV | H, D | ; |
| 5163 | 6B | 107 | | MOV | L, E | ; |

ISIS-II 8080/8085 MACRO ASSEMBLER, V2.0                MODULE   PAGE    3

LOC   OBJ          SEQ           SOURCE STATEMENT

5164  CDE80F       108           CALL    MLTPL   ; HLB (AVRG) * DEC (AVRG) =
                   109                           ; DEB (AVRG**2)
                   110
5167  21097E       111           LXI     H,XAV2E ;
516A  70           112           MOV     M,B     ;
516B  2B           113           DCX     H       ;
516C  72           114           MOV     M,D     ;
516D  2B           115           DCX     H       ;
516E  73           116           MOV     M,E     ;
516F  3A107E       117           LDA     XSQE    ;

5173  2A0E7E       119           LHLD    XSQ     ;
5176  3ADE7E       120           LDA     NSM     ;
5179  CD1052       121           CALL    NDVD    ; HLB (XSQ) / A (NSM) =
                   122                           ; DEB (XSQ/NSM)
517C  2A077E       123           LHLD    XAV2    ;
517F  EB           124           XCHG
5180  CDCD07       125           CALL    NEGDE   ; DE (AVRG2) = DE ( -AVRG2 )
5183  3A097E       126           LDA     XAV2E
5186  4F           127           MOV     C,A
5187  CDEE0F       128           CALL    SUM     ; HLB ( XSQ/NSM ) - DEC (AVRG**2
                   129                           ; HLB ( VARIANCE )
                   130
                   131
518A  78           132  MOVAR:   MOV     A,B     ; START OF MODIFICATION FOR THIS
                   133                           ; VARIANCE AS FUNCTION
                   134                           ; OF AV, AVX, KJ AND SD VECTORS
                   135
518B  C1           136           POP     B       ; AVRG.
518C  D1           137           POP     D
518D  E5           138           PUSH    H       ; SAVE VARIANCE
518E  F5           139           PUSH    PSW
518F  48           140           MOV     C,B
5190  2A137E       141           LHLD    AVXA
5193  46           142           MOV     B,M
5194  23           143           INX     H
5195  22137E       144           SHLD    AVXA
5198  210040       145           LXI     H,4000H ; AVX IN HLB
                   146
519B  CDE051       147           CALL    CMPR    ; HLB (AVX) : DEC (AV) =
                   148                           ; HLB (AV + AVX) LARGER
                   149
519E  E5           150           PUSH    H
519F  D1           151           POP     D
51A0  48           152           MOV     C,B
                   153
51A1  CDE80F       154           CALL    MLTPL   ; DEB = ( AV2 + AVX2 )
                   155
51A4  48           156           MOV     C,B
51A5  2A157E       157           LHLD    KJA
51A8  46           158           MOV     B,M
51A9  23           159           INX     H
51AA  22157E       160           SHLD    KJA
51AD  210040       161           LXI     H,4000H
                   162

```
SIS-II 8080/8085 MACRO ASSEMBLER, V2.0              MODULE    PAGE    4

LOC   OBJ      SEQ        SOURCE STATEMENT

51B0 CDE80F    163         CALL    MLTPL    ; DEB = ( K*(AV**2 + AVX**2) )
               164
51B3 78        165         MOV     A,B
51B4 C1        166         POP     B
51B5 E1        167         POP     H
51B6 4F        168         MOV     C,A
               169
51B7 CDE051    170         CALL    CMPR     ; HLB ( VARI ) : DEC ( K*(AV2+AV
               171                          ; HLB (LARGER)
               172
51BA EB        173 ENDMOD: XCHG             ; END OF VARIANCE MODIFICATION
               174
51BB 48        175         MOV     C,B
51BC 2A0C7E    176         LHLD    DLOC     ;
51BF CDFA0F    177         CALL    DECTM    ;
51C2 220C7E    178         SHLD    DLOC     ;
51C5 2A0A7E    179         LHLD    BLOC     ;
51C8 23        180         INX     H
51C9 23        181         INX     H
51CA 23        182         INX     H
51CB 22007E    183         SHLD    ALOC     ;
51CE 220A7E    184         SHLD    BLOC     ;
51D1 21127E    185         LXI     H,COUNT
51D4 35        186         DCR     M
51D5 C2F750    187         JNZ     NXTPR    ; NO, CONTINUE
51D8 C9        188         RET              ; YES, RETURN
               189
               190 ;****************************************************
               191 ; COMPARE SUBROUTINE
               192 ;****************************************************
               193
               194
51E0           195         ORG     51E0H
               196
51E0 CDA60F    197 CMPR:   CALL    SHFTL    ; SHIFT LEFT HLB
51E3 EB        198         XCHG
51E4 C5        199         PUSH    B
51E5 41        200         MOV     B,C
51E6 CDA60F    201         CALL    SHFTL    ; SHIFT HLB (WAS DEC) LEFT
51E9 EB        202         XCHG
51EA 78        203         MOV     A,B
51EB C1        204         POP     B
51EC 4F        205         MOV     C,A
               206
51ED 7C        207 CMPRB:  MOV     A,H      ; SDI   IN    HLB
51EE B5        208         ORA     L        ; AVI2  IN    DEC
51EF CAFF51    209         JZ      C1
51F2 7A        210         MOV     A,D
51F3 B3        211         ORA     E
51F4 CA0A52    212         JZ      C3
51F7 79        213         MOV     A,C
51F8 90        214         SUB     B
51F9 CA0452    215         JZ      C2
51FC FA0A52    216         JM      C3
               217
```

ISIS-II 8080/8085 MACRO ASSEMBLER, V2.0                MODULE   PAGE   5

```
LOC   OBJ         SEQ           SOURCE STATEMENT

51FF  D5          218 C1:       PUSH    D
5200  E1          219           POP     H
5201  41          220           MOV     B,C
5202  AF          221           XRA     A
5203  C9          222           RET
                  223
5204  CDA002      224 C2:       CALL    HILO
5207  D2FF51      225           JNC     C1
                  226
520A  3EFF        227 C3:       MVI     A,0FFH
                  228
520C  C9          229           RET
                  230
5210              231           ORG     5210H
                  232
                  233 ; ***************************************************
                  234 ; NVDV SUBROUTINE
                  235 ; ***************************************************
                  236
                  237 ; INPUTS
                  238
                  239 ;     A       DENOMINATOR
                  240 ; OUTPUT
                  241 ;     DEB     RESULT
                  242
5210  5F          243 NDVD:     MOV     E,A
5211  AF          244           XRA     A
5212  57          245           MOV     D,A
5213  4F          246           MOV     C,A
5214  CDEB0F      247           CALL    DIVID
5217  C9          248           RET
                  249
                  250
7E00              251           ORG     7E00H
                  252
                  253 ; DEFINITION OF STORAGE AREAS...
                  254
7E00  0000        255 ALOC:     DW      00      ;
7E02  0000        256 CLOC:     DW      00      ;
7E04  0000        257 XLOC:     DW      00      ;
7E06  00          258 XELOC:    DB      00      ;
7E07  0000        259 XAV2:     DW      00      ;
7E09  00          260 XAV2E:    DB      00      ;
7E0A  0000        261 BLOC:     DW      00      ;
7E0C  0000        262 DLOC:     DW      00      ;
7E0E  0000        263 XSQ:      DW      00      ;
7E10  00          264 XSQE:     DB      00      ;
7E11  00          265 N1:       DB      00      ;
7E12  00          266 COUNT:    DB      00
7E13  0000        267 AVXA:     DW      0
7E15  0000        268 KJA:      DW      0
                  269
                  270           END
```

ASSEMBLY COMPLETE, NO ERRORS

What is claimed is:

1. A method for verifying the identity of a person from samples of handwriting comprising the steps of
   A. converting forces generated from writing a signature by the person whose signature is to be verified to an electrical signal representative thereof;
   B. generating a digital representation of said signal;
   C. deriving an information vector from the digital representation of the signature of the person whose identity is to be verified;
   D. providing identification indicia assigned to the person whose signature is to be verified;
   E. comparing said information vector with a unique reference vector associated with said identification indicia provided for said person to derive an error value representing the variance between the two vectors;
   F. comparing said derived error value with a unique threshold value associated with the identification indicia provided for said person; and
   G. providing indication of acceptance if the derived error value is less than the unique threshold value and providing indication of rejection if the derived error value is greater than the unique threshold value.

2. The method of claim 1, also including the step of updating the reference vector if the handwriting sample being tested is accepted, by utilizing said accepted information vector to derive a new reference vector.

3. A method for verifying the identity of the writer of a signature by comparing a signal generated from the writing of said signature with a known reference value, comprising
   A. providing identification indicia to select a reference vector and a threshold value which have been predetermined for the person whose identity is to be verified;
   B. converting forces generated from writing a signature by the person whose identity is to be verified to an electrical signal representative thereof;
   C. generating a digital representation of said signal;
   D. deriving a signature vector from said digital representation;
   E. determining the amount of deviation between said signature vector and the reference vector;
   F. comparing the amount of deviation with the threshold value; and
   G. indicating verification of identity if the amount of deviation is less than the threshold value and rejection of identity if the amount of deviation is greater than the threshold value.

4. The method of claim 3, also including the step of updating the reference vector if verification of identity is indicated, by utilizing said accepted information vector to derive a new reference vector.

5. A method for verifying the identity of the writer of handwritten information by comparing a signal generated from the writing of said information with a known reference value, comprising
   generating a digital representation of said signal;
   deriving an information vector from said digital representation including deriving a plurality of Haar coefficients;
   comparing said information vector derived from said handwritten information with information derived from previous handwriting samples of the person whose identity is to be verified to determine whether or not the identity of the writer is verified; and
   updating the information derived from previous handwriting samples if the identity of the writer is verified, by utilizing said information vector to revise the information derived from previous handwriting samples.

6. The method of claim 5 in which the step of deriving an information vector from the digital representation includes deriving a plurality of physical features in addition to the plurality of Haar coefficients.

7. The method of claim 6 in which said plurality of physical features includes a first group of features representative of the digital representation as a whole and a second group of features representative of each of a plurality of portions of said digital representation.

8. The method of claim 5 in which the comparing step includes determining whether the amount of deviation between the information vector for the writing of the person whose identity is being tested and the reference information vector exceeds a predetermined permissible amount.

9. The method of claim 5 in which the comparing step includes first determining the amount of deviation between said information vector and a reference vector, and also then comparing said amount of deviation with a predetermined deviation amount unique to said person.

10. A method for deriving an information vector for verifying the identity of a person from a handwriting sample, comprising the steps of
    A. deriving an analog electrical signal from forces measured during the writing of the sample;
    B. digitizing said analog signal;
    C. compressing the digitized signal;
    D. extracting Haar coefficients and directly observable features from the compressed digital signal; and
    E. deriving an information vector from said Haar coefficients and said directly observable features.

11. The method of claim 10 in which the directly observable features include a first group of features representative of the compressed digital signal as a whole and a second group of features representative of each of a plurality of portions of said compressed digital signal.

12. The method of claim 10 in which the compressing step includes time-normalizing the signal to minimize the effect of those signal levels resulting from pen lift segments included in the act of providing the handwriting sample.

13. A machine-implemented method for deriving a standard for verifying the identity of a person from handwritten signatures, comprising the steps of
    A. providing a plurality of handwriting samples of the same informational content of a person for whom a reference information vector is desired;
    B. providing an electrical signal representative of each of said plurality of handwriting samples;
    C. deriving an individual signature vector from each one of said plurality of electrical signals;
    D. storing said signature vector;
    E. computing an average vector from said plurality of individual signature vectors;
    F. computing an individual error value for each signature vector based on a comparison of each signature vector with the average vector;

G. computing an average error value using at least some of said individual error values;

H. computing an acceptance error value based upon said average error value;

I. comparing said individual error values with said acceptance error value;

J. discarding any individual signature vector having an error value in excess of the acceptance error value;

K. providing additional handwriting samples for deriving additional individual signature vectors to replace those discarded;

L. computing individual error values for said additional individual signature vectors;

M. comparing said additional individual error values with said acceptance error value and repeating steps A to J inclusive until a predetermined number of acceptable individual signature vectors have been obtained;

N. computing a revised average signature vector from the acceptable individual signature vectors;

O. computing revised individual signature error values for each acceptable individual signature vector based on a comparison of each revised individual signature vector with the revised average signature vector;

P. computing a threshold value based upon the revised individual error values;

Q. computing a normalizing vector assigning different weights to different aspects of the revised average information vector in accordance with the degrees of consistency of said different aspects in the various individual signature vectors;

R. computing a reference vector based upon the revised average signature vector and the normalizing vector; and S. maintaining the threshold value and the reference vector to be utilized jointly as a standard for use in evaluating a vector derived from a handwritten signature of a person whose identity is to be verified.

14. The method of claim 13 in which step C includes the steps of

C1. digitizing said electrical signal;
C2. compressing the digital signal;
C3. time-normalizing the compressed digital signal;
C4. extracting Haar coefficients and directly observable features from the compressed and time-normalized digital signal; and
C5. deriving an individual signature vector from said Haar coefficients and said directly observable features.

15. A machine-implemented method for deriving a standard for verifying the identity of a person from samples of handwriting, comprrising the steps of A. providing a plurality of handwriting samples of the same informational content of a person for whom a reference information vector is desired;

B. providing an electrical signal representative of each of said plurality of handwriting samples;

C. deriving an individual information vector from each one of said plurality of electrical signals;

D. computing an average information vector from said plurality of individual information vectors;

E. computing individual error values and an average error value indicative of deviation of said individual information vectors from said avverage information vector;

F. computing an acceptance error value based upon said average error value;

G. discarding any individual information vector having an error value in excess of the acceptance error value;

H. providing and testing additional individual information vectors until a predetermined number of acceptable individual information vectors have been obtained;

I. computing a revised average information vector and revised individual error values from the acceptable individual information vectors;

J. computing a threshold value based upon the revised individual error values;

K. computing a normalizing vector which assigns different weights to different aspects of the revised average information vector;

L. computing a reference vector based upon the revised average information vector and the normalizing vector; and M. providing a verification standard comprising the threshold value and the reference value to be used jointly in evaluating a vector derived from a handwriting sample of a person whose identity is to be verified.

16. The method of claim 15 in which step C includes the steps of

C1. digitizing said analog signal;
C2. compressing the digital signal;
C3. extracting Haar coefficients and directly observable features from the compressed digital signal; and
C4. deriving an individual information vector from said Haar coefficients and said directly observable features.

17. A machine-implemented method for deriving a standard for verifying the identity of a person from samples of handwriting, comprising the steps of A. providing a plurality of handwriting samples of the same information content of a person for whom a reference information vector is desired;

B. providing an electrical signal representative of each of said plurality of handwriting samples;

C. deriving an individual information vector from each one of said plurality of electrical signals;

D. computing an average information vector from said plurality of individual information vectors;

E. computing individual error values and an average error value indicative of deviation of said individual information vectors from said average information vector;

F. computing an acceptance error value based upon said average error value;

G. computing a threshold value based upon the individual error values;

H. computing a normalizing vector which assigns different weights to different aspects of the average information vector;

I. computing a reference vector based upon the average information vector and the normalizing vector; and J. providing a verification standard comprising the threshold value and the reference value to be used jointly in evaluating a vector derived from a handwriting sample of a person whose identity is to be verified.

18. Apparatus for verifying the identity of a writer of handwritten information by comparing a signal generated from the writing of said information with a known reference, comprising manually operable means for inputting identification indicia to select a unique reference vector and a unique threshold which have been predetermined for the person whose identity is to be verified;

pressure-responsive transducer means for converting forces generated from writing said information to an analog signal representative thereof;

analog-to-digital converter means for generating a digital representation of said signal;

means for deriving an information vector from said digital representation;

means for determining the amount of deviation between said information vector and the reference vector for said person;

comparing means for comparing the amount of deviation with the unique threshold for said person; and indicator means controlled by said comparing means for indicating verification of identity if the amount of deviation is less than the unique threshold and for indicating rejection of identity if the amount of deviation is greater than the unique threshold.

19. The apparatus of claim 18, also including means for updating the selected reference vector by recomputing said vector using the information vector derived from said handwritten information provided by the writer in the event that verification of identity is indicated.

20. Apparatus for verifying the identity of a writer of handwritten information by comparing a signal generated from the writing of said information with a known reference value, comprising pressure-responsive transducer means for converting forces generated from writing said information to an analog electrical signal representative thereof;

analog-to-digital converter means for generating a digital representation of said signal;

means for deriving an information vector from said digital representation including a plurality of Haar coefficients and a pluarlity of physical features; and means for comparing said information vector derived from said handwritten information with information derived from previous handwriting samples of the writer whose identity is to be verified to determine whether or not the identity of the writer is verified.

21. The apparatus of claim 20 in which said plurality of physical features includes a first group of features representative of the digital representation as a whole and a second group of features representative of each of a plurality of portions of said digital representation.

22. The apparatus of claim 20 in which the comparing means includes error means for determining the permissible amount of deviation between the information vector for the writing of the person whose identity is being tested and the reference information vector.

23. The apparatus of claim 20 in which the comparing means includes first means for determining the amount of deviation between said information vector and a reference vector, and also includes second means for comparing said amount of deviation with a predetermined deviation amount unique to said person.

24. The apparatus of claim 20, also including means for updating said information derived from previous handwriting samples by recomputing said information using the information vector derived from said digital representation in the event that verification of identity is indicated.

25. Apparatus for deriving a standard for verifying the identity of a person from handwritten signatures, comprising means for deriving an individual signature vector from each one of a plurality of handwriting samples of the same informational content of a person for whom a reference information vector is desired;

means for storing each said signature vector;

means for computing an average vector from said plurality of individual signature vectors;

means for computing an individual error value for each signature vector based on a comparison of each signature vector with the average vector;

means for computing an average error value using at least some of said individual error values;

means for computing an acceptance error value based upon said average error value;

means for comparing said individual error values with said acceptance error value;

means for discarding any individual signature vector having an error value in excess of the acceptance error value;

means for requesting additional handwriting samples for deriving additional individual signature vectors to replace those discarded;

means for computing individual error values for said additional individual signature vectors;

means for comparing said additional individual error values with said acceptance error value;

means for effecting the generation and testing of additional individual signature vectors until a predetermined number of acceptable individual signature vectors have been obtained;

means for computing a revised average signature vector from the acceptable individual signature vectors;

means for computing revised individual error values for each acceptable individual signature vector based on a comparison of each revised individual signature vector with the revised average signature vector;

means for computing a threshold value based upon the revised individual error values;

means for computing a normalizing vector assigning different weights to different aspects of the revised average signature vector in accordance with the degrees of consistency of said different aspects in the various individual signature vectors;

means for computing a reference vector based upon the revised average signature vector and the normalizing vector; and means for maintaining the threshold value and the reference value to be utilized jointly as a standard for use in evaluating a vector derived from a handwritten signature of a person whose identity is to be verified.

26. The apparatus of claim 25 in which the means for deriving includes means for producing an analog electrical signal from forces measured during the writing of the sample;

means for digitizing said analog signal;

means for compressing the digital signal;

means for extracting Haar coefficients and directly observable features from the compressed digital signal; and means for assembling an individual signature vector from said Haar coefficients and said directly observable features.

27. The apparatus of claim 26 in which the directly observable features include a first group of features representative of the compressed digital signal as a whole and a second group of features representative of each of a plurality of portions of said compressed digital signal.

28. Apparatus for deriving a standard for verifying the identity of a person from samples of handwriting, comprising means for deriving an individual information vector from each one of a plurality of handwriting samples of the same informational content of a person for whom a reference information vector is desired;

means for computing an average information vector from said plurality of individual information vectors;

means for computing individual error values and an average error value indicative of deviation of said individual information vectors from said average information vector;

means for computing an acceptance error value based upon said average error value;

means for computing a threshold value based upon the individual error values;

means for computing a normalizing vector which assigns different weights to different aspects of the average information vector;

means for computing a reference vector based upon the average information vector and the normalizing vector; and means for providing a verification standard comprising the threshold value and the reference value to be used jointly in evaluating a vector derived from a handwriting sample of a person whose identity is to be verified.

29. Apparatus for deriving a standard for verifying the identity of a person from samples of handwriting, comprising means for deriving an individual information vector from each one of a plurality of handwriting samples of the same informational content of a person for whom a reference information vector is desired;

means for computing an average information vector from said plurality of individual information vectors;

means for computing individual error values and an average error value indicative of deviation of said individual information vectors from said average information vector;

means for computing an acceptance error value based upon said average error value;

means for discarding any individual information vector having an error value in excess of the acceptance error value;

means for providing and testing additional individual information vectors until a predetermined number of acceptable individual information vectors have been obtained;

means for computing a revised average information vector and revised individual error values from the acceptable individual information vectors;

means for computing a threshold value based upon the revised individual error values;

means for computing a normalizing vector which assigns different weights to different aspects of the revised average information vector;

means for computing a reference vector based upon the revised average information vector and the normalizing vector; and means for providing a verification standard comprising the threshold value and the reference to be used jointly in evaluating a vector derived from a handwriting sample of a person whose identity is to be verified.

30. The apparatus of claim 29 in which the means for deriving includes means for producing an analog electrical signal from forces measured during the writing of the sample;

means for digitizing said analog signal;

means for compressing the digital signal;

means for extracting Haar coefficients and directly observable features from the compressed digital signal; and means for assembling an individual information vector from said Haar coefficients and said directly observable features.

31. The apparatus of claim 30 in which the directly observable features include a first group of features representative of the compressed digital signal as a whole and a second group of features representative of each of a plurality of portions of said compressed digital signal.

32. Apparatus for deriving an information vector for verifying the identity of a person from a handwriting sample, comprising transducer means for deriving an analog electrical signal from forces measured during the writing of the sample;

means for digitizing said analog signal;

means for compressing the digitized signal;

means for extracting Haar coefficients and directly observable features from the compressed digital signal; and means for deriving an information vector from said Haar coefficients and said directly observable features.

33. The apparatus of claim 32 in which the directly observable features include a first group of features representative of the compressed digital signal as a whole and a second group of features representative of each of a plurality of portions of said compressed digital signal.

* * * * *

UNITED STATES PATENT AND TRADEMARK OFFICE
CERTIFICATE OF CORRECTION

PATENT NO. : 4,308,522
DATED : December 29, 1981
INVENTOR(S) : Bruno J. Paganini et al.

It is certified that error appears in the above—identified patent and that said Letters Patent is hereby corrected as shown below:

Column 200, line 40, "information" should be --informational--.

Column 201, line 41, "pluarlity" should be --plurality--.

Signed and Sealed this

Sixth Day of July 1982

[SEAL]

Attest:

Attesting Officer

GERALD J. MOSSINGHOFF

Commissioner of Patents and Trademarks